United States Patent
Takase et al.

(10) Patent No.: US 11,001,295 B2
(45) Date of Patent: May 11, 2021

(54) MOTOR CONTROL DEVICE, MOTOR CONTROL METHOD, AND ELECTRIC POWER STEERING DEVICE

(71) Applicant: NSK Ltd., Tokyo (JP)

(72) Inventors: Hiroaki Takase, Tokyo (JP); Ryo Minaki, Tokyo (JP); Takayoshi Sugawara, Tokyo (JP); Kouichi Nampei, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/499,709

(22) PCT Filed: Oct. 26, 2018

(86) PCT No.: PCT/JP2018/039887
§ 371 (c)(1),
(2) Date: Sep. 30, 2019

(87) PCT Pub. No.: WO2019/083015
PCT Pub. Date: May 2, 2019

(65) Prior Publication Data
US 2020/0255055 A1 Aug. 13, 2020

(30) Foreign Application Priority Data

Oct. 26, 2017 (JP) .............................. JP2017-207030
Oct. 24, 2018 (JP) .............................. JP2018-200293
(Continued)

(51) Int. Cl.
*B62D 5/04* (2006.01)
*B62D 6/00* (2006.01)
*H02P 27/08* (2006.01)

(52) U.S. Cl.
CPC ........... *B62D 5/0409* (2013.01); *B62D 6/003* (2013.01); *H02P 27/08* (2013.01)

(58) Field of Classification Search
CPC ..... H02P 6/00; H02P 27/08; H02P 6/16; B62D 5/04; B62D 6/00
See application file for complete search history.

(56) References Cited

U.S. PATENT DOCUMENTS

| | | |
|---|---|---|
| 2003/0057913 A1 | 3/2003 | Matsushita et al. |
| 2006/0001392 A1 | 1/2006 | Ajima et al. |

(Continued)

FOREIGN PATENT DOCUMENTS

| | | |
|---|---|---|
| CN | 1558547 A | 12/2004 |
| CN | 102281027 A | 12/2011 |

(Continued)

OTHER PUBLICATIONS

International Search Report for PCT/JP2018/039887 dated Jan. 22, 2019 [PCT/ISA/210].

(Continued)

*Primary Examiner* — Said Bouziane
(74) *Attorney, Agent, or Firm* — Sughrue Mion, PLLC

(57) ABSTRACT

A motor control device for performing PWM control of an inverter for driving a three-phase brushless motor on the basis of a current command value, wherein the motor control device is provided with: a voltage command value computation unit for calculating a voltage command value using the current command value, and a motor rotation speed and a motor electric angle acquired for each control cycle from the three-phase brushless motor; an electric angle interpolation unit for estimating an interpolated electric angle from the motor electric angle at division intervals obtained by dividing the control cycle; a conversion unit for calculating a three-phase Duty command value from the voltage command value and the motor electric angle, and calculating a three-phase interpolated Duty command value from the voltage command value and the interpolated electric angle; and an output setting unit for switching between, and (Continued)

outputting, the three-phase Duty command value and the three-phase interpolated Duty command value so as to match the division intervals.

16 Claims, 88 Drawing Sheets

(30) Foreign Application Priority Data

| Oct. 24, 2018 | (JP) | JP2018-200294 |
|---|---|---|
| Oct. 24, 2018 | (JP) | JP2018-200295 |
| Oct. 24, 2018 | (JP) | JP2018-200296 |

(56) References Cited

U.S. PATENT DOCUMENTS

| 2007/0107973 A1 | 5/2007 | Jiang et al. |
|---|---|---|
| 2008/0067960 A1 | 3/2008 | Maeda et al. |
| 2019/0052203 A1* | 2/2019 | Yajima ............... H02P 6/28 |

FOREIGN PATENT DOCUMENTS

| CN | 106546273 A | 3/2017 |
|---|---|---|
| CN | 106685302 A | 5/2017 |
| CN | 107294337 A | 10/2017 |
| JP | 2001-119977 A | 4/2001 |
| JP | 2006-254532 A | 9/2006 |
| JP | 2006-304478 A | 11/2006 |
| JP | 2007-196860 A | 8/2007 |
| JP | 2011-097679 A | 5/2011 |
| JP | 2011-211786 A | 10/2011 |
| JP | 4946075 B2 | 6/2012 |
| JP | 2013-247832 A | 12/2013 |
| JP | 2015-100142 A | 5/2015 |
| JP | 2015-516722 A | 6/2015 |
| WO | 2013/138990 A1 | 9/2013 |
| WO | 2016098244 A1 | 6/2016 |
| WO | 2017037870 A1 | 3/2017 |

OTHER PUBLICATIONS

Communication dated Jun. 23, 2020, from the Intellectual Property of India in application No. 201917039055.
Search Report dated May 6, 2020, from the State Intellectual Property Office of the P.R.C in application No. 2018800256495.
Communication dated Oct. 15, 2020, issued by the European Patent Office in application No. 18869965.6.

* cited by examiner

MOTOR CONTROL DEVICE, MOTOR CONTROL METHOD, AND ELECTRIC POWER STEERING DEVICE

CROSS REFERENCE TO RELATED APPLICATIONS

This application is a National Stage of International Application No. PCT/JP2018/039887 filed Oct. 26, 2018, claiming priority based on Japanese Patent Application Nos. 2017-207030 filed Oct. 26, 2017, 2018-200293 filed Oct. 24, 2018, 2018-200294 filed Oct. 24, 2018, 2018-200295 filed Oct. 24, 2018 and 2018-200296 filed Oct. 24, 2018.

TECHNICAL FIELD

The present invention relates to a motor control device, a motor control method, and an electric power steering device. Priority is claimed on Japanese Patent Application No. 2017-207030 filed on Oct. 26, 2017, Japanese Patent Application No. 2018-200293 filed on Oct. 24, 2018, Japanese Patent Application No. 2018-200294 filed on Oct. 24, 2018, Japanese Patent Application No. 2018-200295 filed on Oct. 24, 2018, and Japanese Patent Application No. 2018-200296 filed on Oct. 24, 2018, the contents of which are incorporated herein by reference.

BACKGROUND ART

In an electric power steering device (EPS) or the like that applies a steering assist force (assist force) in a steering mechanism of a vehicle, a high efficiency brassiness motor is often used. A motor control device for controlling a brushless motor controls an inverter that drives the brushless motor by PWM (Pulse Width Modulation) control. In recent years, the dead time compensation of an inverter has become essential to a brushless motor mounted on a product requiring high reliability such as an on-vehicle product.

In a motor control device that performs PWM control of a brushless motor, there is a problem that the brushless motor vibrates at a frequency (for example, 4 KHz) according to a cycle (for example, 250 µs) for performing a PWM calculation, and generates a sound caused by the motor of that frequency. As the simplest method of suppressing the noise caused by the motor, there is a method of performing the PWM calculation in a cycle (50 µs or less) such that the vibrating frequency of the motor is out of the audible range (20 KHz or more). There is a problem that, since the amount of calculation processing increases, an expensive microcomputer with high processing capacity is required, and the cost of parts of the ECU increases and the power consumption increases because the operating frequency is high.

In the electric power steering device described in Patent Document 1, when generating a PWM signal, an interpolated Duty command value is calculated using a control signal (Duty command value) of PWM control calculated immediately before, and the control signal of PWM control is fluctuated in a cycle twice as long as the cycle in which the PWM calculation is performed. While the increase in the amount of calculation processing of the microcomputer is slight, it is possible to suppress the vibration of the brushless motor and the noise caused by the motor.

PRIOR ART DOCUMENTS

Patent Document

[Patent Document 1] Japanese Patent (Granted) Publication No. 4946075

SUMMARY OF THE INVENTION

Problems to be Solved by the Invention

However, the electric power steering device described in Patent Document 1 calculates the interpolated Duty command value using the Duty command value. Depending on the response of current control and the accuracy of current detection, the duty command value may transiently change, and therefore the interpolated Duty command value may be a value including a large noise. There is a problem that, when the interpolated Duty command value includes large noise, abnormal noise is generated particularly at high speed steering.

Patent Document 1 also describes a method of calculating an interpolated Duty command value using a rotation angle of a rotor. The angular velocity calculated by differentiating the rotational angle of the rotor is used for calculating the interpolated Duty command value. However, removal of the noise component is not sufficient only by performing the differential calculation on the rotation angle of the rotor, and the interpolated Duty command value may be a value including a large noise.

In addition, when dead time compensation of the inverter is performed in the motor control device, it is desired to calculate the interpolated Duty command value without being affected by the noise of the dead time compensation value including the transient response.

Based on the above circumstances, it is an object of the present invention to provide a motor control device, a motor control method, and an electric power steering device equipped with the motor control device that calculates an interpolated Duty command value with little noise, and capable of suitably suppressing vibration of a brushless motor and sound caused by the motor.

Means for Solving the Problems

In order to solve the above-mentioned subject, this invention proposes the following means.

A motor control device according to a first aspect of the present invention is a motor control device that performs PWM control of an inverter that drives a three-phase brushless motor based on a current command value, comprising: a voltage command value computation unit that calculates a voltage command value using a motor electric angle and a motor rotation speed acquired from the three-phase brushless motor for each control cycle, and the current command value; an electric angle interpolation unit that estimates an interpolated electric angle from the motor electric angle at a division interval obtained by dividing the control cycle; a converter configured that calculates a three-phase Duty command value from the voltage command value and the motor electric angle, and calculates a three-phase interpolated Duty command value from the voltage command value and the interpolated electric angle; and an output setting unit that switches and outputs the three-phase Duty command value and the three-phase interpolated Duty command value in accordance with the division interval.

According to a second aspect of the present invention, in the motor control device according to the first aspect, the electric angle interpolation unit may estimate the interpolated electric angle using one of a quadratic function interpolation calculation and a linear function interpolation calculation.

According to a third aspect of the present invention, in the motor control device according to the second aspect, the electric angle interpolation unit may estimate the interpolated electric angle using the quadratic function interpolation calculation when the motor rotation speed is lower than a predetermined first rotation speed, and switched the quadratic function interpolation calculation to the linear function interpolation calculation when the motor rotation speed is equal to or higher than the first rotation speed.

According to a fourth aspect of the present invention, in the motor control device according to the third aspect, the electric angle interpolation unit may output the motor electric angle as the interpolated electric angle when the motor rotation speed is higher than a predetermined second rotation speed higher than the first rotation speed.

According to a fifth aspect of the present invention, in the motor control device according to any one of the first to fourth aspects, the control cycle may be 100 µs or more and 250 µs or less.

According to a sixth aspect of the present invention, in the motor control device according to any one of the first to fifth aspects, the three-phase brushless motor may be controlled by a vector drive system, and the converter may perform space vector modulation.

A motor control method according to a seventh aspect of the present invention is a motor control method for a three-phase brushless motor in which an inverter is PWM-controlled based on a current command value, comprising: a voltage command value calculation step of calculating a voltage command value using a motor electric angle and a motor rotation speed acquired from the three-phase brushless motor for each control cycle, and the current command value; an electric angle interpolation step of estimating an interpolated electric angle from the motor electric angle at a division interval obtained by dividing the control cycle; a converting step of calculating a three-phase Duty command value from the voltage command value and the motor electric angle, and calculating a three-phase interpolated Duty command value from the voltage command value and the interpolated electric angle; and an output setting step of switching and outputting the three-phase Duty command value and the three-phase interpolated Duty command value in accordance with the division interval.

According to an eighth aspect of the present invention, in the motor control method according to the seventh aspect, in the electric angle interpolation step, a quadratic function interpolation calculation and a linear function interpolation calculation may be switched to estimate the interpolated electric angle.

According to a ninth aspect of the present invention, in the motor control method according to the eighth aspect, in the electric angle interpolation step, the interpolated electric angle may be estimated using the quadratic function interpolation calculation when the motor rotation speed is lower than a predetermined first rotation speed, and the quadratic function interpolation calculation may be switched to the linear function interpolation calculation when the motor rotation speed is equal to or higher than the first rotation speed.

According to a tenth aspect of the present invention, in the motor control method according to the ninth aspect, in the electric angle interpolation step, the motor electric angle may be output as the interpolated electric angle when the motor rotation speed is higher than a predetermined second rotation speed higher than the first rotation speed.

An electric power steering device according to an eleventh aspect of the present invention is a vector control type, having a function of converting a dq-axis current command value calculated based on at least a steering torque is into a three-phase Duty command value, driving and controlling a three-phase brushless motor by PWM control of an inverter based on the three-phase Duty command value, compensating for a dead time of the inverter, and providing an assist torque to a steering mechanism of a vehicle, the electric power steering device comprising: a first space vector modulation unit that converts a dq-axis Duty command value calculated based on the dq-axis current command value, a motor angle, and a motor rotation speed, into three phases according to the motor angle, to superimpose a third harmonic, and outputs a three-phase normal Duty command value; an electric angle interpolation unit that performs interpolation calculation based on the motor angle and outputs a motor angle for interpolation Duty calculation; a second space vector modulation unit that converts the dq-axis Duty command value into three phases according to the interpolation Duty calculation motor angle, superimposes third harmonics, and outputs a three phase interpolated Duty command value; a final Duty computation unit that outputs a final normal Duty value and a final interpolated Duty value based on the normal Duty command value and the interpolated Duty command value.

According to a twelfth aspect of the present invention, in the electric power steering device according to the eleventh aspect, the electric angle interpolation unit may include: a motor angle switching determination unit that determines whether the motor angle falls within a predetermined range and outputs a switching flag; an calculation processing unit that interpolates the motor angle; an offset-added calculation processing unit which performs interpolation calculation of the motor angle for which offset processing has been performed at a predetermined angle, and performs offset return processing for the predetermined angle for which the interpolation calculation has been performed; and a switching unit that receives a first interpolation motor angle from the calculation processing unit and a second interpolation motor angle from the offset-added calculation processing unit, and switches by the switching flag to output the interpolation Duty calculation motor angle.

According to a thirteenth aspect of the present invention, in the electric power steering device according to the eleventh or twelfth aspect, the interpolation calculation may be a quadratic function interpolation calculation or a linear function interpolation calculation.

According to a fourteenth aspect of the present invention, in the electric power steering device according to any of the eleventh to thirteenth aspects, the calculation processing unit may include a first rollover processing unit, and the offset-added calculation processing unit may include a second rollover processing unit after the offset processing, and includes a third rollover processing unit after the offset return processing.

According to a fifteenth aspect of the present invention, in the electric power steering device according to any one of the twelfth to fourteenth aspects, the predetermined range may be a range of 90° or more and 270° or less.

According to a sixteenth aspect of the present invention, in the electric power steering device according to any of the twelfth to fifteenth aspects, the predetermined angle may be 180°.

Effect of the Invention

According to the motor control device, the motor control method, and the electric power steering device equipped with the motor control device of the present invention, it is possible to calculate the interpolated Duty command value with less noise, preferably suppress the noise due to the vibration of the brushless motor or the motor, and reduce the sound caused by the motor in the audible range.

PREFERRED EMBODIMENTS FOR CARRYING OUT THE INVENTION

First Embodiment

A first embodiment of the present invention will be described with reference to FIGS. 1 to 14.

Figure 1:
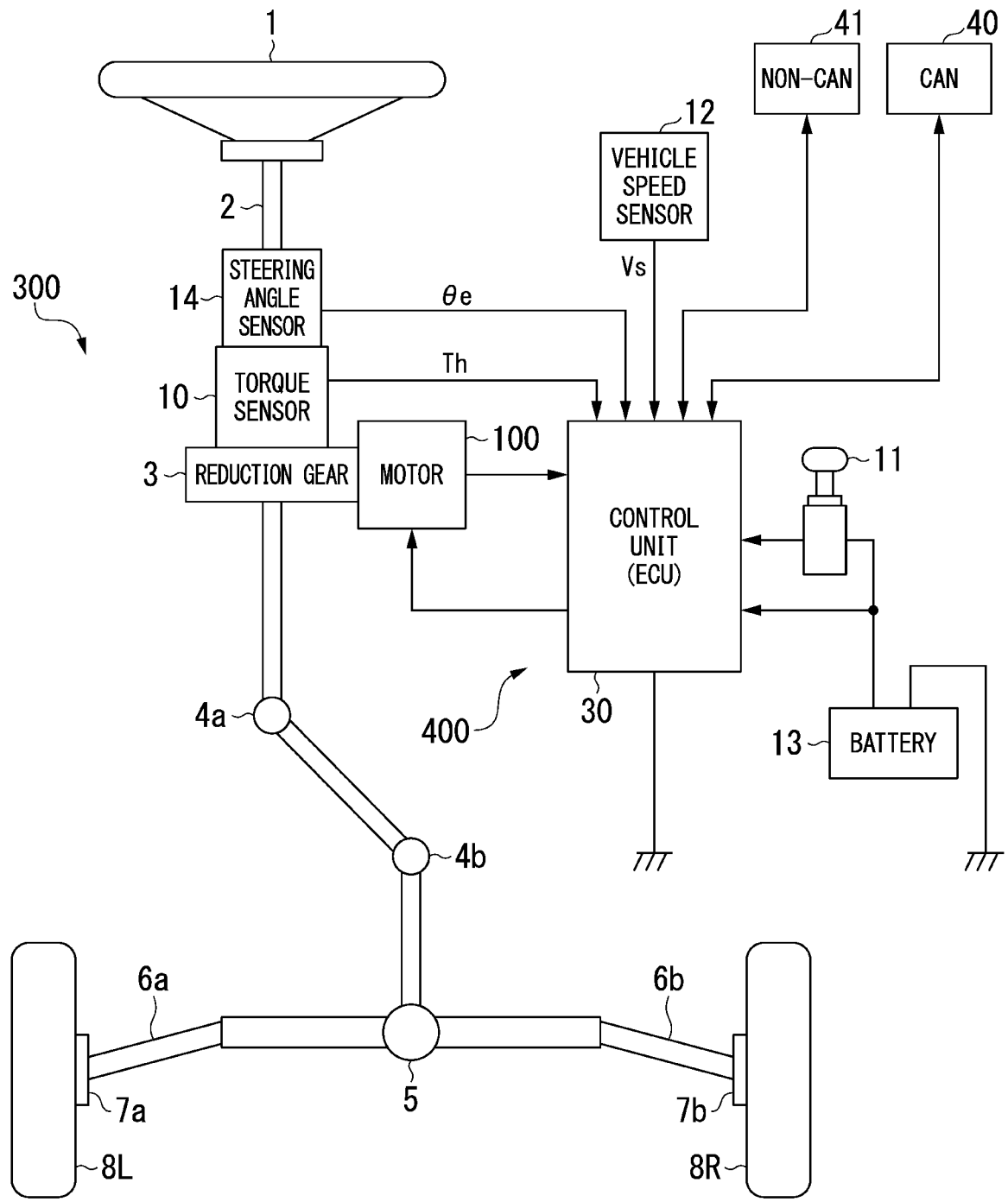
FIG. 1 is a schematic view showing a configuration of an electric power steering device equipped with a motor control device according to a first embodiment.

FIG. 1 is a schematic view showing a configuration of an electric power steering device 300 equipped with a motor control device 400 according to the present embodiment. The electric power steering device 300 is a column assist type electric power steering device in which an electric motor and a reduction mechanism are disposed in a column portion (steering shaft).

[Electric Power Steering Device 300]

The electric power steering device 300 is connected to the steering wheels 8L and 8R via the column axis (steering shaft, handle shaft) 2 of the steering wheel 1, the reduction gear 3, the universal joints 4a and 4b, the pinion rack mechanism 5, the tie rods 6a and 6b, and further the hub units 7a and 7b. In addition, a steering angle sensor 14 for detecting a steering angle θe of the steering wheel 1 and a torque sensor 10 for detecting a steering torque Th of the steering wheel 1 are provided on the column shaft 2, and a motor 100 to assist the steering force of the steering wheel 1 is connected to the column shaft 2 via a reduction gear 3. To the control unit (ECU) 30 that controls the electric power steering device 300, electric power is supplied from the battery 13 and an ignition key signal is input through the ignition key 11.

The control unit 30 calculates the current command value of the assist (steering assist) command based on the steering torque Th detected by the torque sensor 10 and the vehicle speed Vs detected by the vehicle speed sensor 12, and controls the motor 100 by a voltage control command value Vref which is the calculated current command value subjected to compensation or the like. The steering angle sensor 14 is not essential and may not be disposed, and the steering angle (motor angle) θe can be obtained from a rotation sensor such as a resolver connected to the motor 100.

The control unit 30 mainly includes a program executable computer including a central processing unit (CPU) (including an MPU (Micro Processor Unit), an MCU (Micro Controller Unit), or the like).

The control unit 30 includes circuits such as an inverter 161 that drives the motor 100, a motor current detection circuit 162 that detects the current of the motor 100, and an angle detection unit 110A that detects the motor angle θe of the motor 100. These circuits may be mounted on the motor 100 side.

The control unit 30 is connected to a CAN (Controller Area Network) 40 that transmits and receives various information of the vehicle, and the vehicle speed Vs can also be received from the CAN 40. The control unit 30 can also be connected to a non-CAN 41 that transmits and receives communications other than the CAN 40, analog/digital signals, radio waves, or the like.

The motor 100 is a three-phase brushless motor that is mainly used as an actuator of the electric power steering device 300 in recent years. The motor 100 is controlled by a vector control method using space vector drive. In the vector control method using space vector drive, the q axis for controlling the torque, which is the coordinate axis of the rotor of the motor 100, and the d axis for controlling the strength of the magnetic field are set independently, and the dq axis is 90°. Thereby, the current corresponding to each axis (d-axis current command value Iref_d, q-axis current command value Iref_q) is controlled by the vector.

[Motor Control Device 400]

Figure 2:
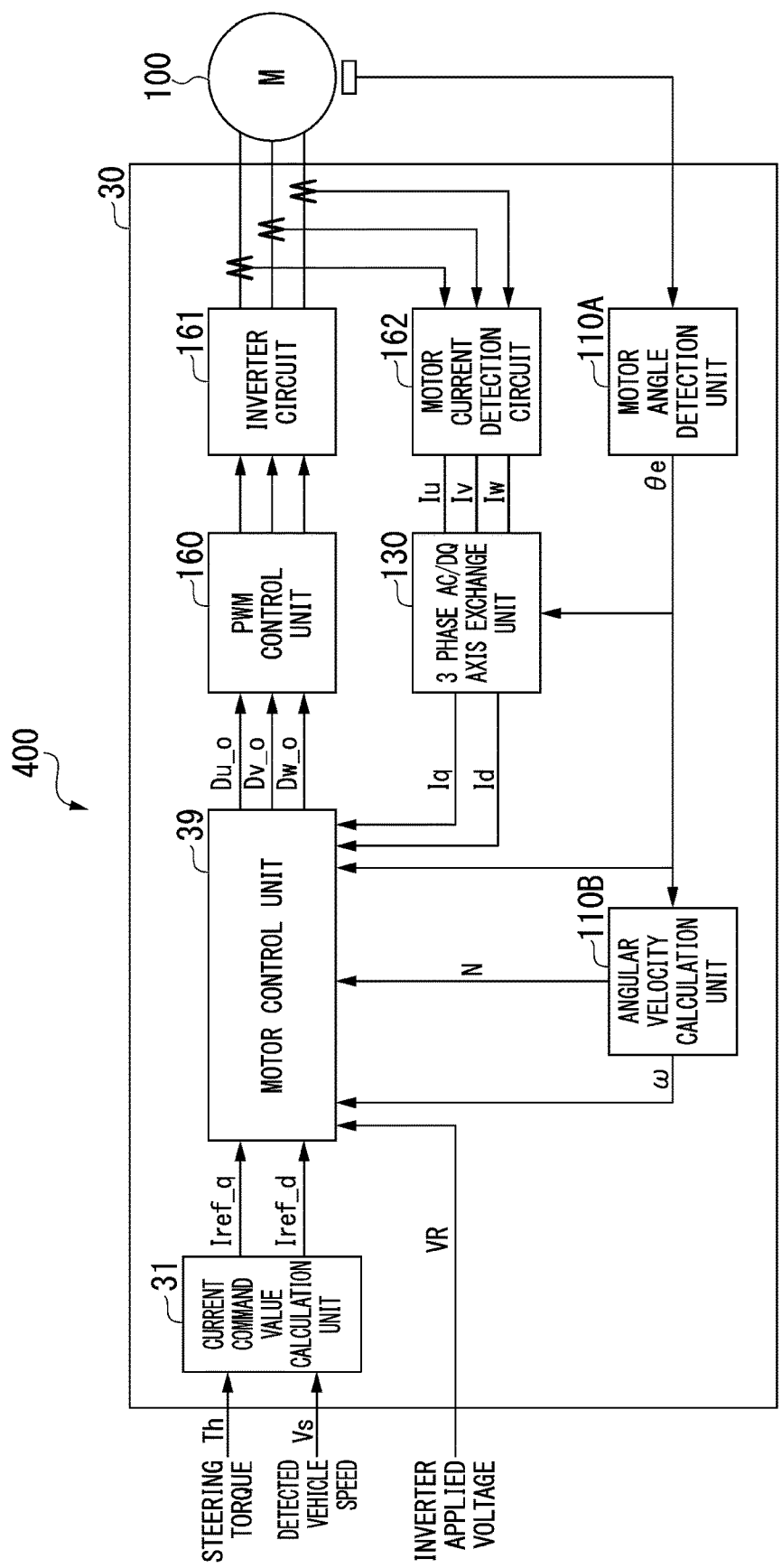
FIG. 2 is a functional configuration diagram of a motor control device configured by a control unit of the same electric power steering device.

FIG. 2 is a functional block diagram of the motor control device 400 configured by the control unit 30. As shown in FIG. The function of the motor control device 400 is realized by appropriately combining a program executed by a CPU or the like and an electronic circuit such as an inverter. The functions described as the electronic circuit in the following description may be realized as a program executed by a CPU or the like.

The motor control device 400 performs drive control of the motor 100. The motor control device 400 includes a current command value computation unit 31, a motor control unit 39, a PWM control unit 160, an inverter 161, a motor current detection circuit 162, a motor angle detection unit 110A, an angular velocity computation unit 110B, and a three-phase alternating current/dq axis conversion unit 130.

The current command value computation unit 31 outputs dq axis current command value Iref_m (m=d, q) of two axes (dq axis coordinate system) calculated using an assist map or the like based on steering torque Th and vehicle speed Vs or the like, to the motor control unit 39.

The motor control unit 39 calculates a voltage control command value Vref_mb (m=d, q) that has been subjected to dead time compensation from the dq axis current command value Iref_m (m=d, q), the motor angle θe, the motor rotation speed N, or like. Further, the motor control unit 39 calculates three phase Duty command values Du_o, Dv_o and Dw_o by space vector modulation from the voltage control command value Vref_mb (m=d, q) or the like, and outputs them to the PWM control unit 160.

Figure 3:
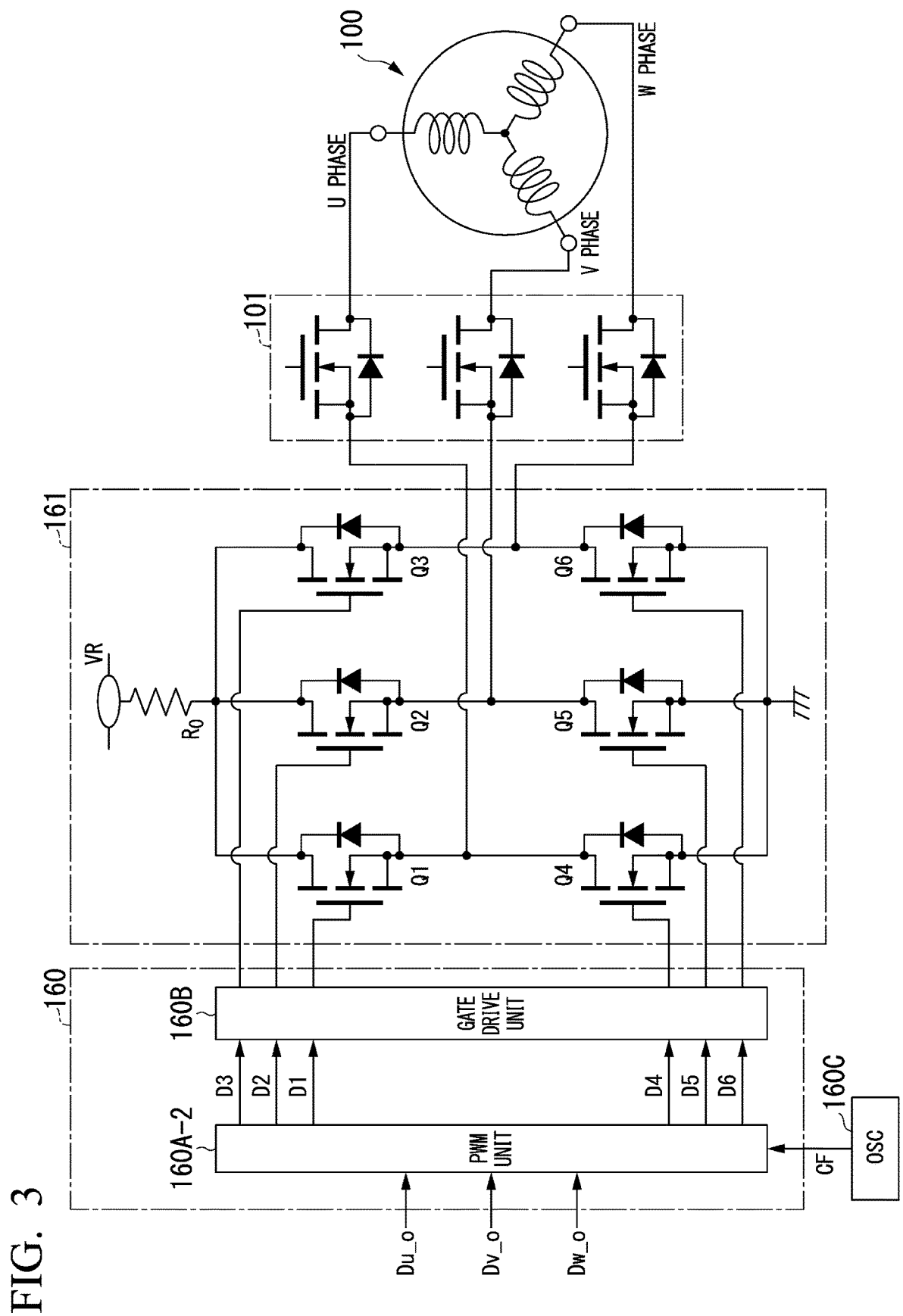
FIG. 3 is a block diagram of a PWM control unit and an inverter of the motor control device.

FIG. 3 is a configuration diagram of the PWM control unit 160 and the inverter 161.

The inverter 161 is, as shown in FIG. 3, configured by a three-phase bridge of FETs, and drives the motor 100 by being turned ON/OFF with PWM-Duty values D1 to D6. Between the inverter 161 and the motor 100, a motor switch 101 for interrupting the supply of current when the assist control is stopped or the like is interposed. The upper arm is configured by FETs Q1, Q2 and Q3 as switching elements, and the lower arm is configured by FETs Q4, Q5 and Q6. Also, FETs Q1 and Q4 are U-phase, FETs Q2 and Q5 are V-phase, and FETs Q3 and Q6 are W-phase drive elements.

As shown in FIG. 3, the PWM control unit 160 controls driving of the motor 100 via an inverter (inverter applied voltage VR) 161 having a bridge configuration of upper and lower arms as shown in FIG. 3 based on the input three-phase Duty command values Du_o, Dv_o, and Dw_o. As shown in FIG. 3, the PWM control unit 160 includes a PWM unit 160A-2 and a gate driving unit 160B.

As shown in FIG. 3, the PWM unit 160A-2 calculates three-phase PWM-Duty values D1 to D6 according to predetermined equations for the three-phase Duty command values Du_o, Dv_o, Dw_o. A modulation signal (carrier) CF of, for example, a triangular wave is input to the PWM unit 160A-2 from the oscillation unit 160C, and the PWM unit 160A-2 calculates PWM-Duty values D1 to D6 in synchronization with the modulation signal CF.

As shown in FIG. 3, the gate driver 160B outputs PWM-Duty values D1 to D6 to drive the gates of the FETs Q1 to Q6 which are drive elements.

Since the electric power steering device 300 is an in-vehicle product, the operating temperature range is wide, and from the viewpoint of fail-safe, the inverter 161 for driving the motor 100 needs to have a longer dead time (industrial equipment <EPS) than that for general industrial use represented by home appliances. In general, switching elements (for example, FETs (Field-Effect Transistors)) have a delay time at the time of OFF, and therefore, if the switching elements of the upper and lower arms are simultaneously switched OFF/ON, there may be a situation where the DC link is short-circuited. In order to prevent occurrence of this situation, a time (dead time) in which the switching elements of both the upper and lower arms are turned off is provided.

When the dead time compensation as described above is performed, the current waveform is distorted and the response of current control and steering feeling deteriorate, and for example, when the steering is slowly performed while the steering wheel is in the vicinity of the on-center, there may be a discontinuous steering feeling due to torque ripple or the like.

The current detector 162 detects three-phase motor currents Iu, Iv, Iw of the motor 100, as shown in FIG. 2. The detected three-phase motor currents Iu, Iv, Iw are input to the three-phase AC/dq axis converter 130 and converted into two-phase feedback dq axis currents Id, Iq. The two-phase feedback dq axis currents Id and Iq are input to the motor control unit 39.

The motor angle detection unit 110A calculates and acquires the motor angle θe of the motor 100, if necessary. The motor angle θe is input to the angular velocity computation unit 110B, the motor control unit 39, and the three-phase AC/dq axis conversion unit 130.

The angular velocity computation unit 110B obtains the motor rotation speed N and the motor angular velocity ω from the motor angle θe by calculation. The motor rotation speed N and the motor angular velocity ω are input to the motor control unit 39.

[Motor Control Unit 39]

Figure 4:
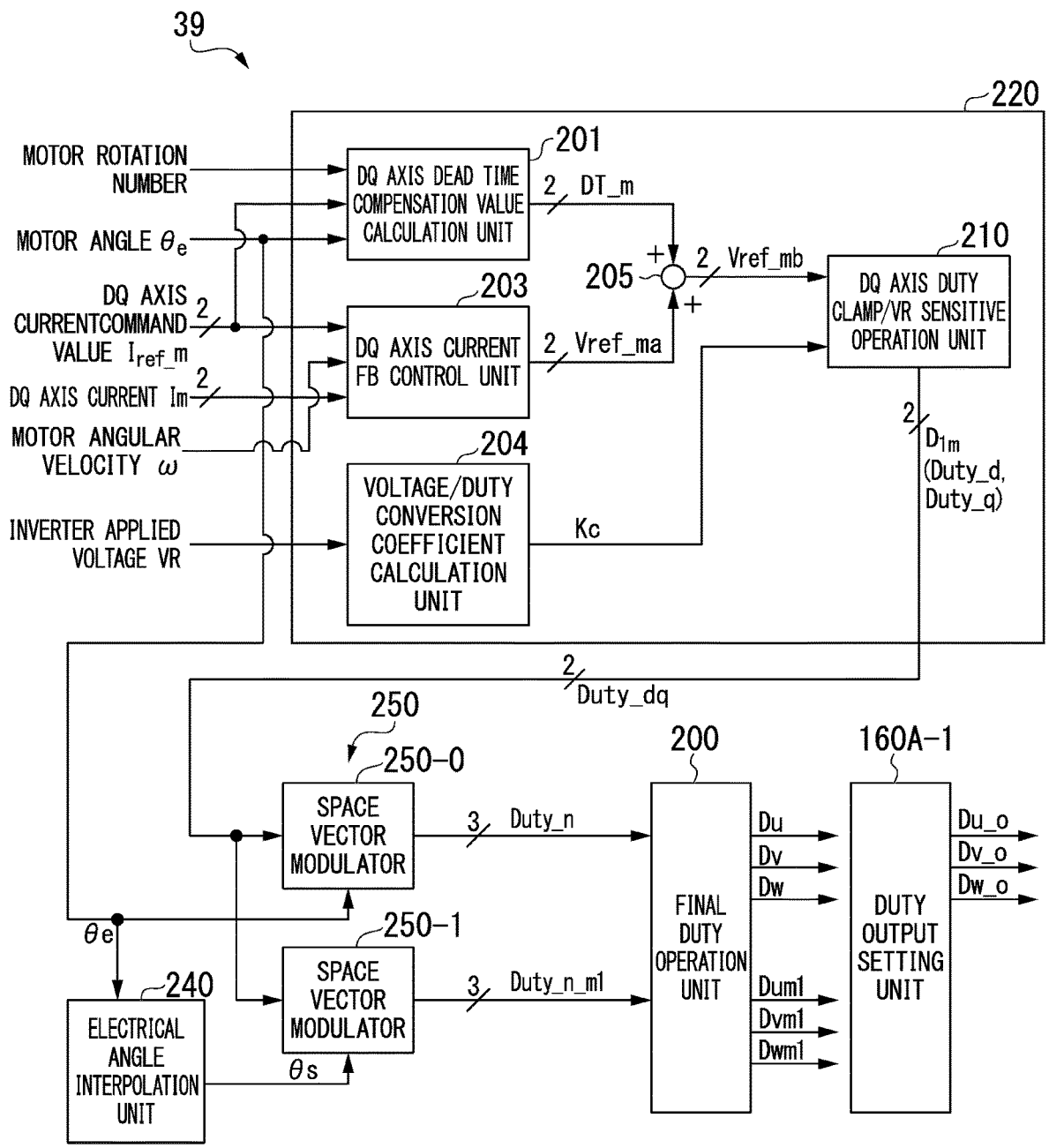
FIG. 4 is a functional configuration diagram of a motor control unit of the motor control device.

FIG. 4 is a functional block diagram of the motor control unit 39.

The motor control unit 39 includes a voltage command value computation unit 220, an electric angle interpolation unit 240, a space vector modulation unit 250, a final Duty computation unit 200, and a Duty output setting unit 160A-1.

The voltage command value computation unit 220 includes a dq axis dead time compensation value computation unit 201, a dq axis current feedback control unit 203, a voltage/Duty conversion coefficient computation unit 204, an adding unit 205, and a dq axis Duty clamp/VR sensitivity computation unit 210.

The voltage command value computation unit 220 calculates a voltage command value using the motor electric angle θe and the motor rotation speed acquired from the motor 100 for each control cycle Tc, the current command value Iref_m (m=d, q), or the like (voltage command value calculation step).

The dq axis dead time compensation value computation unit 201 outputs the dq axis dead time compensation value DT_m (m=d, q) calculated from the input motor rotation speed N, the motor angle (electric angle) θe, and the dq axis current command value Iref_m (m=d, q), to the adding unit 205.

The dq-axis current feedback control unit 203 outputs the voltage control command value Vref_ma (m=d, q) calculated from the input motor angular velocity ω, the dq-axis current command value Iref_m (m=d, q), and the two-phase feedback dq-axis current Im (m=d, q) (Id, Iq), to the adding unit 205.

The voltage/duty conversion coefficient computation unit 204 calculates a voltage/duty conversion coefficient Kc in accordance with the inverter applied voltage VR.

The adding unit 205 outputs the voltage control command value Vref_mb (m=d, q) obtained by adding the dq-axis dead time compensation value DT_m (m=d, q) and the voltage control command value Vref_ma (m=d, q), to the three-phase Duty clamp/VR sensitive computation unit 210.

The dq axis Duty clamp/VR (inverter applied voltage) sensitive computation unit 210 inputs the Duty command value D1m (m=d, q) (Duty_d, Duty_q) for dq axis normal, which is calculated by multiplying the voltage control command value Vref_mb (m=d, q) and the conversion coefficient Kc of voltage/duty conversion, to the space vector modulation unit 250.

[Electric Angle Interpolation Unit 240]

Figure 5:
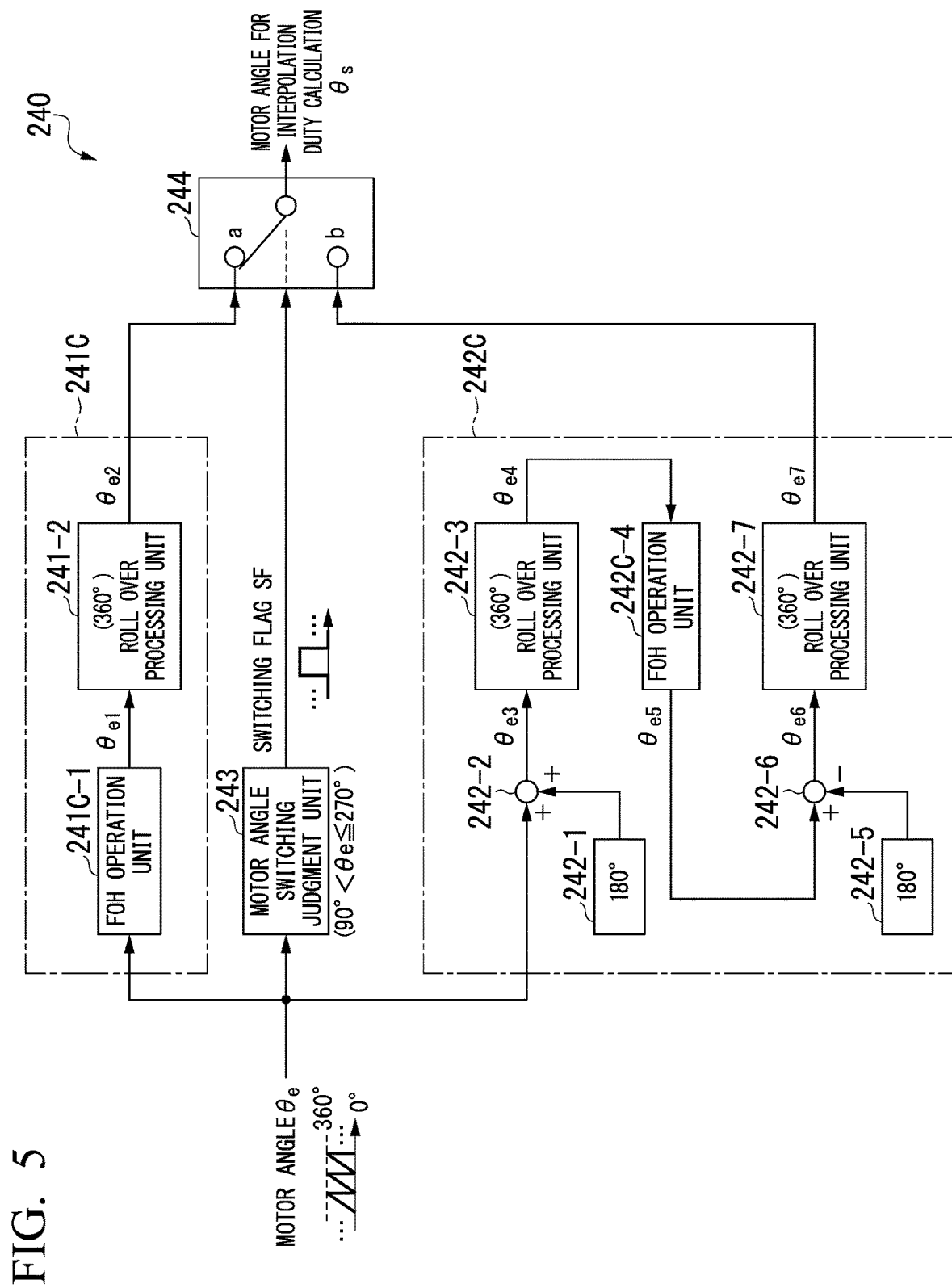
FIG. 5 is a block diagram of an electric angle interpolation unit of the motor control unit.

FIG. 5 is a block diagram of the electric angle interpolation unit 240.

The electric angle interpolation unit 240 calculates a motor angle (interpolated electric angle) θs for interpolation Duty calculation from the input motor angle θe, and outputs it to the space vector modulation unit 250 (electric angle interpolation step).

The electric angle interpolation unit 240 estimates the motor angle (interpolated electric angle) θs after the elapse of Tc/2 from the control cycle Tc by a quadratic function interpolation calculation (Second Order Hold calculation: for the following, the quadratic function interpolation calculation is simply referred to as "SOH calculation") with respect to the motor angle θe detected in the control cycle 250 μs (Tc), and calculates the interpolated Duty command value based on the estimated motor angle (interpolated electric angle) θs.

In the dq-axis current control performed by the electric angle interpolation unit 240, the duty command value after space vector modulation is not set as an interpolation target. This is because the Duty command value after space vector modulation includes a dead time compensation value with a transient change and a noise component caused by the distortion component of the third high frequency due to space vector modulation, or the like, and the interpolated Duty command value calculated by directly interpolating the Duty command value may be a value including large noise.

As shown in FIG. 5, the electric angle interpolation unit 240 includes a calculation processing unit 241 (SOH calculating unit 241-1 and rollover processing unit 241-2) that receives the motor angle θe and directly performs an SOH calculation, an offset-added calculation processing unit 242 that receives the motor angle θe, performs offset processing or the like, and performs SOH calculation, a motor angle switching determination unit 243 that determines whether the motor angle θe belongs to a range where the motor angle θe is greater than 90° and equal to or less than 270° and other ranges, and outputs a switching flag SF, and a switching unit 244 that switches the contacts a and b by the switching flag SF and outputs the motor angle (interpolated electric angle) θs for interpolation Duty calculation.

FIG. 6 shows the interpolated electric angle calculated by the SOH calculation after the control cycle Tc has elapsed from Tc/2. By calculating the interpolated electric angle θs using the motor electric angle θe detected before, it is possible to make the change of the electric angle smooth.

Figure 6A:
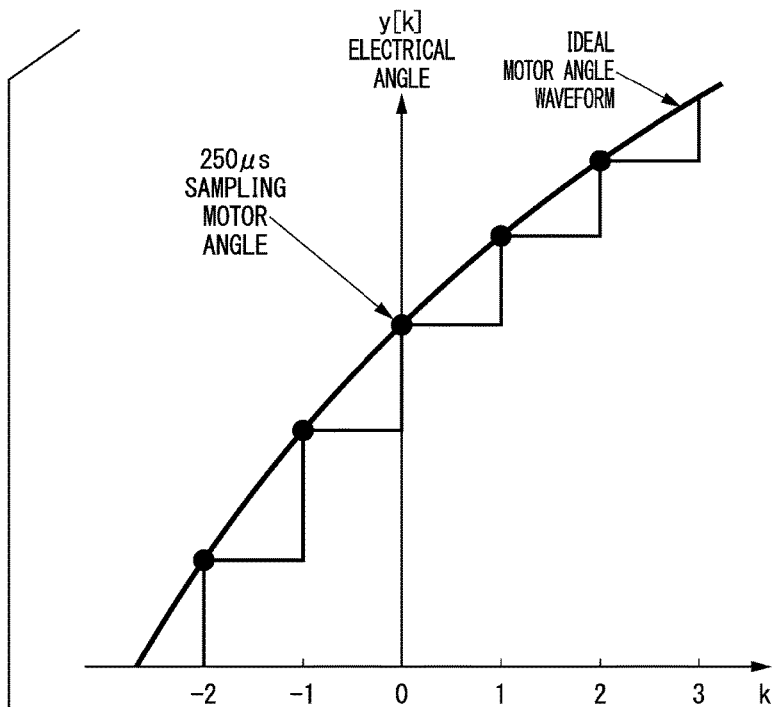
FIG. 6(A) and FIG. 6(B) are graphs showing an interpolated electric angle calculated by the same electric angle interpolation unit by SOH calculation.
Figure 6B:
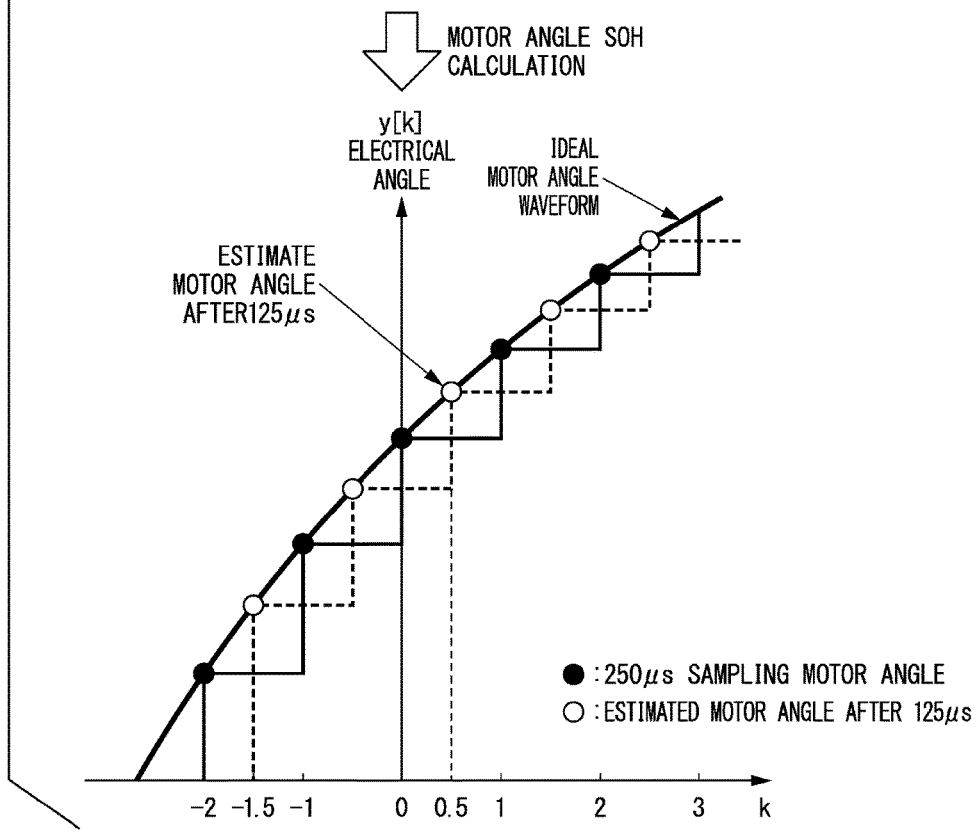

As shown in FIG. 6(A), the sampling waveform every 250 μs naturally becomes a staircase waveform of 250 μs with respect to the arc-shaped ideal motor angle waveform, but as shown in FIG. 6(B), the sampling cycle can be doubled by estimating the motor angle after 125 μs by SOH calculation.

The function y [k] used for the SOH calculation is expressed by Equation 1. y [k] is a function representing the motor angle (electric angle) at the control cycle number k.

[Equation 1]

$$y[k]ak^2+bk+c \qquad \text{(EQUATION 1)}$$

Equation 2 is established by using the coefficients a, b, c when the second previous value is y[−2], the last value is y[−1], and the current value is y[0].

[Equation 2]

$$\begin{cases} y[0] = c \\ y[-1] = a - b + c \\ y[-2] = 4a - 2b + c \end{cases} \quad \text{(EQUATION 2)}$$

By arranging the above equations, a, b, c are expressed as Equation 3 using y [0], y [−1], y [−2].

[Equation 3]

$$\begin{cases} a = (y[-2] - 2y[-1] + y[0])/2 \\ b = (y[-2] - 4y[-1] + 3y[0])/2 \\ c = y[0] \end{cases} \quad \text{(EQUATION 3)}$$

Substituting Equation 3 into Equation 1 results in Equation 4.

[Equation 4]

$$y[k] = ak^2 + bk + c = ((k^2 + 3k + 2)/2)y[0] + ((-2k^2 - 4k)/2)y[-1] + ((k^2 + k)/2)y[-2] \quad \text{(EQUATION 4)}$$

Since the interpolated electric angle θs1 is an electric angle after the lapse of Tc/2 from the control cycle Tc, it can be calculated by substituting k=0.5 into the Equation 4.

[Equation 5]

$$y[0.5] = (15y[0] - 10y[-1] + 3y[-2])/8 \quad \text{(EQUATION 5)}$$

Figure 7:
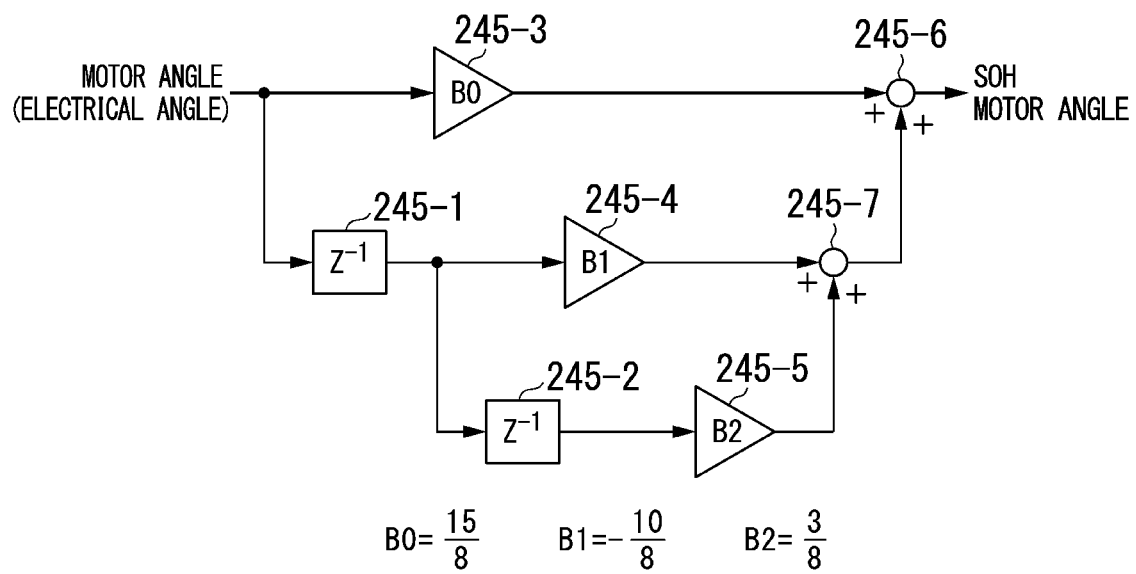
FIG. 7 is a functional configuration diagram of an SOH computation unit of the electric angle interpolation unit.

FIG. 7 is a functional block diagram of the SOH computation unit 241-1 (242-4).

The SOH computation unit 241-1 includes a holding unit 245-1 and a holding unit 245-2 of the previous value of the motor angle θe, a coefficient unit B0 (245-3), a coefficient unit B1 (245-4), a coefficient unit B2 (245-5), an adding unit 245-6, and an adding unit 245-7.

The motor angle θe is input to the coefficient unit B0 (245-3) and the holding unit 245-1, and the holding value of the holding unit 245-1 is input to the coefficient unit B1 (245-4) and the holding unit 245-2. The holding value of holding unit 245-2 is input to the coefficient unit B2 (245-5), and the output values of the coefficient unit B0 (245-3), the coefficient unit B1 (245-4) and the coefficient unit B2 (245-5) are added by the adding unit 245-7 and the adding unit 245-6 to be output as the interpolated electric angle θs.

The coefficients B0, B1, and B2 at the time of calculating the interpolated electric angle θs are calculated by Equation 5 as shown in FIG. 7.

As shown in FIG. 5, the calculation processing unit 241 in the electric angle interpolation unit 240 includes an SOH computation unit 241-1 that receives the motor angle θe to perform SOH calculation, and a rollover processing unit 241-2 that performs rollover processing (waveform processing) on the motor angle θe1 output from the SOH computation unit 241-1. The motor angle (first interpolation motor angle) θe2 subjected to rollover processing by the rollover processing unit 241-2 is input to the contact a of the switching unit 244.

As shown in FIG. 5, the offset-added calculation processing unit 242 includes an adding unit 242-2 that performs offset processing using a coefficient 180° that is input from the fixing unit 242-1 when the motor angle θe is input, a rollover processing unit 242-3 that performs rollover processing (waveform processing) on the motor angle θe3 input from the adding unit 242-2, an SOH computation unit 242-4 that corrects the motor angle θe4 input from the rollover processing unit 242-3, a subtraction unit 242-6 that receives the motor angle θe5 from the SOH computation unit 242-4 to perform offset return processing using a coefficient of 180° input from the fixing unit 242-5, and a rollover processing unit 242-7 that performs rollover processing (waveform processing) on the motor angle θe6 input from the subtraction unit 242-6. The motor angle (second interpolation motor angle) θe7 subjected to rollover processing in the rollover processing unit 242-7 is input to the contact b of the switching unit 244.

The motor angle θe2 from the rollover processing unit 241-2 of the calculation processing unit 241 is input to the contact a of the switching unit 244, and the motor angle θe7 from the rollover processing unit 242-7 of the offset-added calculation processing unit 242 is input to the contact b of the switching unit 244. The contacts a and b of the switching unit 244 are switched by the switching flag SF ("H", "L") from the motor angle switching determination unit 243, and the motor angle (interpolated electric angle) θs for interpolation Duty calculation is output from the switching unit 244.

The motor angle (electric angle) θe returns to 0° if it exceeds 360° when moving from the current motor angle to the next motor angle. At this time, since a transient angle variation occurs, if SOH calculation is performed using the current motor angle, an accurate interpolation calculation result may not be obtained. In order to avoid this problem, the electric angle interpolation unit 240 switches the calculation output (motor angle θs for interpolation Duty calculation) according to the motor angle θe of the input electric angle.

When the motor angle θe is in the range of 90°<θe≤270°, there is no transient angle fluctuation in the motor angle θe. Therefore, the electric angle interpolation unit 240 performs the SOH calculation on the input motor angle θe.

On the other hand, when the motor angle θe is in the range of 0°≤θe≤90° or 270°≤θe≤360°, there is a transient angle fluctuation in the motor angle θe. Therefore, the electric angle interpolation unit 240 offsets the motor angle θe by 180°, converts it into a continuous angle signal to perform SOH calculation, and performs 180° offset return processing on the interpolation calculation result after the SOH calculation.

The motor angle switching determination unit 243 generates the switching flag SF ("H" when 90°<θe≤270°, "L" when 0°≤θe≤90° or 270°<θe≤360°) from the input motor angle θe.

The switching unit 244 selects and outputs the motor angle (interpolated electric angle) θs for the interpolation Duty calculation after the SOH calculation based on the switching flag SF.

That is, when 90°<θe≤270°, the switching unit 244 is controlled as shown in Equation 6, and outputs the motor angle θe2 as the motor angle θs for interpolation Duty calculation.

[Equation 6]

$$SF = H(90° < \theta_e \leq 270°) \quad \text{(EQUATION 6)}$$

Further, when $0° \leq \theta e \leq 90°$ or $270° < \theta e \leq 360°$, the switching unit 244 is controlled as shown in Equation 7, and outputs the motor angle $\theta e7$ as the motor angle $\theta s$ for interpolation Duty calculation.

[Equation 7]

$$SF = L(0° \leq \theta_e \leq 90° \text{ OR } 270° < \theta_e \leq 360°) \quad \text{(EQUATION 7)}$$

Figure 8:
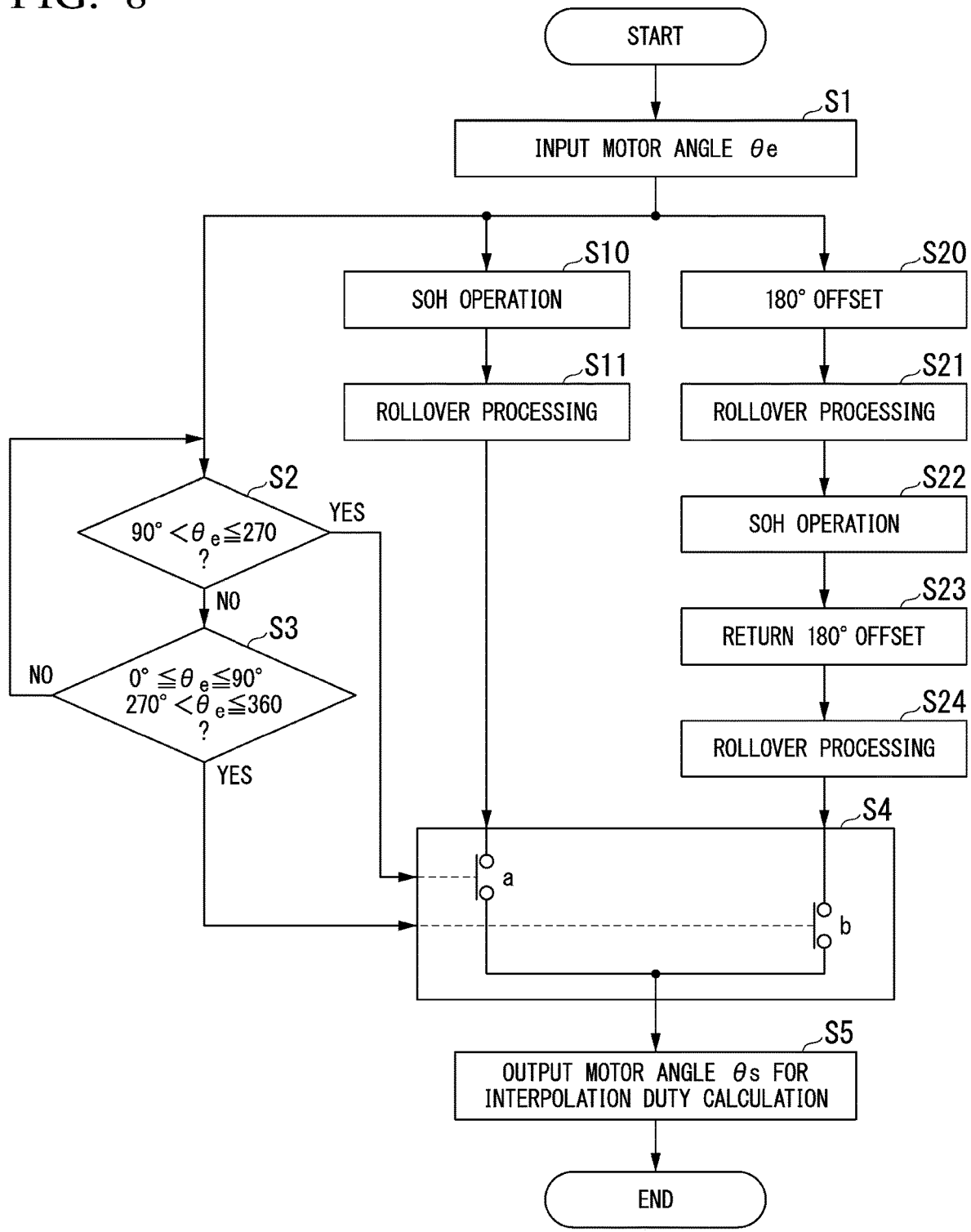
FIG. 8 shows a control flowchart of the electric angle interpolation unit.

FIG. 8 shows a control flowchart of the electric angle interpolation unit 240.

The motor angle (electric angle) $\theta e$ is input to the electric angle interpolation unit 240 (step S1).

The SOH computation unit 241-1 of the calculation processing unit 241 performs the SOH calculation (step S10). The motor angle $\theta e$ is input to the holding unit 245-1 to be used as the previous value in the next SOH calculation. Further, the previous value input to the holding unit 245-1 is input to the holding unit 245-2 because it is used as the value before the next SOH calculation.

The rollover processing unit 241-2 performs rollover processing on the motor angle $\theta e1$ calculated by the SOH and outputs a motor angle $\theta e2$ (step S11).

The offset-added calculation processing unit 242 performs offset processing on the motor angle (electric angle) $\theta e$ using the coefficient 180° input from the fixing unit 242-1 by the adding unit 242-2 (step S20).

The rollover processing unit 242-3 performs rollover processing on the offset-processed motor angle $\theta e3$, and outputs the motor angle $\theta e4$ (step S21).

The SOH calculating unit 242-4 performs the SOH calculation on the input motor angle $\theta e4$ (step S22). The motor angle $\theta e$ is input to the holding unit 245-1 to be used as the previous value in the next SOH calculation. Further, the previous value input to the holding unit 245-1 is input to the holding unit 245-2 because it is used as the value before the next SOH calculation.

The motor angle $\theta e5$ calculated by the SOH is input to the subtraction unit 242-6, and the offset return processing is performed with the coefficient 180° input from the fixing unit 242-5 (step S23).

The motor angle $\theta e6$ subjected to the offset return processing is subjected to rollover processing by the rollover processing unit 242-7, and the motor angle $\theta e7$ is output (step S24).

The motor angle switching determination unit 243 determines that the motor angle $\theta e$ is larger than 90° and equal to or smaller than 270° (step S2).

When this condition is satisfied (in the case of YES), the motor angle switching determination unit 243 sets the switching flag SF to "H".

If the above conditions are not met (in the case of NO), the motor angle $\theta e$ is 0° or more and 90° or less, or more than 270° and 360° or less, and the motor angle switching determination unit 243 sets the switching flag SF to "L". (Step S3).

When the switching flag SF input from the motor angle switching determination unit 243 is "H", the switching unit 244 selects $\theta e2$ and outputs it as a motor angle (interpolated electric angle) $\theta s$ for interpolation Duty calculation. When the switching flag SF input from the motor angle switching determination unit 243 is "L", the switching unit 244 selects $\theta e7$ and outputs it as the motor angle (interpolated electric angle) $\theta s$ for interpolation Duty calculation (Step S4 and Step S5).

FIG. 9 shows the waveforms of each part of the electric angle interpolation unit 240, the horizontal axis is time [sec], and the vertical axis is an internal value processed by the MPU or the like and is 64 [dec]/1 [deg]. Note that 23040 [dec]=360 [deg].

Figure 9A:
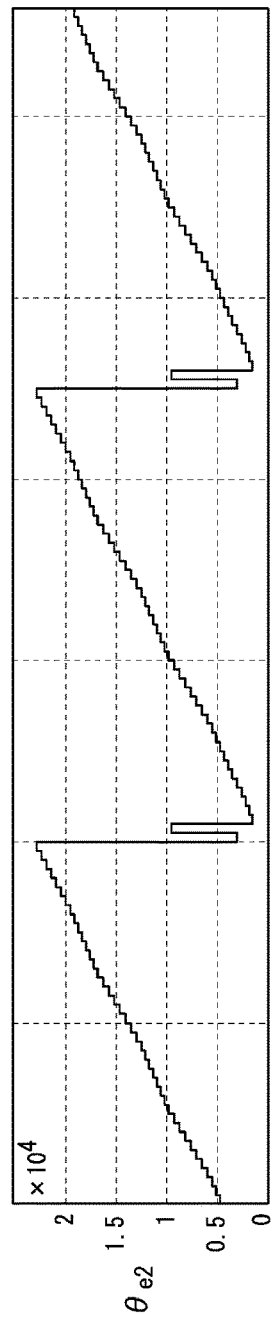
FIG. 9(A)-FIG. 9(D) are graphs showing the waveform of the electric angle interpolation unit.
Figure 9B:
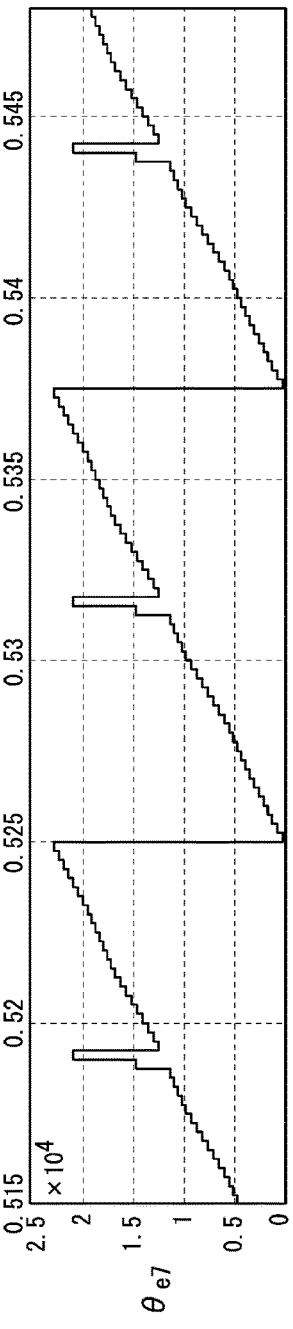
Figure 9C:
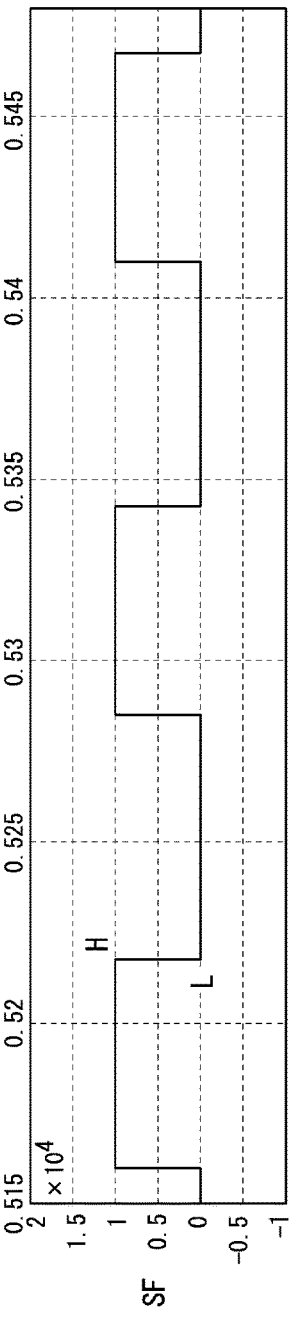

FIG. 9(A) is a waveform example of the motor angle $\theta e2$ output from the calculation processing unit 241, and FIG. 9(B) is a waveform example of the motor angle $\theta e7$ output from the offset-added calculation processing unit 242. Further, FIG. 9(C) shows the switching timing of "H" and "L" of the switching flag SF, and FIG. 9(D) shows an example of the waveform of the motor angle (interpolated electric angle) $\theta s$ for interpolation Duty calculation output from the switching unit 244.

Figure 9D:
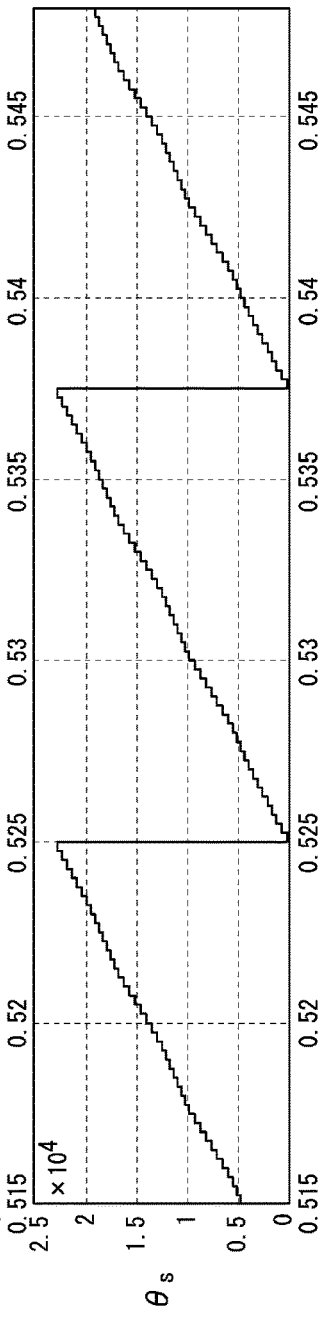

As shown in FIG. 9(D), the motor angle (interpolated electric angle) $\theta s$ output by the electric angle interpolation unit 240 is such that the motor angle $\theta s$ exceeds 360° as compared with the waveform shown in FIG. 9(A). When returning to 0°, there is no transient angle variation. Since the motor angle $\theta e$ has relatively low noise if the linearity is high and there is no transitional change other than the angle change to switch from 360° to 0°, high accuracy can be ensured in calculation of the interpolated electric angle by SOH calculation.

[Space Vector Modulation Unit 250]

Figure 10:
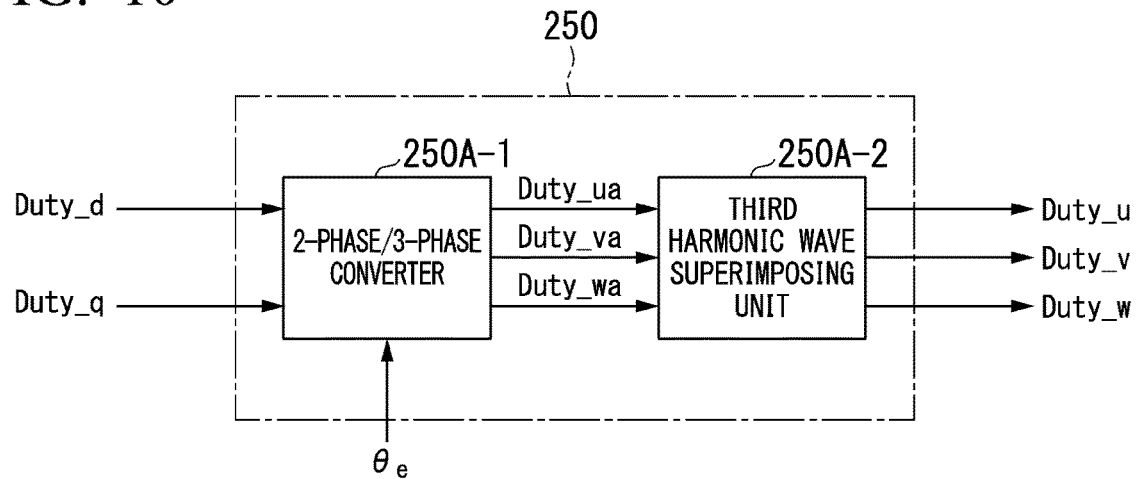
FIG. 10 is a functional configuration diagram of a space vector modulation unit of the motor control unit.

FIG. 10 is a functional block diagram of the space vector modulation unit 250.

The space vector modulation unit (conversion unit) 250 performs space vector conversion calculation after converting from the dimension of voltage to the dimension of Duty (conversion step). The space vector modulation unit 250 only needs to have a function of converting the Duty command value D1m (m=d, q) (Duty_d, Duty_q) for normal calculation in the dq axis space into a three-phase Duty command value (Duty_ua, Duty_va, Duty_wa) to superimpose the third harmonic, and outputting three-phase Duty command values Duty_u, Duty_v, and Duty_w. For example, the space vector modulation method proposed in Japanese Unexamined Patent Application, First Publication No. 2017-70066 or PCT International Publication No. WO 2017/098840 by the present applicant may be used.

The space vector modulation unit 250 includes a space vector modulation unit 250-0 that performs the above-mentioned space vector conversion calculation using the motor angle (electric angle) $\theta e$, and a space vector modulation unit 250-1 that performs the space vector conversion calculation using interpolated electric angle $\theta s$.

The space vector modulation unit (first space vector modulation unit) 250-0 performs space vector conversion calculation using the motor angle (electric angle) $\theta e$, and outputs the three-phase Duty command value Duty_n (n=u, v, w) (Duty_u, Duty_v, Duty_w).

The space vector modulation unit (second space vector modulation unit) 250-1 performs space vector conversion calculation using the interpolated electric angle $\theta s$, and outputs a three-phase interpolation Duty command value Duty_n_m1 (n=u, v, w) (Duty_u_m1, Duty_v_m1, Duty_w_m1).

[Final Duty Computation Unit 200]

Figure 11:
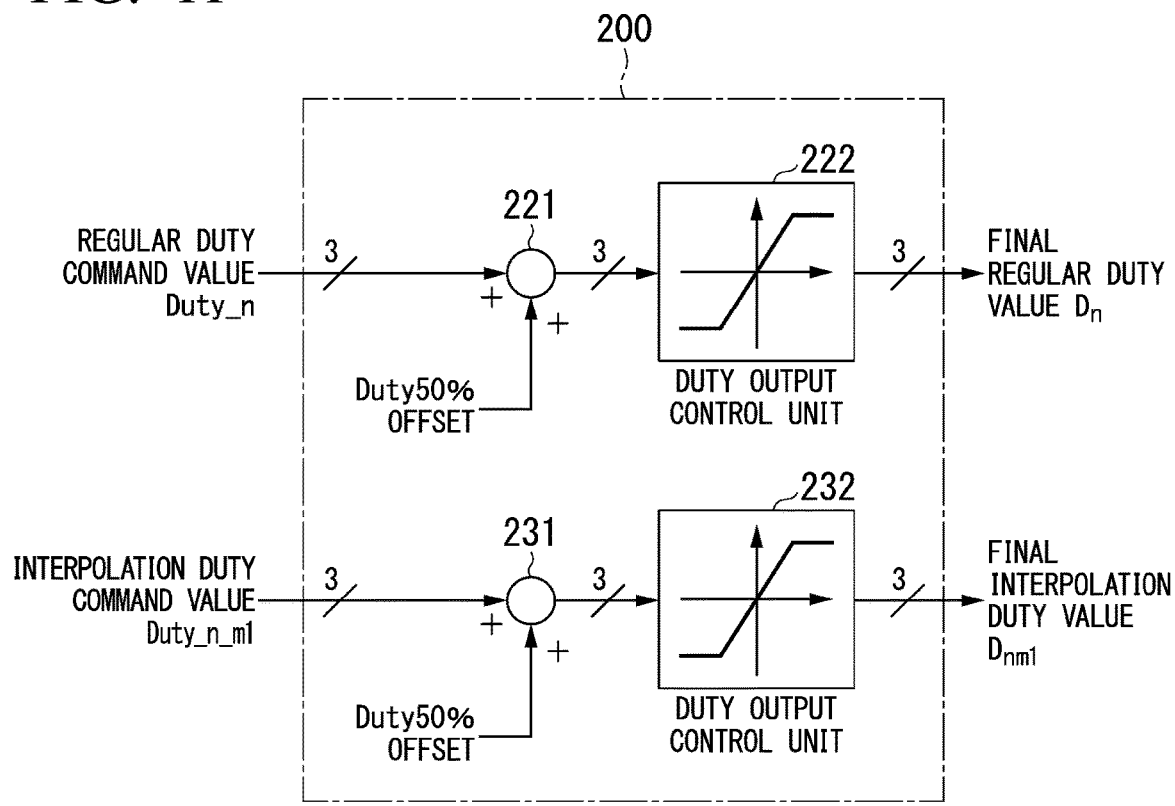
FIG. 11 is a functional configuration diagram of a final Duty computation unit of the motor control unit.

FIG. 11 is a functional block diagram of the final Duty computation unit 200.

In the final Duty computation unit 200, the normal Duty command value Duty_n (n=u, v, w) from the space vector modulation unit 250 is input to the adding unit 221. The Duty value to which the offset of Duty: 50% has been added by the adding unit 221 is input to the limiter 222 which limits the Duty output within the range of 0 to 100% (variable). A final normal Duty command value Dn (n=u, v, w) is output from the limiter 222.

The interpolated Duty command value Duty_n_m1 from the space vector modulation unit 250 is input to the adding unit 231, and the Duty value to which the offset of Duty: 50% has been added by the adding unit 231 is input to the limiter 232 which limits the Duty output within the range of 0 to 100% (variable). The limiter 232 outputs the final interpolation Duty command value Dnm1 (n=u, v, w).

In general, since the EPS supplies the motor applied voltage from the battery (DC+12 V), it cannot supply the applied voltage in the negative (−) direction. In this state, the phase voltage command value in the negative direction cannot be supplied, so the phase current cannot flow in the negative direction. In order to cope with this problem, by setting the reference voltage by offsetting the Duty value by 50% (+6V) for all three phases, even if the three-phase is not 0 V, the phase current becomes 0 A when the three-phase Duty value is 50% (when the motor applied voltage is +12 V). For example, when the U-phase Duty value is 50% (+6 V), the V-phase Duty value is 50% (+6 V), and the W-phase Duty value is 50% (+6 V), the U-phase is 0A, the V-phase is 0A, and the W-phase is 0A. When the U-phase Duty value is 60% (+7.2V), the V-phase Duty value is 50% (+6V), and the W-phase Duty value is 40% (+4.8V), a current flows in the positive (+) direction in the U-phase. When the U-phase Duty value is 40% (+4.8V), the V-phase Duty value is 50% (+6V), and the W-phase Duty value is 60% (+7.2V), a current flows in the U-phase in the negative direction. By offsetting all three phases to a Duty value of 50% to be set as the reference voltage, it is possible to flow a current in the negative direction while the applied voltage is positive. Although the offset of Duty value: 50% is basically fixed, the reference voltage at the 50% Duty value fluctuates depending on the applied voltage state to be supplied. For example, when the applied voltage is 11 V, the 50% Duty value is 5.5 V, and when the applied voltage is 13 V, the 50% Duty value is 6.5 V.

[Duty Output Setting Unit 160A-1]

Figure 12:
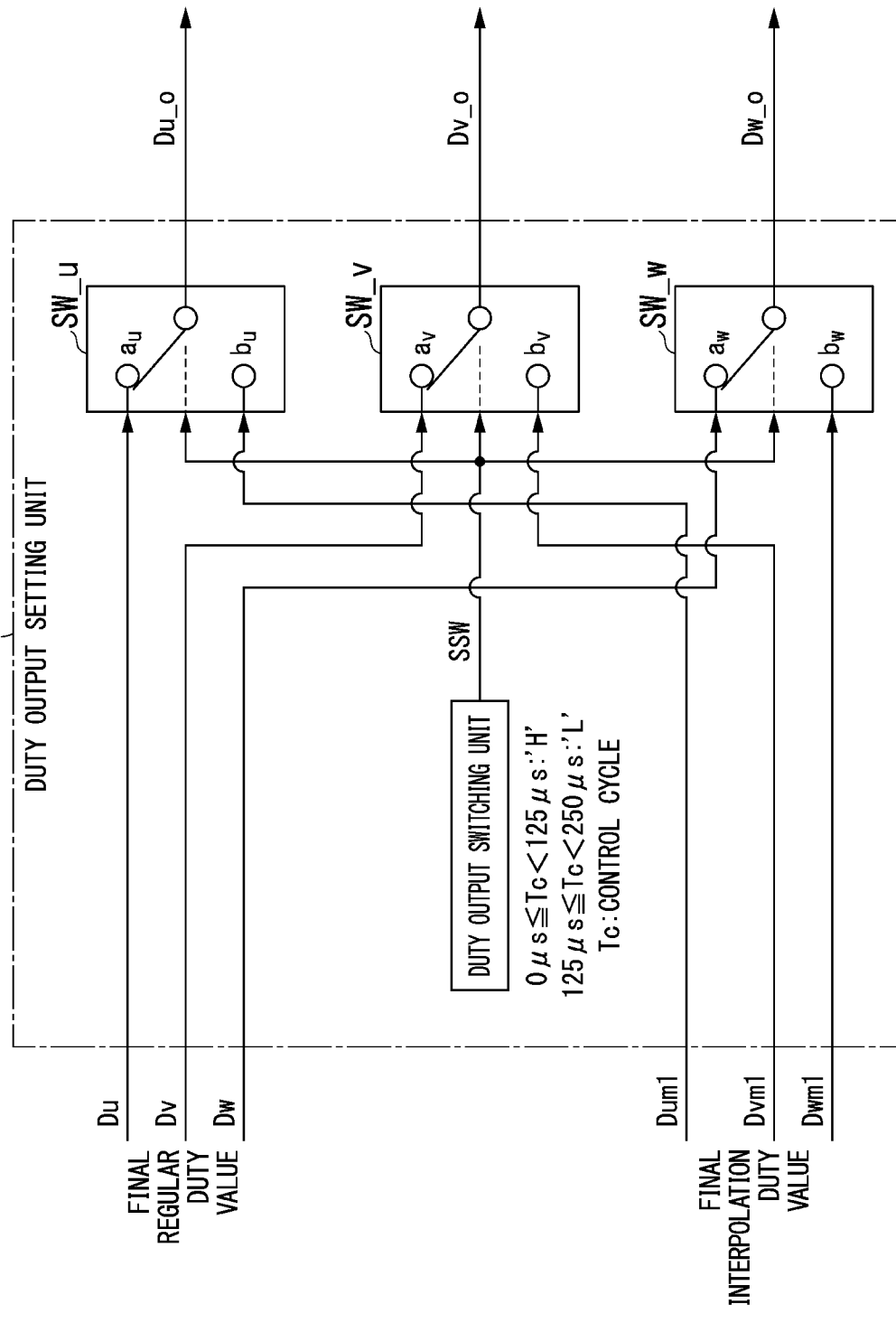
FIG. 12 is a functional configuration diagram of a Duty output setting unit of the motor control unit.

FIG. 12 is a functional block diagram of the Duty output setting unit 160A-1.

As shown in FIG. 12, the Duty output setting unit (output setting unit) 160A-1 switches and outputs the final Duty command values Du_o, Dv_o, Dw_o to be output, after the control cycle Tc and Tc/2 μs have elapsed from control cycle Tc, based on the elapsed time T from the control cycle Tc (output setting step).

Figure 13:
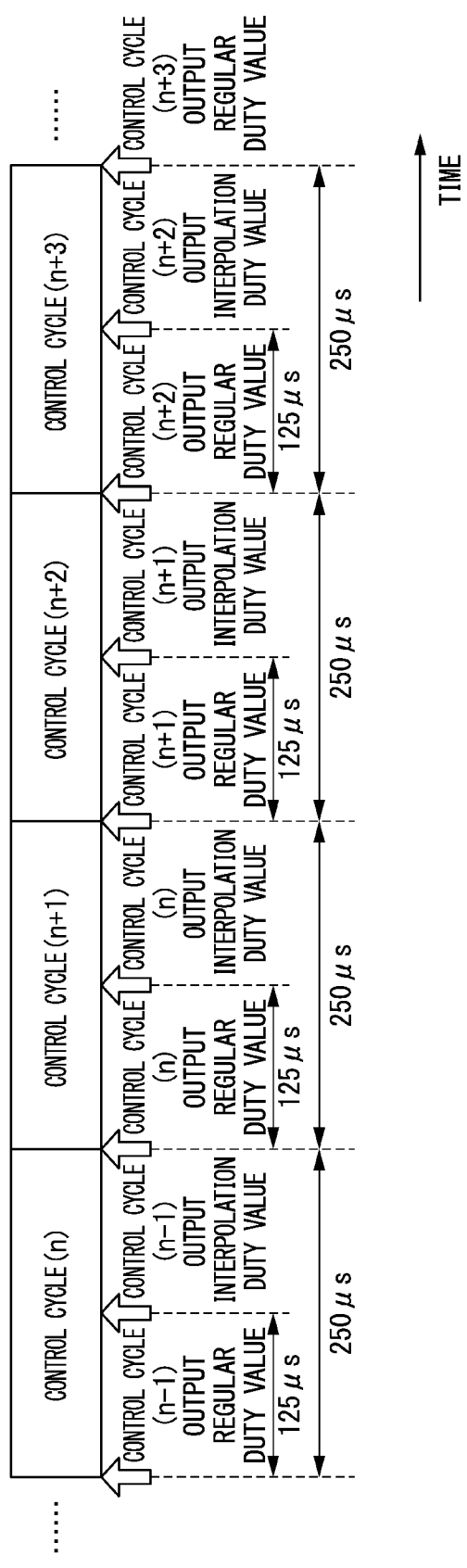
FIG. 13 shows output timings of a final normal Duty command value and a final interpolated Duty command value.

FIG. 13 shows the control cycle and the output timing of the final normal Duty command value Dn and the final interpolated Duty command value Dnm1.

As for the final normal Duty command value Dn and the final interpolated Duty command value Dnm1 calculated in the control cycle Tc (n), the final normal Duty command value Dn is output at the timing of 0 μs of the next control cycle Tc (n+1), and then the final interpolated Duty command value Dnm1 is output at the timing 125 μs.

Figure 14:
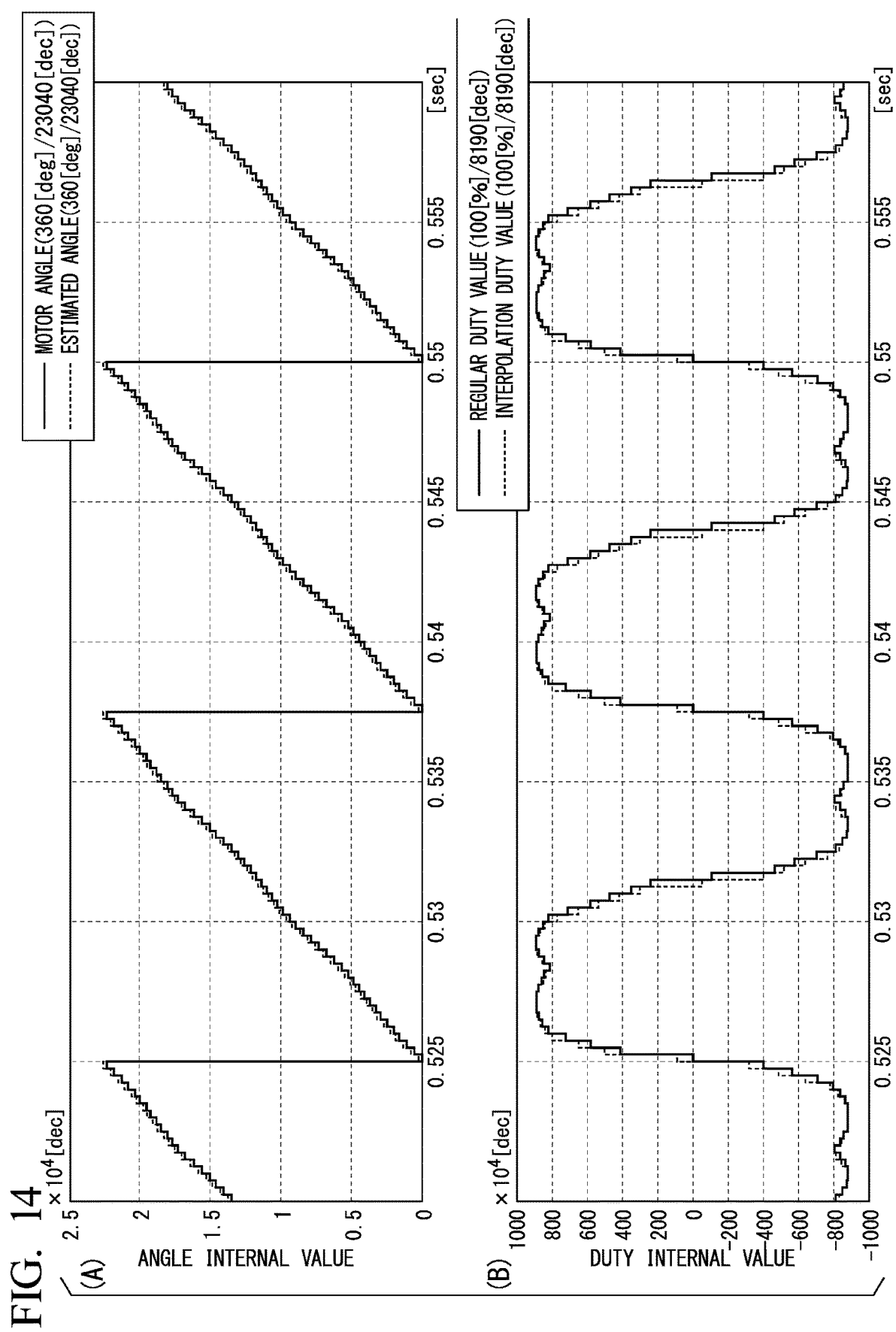
FIG. 14 is a graph showing simulation results of estimation of an interpolated electric angle.

FIG. 14 shows simulation results in the simulation device. The horizontal axis is time [sec], and the vertical axis is an internal value processed by an MPU or the like, which is 64 [dec]/1 [deg]. FIG. 14(A) shows a waveform of a motor angle (thick line), and it can be confirmed that an estimated motor angle (thin line) calculated by SOH calculation of sampling data of 250 μs cycle is calculated as an angle (electric angle) after 125 μs of the 250 μs cycle. When the estimated motor angle (thin line) is offset by 125 μs on the horizontal axis, an angular waveform indicating intermediate data of sampling data of 250 μs cycle of the motor angle (thick line) is obtained. FIG. 14(B) shows the waveform of the Duty command value calculated by space vector modulation, and it can be confirmed that the waveform (thin line) of the interpolated Duty command value to which the estimated motor angle is applied is calculated as the waveform after 125 μs of the 250 μs cycle. When the waveform (thin line) of the interpolated Duty command value is offset by 125 μs on the horizontal axis, a duty command value waveform indicating intermediate data of data of 250 μs cycle of the normal duty command value (thick line) is obtained.

According to the motor control device 400 of the present embodiment, the interpolated Duty command value with less noise can be calculated without being affected by the dead time compensation, and the control signal for PWM control can be changed at a cycle (50 μs) earlier than the cycle for performing the PWM calculation, thereby, the control signal for PWM control can be varied. As a result, while the increase in the calculation processing amount of the microcomputer is slight, the noise due to the vibration of the brushless motor or the motor can be suitably suppressed, and the noise due to the motor in the audible range can be reduced.

The first embodiment of the present invention has been described in detail with reference to the drawings, but the specific configuration is not limited to this embodiment, and design changes or the like within the scope of the present invention are also included. Moreover, the components shown in the above-mentioned embodiment and modification can be combined appropriately and can be constituted.

Modification 1

For example, in the motor control device 400 according to the above-described embodiment, the motor 100 is controlled by the vector control method using space vector driving, but the motor to be controlled by the motor control device is not limited thereto. The motor to be controlled by the motor control device according to the present invention may be, for example, a brushless motor of a sine wave control system. The motor control device according to the present invention does not set the duty command value as the direct interpolation target, but sets the motor angle (electric angle) θe as the interpolation target. The motor angle θe has relatively low noise if the linearity is high, and there is no transitional change other than the angle change to switch from 360° to 0°. Therefore, high accuracy can be ensured in the calculation of the interpolated electric angle by the SOH calculation and the calculation of the interpolated Duty command value.

Modification 2

For example, although the motor control device 400 according to the above-described embodiment is mounted on the electric power steering device 300, the aspect of the motor control device is not limited to this. The motor control device according to the present invention is suitably mounted on a motor drive device that requires high torque while low noise is required. For example, the motor control device according to the present invention is preferably mounted on a walking support device that supports muscle power when the wearer walks, a cleaning device that operates indoors, or the like. Thereby, it is possible to suitably suppress the vibration of the motor and the sound caused by the motor, and to reduce the sound caused by the motor in the audible range.

Modification 3

For example, in the motor control device 400 according to the above embodiment, the control cycle Tc is 250 μs (frequency 4 KHz), but the aspect of the motor control device is not limited to this. The motor control device according to the present invention can preferably reduce the sound caused by the motor in the audible range when the control cycle Tc is 100 μs or more and 250 μs or less. The control cycle is predicted to be shorter than 250 μs as the performance of the CPU or the like mounted on the motor control device improves or the number of poles of the motor to be controlled increases. When the control cycle Tc is 100 μs or more and 250 μs or less, as in the above embodiment, a problem occurs that a sound is generated due to the motor in the audible range. However, according to the motor control device according to the present invention, sounds resulting from vibrations caused by the brushless motor and sounds caused by motors can be suitably suppressed, and the sounds resulting from motors in the audible range can be reduced.

Second Embodiment

A second embodiment of the present invention will be described with reference to FIGS. 15 to 37.

Figure 15:
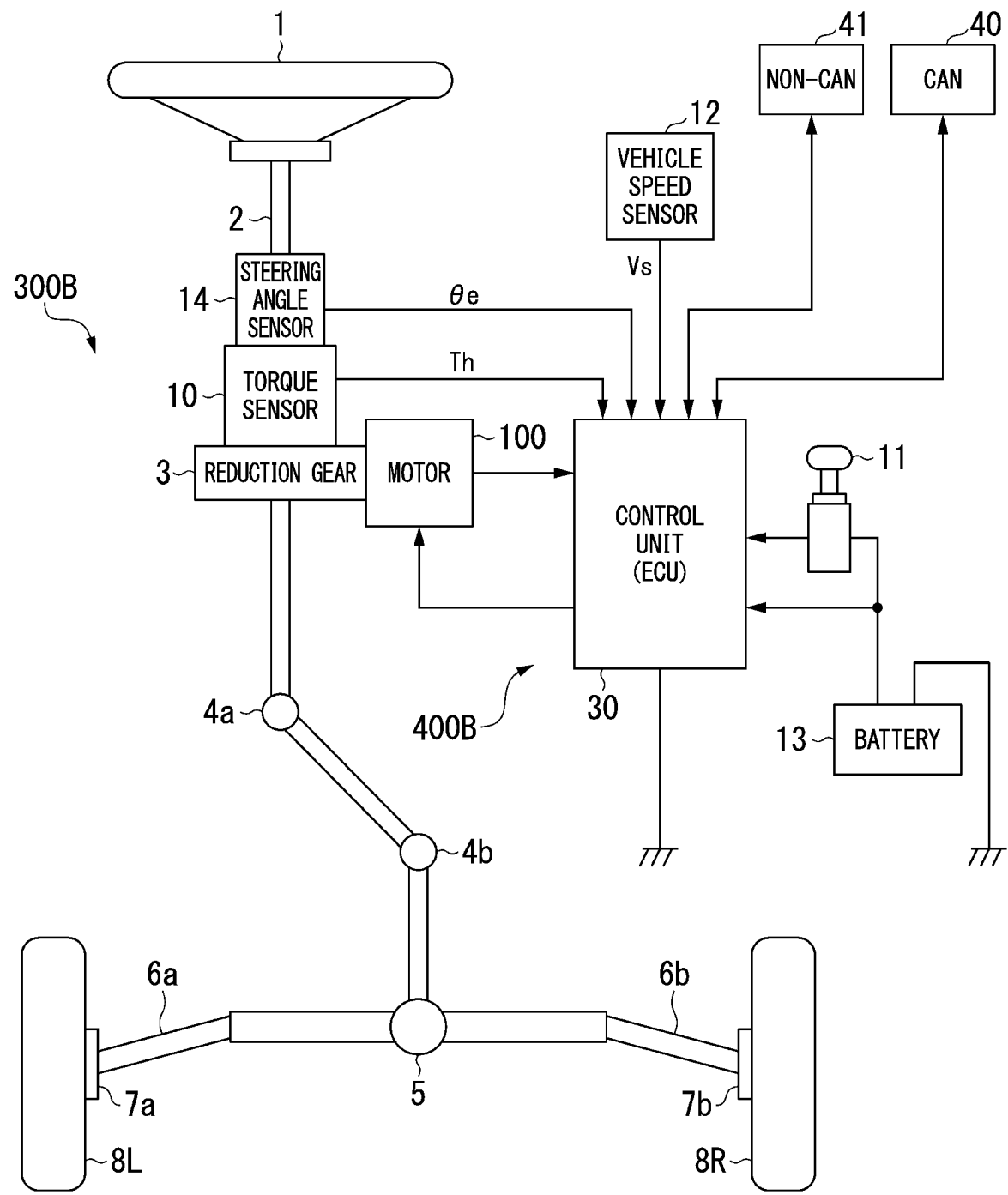
FIG. 15 is a schematic view showing a configuration of an electric power steering device equipped with a motor control device according to a second embodiment.

FIG. 15 is a schematic view showing a configuration of an electric power steering device 300B equipped with a motor control device 400B according to the present embodiment. The electric power steering device 300B is a column assist type electric power steering device in which an electric motor and a reduction mechanism are disposed in a column portion (steering shaft).

[Electric Power Steering Device 300B]

The electric power steering device 300B is connected to the steering wheels 8L and 8R through the column shaft (steering shaft, handle shaft) 2 of the steering wheel 1, the reduction gear 3, the universal joints 4a and 4b, the pinion rack mechanism 5, the tie rods 6a and 6b, and further the hub units 7a and 7b. In addition, a steering angle sensor 14 for detecting a steering angle θe of the steering wheel 1 and a torque sensor 10 for detecting a steering torque Th of the steering wheel 1 are provided on the column shaft 2, a motor 100 that assists the steering force of the handle 1 is connected to the column shaft 2 via the reduction gear 3. To the control unit (ECU) 30 that controls the electric power steering device 300B, electric power is supplied from the battery 13, and an ignition key signal is input via the ignition key 11.

The control unit 30 calculates the current command value of the assist (steering assist) command based on the steering torque Th detected by the torque sensor 10 and the vehicle speed Vs detected by the vehicle speed sensor 12, and the motor 100 is controlled by the voltage control command value Vref obtained by compensating the calculated current command value or the like. The steering angle sensor 14 is not essential and may not be disposed, and the steering angle (motor angle) θe can be obtained from a rotation sensor such as a resolver connected to the motor 100.

The control unit 30 mainly includes a program executable computer including a central processing unit (CPU) (including an MPU (Micro Processor Unit), an MCU (Micro Controller Unit), or the like).

The control unit 30 includes circuits such as an inverter 161 that drives the motor 100, a motor current detection circuit 162 that detects the current of the motor 100, and an angle detection unit 110A that detects the motor angle θe of the motor 100. These circuits may be mounted on the motor 100 side.

The control unit 30 is connected to a CAN (Controller Area Network) 40 that transmits and receives various information of the vehicle, and the vehicle speed Vs can also be received from the CAN 40. The control unit 30 can also be connected to a non-CAN 41 that transmits and receives communications other than the CAN 40, analog/digital signals, radio waves, or the like.

The motor 100 is a three-phase brushless motor that is mainly used as an actuator of the electric power steering device 300B in recent years. The motor 100 is controlled by a vector control method using space vector drive. In the vector control method using space vector drive, the q axis for controlling the torque, which is the coordinate axis of the rotor of the motor 100, and the d axis for controlling the strength of the magnetic field are set independently, and since the dq axis is 90°, the current corresponding to each axis (d-axis current command value Iref_d, q-axis current command value Iref_q) is controlled by the vector.

[Motor Control Device 400B]

Figure 16:
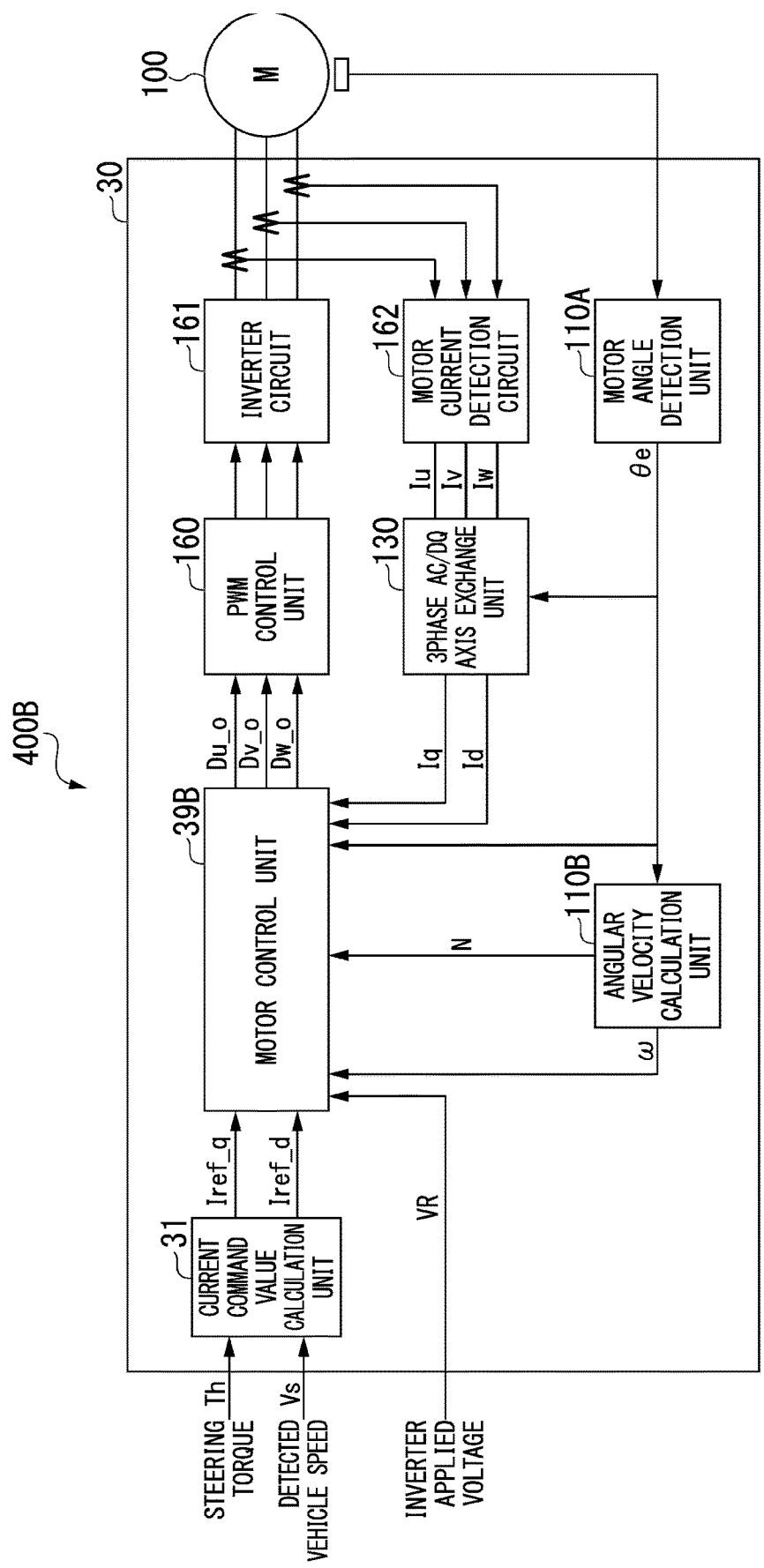
FIG. 16 is a functional configuration diagram of a motor control device configured by a control unit of the electric power steering device.

FIG. 16 is a functional configuration diagram of a motor control device 400B configured by the control unit 30. The function of the motor control device 400B is realized by appropriately combining a program executed in a CPU or the like and an electronic circuit such as an inverter. The functions described as the electronic circuit in the following description may be realized as a program executed by a CPU or the like.

The motor control device 400B performs drive control of the motor 100. The motor control device 400B includes a current command value computation unit 31, a motor control unit 39B, a PWM control unit 160, an inverter 161, a motor current detection circuit 162, a motor angle detection unit 110A, an angular velocity computation unit 110B, and a three-phase alternating current/dq axis conversion unit 130.

The current command value computation unit 31 outputs a dq axis current command value Iref_m (m=d, q) of two axes (dq axis coordinate system) calculated using an assist map or the like based on the steering torque Th, the vehicle speed Vs, or the like, to the motor control unit 39B.

The motor control unit 39B calculates a voltage control command value Vref_mb (m=d, q) subjected to dead time compensation from the input dq axis current command value Iref_m (m=d, q), the motor angle θe, the motor rotation speed N, or the like. Further, the motor control unit 39B calculates three phase Duty command values Du_o, Dv_o, Dw_o by space vector modulation from the voltage control command value Vref_mb (m=d, q) or the like, and outputs them to the PWM control unit 160.

Figure 17:
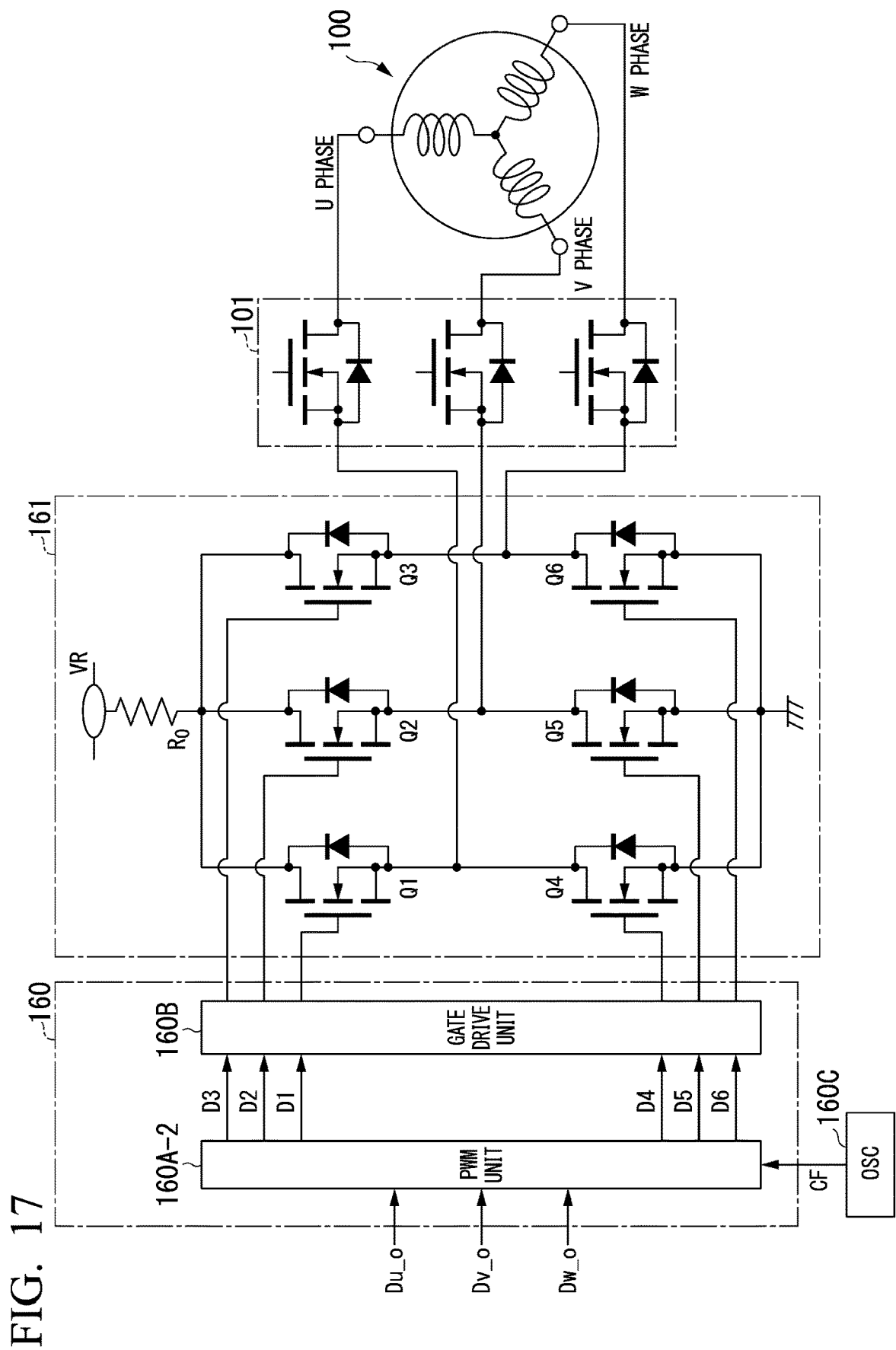
FIG. 17 is a configuration diagram of a PWM control unit and an inverter of the motor control device.

FIG. 17 is a configuration diagram of the PWM control unit 160 and the inverter 161.

The inverter 161 is configured by a three-phase bridge of FETs as shown in FIG. 17, and drives the motor 100 by being turned ON/OFF by the PWM-Duty values D1 to D6. Between the inverter 161 and the motor 100, a motor switch 101 for interrupting the supply of current when the assist control is stopped or the like is interposed. The upper arm is configured by FETs Q1, Q2 and Q3 as switching elements, and the lower arm is configured by FETs Q4, Q5 and Q6. Also, the FETs Q1 and Q4 are U-phase drive elements, the FETs Q2 and Q5 are V-phase drive elements, and the FETs Q3 and Q6 are W-phase drive elements.

The PWM control unit 160, as shown in FIG. 17, controls driving of the motor 100 via an inverter (inverter applied voltage VR) 161 having a bridge configuration of upper and lower arms as shown in FIG. 17, based on the input three-phase Duty command values Du_o, Dv_o, Dw_o. The PWM control unit 160 has a PWM unit 160A-2 and a gate drive unit 160B as shown in FIG. 17.

As shown in FIG. 17, the PWM unit 160A-2 calculates three-phase PWM-Duty values D1 to D6 according to predetermined equations for the three-phase Duty command values Du_o, Dv_o, and Dw_o. A modulation signal (carrier) CF of, for example, a triangular wave is input to the PWM unit 160A-2 from the oscillation unit 160C, and the PWM unit 160A-2 calculates PWM-Duty values D1 to D6 in synchronization with the modulation signal CF.

As shown in FIG. 17, the gate driver 160B outputs PWM-Duty values D1 to D6 to drive the gates of the FETs Q1 to Q6 which are driving elements.

Since the electric power steering device 300B is an in-vehicle product, the operating temperature range is wide, and from the viewpoint of fail-safe, the inverter 161 that drives the motor 100 needs to have a larger dead time (industrial equipment<EPS) than that for general industrial use represented by home appliances. In general, switching elements (for example, FETs (Field-Effect Transistors)) have a delay time at the time of OFF, and therefore, if the switching elements of the upper and lower arms are simultaneously switched OFF/ON, there may be a situation where the DC link is short-circuited. In order to prevent occurrence of this situation, a time (dead time) in which the switching elements of both the upper and lower arms are turned off is provided.

When the dead time compensation as described above is performed, the current waveform is distorted, the response of current control and steering feeling deteriorate, for example, when steering slowly while the steering wheel is in the vicinity of on center, there may be a discontinuous steering feeling due to torque ripple or the like.

The current detector 162 detects three-phase motor currents Iu, Iv, Iw of the motor 100, as shown in FIG. 16. The detected three-phase motor currents Iu, Iv, Iw are input to the three-phase AC/dq axis converter 130 and converted into two-phase feedback dq axis currents Id and Iq. The two-phase feedback dq axis currents Id and Iq are input to the motor control unit 39B.

The motor angle detection unit 110A calculates and acquires the motor angle θe of the motor 100, if necessary. The motor angle θe is input to the angular velocity computation unit 110B, the motor control unit 39B, and the three-phase alternating current/dq axis conversion unit 130.

The angular velocity computation unit 110B obtains the motor rotation speed N and the motor angular velocity ω from the motor angle θe by calculation. The motor rotation speed N and the motor angular velocity ω are input to the motor control unit 39B.

[Motor Control Unit 39B]

Figure 18:
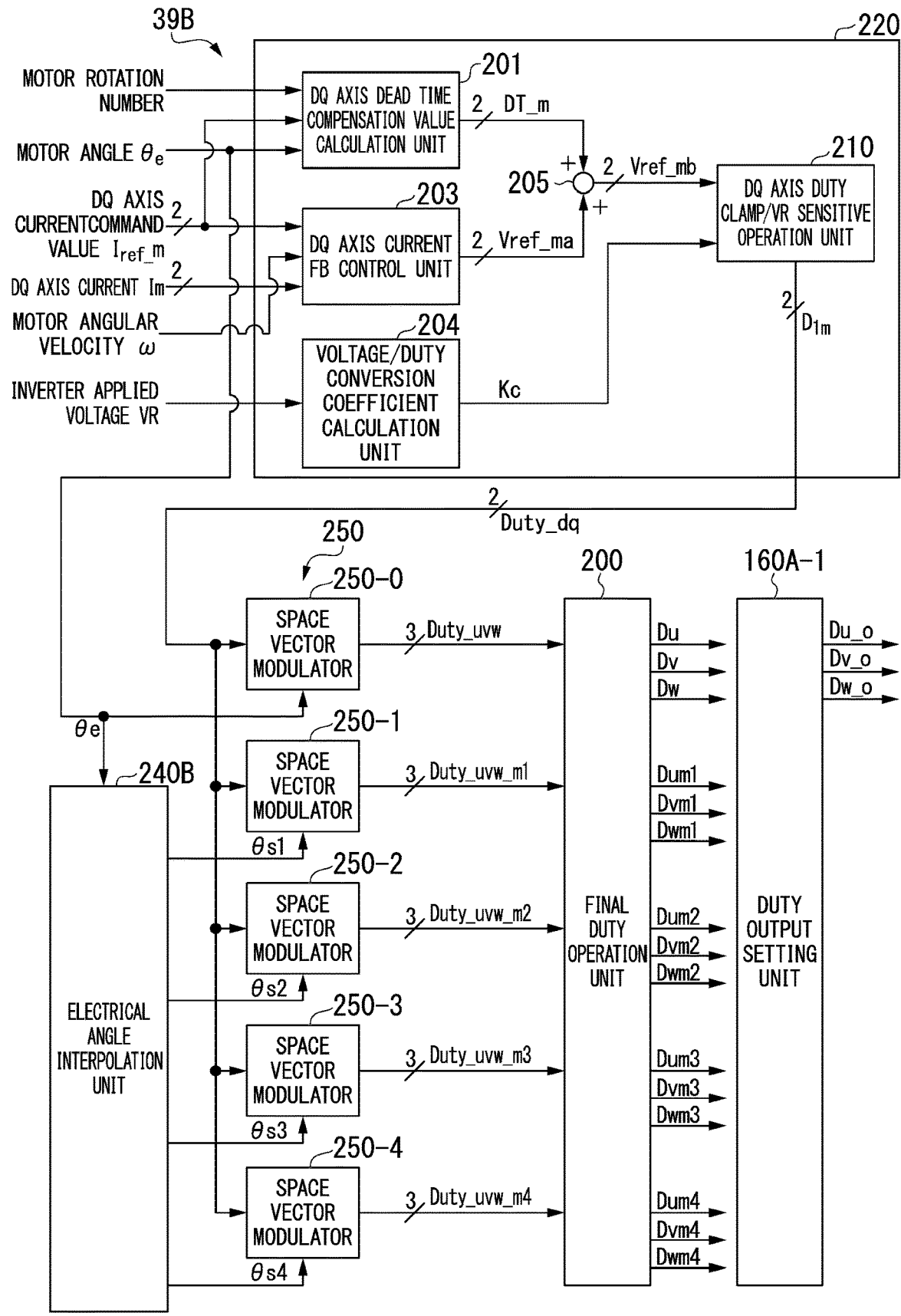
FIG. 18 is a functional configuration diagram of a motor control unit of the motor control device.

FIG. 18 is a functional configuration diagram of the motor control unit 39B.

The motor control unit 39B includes a voltage command value computation unit 220, an electric angle interpolation unit 240B, a space vector modulation unit 250, a final Duty computation unit 200, and a Duty output setting unit 160A-1.

The voltage command value computation unit 220 includes a dq axis dead time compensation value computation unit 201, a dq axis current feedback control unit 203, a voltage/Duty conversion coefficient computation unit 204, an adding unit 205, and a dq axis Duty clamp/VR sensitivity computation unit 210.

The voltage command value computation unit 220 calculates a voltage command value using motor electric angle θe and motor rotation speed θe acquired from the motor 100 for each control cycle Tc, the current command value Iref_m (m=d, q), or the like (voltage command value calculation step).

The dq axis dead time compensation value computation unit 201 outputs a dq axis dead time compensation value DT_m (m=d, q) calculated from the input motor rotation speed N, the motor angle (electric angle) θe, and the dq axis current command value Iref_m (m=d, q), to the adding unit 205.

The dq-axis current feedback control unit 203 outputs a voltage control command value Vref_ma (m=d, q) calculated from the input motor angular velocity ω, the dq-axis current command value Iref_m (m=d, q), and the two-phase feedback dq-axis currents Id and Iq, to the adding unit 205.

The voltage/duty conversion coefficient computation unit 204 calculates a voltage/duty conversion coefficient Kc in accordance with the inverter applied voltage VR.

The adding unit 205 outputs the voltage control command value Vref_mb (m=d, q) obtained by adding the dq-axis dead time compensation value DT_m (m=d, q) and the voltage control command value Vref_ma (m=d, q), to the three-phase Duty clamp/VR sensitive computation unit 210.

The dq axis Duty clamp/VR (inverter applied voltage) sensitive computation unit 210 inputs the Duty command value D1m (m=d, q) (Duty_d, Duty_q) for dq axis normal calculated by multiplying the voltage control command value Vref_mb (m=d, q) and the conversion coefficient Kc of voltage/duty conversion, to the space vector modulation unit 250.

[Electric Angle Interpolation Unit 240B]

Figure 19:
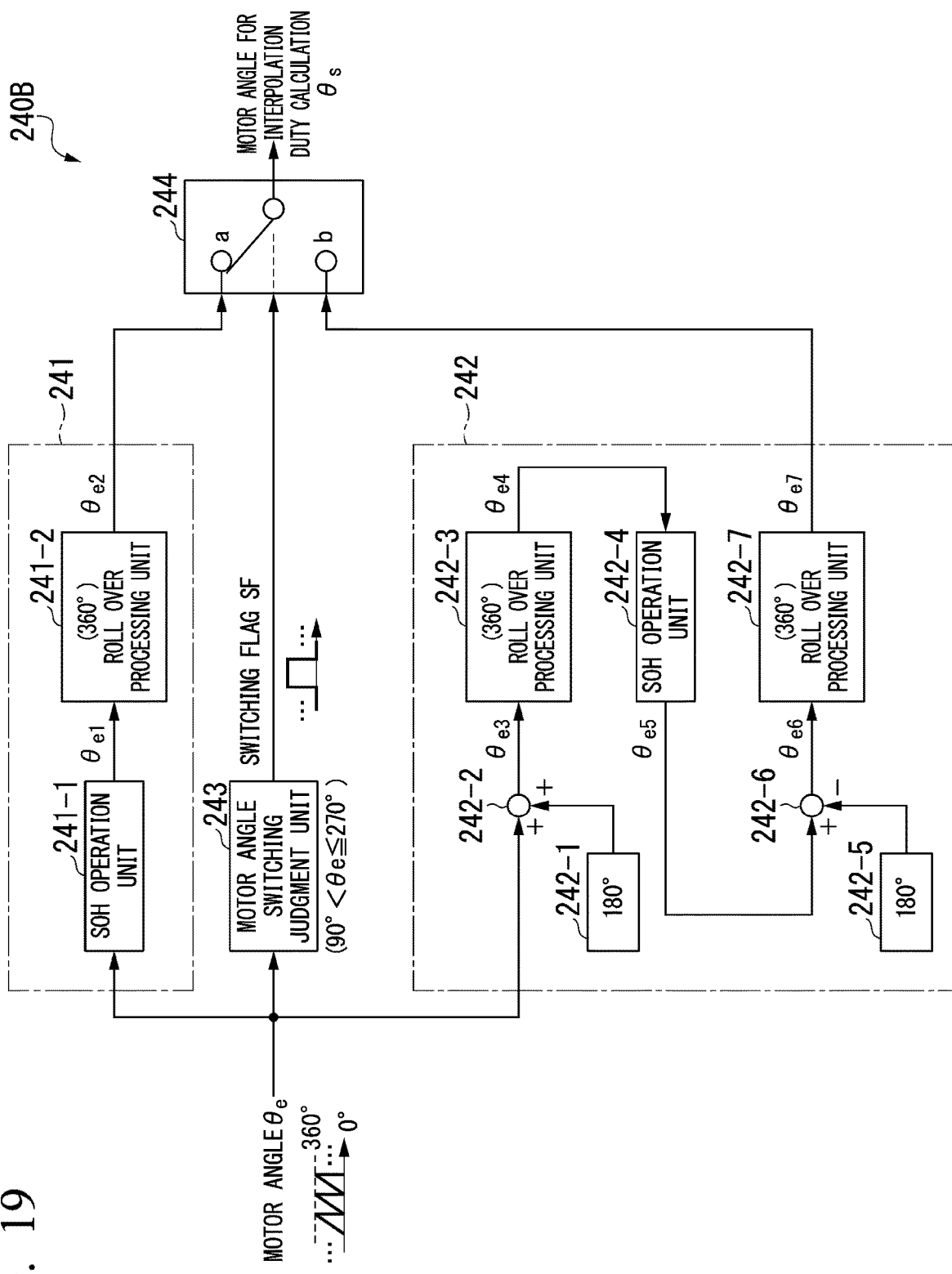
FIG. 19 is a block diagram of an electric angle interpolation unit of the motor control unit.
Figure 20:
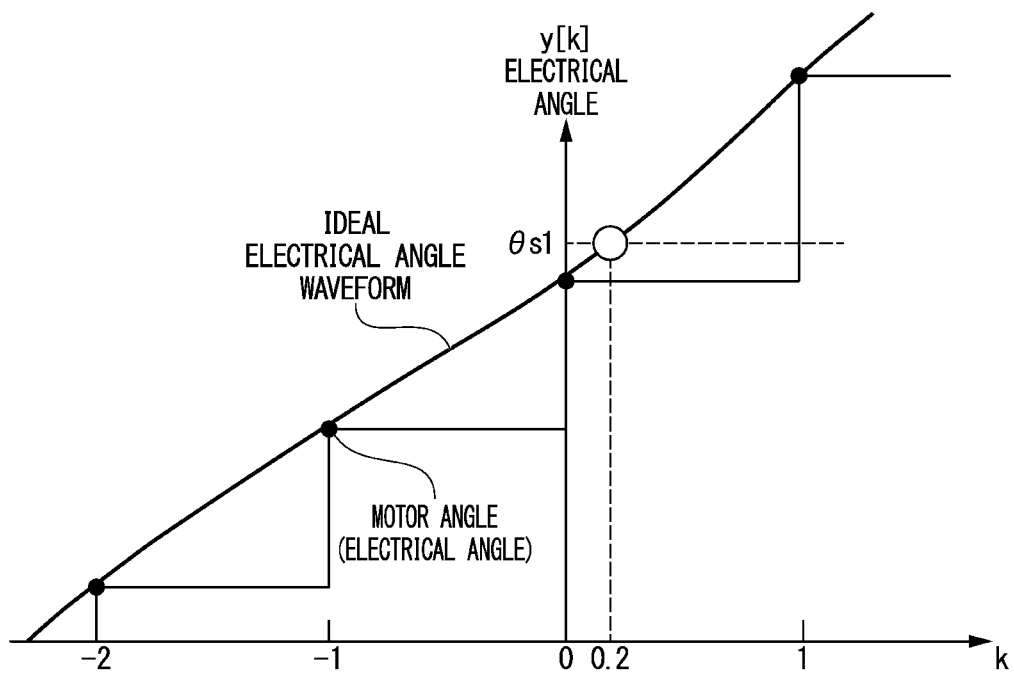
FIG. 20 is a graph showing an interpolated electric angle 1 calculated by the same electric angle interpolation unit by SOH calculation.
Figure 21:
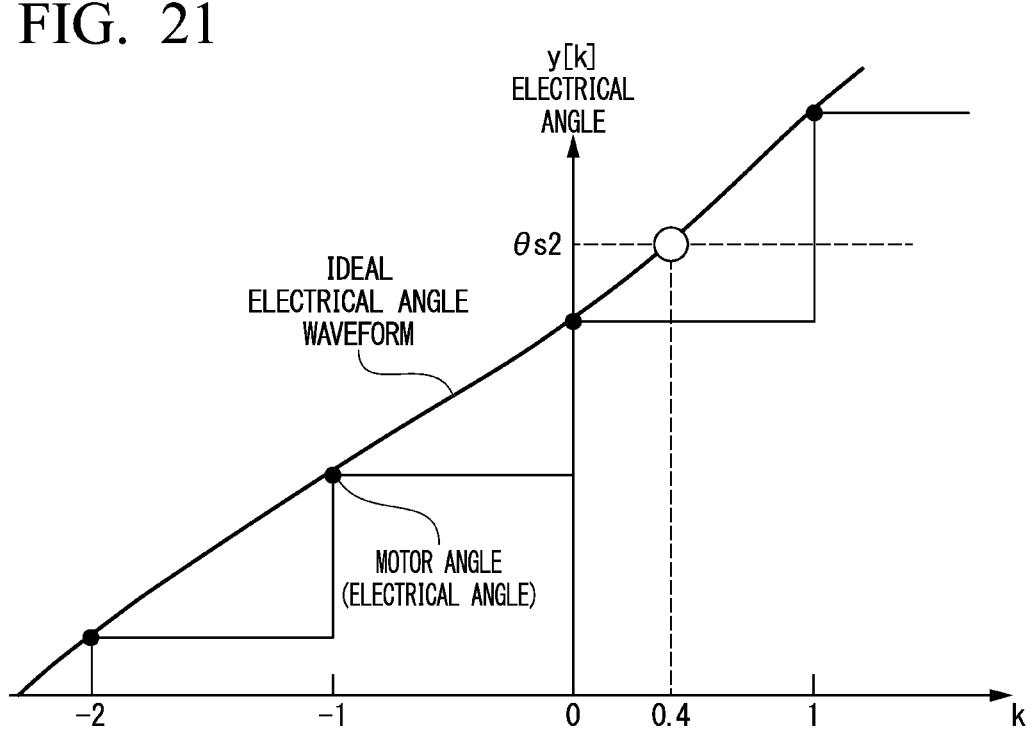
FIG. 21 is a graph showing an interpolated electric angle 2 calculated by the same electric angle interpolation unit by SOH calculation.
Figure 22:
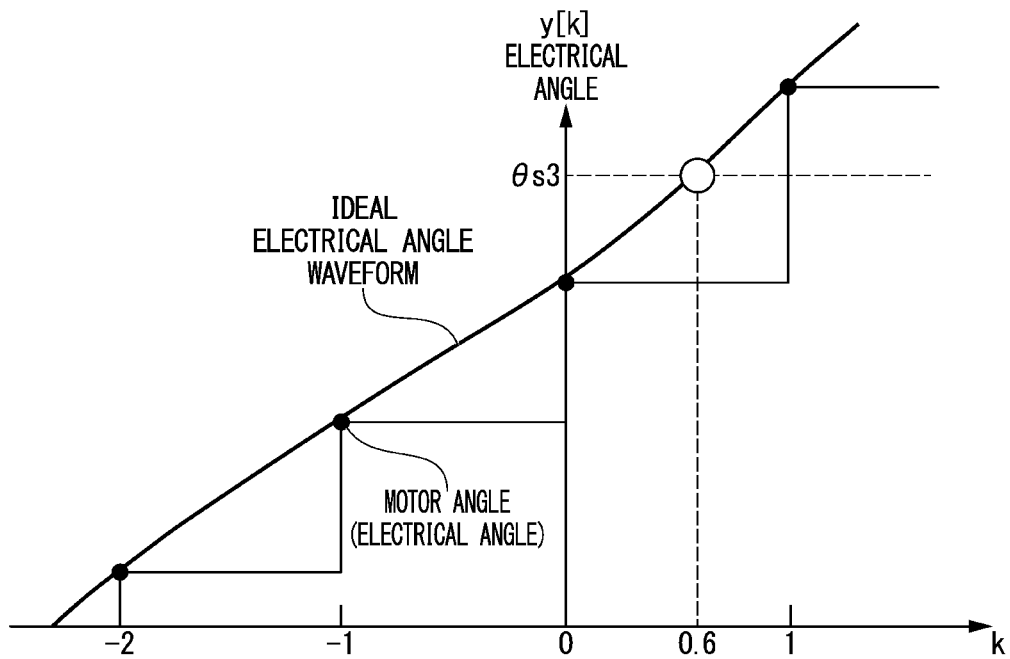
FIG. 22 is a graph showing an interpolated electric angle 3 calculated by the same electric angle interpolation unit by SOH calculation.
Figure 23:
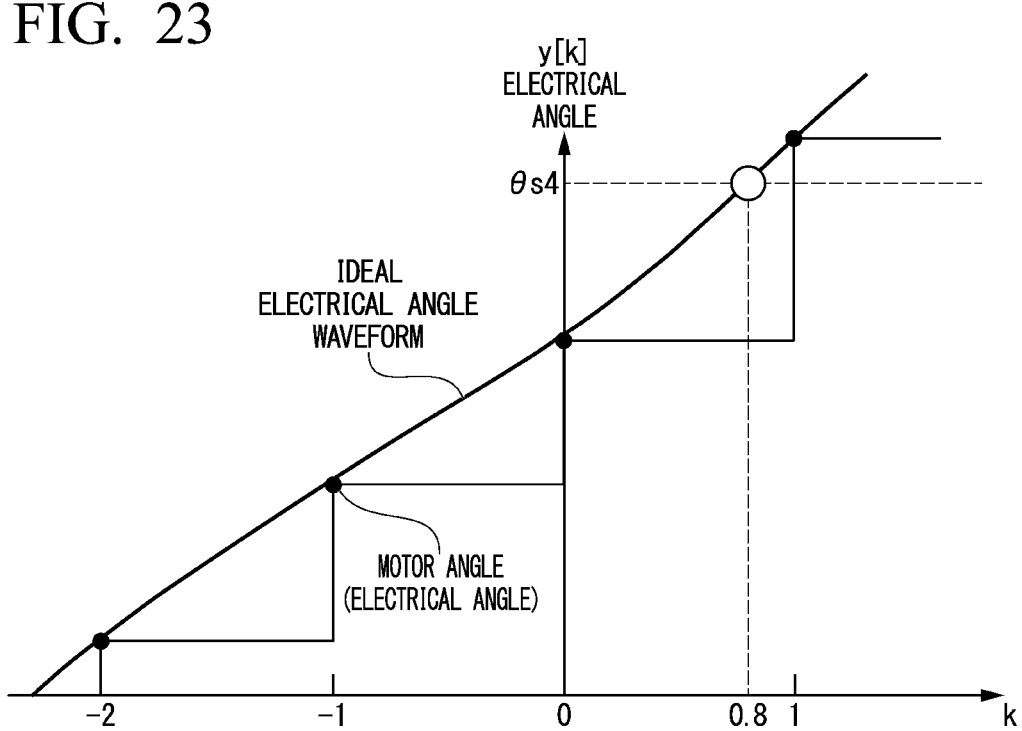
FIG. 23 is a graph showing an interpolated electric angle 4 calculated by the same electric angle interpolation unit by SOH calculation.

FIG. 19 is a block diagram of the electric angle interpolation unit 240B.

The electric angle interpolation unit 240B calculates a motor angle (interpolated electric angle) θs for interpolation Duty calculation from the input motor angle θe, and outputs the calculated motor angle to the space vector modulation unit 250 (electric angle interpolation step).

The electric angle interpolation unit 240B performs quadratic function interpolation calculation (Second Order Hold calculation: for the following, the quadratic function interpolation calculation may simply referred to as "SOH calculation") with respect to the motor angle θe detected in the control cycle 250 μs (Tc), to estimate the motor angle (interpolated electric angle) θs at an interval (division interval) of 50 μs obtained by dividing the control cycle Tc by ⅕, and calculates the interpolated Duty command value is calculated based on the estimated motor angle (interpolated electric angle) θs.

In the dq-axis current control performed by the electric angle interpolation unit 240B, the Duty command value after space vector modulation is not set as an interpolation target. This is because the Duty command value after space vector modulation includes a dead time compensation value with a transient change and a noise component caused by the distortion component of the third high frequency due to space vector modulation, or the like, and interpolated Duty command value calculated by directly interpolating the Duty command value is a value including large noise.

As shown in FIG. 19, the electric angle interpolation unit 240B includes a calculation processing unit 241 (SOH computation unit 241-1 and rollover processing unit 241-2) that inputs the motor angle θe and directly performs SOH calculation, an offset-added calculation processing unit 242 that receives the motor angle θe and performs offset processing or the like to perform SOH calculation, a motor angle switching determination unit 243 that determines whether the motor angle θe belongs to a range in which it is greater than 90° and less than or equal to 270° or the other range to output a switching flag SF, and a switching unit 244 that switches the contacts a and b by a switching flag SF and outputs a motor angle (interpolated electric angle) θs for interpolation Duty calculation.

FIGS. 20 to 23 show four interpolated electric angles (hereinafter referred to as "interpolated electric angles 1 to 4") calculated by SOH calculation at intervals of 50 μs in which the control cycle Tc is divided into ⅕. By calculating the interpolated electric angles 1 to 4 (θs 1 to 4) using the motor electric angle θe detected before, the change of the electric angle can be smoothed.

The function y [k] used for the SOH calculation is expressed by Equation 8. y [k] is a function representing the motor angle (electric angle) at the control cycle number k.

[Equation 8]

$$y[k]=ak^2+bk+c \quad \text{(EQUATION 8)}$$

Equation 9 is established by expressing as the second previous value y [−2], the previous value y [−1], and the current value y [0], using the coefficients a, b, c.

[Equation 9]

$$\begin{cases} y[0] = c \\ y[-1] = a - b + c \\ y[-2] = 4a - 2b + c \end{cases} \quad \text{(EQUATION 9)}$$

By arranging the above equations, a, b, c are expressed as in Equation 10 using y [0], y [4], y [−2].

[Equation 10]

$$\begin{cases} a = (y[-2] - 2y[-1] + y[0])/2 \\ b = (y[-2] - 4y[-1] + 3y[0])/2 \\ c = y[0] \end{cases} \quad \text{(EQUATION 10)}$$

When Equation 10 is substituted into Equation 8, Equation 11 is obtained.

[Equation 11]

$$y[k]=ak^2+bk+c=((k^2+3k+2)/2)y[0]+((-2k^2-4k)/2)y[-1]+((k^2+k)/2)y[-2] \quad \text{(EQUATION 11)}$$

Since the interpolated electric angle 1 (θs1) is an electric angle after 50 μs (Tc*{⅕}) from the control cycle Tc, it can be calculated by substituting k=0.2 in Equation 11.

[Equation 12]

$$y[0.2]=(33y[0]-11y[-1]+3y[-2])/25 \quad \text{(EQUATION 12)}$$

Since the interpolated electric angle 2 (θs2) is an electric angle after 100 μs (Tc*{⅖}) from the control cycle Tc, it can be calculated by substituting k=0.4 into Equation 11.

[Equation 13]

$$y[0.4]=(42y[0]-24y[-1]+7y[-2])/25 \quad \text{(EQUATION 13)}$$

Since the interpolated electric angle 3 (θs3) is an electric angle after 150 μs (Tc*{⅗}) from the control cycle Tc, it can be calculated by substituting k=0.6 into Equation 11.

[Equation 14]

$$y[0.6]=(52y[0]-39y[-1]+12y[-2])/25 \quad \text{(EQUATION 14)}$$

Since the interpolated electric angle 4 (θs4) is an electric angle after 200 μs (Tc*{⅘}) from the control cycle Tc, it can be calculated by substituting k=0.8 into Equation 11.

[Equation 15]

$$y[0.8]=(63y[0]-56y[-1]+18y[-2])/25 \quad \text{(EQUATION 15)}$$

Figure 24:
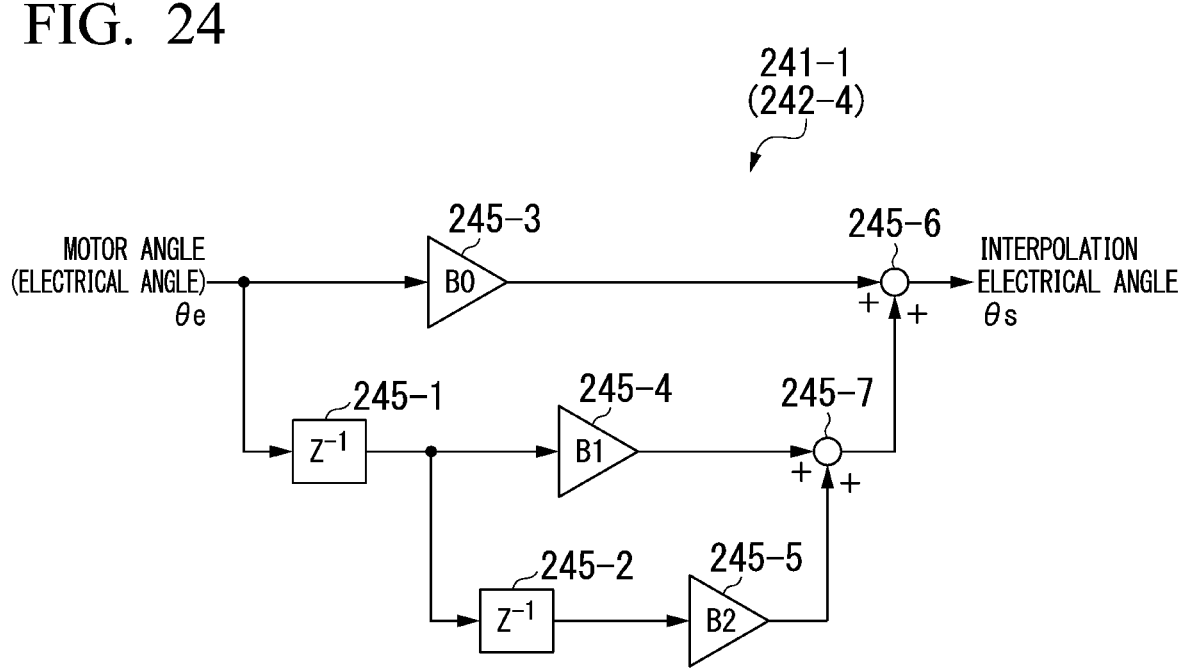
FIG. 24 is a functional block diagram of an SOH computation unit of the electric angle interpolation unit.

FIG. 24 is a functional block diagram of the SOH computation unit 241-1 (242-4).

The SOH computation unit 241-1 includes a holding unit 245-1 and a holding unit 245-2 of the previous value of the motor angle θe, a coefficient unit B0 (245-3), a coefficient unit B1 (245-4), a coefficient unit B2 (245-5), an adding unit 245-6, and an adding unit 245-7.

The motor angle θe is input to the coefficient unit B0 (245-3) and the holding unit 245-1, and the holding value of the holding unit 245-1 is input to the coefficient unit B1 (245-4) and the holding unit 245-2. The holding value of holding unit 245-2 is input to the coefficient unit B2 (245-5), and the output values of the coefficient unit B0 (245-3), the coefficient unit B1 (245-4) and the coefficient unit B2 (245-5) are added by the adding unit 245-7 and the adding unit 245-6 to be output as the interpolated electric angle θs.

The coefficients B0, B1, and B2 at the time of calculating the interpolated electric angles 1 to 4 (θs 1 to 4) are expressed as shown in Table 1 by Equations 12 to 15.

TABLE 1

| | B0 | B1 | B2 |
|---|---|---|---|
| INTERPOLATION ELECTRICAL ANGLE 1 (θs1) | $\frac{33}{25}$ | $-\frac{11}{25}$ | $\frac{3}{25}$ |
| INTERPOLATION ELECTRICAL ANGLE 2 (θs2) | $\frac{42}{25}$ | $-\frac{24}{25}$ | $\frac{7}{25}$ |
| INTERPOLATION ELECTRICAL ANGLE 3 (θs3) | $\frac{52}{25}$ | $-\frac{39}{25}$ | $\frac{12}{25}$ |
| INTERPOLATION ELECTRICAL ANGLE 4 (θs4) | $\frac{63}{25}$ | $-\frac{56}{25}$ | $\frac{18}{25}$ |

As shown in FIG. 19, the calculation processing unit 241 in the electric angle interpolation unit 240B includes an SOH calculating unit 241-1 that receives the motor angle θe and performs SOH calculation, and a rollover processing unit 241-2 that performs rollover processing (waveform processing) on the motor angle θe1 output from the SOH calculating unit 241-1. The motor angle θe2 subjected to rollover processing by the rollover processing unit 241-2 is input to the contact a of the switching unit 244.

As shown in FIG. 19, the offset-added calculation processing unit 242 includes an adding unit 242-2 that receives the motor angle θe and performs offset processing using a coefficient 180° that is input from the fixing unit 242-1, a rollover processing unit 242-3 that performs rollover processing (waveform processing) on the motor angle θe3 input from the adding unit 242-2, an SOH computation unit 242-4 that corrects the motor angle θe4 input from the rollover processing unit 242-3, a subtraction unit 242-6 that receives the motor angle θe5 is input from the SOH computation unit 242-4 and performs offset return processing by a coefficient 180° that is input from the fixed portion 242-5, and a rollover processing unit 242-7 that performs rollover processing (waveform processing) on the motor angle θe6 that is input from the subtraction unit 242-6. The motor angle θe7 subjected to the rollover processing in the rollover processing unit 242-7 is input to the contact b of the switching unit 244.

The motor angle θe2 from the rollover processing unit 241-2 of the calculation processing unit 241 is input to the contact a of the switching unit 244, and the motor angle θe7 from the rollover processing unit 242-7 of the offset-added calculation processing unit 242 is input to the contact b of the switching unit 244. The contacts a and b of the switching unit 244 are switched by the switching flag SF ("H", "L") from the motor angle switching determination unit 243, and a motor angle (interpolated electric angle) θs for interpolation Duty calculation is output from the switching unit 244.

The motor angle (electric angle) θe returns to 0° if it exceeds 360° when moving from the current motor angle to the next motor angle. At this time, since a transient angle variation occurs, if SOH calculation is performed using the current motor angle, an accurate interpolation calculation result may not be obtained. In order to avoid this problem, the electric angle interpolation unit 240B switches the calculation output (motor angle θs for interpolation Duty calculation) according to the motor angle θe of the input electric angle.

When the motor angle θe is in the range of 90°<θe≤270°, there is no transient angle fluctuation in the motor angle θe. Therefore, the electric angle interpolation unit 240B performs SOH calculation on the input motor angle θe.

On the other hand, when the motor angle θe is in the range of 0°≤θe≤90° or 270°<θe≤360°, there is a transient angle fluctuation in the motor angle θe. Therefore, the electric angle interpolation unit 240B offsets the motor angle θe by 180°, converts it into a continuous angle signal, performs SOH calculation, and performs 180° offset return processing on the interpolation calculation result after the SOH calculation.

The motor angle switching determination unit 243 generates the switching flag SF from input motor angle θe ("H" when 90°<θe≤270° or "L" when 0°≤θe≤90° or 270°<θe≤360°).

The switching unit 244 selects and outputs the motor angle (interpolated electric angle) θs for the interpolation Duty calculation after the SOH calculation based on the switching flag SF.

That is, when 90°<θe≤270°, the switching unit 244 is controlled as shown in Equation 16 and outputs the motor angle θe2 as the motor angle θs for interpolation Duty calculation.

[Equation 16]

$$SF = H(90° < \theta_e \leq 270°) \quad \text{(EQUATION 16)}$$

Further, when 0°≤θe≤90° or 270°<θe≤360°, the switching unit 244 is controlled as in Equation 17, and outputs the motor angle θe7 as the motor angle θs for interpolation Duty calculation.

[Equation 17]

$$SF = L(0° \leq \theta_e \leq 90° \text{ OR } 270° < \theta_e \leq 360°) \quad \text{(EQUATION 17)}$$

Figure 25:
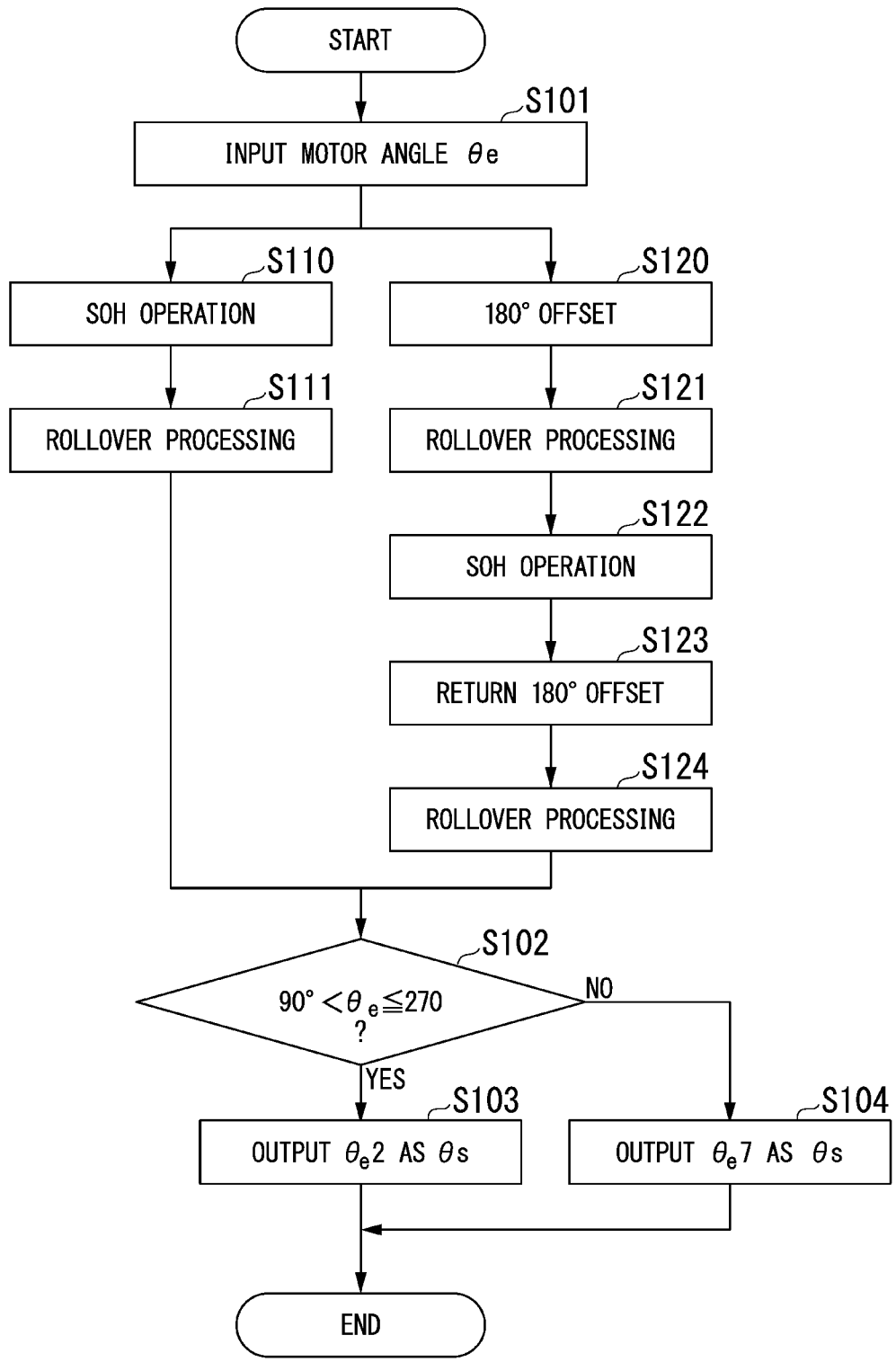
FIG. 25 shows a control flowchart of the electric angle interpolation unit.

FIG. 25 shows a control flowchart of the electric angle interpolation unit 240B.

The motor angle (electric angle) θe is input to the electric angle interpolation unit 240B (step S101).

The SOH computation unit 241-1 of the calculation processing unit 241 performs the SOH calculation (step S110). The motor angle θe is input to the holding unit 245-1 to be used as the previous value in the next SOH calculation.

Further, the previous value input to the holding unit 245-1 is input to the holding unit 245-2 because it is used as the value before the next SOH calculation.

The rollover processing unit 241-2 performs rollover processing on the motor angle θe1 calculated by the SOH and outputs a motor angle θe2 (step S111).

The offset-added calculation processing unit 242 performs offset processing on the motor angle (electric angle) θe using the coefficient 180° input from the fixing unit 242-1 to the adding unit 242-2 (step S120).

The rollover processing unit 242-3 performs rollover processing on the offset-processed motor angle θe3, and outputs the motor angle θe4 (step S121).

The SOH computation unit 242-4 performs the SOH calculation on the input motor angle θe4 (step S122). The motor angle θe is input to the holding unit 245-1 to be used as the previous value in the next SOH calculation. Further, the previous value that has been input to the holding unit 245-1 is input to the holding unit 245-2 because it is used as the value before the next SOH calculation.

The motor angle θe5 calculated by the SOH is input to the subtraction unit 242-6, and the offset return processing is performed with the coefficient 180° input from the fixing unit 242-5 (step S123).

The motor angle θe6 subjected to the offset return processing is subjected to rollover processing by the rollover processing unit 242-7, and the motor angle θe7 is output (step S124).

After completion of the processing in step S111 and step S124, the motor angle switching determination unit 243 determines that the motor angle θe is greater than 90° and not more than 270° (step S102).

When this condition is satisfied (in the case of YES), the motor angle switching determination unit 243 sets the switching flag SF to "H".

If the above conditions are not met (in the case of NO), the motor angle θe is 0° or more and 90° or less, or more than 270° and 360° or less, and the motor angle switching determination unit 243 sets the switching flag SF to "L".

When the switching flag SF input from the motor angle switching determination unit 243 is "H", the switching unit 244 selects θe2 and outputs it as the motor angle (interpolated electric angle) θs for interpolation Duty calculation (step S103).

When the switching flag SF input from the motor angle switching determination unit 243 is "L", the switching unit 244 selects θe7 and outputs it as the motor angle (interpolated electric angle) θs for interpolation Duty calculation (step S104).

The electric angle interpolation unit 240B performs SOH calculation using the coefficients B0, B1, and B2 (see Table 1) corresponding to the interpolated electric angles 1 to 4 (θs1 to θs4), and calculates each interpolated electric angles 1 to 4 (θs1 to θs4).

FIG. 26 shows the waveforms of each part of the electric angle interpolation unit 240B, the horizontal axis is time [sec], and the vertical axis is an internal value processed by the MPU or the like and is 64 [dec]/1 [deg]. Note that 23040 [dec]=360 [deg].

Figures 26A, 26B, 26C, 26D:
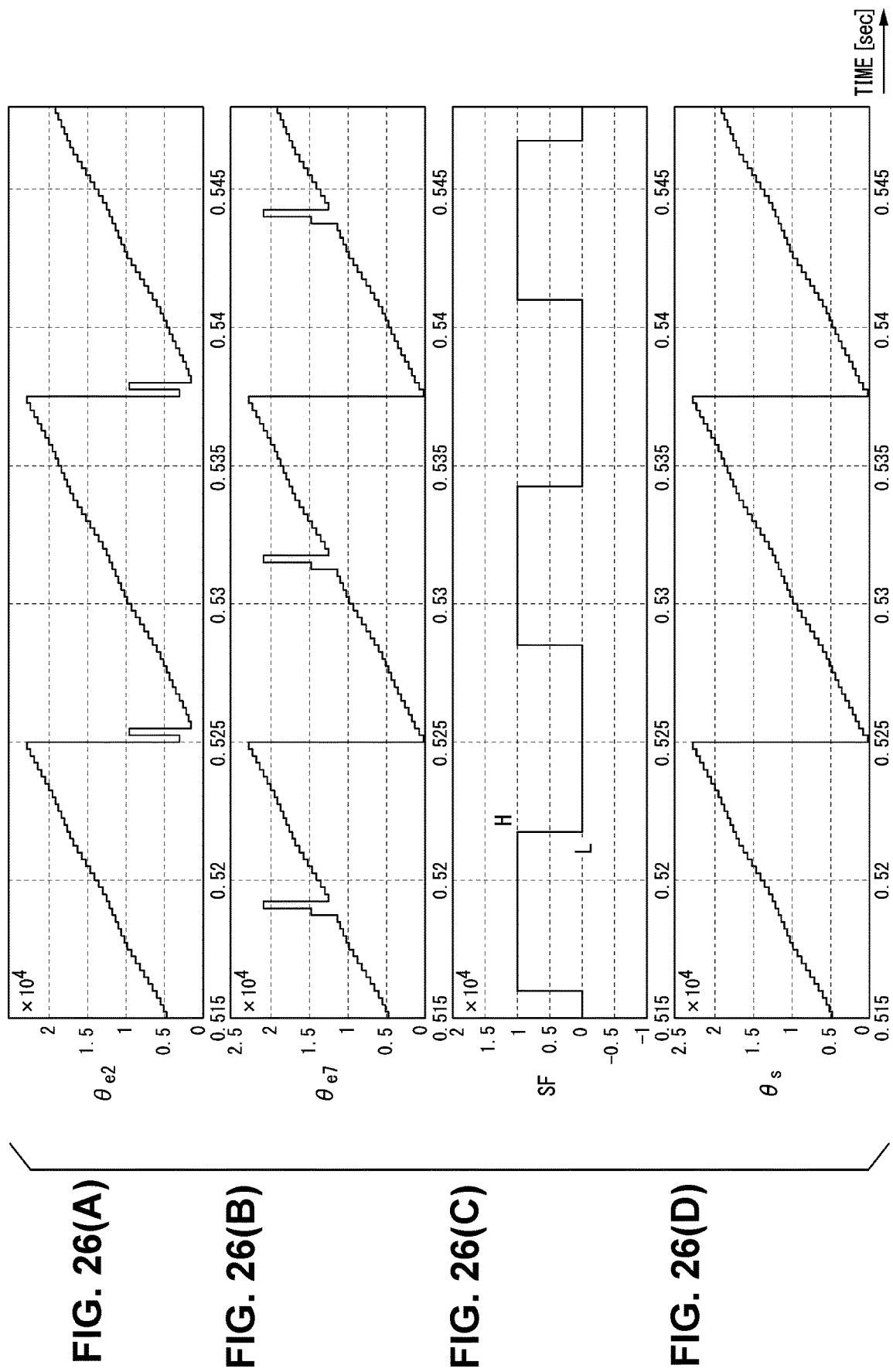
FIG. 26(A)-FIG. 26(D) are graphs showing the waveform of the electric angle interpolation unit.

FIG. 26(A) is a waveform example of the motor angle θe2 output from the calculation processing unit 241, and FIG. 26(B) is a waveform example of the motor angle θe7 output from the offset-added calculation processing unit 242. FIG. 26(C) shows the switching timing of "H" and "L" of the switching flag SF, and FIG. 26(D) shows a waveform example of the motor angle (interpolated electric angle) θs for interpolation Duty calculation output from the switching unit 244.

As shown in FIG. 26(D), the motor angle (interpolated electric angle) θs output by the electric angle interpolation unit 240B has no transient angle fluctuation as compared with the waveform shown in FIG. 26(A) when the motor angle θs exceeds 360° and returns to 0°. Since the motor angle θe has relatively low noise if the linearity is high, and there is no transitional change other than the angle change to switch from 360° to 0°, high accuracy can be ensured in calculation of the interpolated electric angle by SOH calculation.

[Space Vector Modulation Unit 250]

Figure 27:
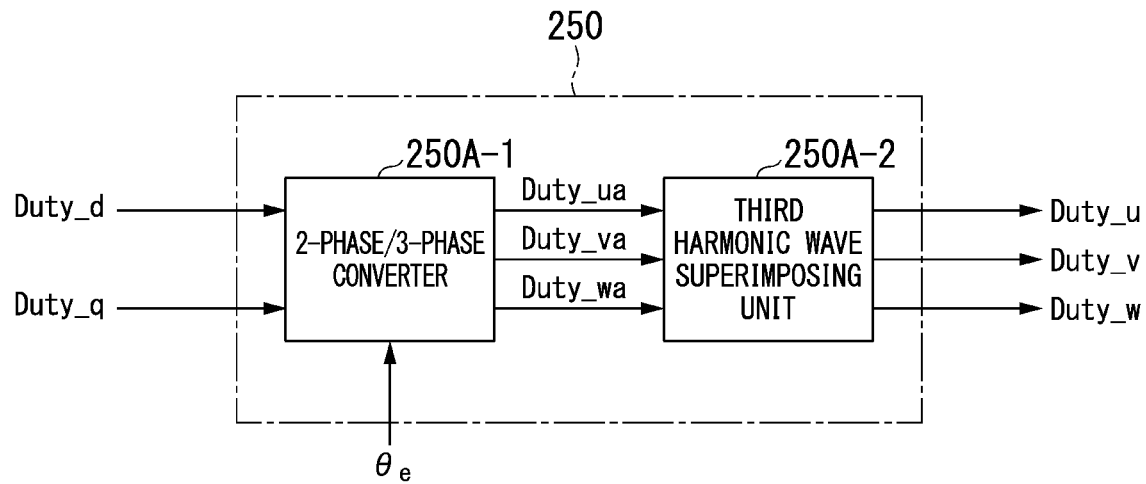
FIG. 27 is a functional block diagram of a space vector modulation unit of the motor control unit.

FIG. 27 is a functional block diagram of the space vector modulation unit 250.

The space vector modulation unit (conversion unit) 250 performs space vector conversion calculation after converting from the dimension of voltage to the dimension of Duty (conversion step). The space vector modulation unit 250 only needs to have a function of converting the Duty command value D1m (m=d, q) (Duty_d, Duty_q) for normal calculation in the dq axis space into a three-phase Duty command value (Duty_ua, Duty_va, Duty_wa), superimposing the third harmonic, and outputting the three-phase Duty command values Duty_u, Duty_v, and Duty_w. For example, the space vector modulation method proposed in Japanese Unexamined Patent Application, First Publication No. 2017-70066 or PCT International Publication No. WO 2017/098840 by the present applicant may be used.

The space vector modulation unit 250 includes a space vector modulation unit 250-0 that performs the above space vector conversion calculation using the motor angle (electric angle) θe, and space vector modulation units 250-1, 250-2, 250-3, 250-4 that perform space vector conversion calculations using the interpolated electric angles 1 to 4 (θs1 to θs4), respectively.

The space vector modulation unit 250-0 performs space vector conversion calculation using the motor angle (electric angle) θe, and outputs three-phase Duty command values Duty_u, Duty_v, and Duty_w.

The space vector modulation unit 250-1 performs space vector conversion calculation using the interpolated electric angle 1 (θs1), and outputs a three-phase interpolated Duty command value Duty_u_m1, Duty_v_m1, Duty_w_m1.

The space vector modulation unit 250-2 performs space vector conversion calculation using the interpolated electric angle 2 (θs2), and outputs a three-phase interpolated Duty command value Duty_u_m2, Duty_v_m2, Duty_w_m2.

The space vector modulation unit 250-3 performs space vector conversion calculation using the interpolated electric angle 3 (θs3), and outputs a three-phase interpolated Duty command value Duty_u_m3, Duty_v_m3, and Duty_w_m3.

The space vector modulation unit 250-4 performs space vector conversion calculation using the interpolated electric angle 4 (θs4), and outputs a three-phase interpolated Duty command value Duty_u_m4, Duty_v_m4, and Duty_w_m4.

[Final Duty Computation Unit 200]

Figure 28:
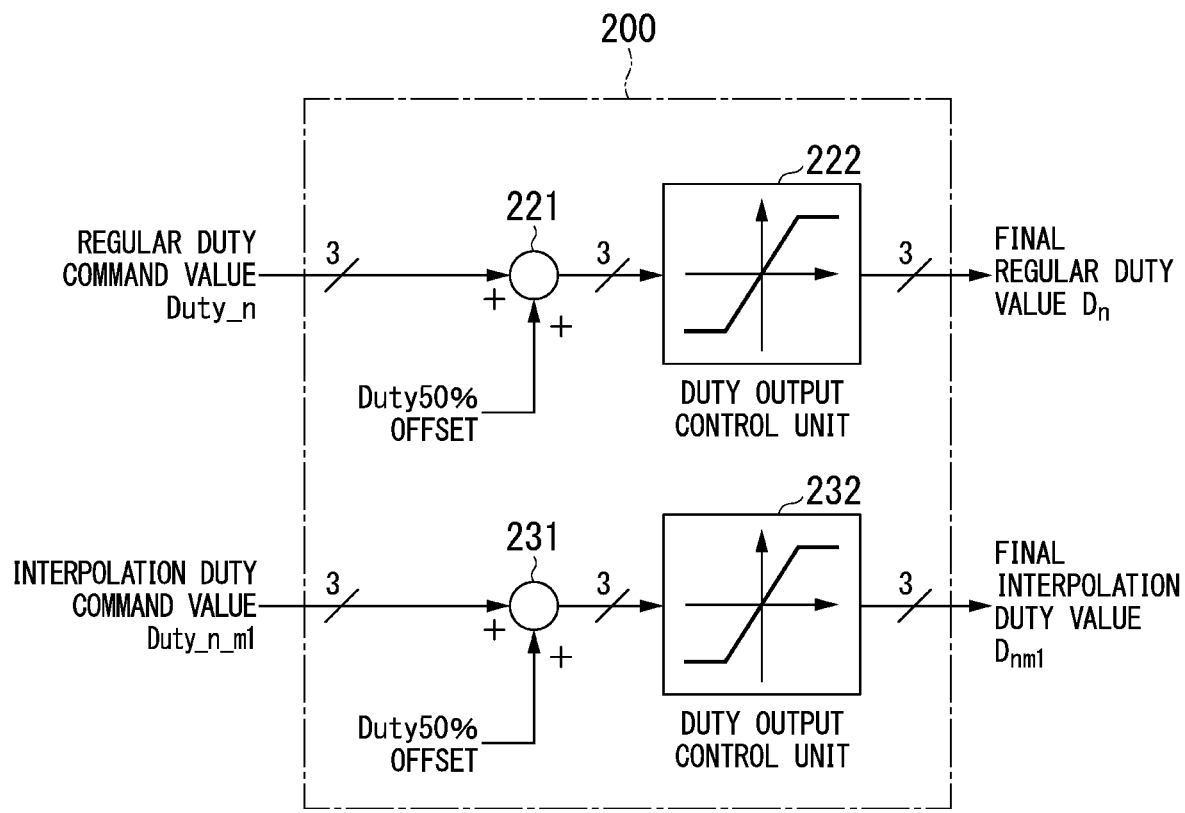
FIG. 28 is a functional block diagram of a final Duty computing unit of the motor control unit.

FIG. 28 is a functional block diagram of the final Duty computation unit 200.

In the final Duty computation unit 200, the normal Duty command value Duty_n (n=u, v, w) from the space vector modulation unit 250 is input to the adding unit 221. The Duty value to which the offset of Duty 50% has been added by the adding unit 221 is input to the limiter 222 which limits the Duty output within the range of 0 to 100% (variable). A final normal Duty command value Dn (n=u, v, w) is output from the limiter 222.

The interpolated Duty command value Duty_n_m1 from the space vector modulation unit 250 is input to the adding unit 231, and the Duty value to which the offset of Duty 50% is added by the adding unit 231 is input to a limiter 232 that limits the Duty output within a range (variable) of 0 to 100%. The final interpolated Duty command value Dnm1 (n=u, v, w) is output from the limiter 232.

The interpolated Duty command values Duty_n_m2, Duty_n_m3 and Duty_n_m4 from the space vector modulation unit 250 are processed in the same manner as the interpolated Duty command values Duty_n_m1, and the final interpolated Duty command values Dnm2, Dnm3, Dnm4 (n=u, v, n w) is output from the limiter 232.

In general, since the EPS supplies the motor applied voltage from the battery (DC+12 V), it cannot supply the applied voltage in the negative (−) direction. In this state, the phase voltage command value in the negative direction cannot be supplied, so the phase current cannot flow in the negative direction. In order to cope with this problem, by offsetting the Duty value by 50% (+6V) for all three phases to make the reference voltage, the phase current becomes 0A when the three-phase Duty value is 50% even when the three phases are not 0V (when the motor applied voltage is +12V). For example, in the case when the U-phase Duty value is 50% (+6 V), the V-phase Duty value is 50% (+6 V), and the W-phase Duty value is 50% (+6 V), the U-phase becomes 0A, the V-phase becomes 0A, and the W-phase becomes 0A. In the case when the U-phase Duty value is 60% (+7.2 V), the V-phase Duty value is 50% (+6 V), and the W-phase Duty value is 40% (+4.8 V), a current flows in the positive (+) direction in the U phase. In the case when the U-phase Duty value is 40% (+4.8 V), the V-phase Duty value is 50% (+6 V), and the W-phase Duty value is 60% (+7.2 V), a current flows in the negative direction in the U phase. By offsetting the three phases to a Duty value of 50% to make the reference voltage, it is possible to flow a current in the negative direction while the applied voltage is positive. Although the 50% Duty value offset is basically fixed, the reference voltage at 50% Duty value fluctuates depending on the applied voltage state to be supplied. For example, when the applied voltage is 11 V, the 50% Duty value is 5.5 V, and when the applied voltage is 13 V, the 50% Duty value is 6.5 V.

[Duty Output Setting Unit 160A-1]

Figure 29:
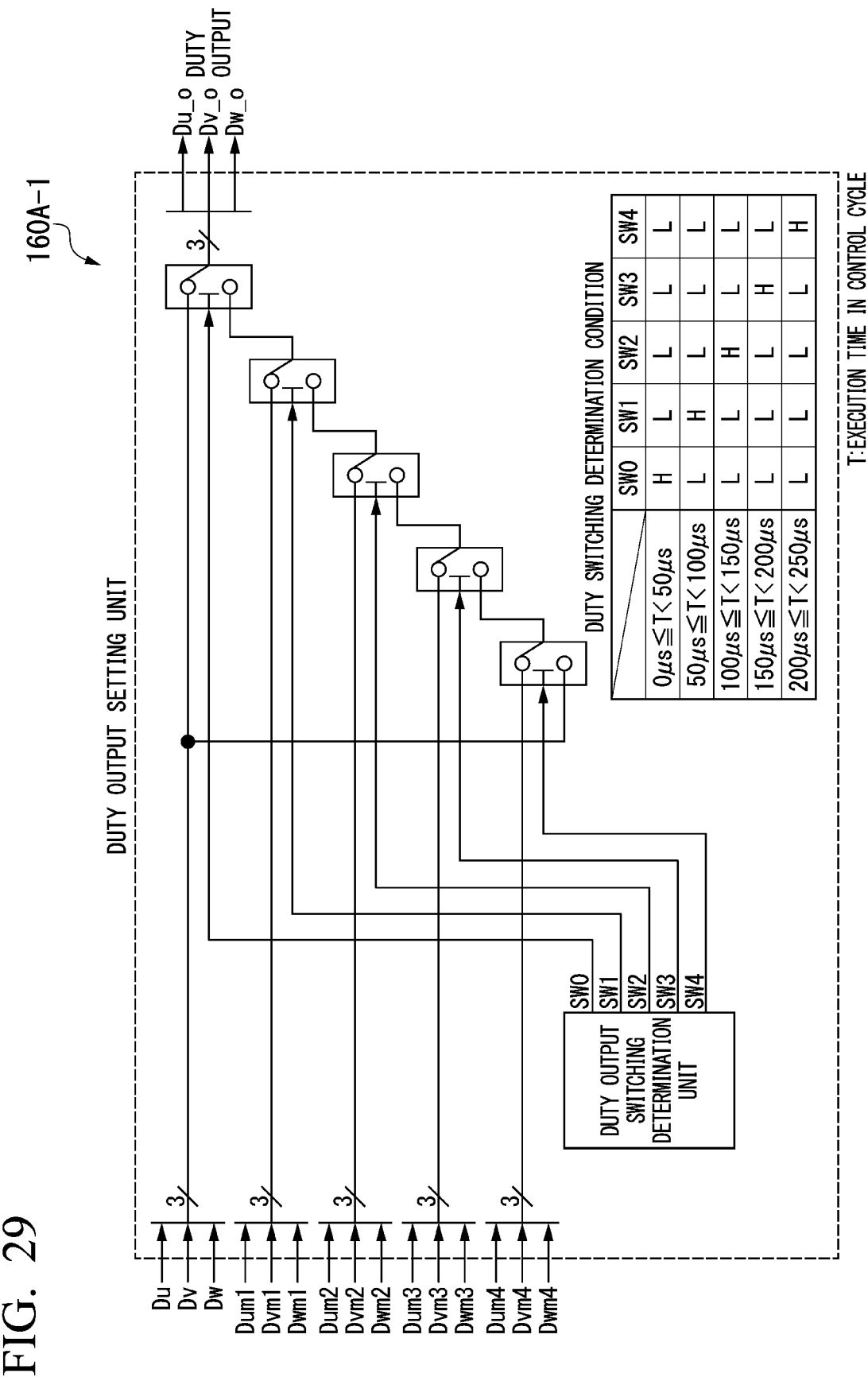
FIG. 29 is a functional configuration diagram of a Duty output setting unit of the motor control unit.
Figure 30:
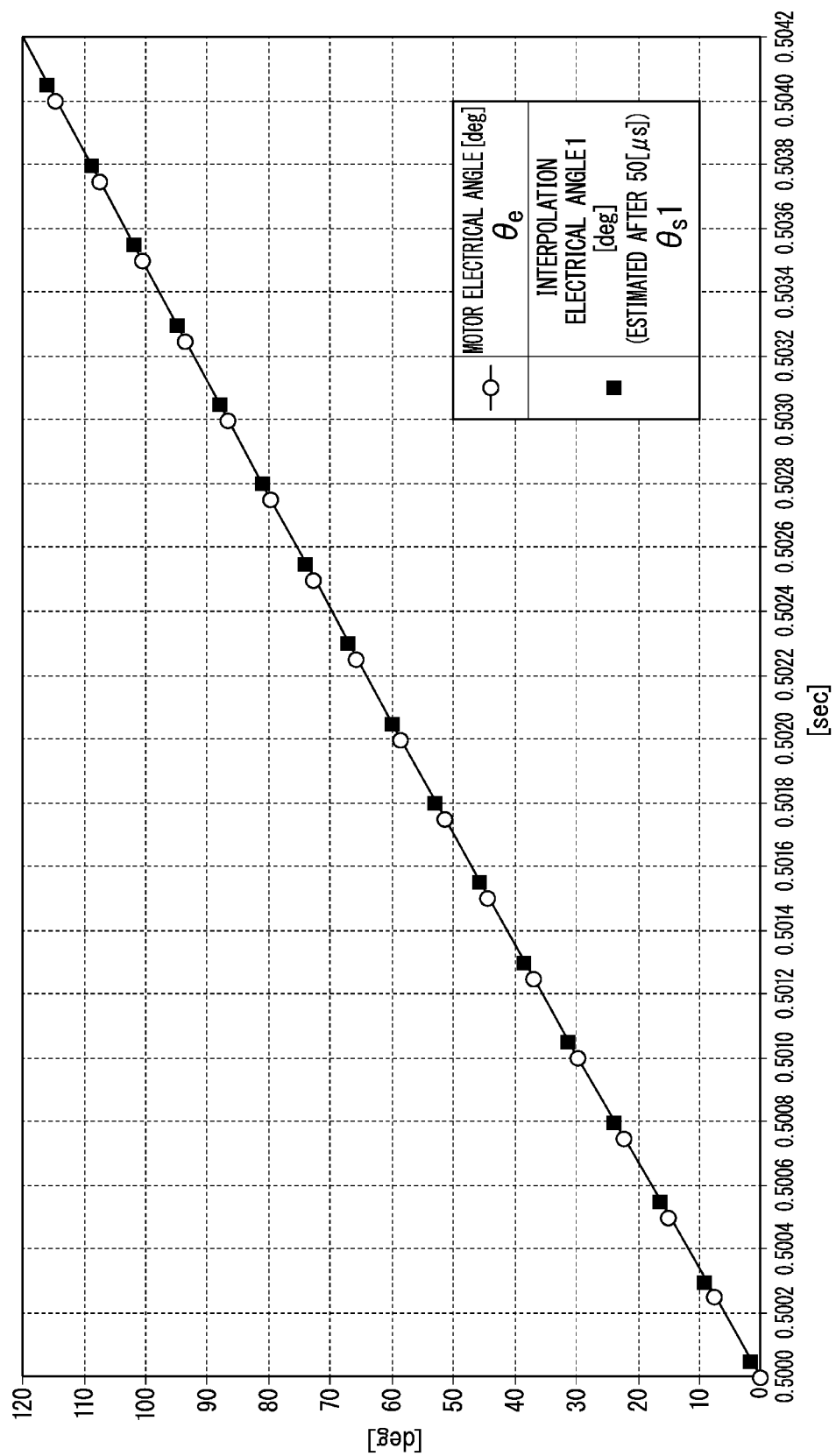
FIG. 30 is a graph showing simulation results of estimation of the interpolated electric angle 1.
Figure 31:
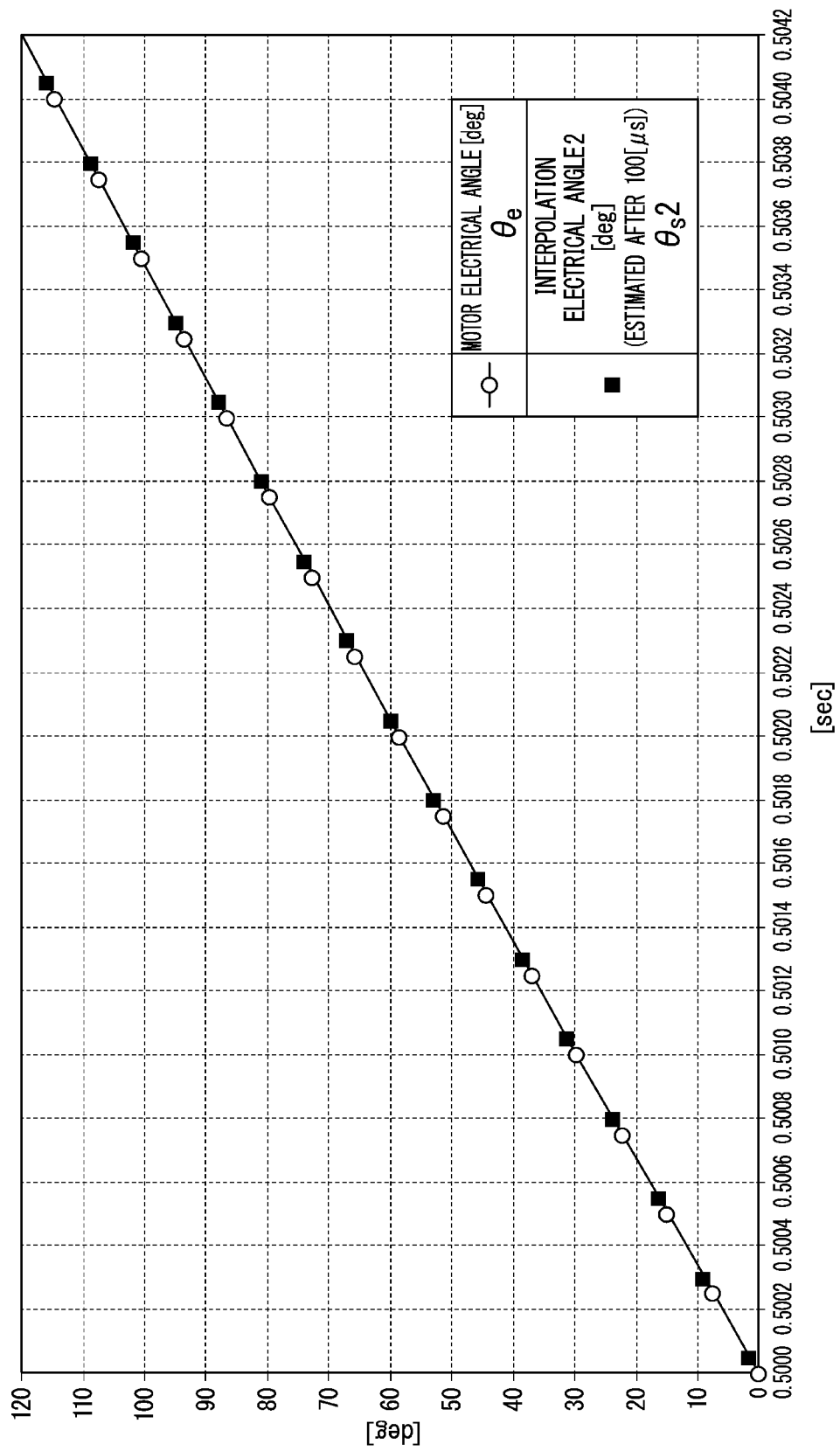
FIG. 31 is a graph showing simulation results of estimation of the interpolated electric angle 2.
Figure 32:
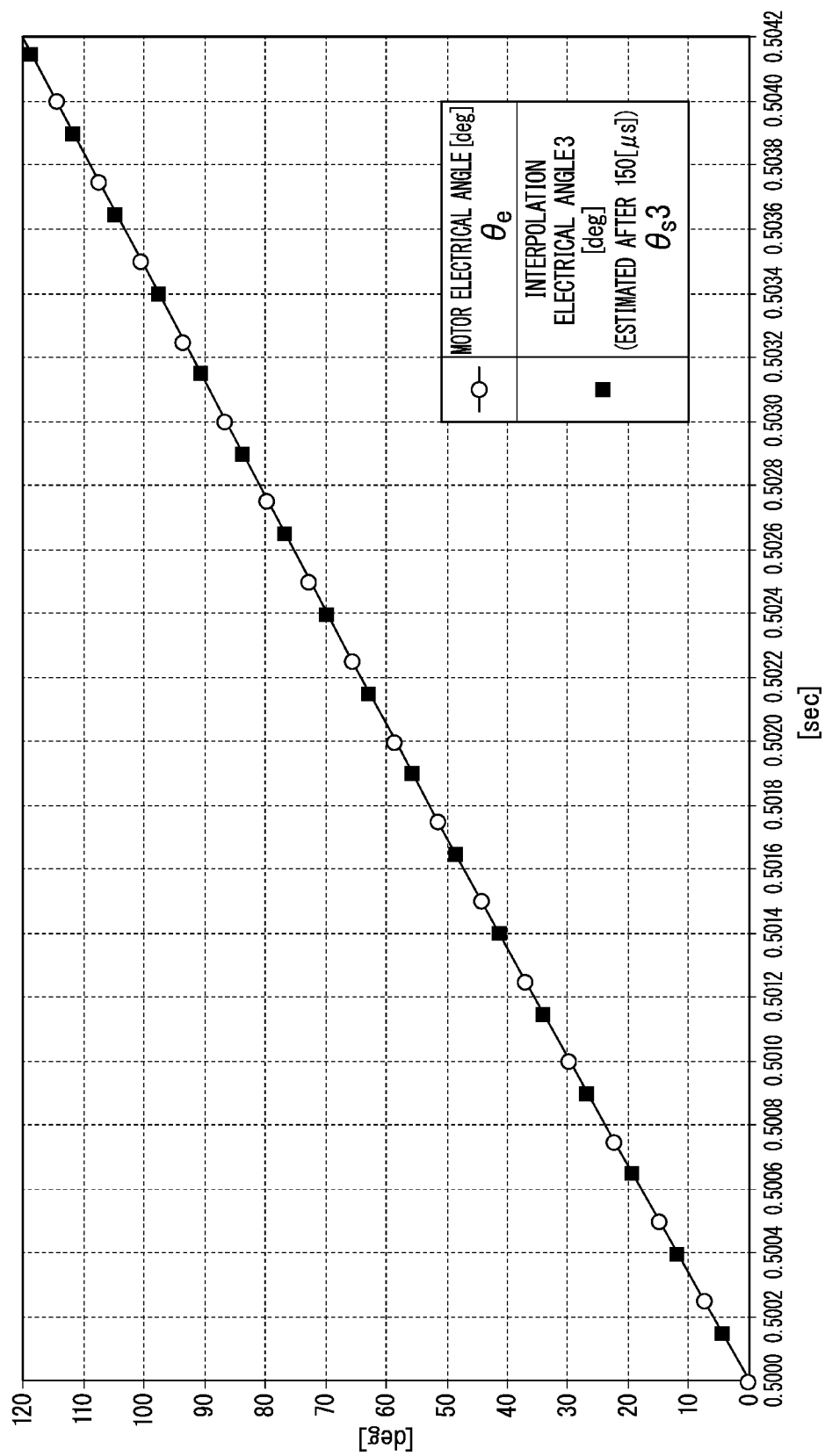
FIG. 32 is a graph showing simulation results of estimation of the interpolated electric angle 3.
Figure 33:
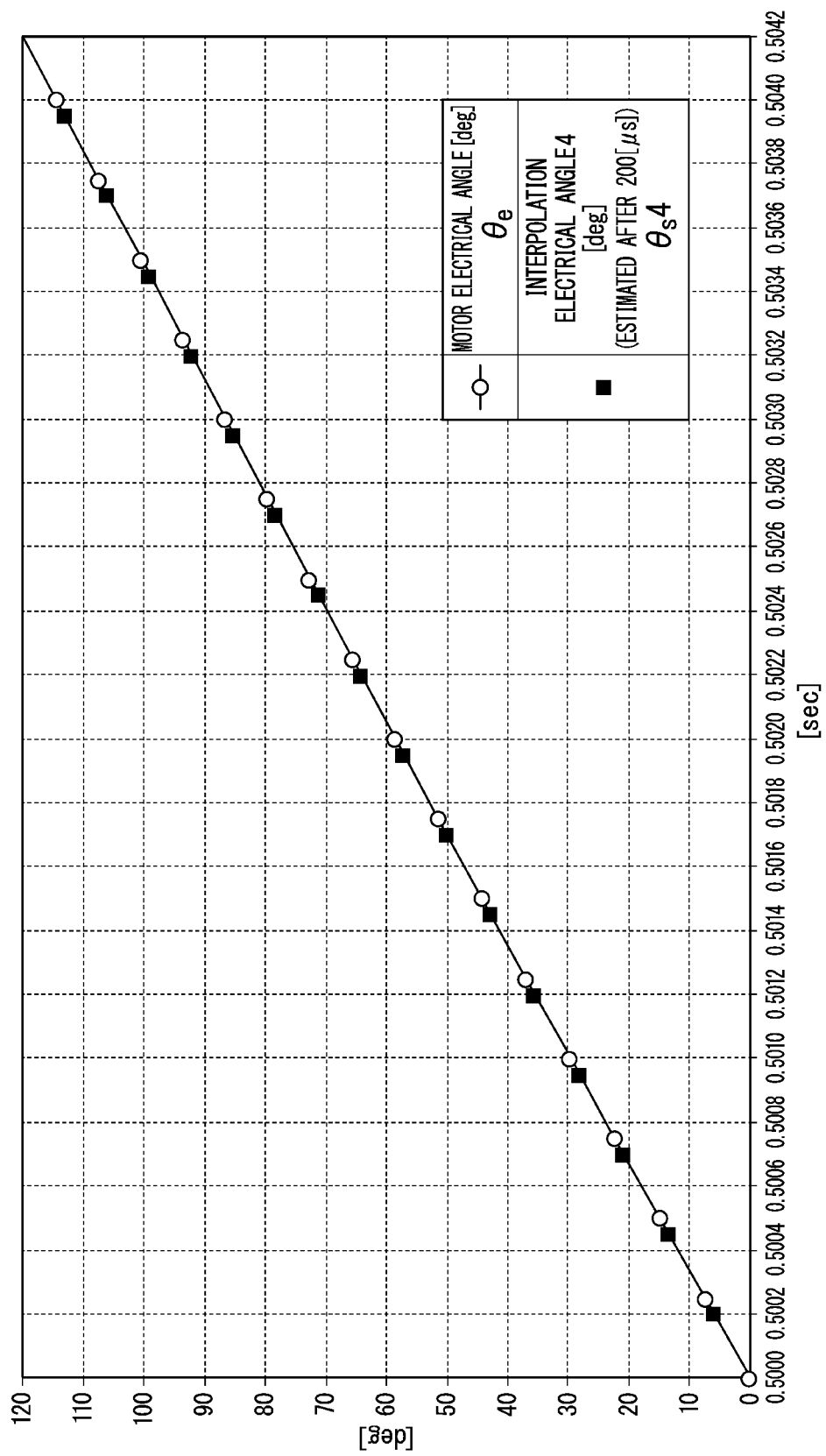
FIG. 33 is a graph showing simulation results of estimation of the interpolated electric angle 4.
Figure 34:
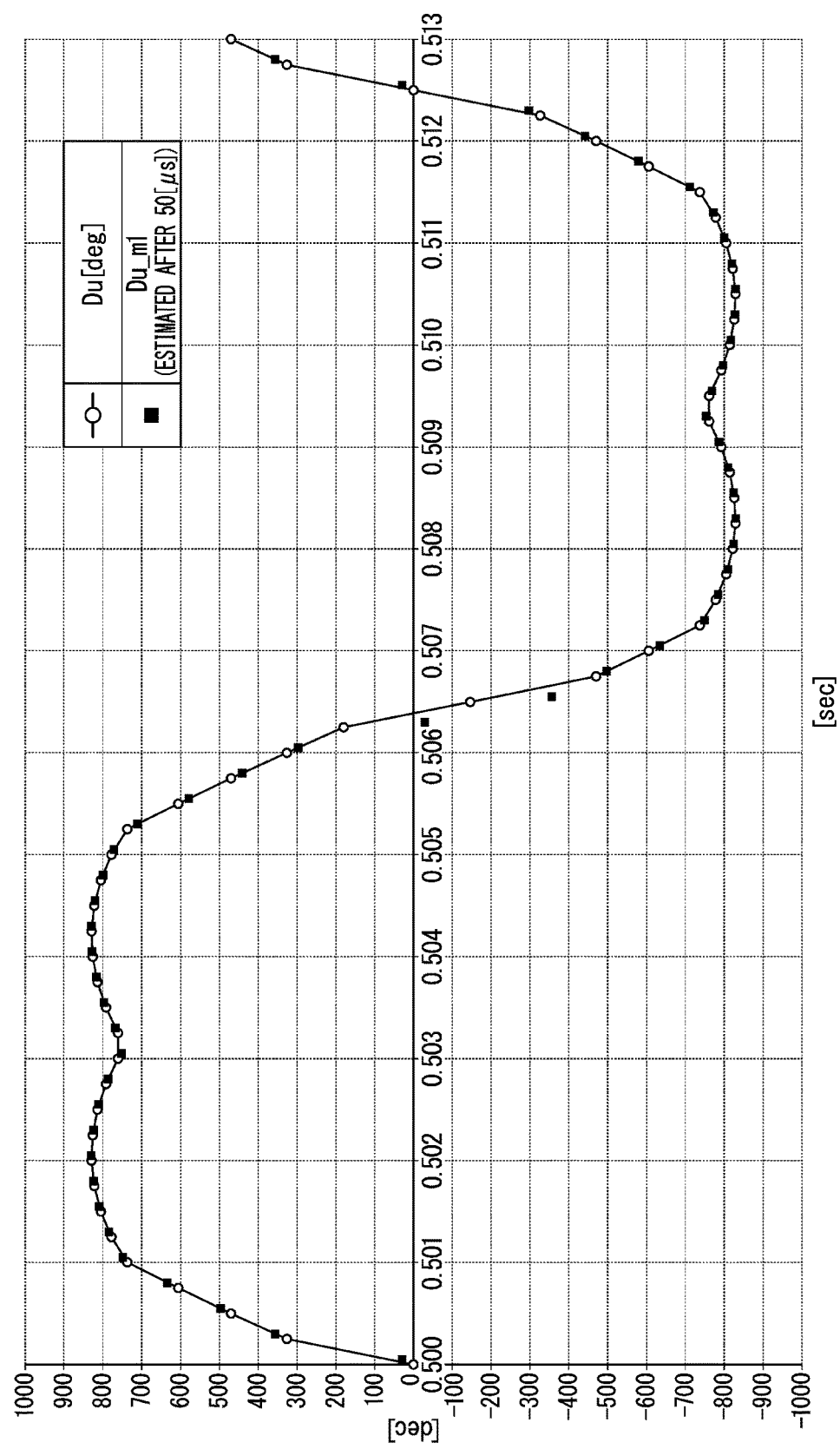
FIG. 34 is a graph showing simulation results of Duty command values calculated using the estimated interpolated electric angle 1.
Figure 35:
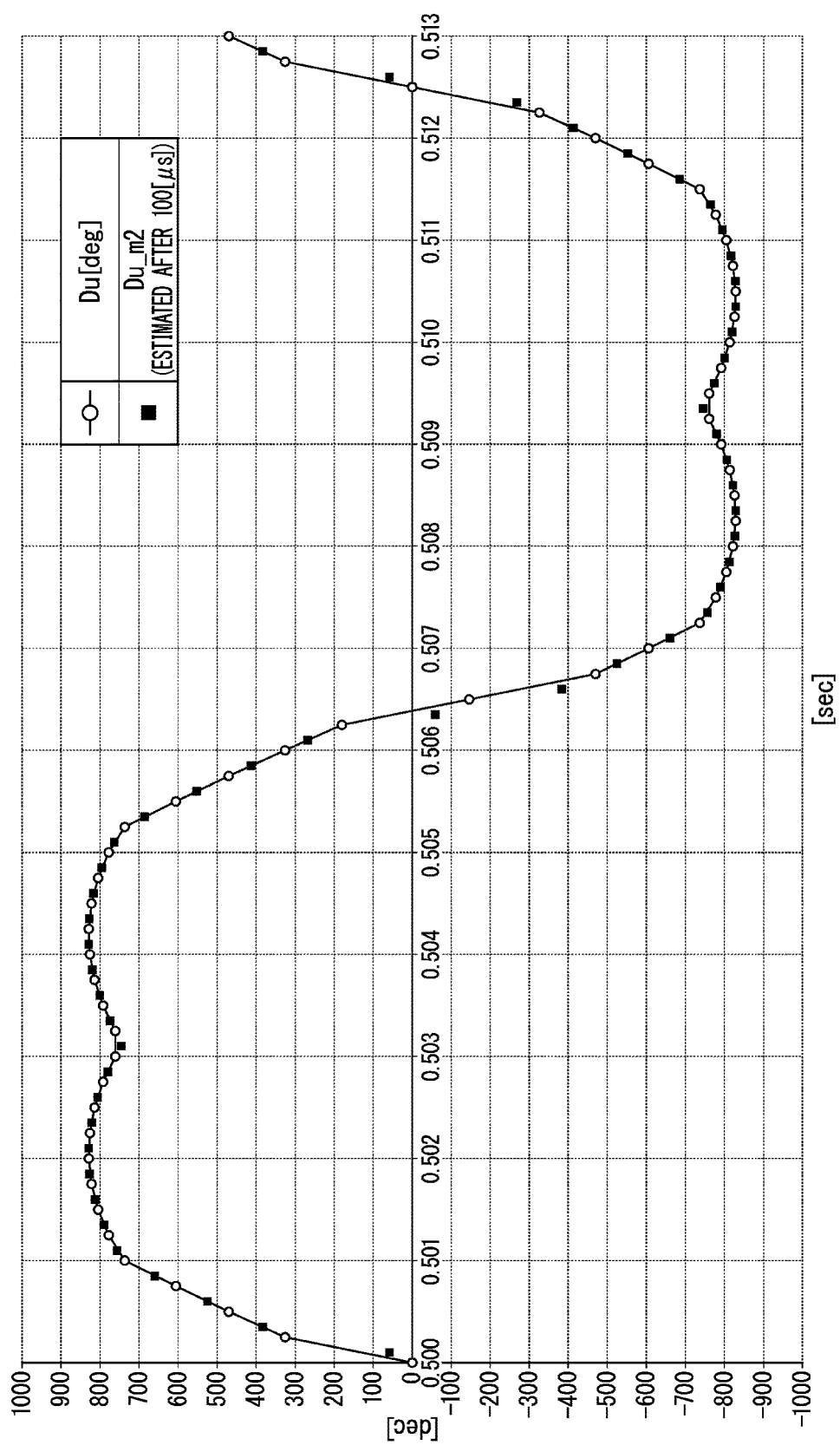
FIG. 35 is a graph showing simulation results of Duty command values calculated using the estimated interpolated electric angle 2.
Figure 36:
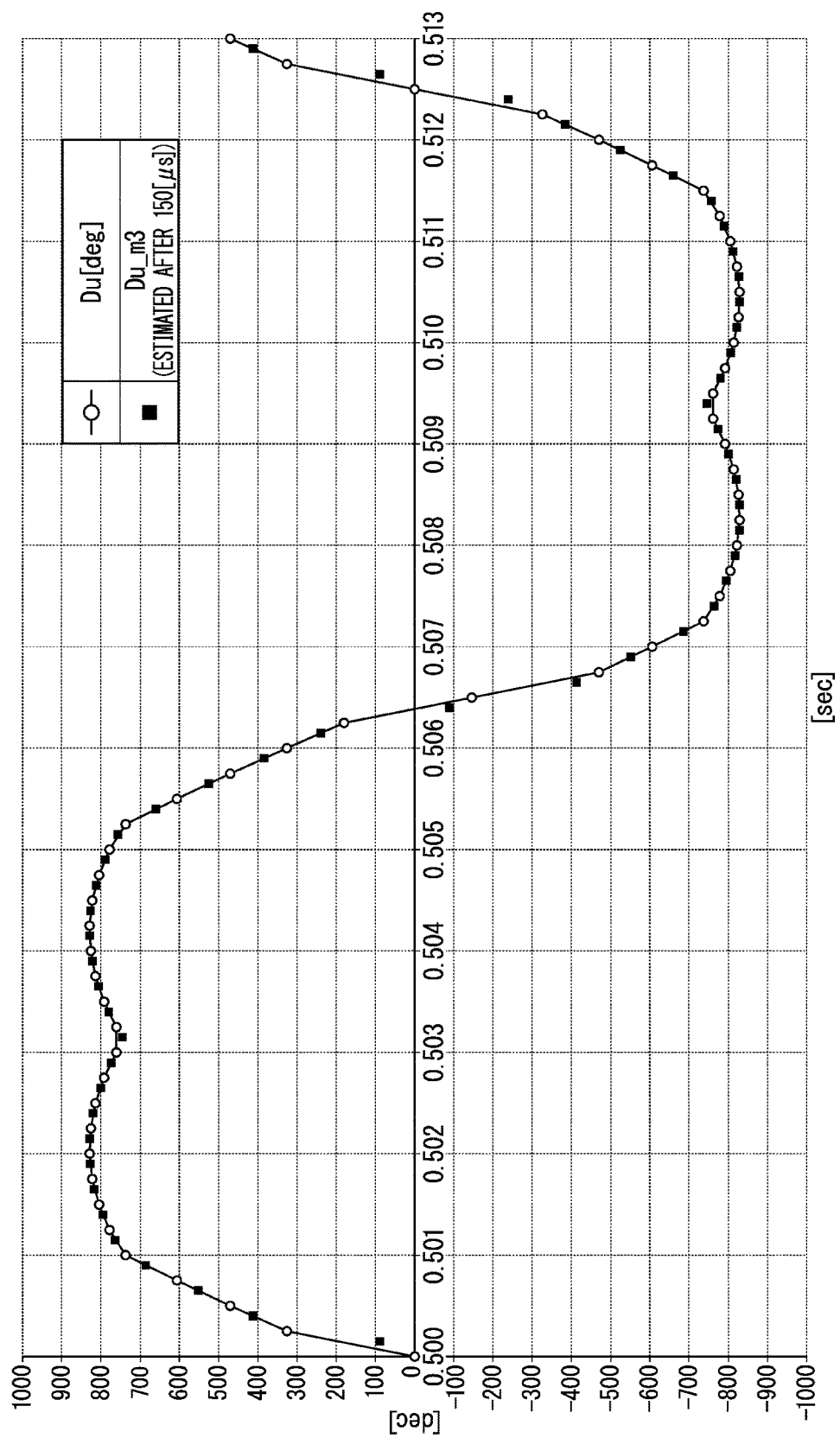
FIG. 36 is a graph showing simulation results of Duty command values calculated using the estimated interpolated electric angle 3.
Figure 37:
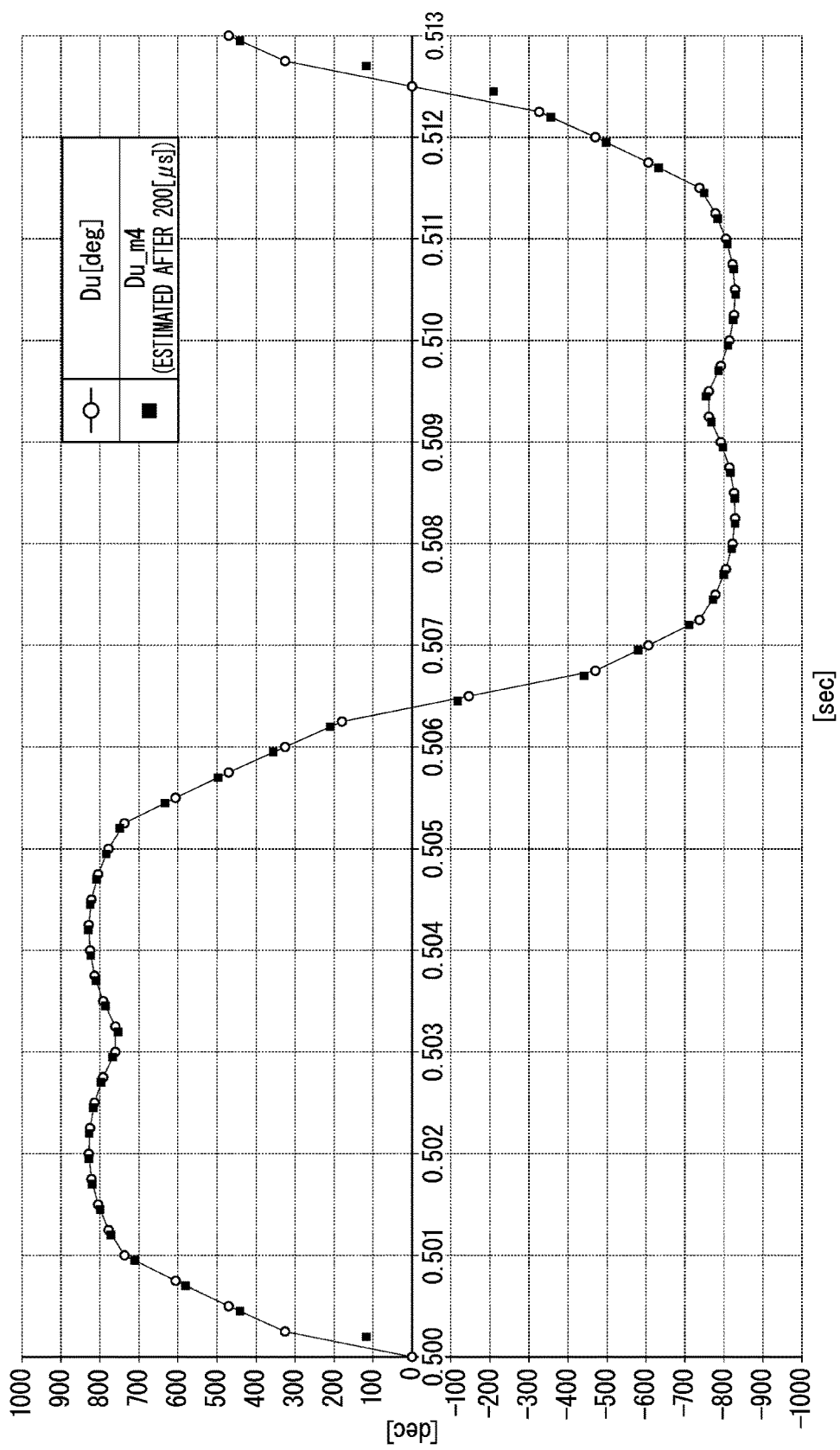
FIG. 37 is a graph showing simulation results of Duty command values calculated using the estimated interpolated electric angle 4.

FIG. 29 is a functional block diagram of the Duty output setting unit 160A-1.

As shown in FIG. 29, the Duty output setting unit (output setting unit) 160A-1 adjusts the control cycle Tc to an interval (division interval) of 50 μs obtained by dividing the control cycle Tc into ⅕, and switches and outputs the final Duty command values Du_o, Dv_o, and Dw_o to be output based on the elapsed time T from the control cycle Tc (output setting step).

FIGS. 30 to 33 show simulation results in which the interpolated electric angles 1 to 4 (θs 1 to 4) [deg] are estimated under the condition that the motor rotation speed is steered to a constant rotation speed (1200 rpm). In any of the results, it can be confirmed that the interpolated electric angles 1 to 4 overlap the line obtained by linearly interpolating the motor electric angle θe, and the estimated angle calculation by the SOH calculation is appropriately performed with high accuracy.

FIGS. 34 to 37 show simulation waveforms of Duty command values (U phase) Du_m1 to Du_m4 calculated using interpolated electric angles 1 to 4 (θs1 to θs4) estimated under the same conditions as the simulations whose results are shown in FIGS. 30 to 33. The horizontal axis is time [sec], and the vertical axis is an internal value processed by the MPU or the like, which is 8192 [dec]/100 [%]. In any of the results, the interpolated Duty command value is output on a line or in the vicinity of linear interpolation of the normal duty command value Du, and it can be confirmed that interpolation of the Duty command value using the electrical interpolation angle is appropriately performed with high accuracy. Although V and W phases are not shown, they show similar results.

According to the motor control device 400B of this embodiment, the interpolated Duty command value with little noise can be calculated without the influence of the dead time compensation, and the control signal for PWM control can be varied at a cycle (50 µs) earlier than the cycle for performing PWM calculation. As a result, while the increase in the calculation processing amount of the microcomputer is slight, the noise due to the vibration of the brushless motor or the motor can be suitably suppressed, and the noise due to the motor in the audible range can be reduced.

The second embodiment of the present invention has been described in detail with reference to the drawings, but the specific configuration is not limited to this embodiment, and design changes or the like within the scope of the present invention are also included. Moreover, the components shown in the above-mentioned embodiment and modification can be combined appropriately and can be constituted.

Modification 4

For example, in the motor control device 400B according to the above embodiment, the motor 100 is controlled by a vector control method using space vector driving, but the motor to be controlled by the motor control device is not limited to this. The motor to be controlled by the motor control device according to the present invention may be, for example, a brushless motor of a sine wave control system. The motor control device according to the present invention does not set the Duty command value as the direct interpolation target, but sets the motor angle (electric angle) θe as the interpolation target. The motor angle θe has relatively low noise if the linearity is high, and there is no transitional change other than the angle change to switch from 360° to 0°. Therefore, high accuracy can be ensured in the calculation of the interpolated electric angle by SOH calculation and the calculation of the interpolated Duty command value.

Modification 5

For example, although motor control device 400B concerning the above-mentioned embodiment was carried in electric power steering device 300B, the mode of a motor control device is not limited to this. The motor control device according to the present invention is suitably mounted on a motor drive device that requires high torque while low noise is required. For example, the motor control device according to the present invention is preferably mounted on a walking support device that supports muscle power when the wearer walks, a cleaning device that operates indoors, or the like. Thereby, it is possible to suitably suppress the vibration of the motor and the sound caused by the motor, and to reduce the sound caused by the motor in the audible range.

Modification 6

For example, in the motor control device 400B according to the above embodiment, the control cycle Tc is 250 µs (frequency 4 KHz), but the aspect of the motor control device is not limited to this. The motor control device according to the present invention can preferably reduce the sound caused by the motor in the audible range when the control cycle Tc is 100 µs or more and 250 µs or less. The control cycle is predicted to be shorter than 250 µs as the performance of the CPU or the like mounted on the motor control device improves or the number of poles of the motor to be controlled increases. When the control cycle Tc is 100 µs or more and 250 µs or less, as in the above embodiment, a problem occurs that a sound is generated due to the motor in the audible range, similar to the above embodiment. However, according to the motor control device according to the present invention, it is possible to suitably suppress the vibration of the brushless motor and the sound caused by the motor, and reduce the sound caused by the motor in the audible range.

Third Embodiment

A third embodiment of the present invention will be described with reference to FIGS. 38 to 53.

Figure 38:
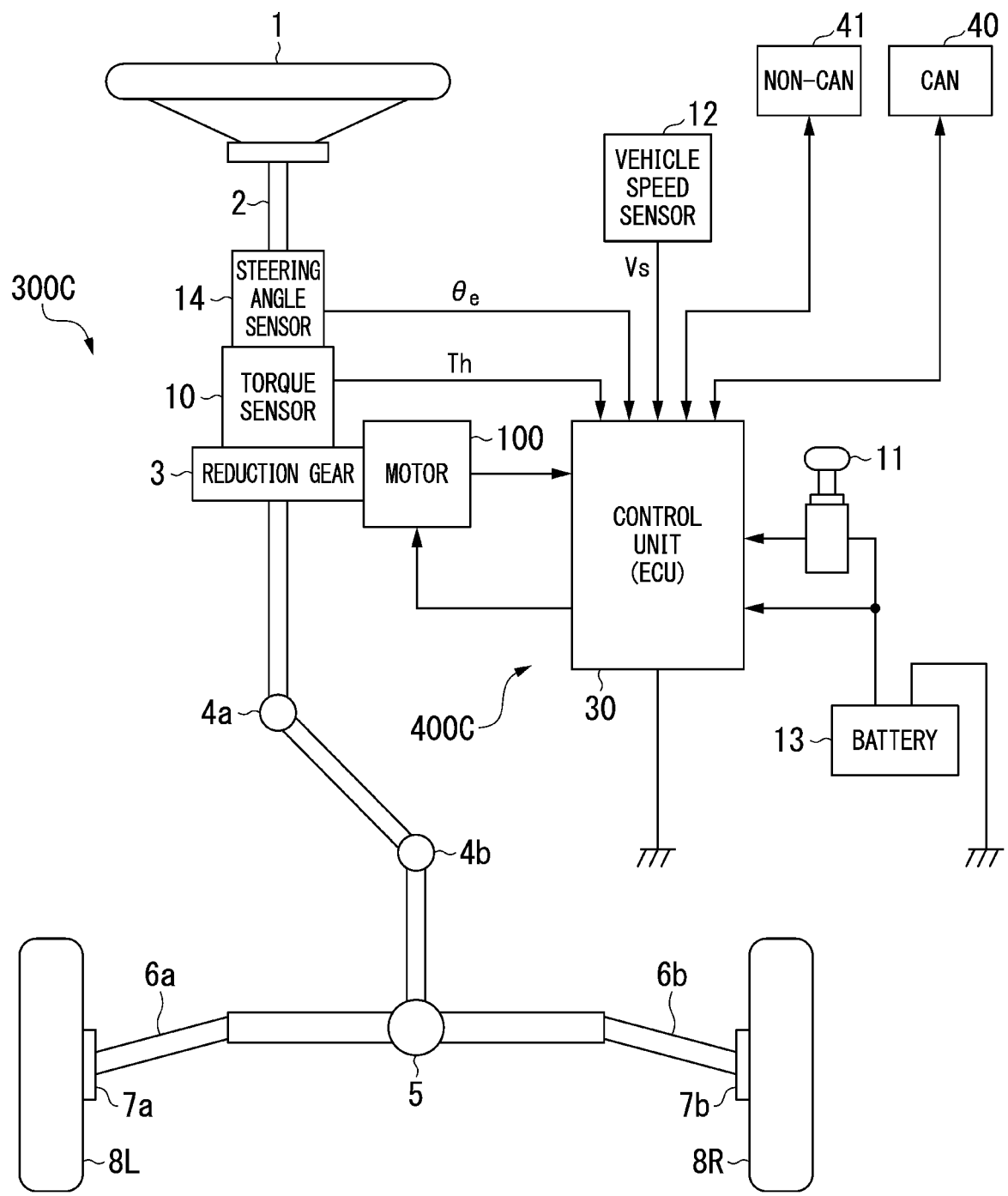
FIG. 38 is a schematic view showing a configuration of an electric power steering device equipped with a motor control device according to a third embodiment.

FIG. 38 is a schematic view showing a configuration of an electric power steering device 300C equipped with a motor control device 400C according to the present embodiment. The electric power steering device 300C is a column assist type electric power steering device in which an electric motor and a reduction mechanism are disposed in a column portion (steering shaft).

[Electric Power Steering Device 300C]

The electric power steering device 300C is connected to the steering wheels 8L and 8R through the column axis (steering shaft, handle shaft) 2 of the steering wheel 1, the reduction gear 3, the universal joints 4a and 4b, the pinion rack mechanism 5, the tie rods 6a and 6b, and further the hub units 7a and 7b. In addition, a steering angle sensor 14 for detecting a steering angle θe of the steering wheel 1 and a torque sensor 10 for detecting a steering torque Th of the steering wheel 1 are provided on the column shaft 2, and a motor 100 that assists the steering force of the handle 1 is connected to the column shaft 2 via the reduction gear 3. To the control unit (ECU) 30 that controls the electric power steering device 300C, electric power is supplied from the battery 13 and an ignition key signal is input through the ignition key 11.

The control unit 30 calculates the current command value of the assist (steering assist) command based on the steering torque Th detected by the torque sensor 10 and the vehicle speed Vs detected by the vehicle speed sensor 12, and controls the motor 100 by the voltage control command value Vref obtained by compensating the calculated current command value or the like. The steering angle sensor 14 is not essential and may not be disposed, and the steering angle (motor angle) θe can be obtained from a rotation sensor such as a resolver connected to the motor 100.

The control unit 30 mainly includes a program executable computer including a central processing unit (CPU) (including an MPU (Micro Processor Unit), an MCU (Micro Controller Unit), or the like).

The control unit 30 includes circuits such as an inverter 161 that drives the motor 100, a motor current detection circuit 162 that detects the current of the motor 100, and an angle detection unit 110A that detects the motor angle θe of the motor 100. These circuits may be mounted on the motor 100 side.

The control unit 30 is connected to a CAN (Controller Area Network) 40 that transmits and receives various information of the vehicle, and the vehicle speed Vs can also be received from the CAN 40. The control unit 30 can also be connected to a non-CAN 41 that transmits and receives communications other than the CAN 40, analog/digital signals, radio waves, or the like.

The motor 100 is a three-phase brushless motor that is mainly used as an actuator of the electric power steering device 300C in recent years. The motor 100 is controlled by a vector control method using space vector drive. In the vector control method using space vector drive, the q axis for controlling the torque, which is the coordinate axis of the rotor of the motor 100, and the d axis for controlling the strength of the magnetic field are set independently, and since the dq axis is 90°, the current corresponding to each axis (d-axis current command value Iref_d, q-axis current command value Iref_q) is controlled by the vector.

[Motor Control Device 400C]

Figure 39:
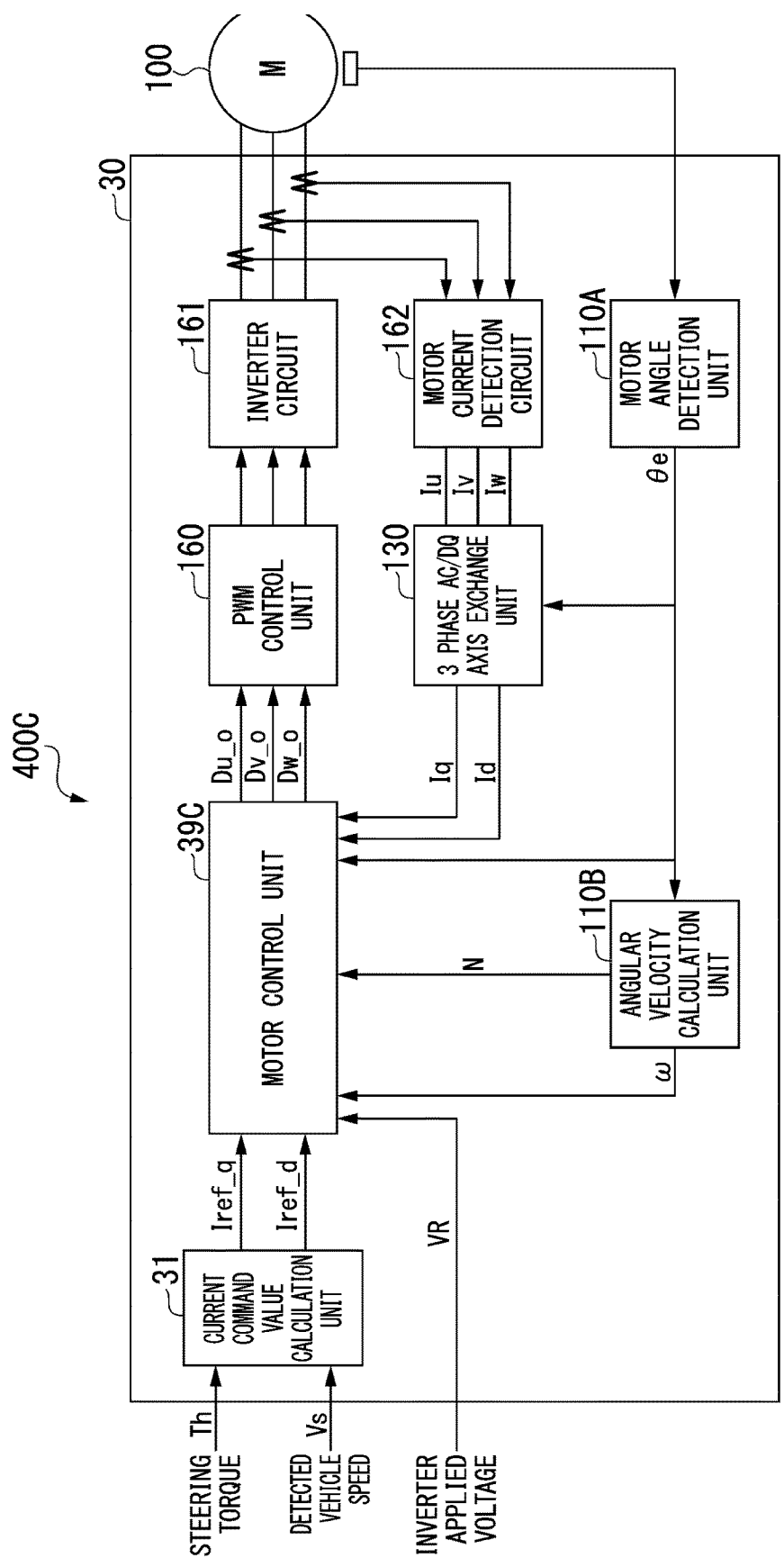
FIG. 39 is a functional configuration diagram of a motor control device configured by a control unit of the electric power steering device.

FIG. 39 is a functional configuration diagram of a motor control device 400C configured by the control unit 30. The function of the motor control device 400C is realized by appropriately combining a program executed by a CPU or the like and an electronic circuit such as an inverter. The functions described as the electronic circuit in the following description may be realized as a program executed by a CPU or the like.

The motor control device 400C performs drive control of the motor 100. The motor control device 400C includes a current command value computation unit 31, a motor control unit 39C, a PWM control unit 160, an inverter 161, a motor current detection circuit 162, a motor angle detection unit 110A, an angular velocity computation unit 110B, and a three-phase alternating current/dq axis conversion unit 130.

The current command value computation unit 31 outputs the dq axis current command value Iref_m (m=d, q) of two axes (dq axis coordinate system) calculated using an assist map or the like based on the steering torque Th, the vehicle speed Vs, or the like, to the motor control unit 39C.

The motor control unit 39C calculates the voltage control command value Vref_mb (m=d,) subjected to dead time compensation from input the dq axis current command value Iref_m (m=d, q), the motor angle θe, the motor rotation speed N, or the like. Further, the motor control unit 39C calculates three phase Duty command values Du_o, Dv_o, Dw_o by space vector modulation from the voltage control command value Vref_mb (m=d, q) or the like, and outputs them to the PWM control unit 160.

Figure 40:
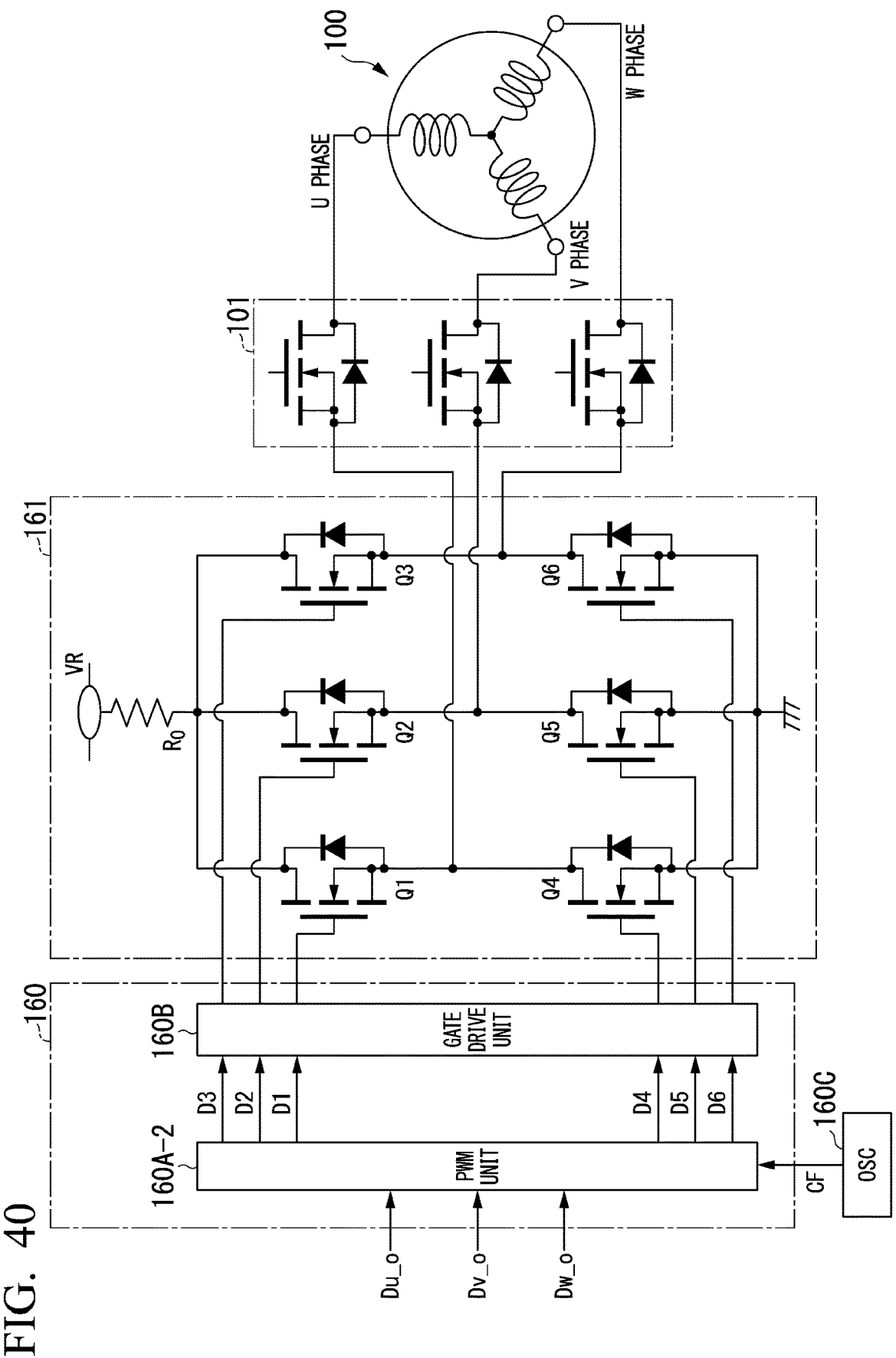
FIG. 40 is a block diagram of a PWM control unit and an inverter of the motor control device.

FIG. 40 is a block diagram of the PWM control unit 160 and the inverter 161.

As shown in FIG. 40, the inverter 161 is configured by a three-phase bridge of FETs, and drives the motor 100 by being turned on/off by the PWM-Duty values D1 to D6. Between the inverter 161 and the motor 100, a motor switch 101 for interrupting the supply of current when the assist control is stopped or the like is interposed. The upper arm is configured by FETs Q1, Q2 and Q3 as switching elements, and the lower arm is configured by FETs Q4, Q5 and Q6. Also, the FETs Q1 and Q4 are U-phase drive elements, the FETs Q2 and Q5 are V-phase drive elements, and the FETs Q3 and Q6 are W-phase drive elements.

As shown in FIG. 40, the PWM control unit 160 drives and controls the motor 100 via an inverter (inverter applied voltage VR) 161 having a bridge configuration of upper and lower arms as shown in FIG. 40, based on the input three-phase Duty command values Du_o, Dv_o, and Dw_o. As shown in FIG. 40, the PWM control unit 160 includes a PWM unit 160A-2 and a gate drive unit 160B.

As shown in FIG. 40, the PWM unit 160A-2 calculates three-phase PWM-Duty values D1 to D6 according to predetermined equations for the three-phase Duty command values Du_o, Dv_o, and Dw_o. A modulation signal (carrier) CF of, for example, a triangular wave is input to the PWM unit 160A-2 from the oscillation unit 160C, and the PWM unit 160A-2 calculates PWM-Duty values D1 to D6 in synchronization with the modulation signal CF.

As shown in FIG. 40, the gate driver 160B outputs PWM-Duty values D1 to D6 to drive the gates of the FETs Q1 to Q6 which are drive elements.

Since the electric power steering device 300C is an in-vehicle product, the operating temperature range is wide, and from the viewpoint of fail-safe, the inverter 161 that drives the motor 100 needs to have a larger dead time (industrial equipment <EPS) than that for general industrial use such as home appliances. In general, switching elements (for example, FETs (Field-Effect Transistors)) have a delay time at the time of OFF, and therefore, if the switching elements of the upper and lower arms are simultaneously switched OFF/ON, there may be a situation where the DC link is short-circuited. In order to prevent occurrence of this situation, a time (dead time) in which the switching elements of both the upper and lower arms are turned off is provided.

When the dead time compensation as described above is performed, the current waveform is distorted and the response of current control and steering feeling deteriorate, and for example, when the steering is slowly performed with the steering wheel in the vicinity of the on-center, discontinuous steering feeling due to torque ripple or the like may occur.

The current detector 162 detects three-phase motor currents Iu, Iv, Iw of the motor 100, as shown in FIG. 39. The detected three-phase motor currents Iu, Iv, Iw are input to the three-phase AC/dq axis converter 130 and converted into two-phase feedback dq axis currents Id and Iq. The two-phase feedback dq axis currents Id and Iq are input to the motor control unit 39C.

The motor angle detection unit 110A calculates and acquires the motor angle θe of the motor 100, if necessary. The motor angle θe is input to the angular velocity computation unit 110B, the motor control unit 39C, and the three-phase AC/dq axis conversion unit 130.

The angular velocity computation unit 110B obtains the motor rotation speed N and the motor angular velocity ω from the motor angle θe by calculation. The motor rotation speed N and the motor angular velocity ω are input to the motor control unit 39C.

[Motor Control Unit 39C]

Figure 41:
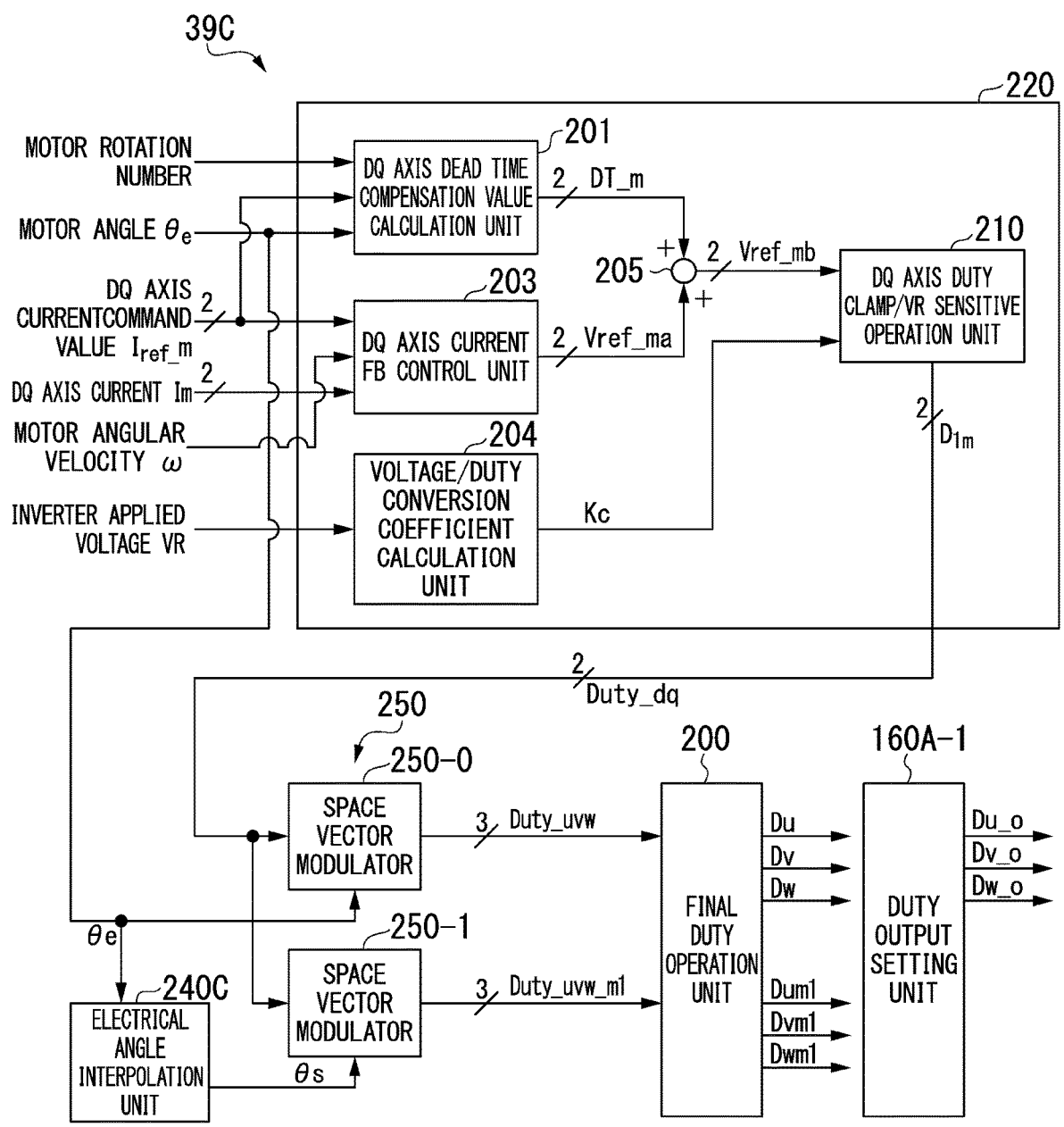
FIG. 41 is a functional configuration diagram of a motor control unit of the motor control device.

FIG. 41 is a functional configuration diagram of the motor control unit 39C.

The motor control unit 39C includes a voltage command value computation unit 220, an electric angle interpolation unit 240C, a space vector modulation unit 250, a final Duty computation unit 200, and a Duty output setting unit 160A-1.

The voltage command value computation unit 220 includes a dq axis dead time compensation value computation unit 201, a dq axis current feedback control unit 203, a voltage/duty conversion coefficient computation unit 204, an adding unit 205, and a dq axis duty clamp/VR sensitivity computation unit 210.

The voltage command value computation unit 220 calculates a voltage command value using the motor electric angle θe and the motor rotation speed θe acquired from the motor 100 for each control cycle Tc, the current command value Iref_m (m=d, q), or the like (voltage command value calculation step).

The dq axis dead time compensation value computation unit 201 outputs a dq axis dead time compensation value DT_m (m=d, q) calculated from the input motor rotation speed N, the motor angle (electric angle) θe, and the dq axis current command value Iref_m (m=d, q), to the adding unit 205.

The dq-axis current feedback control unit 203 outputs a voltage control command value Vref_ma (m=d, q) calculated from the input motor angular velocity ω, the dq-axis current command value Iref_m (m=d, q), and the two-phase feedback dq-axis current Id and Iq, to the adding unit 205.

The voltage/duty conversion coefficient computation unit 204 calculates a voltage/duty conversion coefficient Kc in accordance with the inverter applied voltage VR.

The adding unit 205 outputs a voltage control command value Vref_mb (m=d, q) obtained by adding the dq-axis dead time compensation value DT_m (m=d, q) and the voltage control command value Vref_ma (m=d, q), to the three-phase Duty clamp/VR sensitive computation unit 210.

The dq axis Duty clamp/VR (inverter applied voltage) sensitive computation unit 210 inputs the Duty command value D1m (m=d, q) (Duty_d, Duty_q) for dq axis normal calculated by multiplying the voltage control command value Vref_mb (m=d, q) and the voltage/Duty conversion coefficient Kc, to the space vector modulation unit 250.

[Electric Angle Interpolation Unit 240C]

Figure 42:
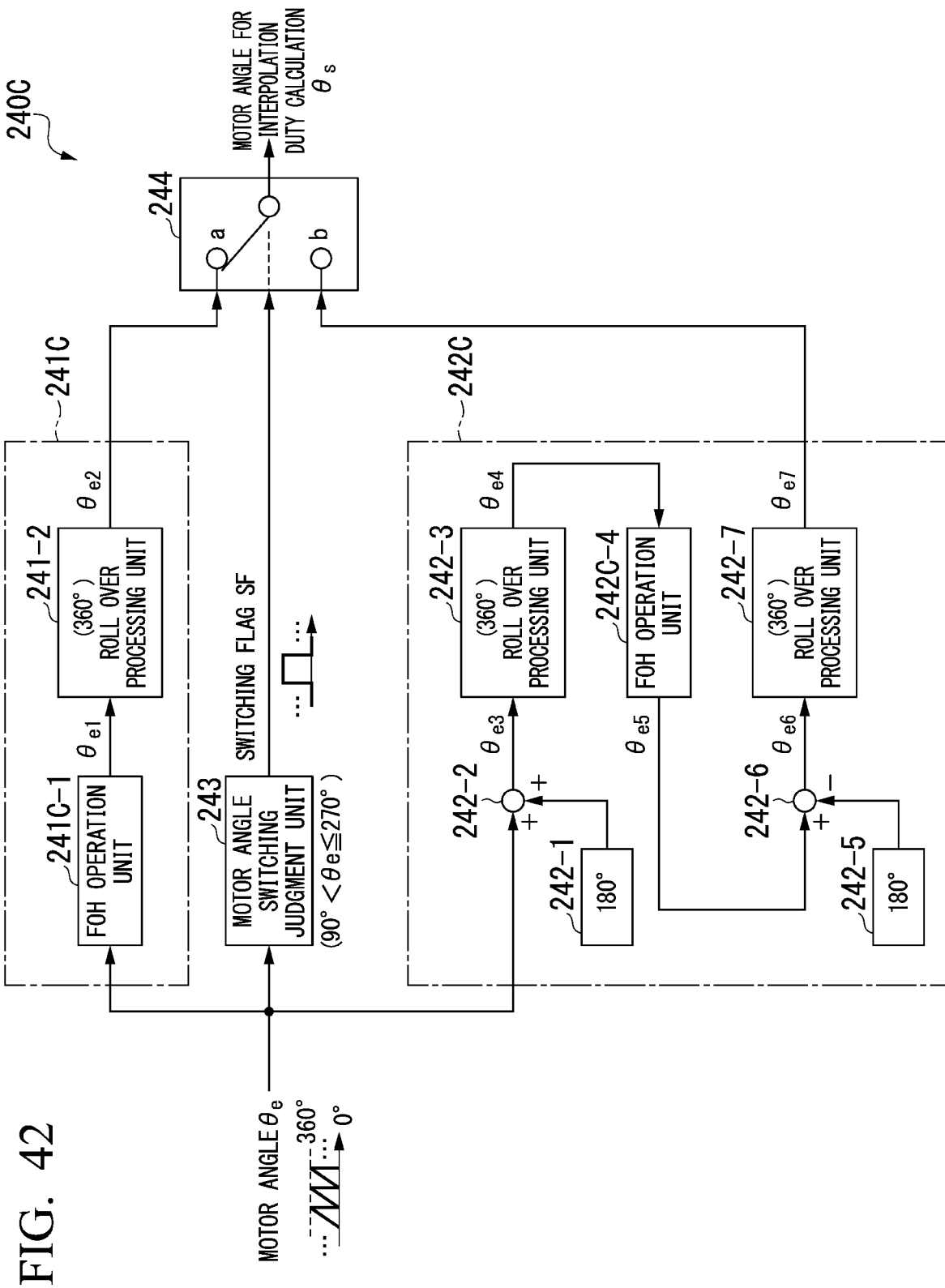
FIG. 42 is a block diagram of an electric angle interpolation unit of the motor control unit.

FIG. 42 is a block diagram of the electric angle interpolation unit 240C.

The electric angle interpolation unit 240C calculates a motor angle (interpolated electric angle) θs for interpolation Duty calculation from the input motor angle θe, and outputs the calculated motor angle to the space vector modulation unit 250 (electric angle interpolation step).

The electric angle interpolation unit 240C performs linear function interpolation calculation (First Order Hold calculation: hereinafter, linear function interpolation calculation is simply referred to as "FOH calculation") on the motor angle θe detected in the control cycle 250 μs (Tc) to estimate the motor angle (interpolated electric angle) θs after the elapse of Tmμs (0<Tm<Tc) from the control cycle Tc, and calculates an interpolated Duty command value based on the estimated motor angle (interpolated electric angle) θs.

In the dq axis current control performed by the electric angle interpolation unit 240C, the Duty command value after space vector modulation is not set as an interpolation target. This is because the Duty command value after space vector modulation includes a dead time compensation value with a transient change, a noise component caused by the distortion component of the third high frequency due to space vector modulation, or the like, and the interpolated Duty command value calculated by directly interpolating the Duty command value may be a value including large noise.

As shown in FIG. 42, the electric angle interpolation unit 240C includes a calculation processing unit 241C (FOH computation unit 241C-1 and rollover processing unit 241-2) that directly inputs the motor angle θe and performs FOH calculation, an offset-added calculation processing unit 242C that inputs the motor angle θe and performs an offset process or the like to perform an FOH calculation, a motor angle switching determination unit 243 that determines whether the motor angle θe belongs to a range larger than 90° and less than or equal to 270° or any other range to output a switching flag SF, and a switching unit 244 that switches the contacts a and b by the switching flag SF and outputs the motor angle (interpolated electric angle) θs for interpolation Duty calculation.

Figure 43:
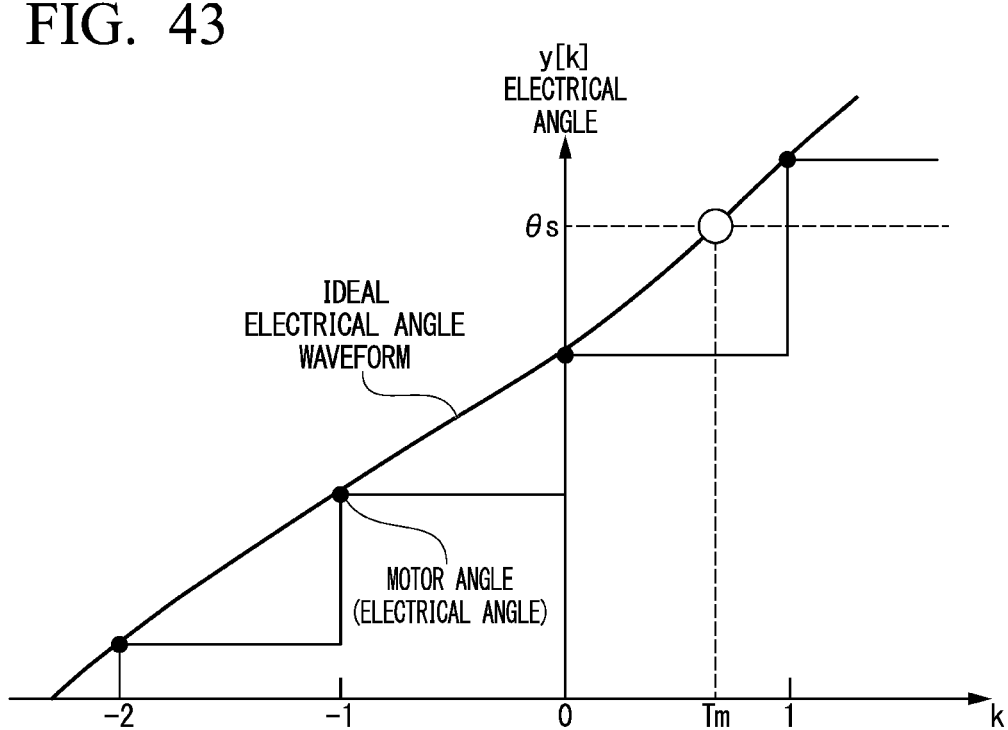
FIG. 43 is a graph showing an interpolated electric angle calculated by the same electric angle interpolation unit by FOH calculation.

FIG. 43 shows the interpolated electric angle calculated by FOH calculation after Tmμs (0<Tm<Tc). By calculating the interpolated electric angle θs using the motor electric angle θe detected before, it is possible to make the change of the electric angle smooth.

The function y [k] used for the FOH calculation is expressed by Equation 18. y [k] is a function representing the motor angle (electric angle) at the control cycle number k.

[Equation 18]

$$y[k]=ak+b \qquad \text{(EQUATION 18)}$$

Equation 19 is established by using the coefficients a and b to express the previous value y [−1] and the current value y [0].

[Equation 19]

$$\begin{cases} y[0] = b \\ y[-1] = -a+b \end{cases} \qquad \text{(EQUATION 19)}$$

By arranging the above equations, a and b can be expressed as Equation 20 using y [0] and y [−1].

[Equation 20]

$$\begin{cases} a = y[0] - y[-1] \\ b = y[0] \end{cases} \qquad \text{(EQUATION 20)}$$

When Equation 20 is substituted into Equation 18, Equation 21 is obtained.

[Equation 21]

$$y[k]=(k+1)y[0]+(-k)y[-1] \qquad \text{(EQUATION 21)}$$

Since the interpolated electric angle θs is an electric angle after Tm from the control cycle Tc, it can be calculated by substituting k=Tm/Tc into Equation 21. As an example, assuming that the control cycle Tc=250 [us] and Tm=125 [us], y [k] can be calculated by substituting k=0.5 into Equation 21.

[Equation 22]

$$y[0.5]=1.5y[0]-0.5y[-1] \qquad \text{(EQUATION 22)}$$

Further, assuming that the control cycle Tc=250 [us] and Tm=150 [us], y [k] can be calculated by substituting k=0.6 into the equation 21.

[Equation 23]

$$y[0.6]=1.6y[0]-0.6y[-1] \qquad \text{(EQUATION 23)}$$

Figure 44:
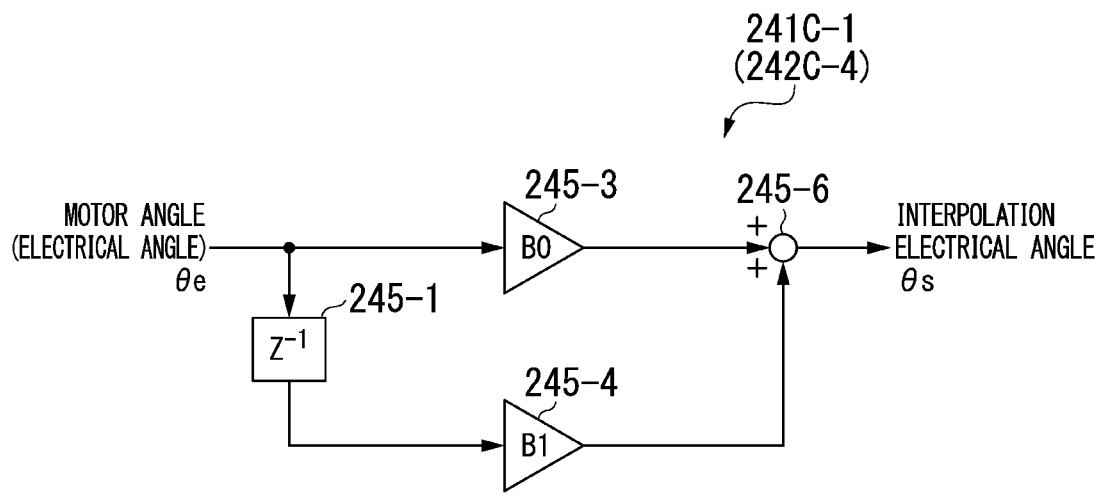
FIG. 44 is a functional block diagram of an FOH computation unit of the electric angle interpolation unit.

FIG. 44 is a functional block diagram of the FOH computation unit 241C-1 (242C-4).

The FOH computation unit 241C-1 includes a holding unit 245-1 and a holding unit 245-2 of the previous value of the motor angle θe, a coefficient unit B0 (245-3), a coefficient unit B1 (245-4), a coefficient unit B2 (245-5), an adding unit 245-6, and an adding unit 245-7.

The motor angle θe is input to the coefficient unit B0 (245-3) and the holding unit 245-1, and the holding value of the holding unit 245-1 is input to the coefficient unit B1

(245-4). The respective output values of the coefficient unit B0 (245-3) and the coefficient unit B1 (245-4) are added by the addition part 245-6 and output as the interpolated electric angle θs.

The coefficients B0 and B1 at the time of calculating the interpolated electric angle θs are expressed as shown in Table 2 by Equations 22-23.

TABLE 2

|  | B0 | B1 |
|---|---|---|
| INTERPOLATION ELECTRICAL ANGLE (IN A CASE OF y[0.5]) | 1.5 | −0.5 |
| INTERPOLATION ELECTRICAL ANGLE (IN A CASE OF y[0.6]) | 1.6 | −0.6 |

As shown in FIG. 42, the calculation processing unit 241C in the electric angle interpolation unit 240C includes an FOH computation unit 241C-1 that receives the motor angle θe and performs FOH calculation, and a rollover processing unit 241-2 that performs rollover processing (waveform processing) on the motor angle θe1 output from the FOH computation unit 241C-1. The motor angle θe2 subjected to rollover processing by the rollover processing unit 241-2 is input to the contact a of the switching unit 244.

As shown in FIG. 42, the offset-added calculation processing unit 242C includes an adding unit 242-2 that receives the motor angle θe and performs offset processing with coefficient 180° input from the fixing unit 242-1, a rollover processing unit 242-3 that performs rollover processing (waveform processing) on the motor angle θe3 input from the adding unit 242-2, an FOH computation unit 242C-4 that corrects the motor angle θe4 input from the rollover processing unit 242-3, a the subtraction unit 242-6 that receives the motor angle θe5 from the FOH computation unit 242C-4 and performs offset return processing by coefficient 180° input from the fixing unit 242-5, and a rollover processing unit 242-7 that performs rollover processing (waveform processing) on the motor angle θe6 input from the subtraction unit 242-6. The motor angle θe7 subjected to the rollover processing in the rollover processing unit 242-7 is input to the contact b of the switching unit 244.

The motor angle θe2 from the rollover processing unit 241-2 of the calculation processing unit 241C is input to the contact a of the switching unit 244, and the motor angle θe7 from the rollover processing unit 242-7 of the offset-added calculation processing unit 242C is input to the contact b of the switching unit 244. The contacts a and b of the switching unit 244 are switched by the switching flag SF ("H", "L") from the motor angle switching determination unit 243, and the motor angle for interpolation Duty calculation from the switching unit 244 (interpolation Angle) θs is output.

The motor angle (electric angle) θe returns to 0° if it exceeds 360° when moving from the current motor angle to the next motor angle. At this time, since a transient angle fluctuation occurs, if the FOH calculation is performed using the current motor angle, there are cases where the accurate interpolation calculation result cannot be obtained. In order to avoid this problem, the electric angle interpolation unit 240C switches the calculation output (motor angle θs for interpolation Duty calculation) according to the motor angle θe of the input electric angle.

When the motor angle θe is in the range of 90°<θe≤270°, there is no transient angle fluctuation in the motor angle θe. Therefore, the electric angle interpolation unit 240C performs FOH calculation on the input motor angle θe.

On the other hand, when the motor angle θe is in the range of 0°≤θe≤90° or 270°<θe≤360°, there is a transient angle fluctuation in the motor angle θe. Therefore, the electric angle interpolation unit 240C offsets the motor angle θe by 180°, converts it into a continuous angle signal, performs FOH calculation, and performs 180° offset return processing on the interpolation calculation result after the FOH calculation.

The motor angle switching determination unit 243 generates the switching flag SF ("H" when 90°<θe≤270°, "L" when 0°≤θe≤90° or 270°<θe≤360°) from the input motor angle θe.

The switching unit 244 selects and outputs the motor angle (interpolated electric angle) θs for the interpolation Duty calculation after the FOH calculation based on the switching flag SF.

That is, when 90°<θe≤270°, the switching unit 244 is controlled as shown in Equation 24, and outputs the motor angle θe2 as the motor angle θs for interpolation Duty calculation.

[Equation 24]

$$SF = H(90° < \theta_e \leq 270°) \quad \text{(EQUATION 24)}$$

Further, when 0°≤θe≤90° or 270°<θe≤360°, the switching unit 244 is controlled as in Equation 25, and outputs the motor angle θe7 as the motor angle θs for interpolation Duty calculation.

[Equation 25]

$$SF = L(0° \leq \theta_e \leq 90° \text{ OR } 270° < \theta_e \leq 360°) \quad \text{(EQUATION 25)}$$

Figure 45:
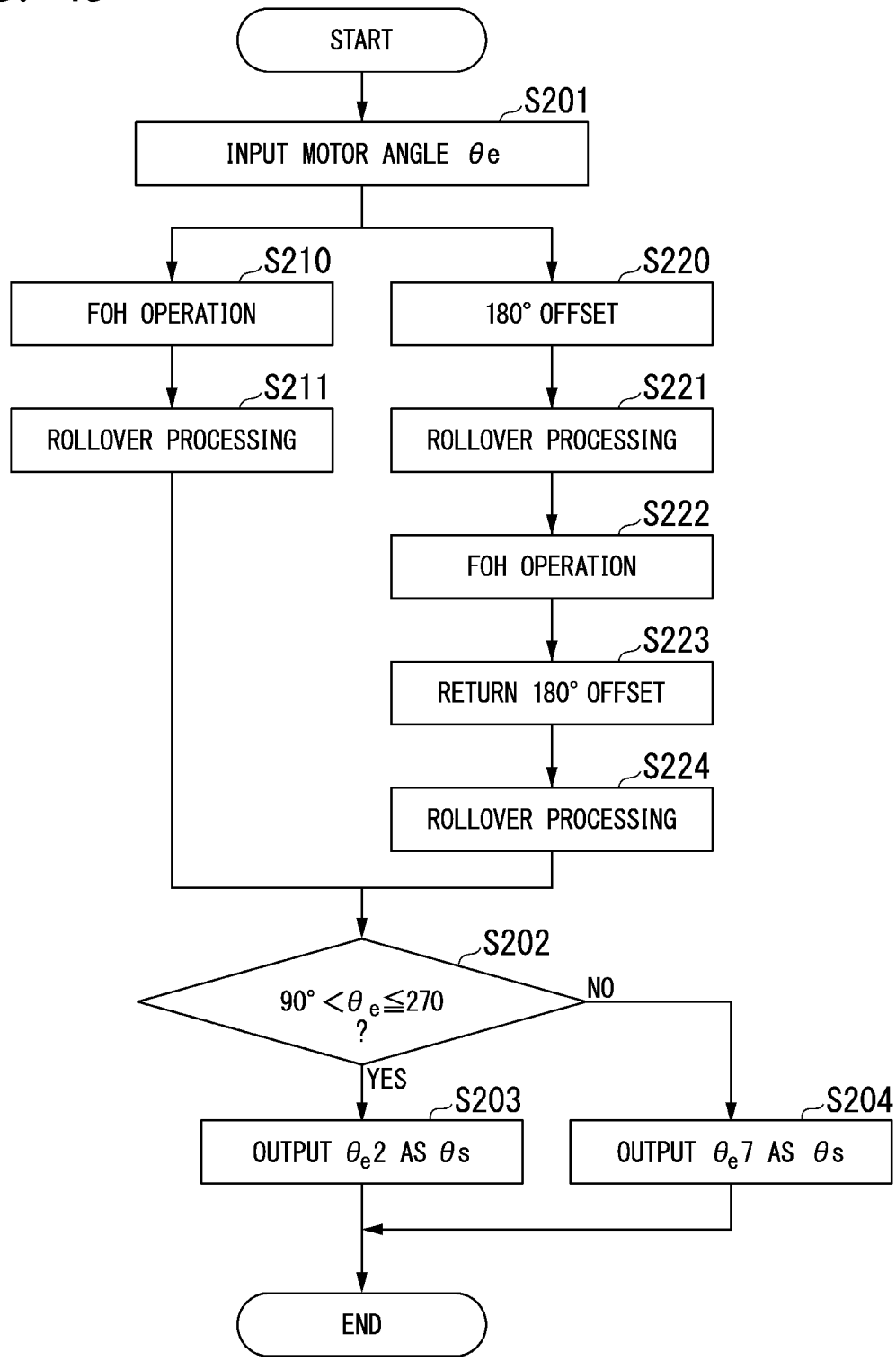
FIG. 45 shows a control flowchart of the electric angle interpolation unit.

FIG. 45 shows a control flowchart of the electric angle interpolation unit 240C.

The motor angle (electric angle) θe is input to the electric angle interpolation unit 240C (step S201).

The FOH computation unit 241C-1 of the calculation processing unit 241C performs FOH calculation (step S210). The motor angle θe is input to the holding unit 245-1 to be used as the previous value in the next FOH calculation. In addition, the previous value input to the holding unit 245-1 is input to the holding unit 245-2 because it is used as the second previous value in the next FOH calculation.

The rollover processing unit 241-2 performs rollover processing on the motor angle θe1 calculated by FOH and outputs a motor angle θe2 (step S211).

The offset-added calculation processing unit 242C performs offset processing on the motor angle (electric angle) θe using the coefficient 180° input from the fixing unit 242-1 to the adding unit 242-2 (step S220).

The rollover processing unit 242-3 performs rollover processing on the offset-processed motor angle θe3, and outputs the motor angle θe4 (step S221).

The FOH computation unit 242C-4 performs the FOH calculation on the input motor angle θe4 (step S222). The motor angle θe is input to the holding unit 245-1 to be used as the previous value in the next FOH calculation.

The motor angle θe5 calculated by the FOH is input to the subtraction unit 242-6, and the offset return processing is performed with the coefficient 180° input from the fixing unit 242-5 (step S223).

The motor angle θe6 subjected to the offset return processing is subjected to rollover processing by the rollover processing unit 242-7, and the motor angle θe7 is output (step S224).

After completion of the processing in step S211 and step S224, the motor angle switching determination unit 243 determines that the motor angle θe is greater than 90° and not more than 270° (step S202).

When this condition is satisfied (in the case of YES), the motor angle switching determination unit 243 sets the switching flag SF to "H".

If the above conditions are not met (in the case of NO), the motor angle θe is 0° or more and 90° or less, or more than 270° and 360° or less, and the motor angle switching determination unit 243 sets the switching flag SF to "L".

When the switching flag SF input from the motor angle switching determination unit 243 is "H", the switching unit 244 selects θe2 and outputs it as the motor angle (interpolated electric angle) θs for interpolation Duty calculation (step S203).

When the switching flag SF input from the motor angle switching determination unit 243 is "L", the switching unit 244 selects θe7 and outputs it as the motor angle (interpolated electric angle) θs for interpolation Duty calculation (step S204).

Figure 46:
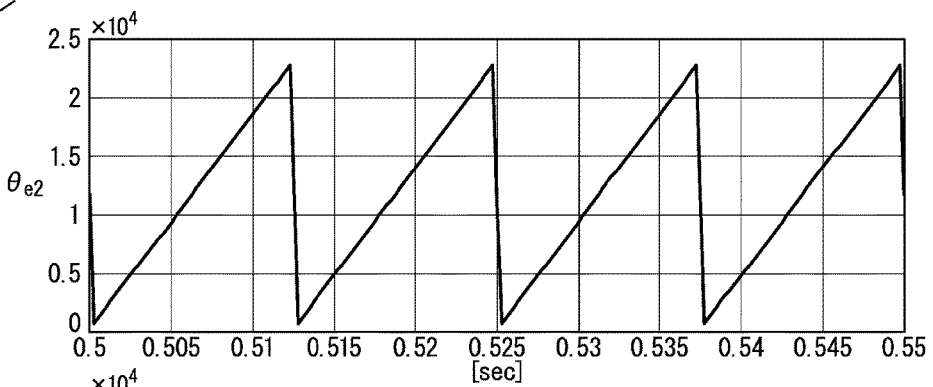
FIG. 46A-FIG. 46D are graphs showing the waveform of the electric angle interpolation unit.
Figure 46:
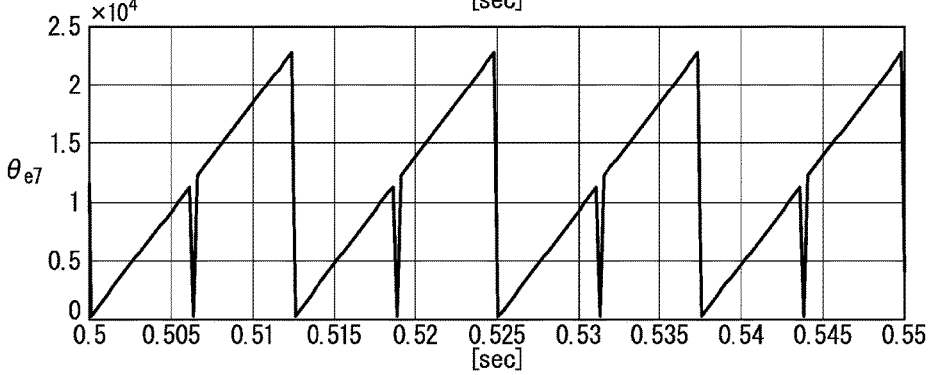
Figure 46:
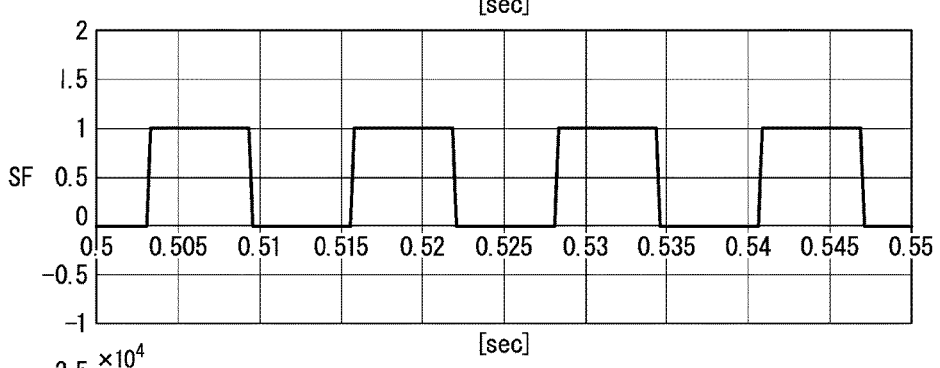
Figure 46:
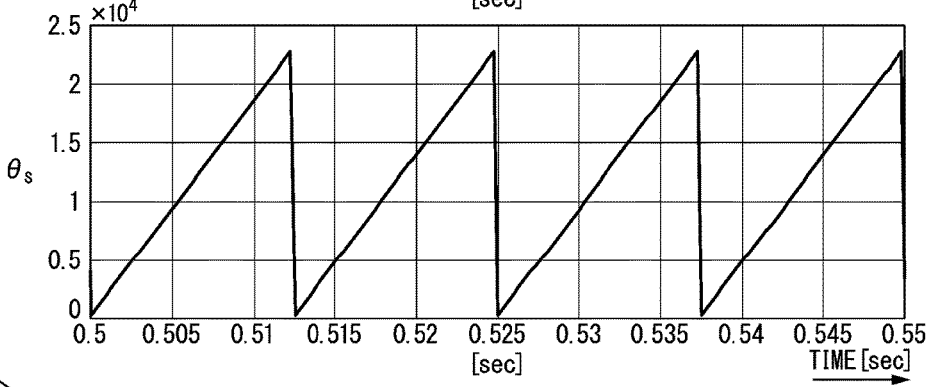

FIG. 46 shows the waveforms of each part of the electric angle interpolation unit 240C, the horizontal axis is time [sec], and the vertical axis is an internal value processed by the MPU or the like and is 64 [dec]/1 [deg]. Note that 23040 [dec]=360 [deg].

FIG. 46(A) is a waveform example of the motor angle θe2 output from the calculation processing unit 241C, and FIG. 46(B) is a waveform example of the motor angle θe7 output from the offset-added calculation processing unit 242C. Further, FIG. 46(C) shows the switching timing of "H" and "L" of the switching flag SF, and FIG. 46(D) shows an example of the waveform of the motor angle (interpolated electric angle) θs for interpolation Duty calculation output from the switching unit 244.

As shown in FIG. 46(D), the motor angle (interpolated electric angle) θs output by the electric angle interpolation unit 240C has no transient angle fluctuation when the motor angle θs exceeds 360° and returns to 0° as compared with the waveform shown in FIG. 46A. The motor angle θe has relatively low noise if the linearity is high, and there is no transitional change other than the angle change to switch from 360° to 0°, so high accuracy can be ensured in calculation of the interpolated electric angle by FOH calculation.

[Space Vector Modulation Unit 250]

Figure 47:
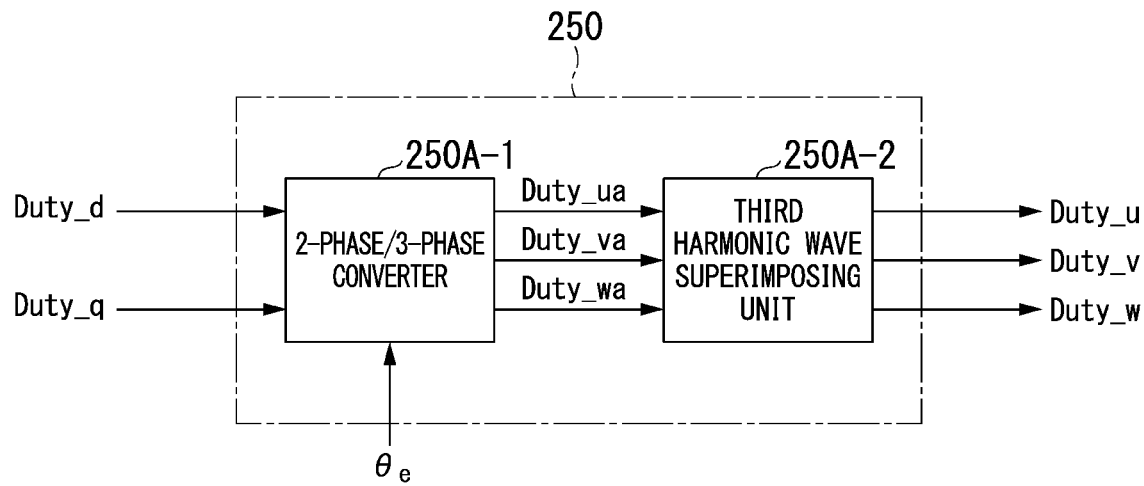
FIG. 47 is a functional block diagram of a space vector modulation unit of the motor control unit.

FIG. 47 is a functional block diagram of the space vector modulation unit 250.

The space vector modulation unit (conversion unit) 250 performs space vector conversion calculation after converting from the dimension of voltage to the dimension of Duty (conversion step). The space vector modulation unit 250 only needs to have a function of converting the Duty command value D1m (m=d, q) (Duty_d, Duty_q) for normal calculation in the dq axis space into a three-phase Duty command value (Duty_ua, Duty_va, Duty_wa), superimposing the third harmonic, and outputting the three-phase Duty command values Duty_u, Duty_v, and Duty_w. For example, the space vector modulation method proposed in Japanese Unexamined Patent Application, First Publication No. 2017-70066 or PCT International Publication No. WO 2017/098840 by the present applicant may be used.

The space vector modulation unit 250 includes a space vector modulation unit 250-0 that performs the above-mentioned space vector conversion calculation using the motor angle (electric angle) θe, and a space vector modulation unit 250-1 that performs space vector conversion calculation using the interpolated electric angle θs.

The space vector modulation unit 250-0 performs space vector conversion calculation using the motor angle (electric angle) θe, and outputs the three-phase Duty command value Duty_n (n=u, v, w) (Duty_u, Duty_v, Duty_w).

The space vector modulation unit 250-1 performs space vector conversion calculation using the interpolated electric angle θs, and outputs a three-phase interpolated Duty command value Duty_n_m1 (n=u, v, w) (Duty_u_m1, Duty_v_m1, Duty_w_m1).

[Final Duty Computation Unit 200]

Figure 48:
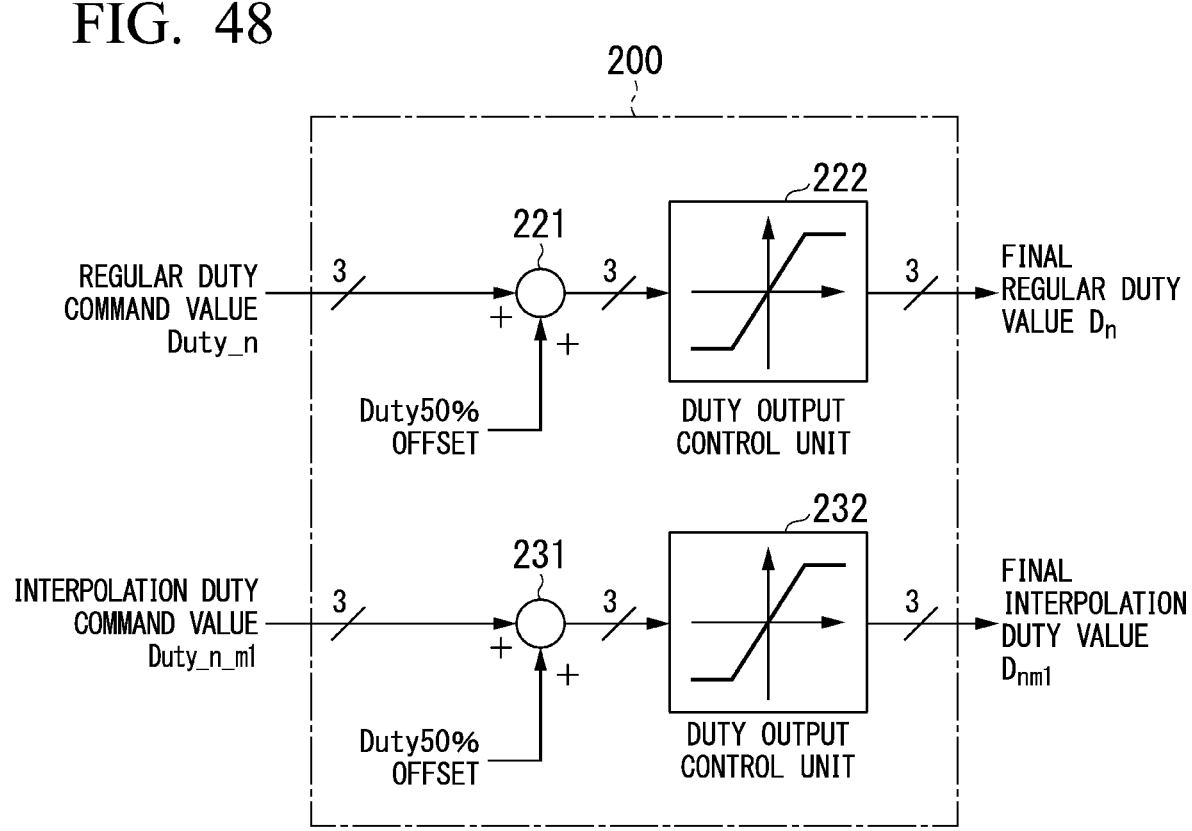
FIG. 48 is a functional block diagram of a final Duty computing unit of the motor control unit.

FIG. 48 is a functional block diagram of the final Duty computing unit 200.

In the final Duty computation unit 200, the normal Duty command value Duty_n (n=u, v, w) from the space vector modulation unit 250 is input to the adding unit 221. The Duty value to which the offset of Duty 50% has been added by the adding unit 221 is input to the limiter 222 which limits the Duty output within the range of 0 to 100% (variable). A final normal Duty command value Dn (n=u, v, w) is output from the limiter 222.

The interpolated Duty command value Duty_n_m1 from the space vector modulation unit 250 is input to the adding unit 231, and the Duty value to which the offset of Duty 50% is added by the adder 231 is input to a limiter 232 that limits the Duty output within a range (variable) of 0 to 100%. The final interpolated Duty command value Dnm1 (n=u, v, w) is output from the limiter 232.

In general, since the EPS supplies the motor applied voltage from the battery (DC+12 V), it cannot supply the applied voltage in the negative (−) direction. In this state, the phase voltage command value in the negative direction cannot be supplied, so the phase current cannot flow in the negative direction. In order to cope with this problem, by offsetting the Duty value by 50% (+6V) for all three phases to make the reference voltage, the phase current becomes 0A when the three-phase Duty value is 50% even when the three phases are not 0V (when the motor applied voltage is +12V). For example, in the case when the U-phase Duty value is 50% (+6 V), the V-phase Duty value is 50% (+6 V), and the W-phase Duty value is 50% (+6 V), the U-phase becomes 0A, the V-phase becomes 0A, and the W-phase becomes 0A. In the case when the U-phase Duty value is 60% (+7.2 V), the V-phase Duty value is 50% (+6 V), and the W-phase Duty value is 40% (+4.8 V), a current flows in the positive (+) direction in the U phase. In the case when the U-phase Duty value is 40% (+4.8 V), the V-phase Duty value is 50% (+6 V), and the W-phase Duty value is 60% (+7.2 V), a current flows in the negative direction in the U phase. By offsetting the three phases to a Duty value of 50% to make the reference voltage, it is possible to flow a current in the negative direction while the applied voltage is positive. Although the 50% Duty value offset is basically fixed, the reference voltage at 50% Duty value fluctuates depending on the applied voltage state to be supplied. For example, when the applied voltage is 11 V, the 50% Duty value is 5.5 V, and when the applied voltage is 13 V, the 50% Duty value is 6.5 V.

[Duty Output Setting Unit 160A-1]

Figure 49:
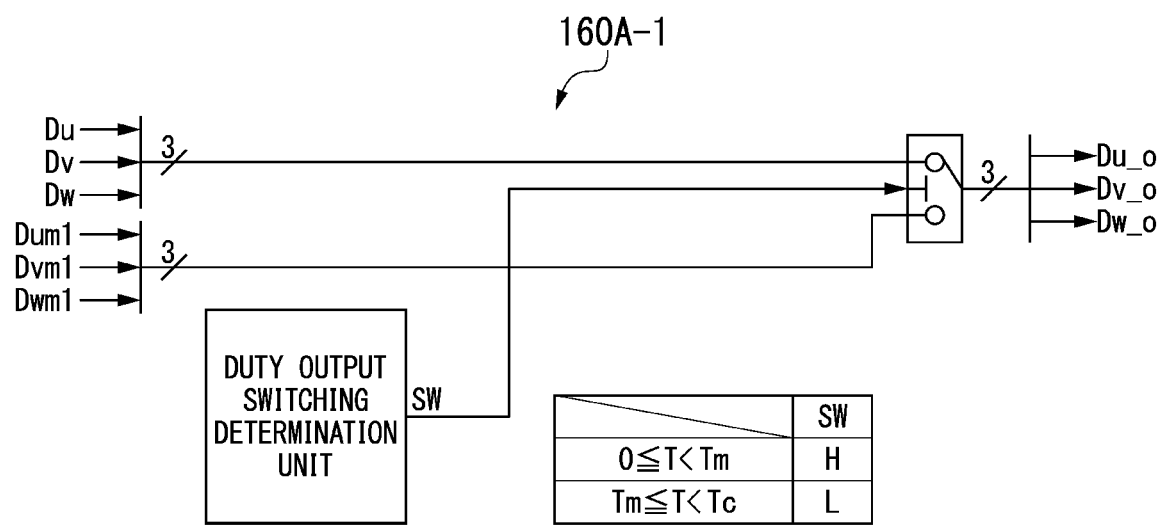
FIG. 49 is a functional configuration diagram of a Duty output setting unit of the motor control unit.

FIG. 49 is a functional block diagram of the Duty output setting unit 160A-1.

As shown in FIG. 49, the Duty output setting unit (output setting unit) 160A-1 switches and outputs the final duty command values Du_o, Dv_o, and Dw_o to be output, based on the elapsed time T from the control cycle Tc after the control cycle Tc and Tm μs (0<Tm<Tc) have elapsed from the control cycle Tc (output setting step).

Figure 50:
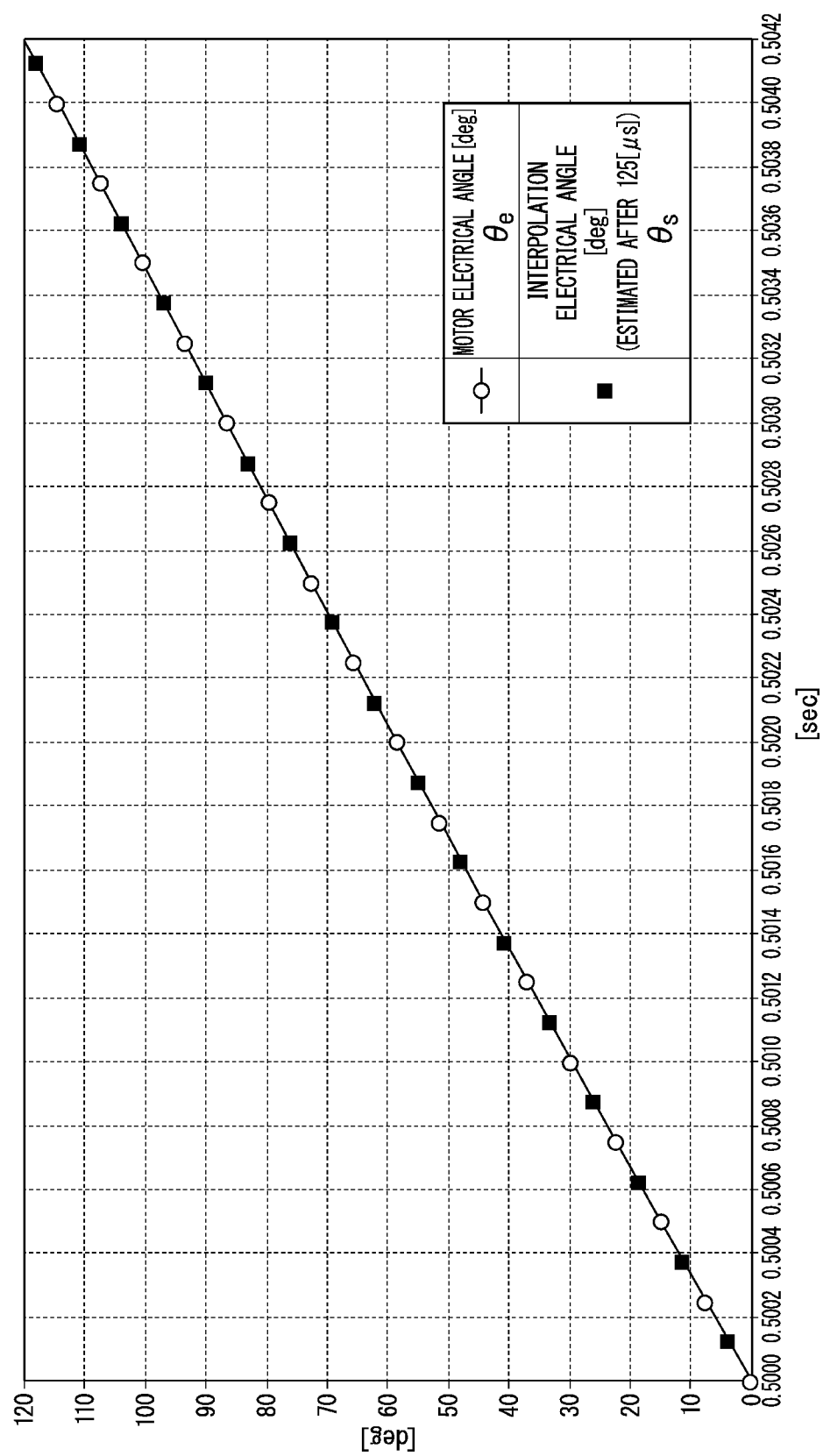
FIG. 50 is a graph showing simulation results of estimation of the interpolated electric angle.
Figure 51:
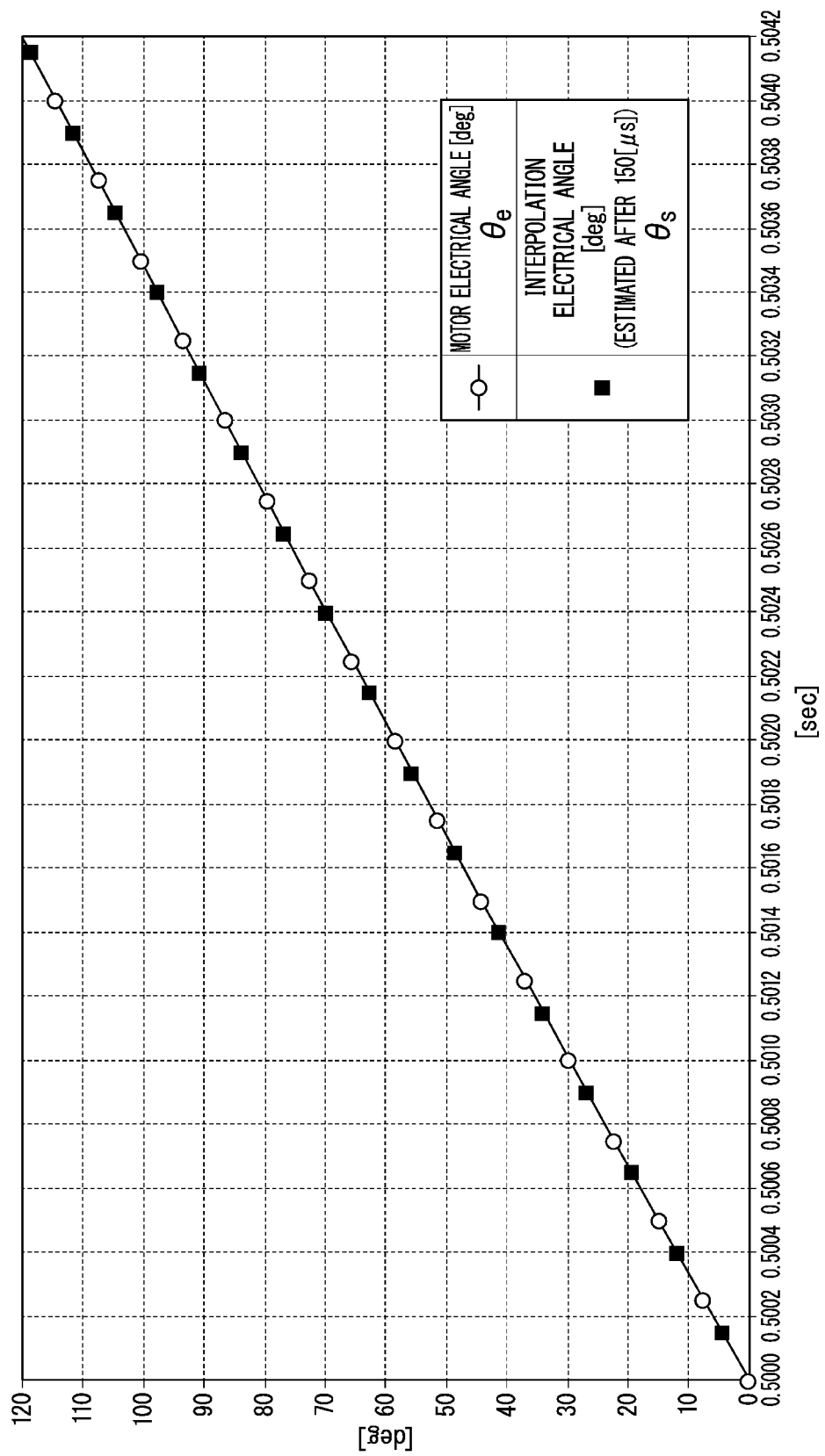
FIG. 51 is a graph showing simulation results of estimation of an interpolated electric angle.

FIGS. 50 and 51 show simulation results in which the interpolated electric angle θs [deg] is estimated under the condition that the motor rotation speed is steered to a constant rotation speed (2000 rpm). FIG. 50 shows simulation results under the conditions of control cycle Tc=250 [us] and Tm=125 [us]. FIG. 51 shows simulation results under the conditions of control cycle Tc=250 [us] and Tm=150 [us]. In any of the results, it is possible to confirm that the interpolated electric angle overlaps the line obtained by linearly interpolating the motor electric angle θe, and that the estimated angle calculation by the FOH calculation is appropriately performed with high accuracy.

Figure 52:
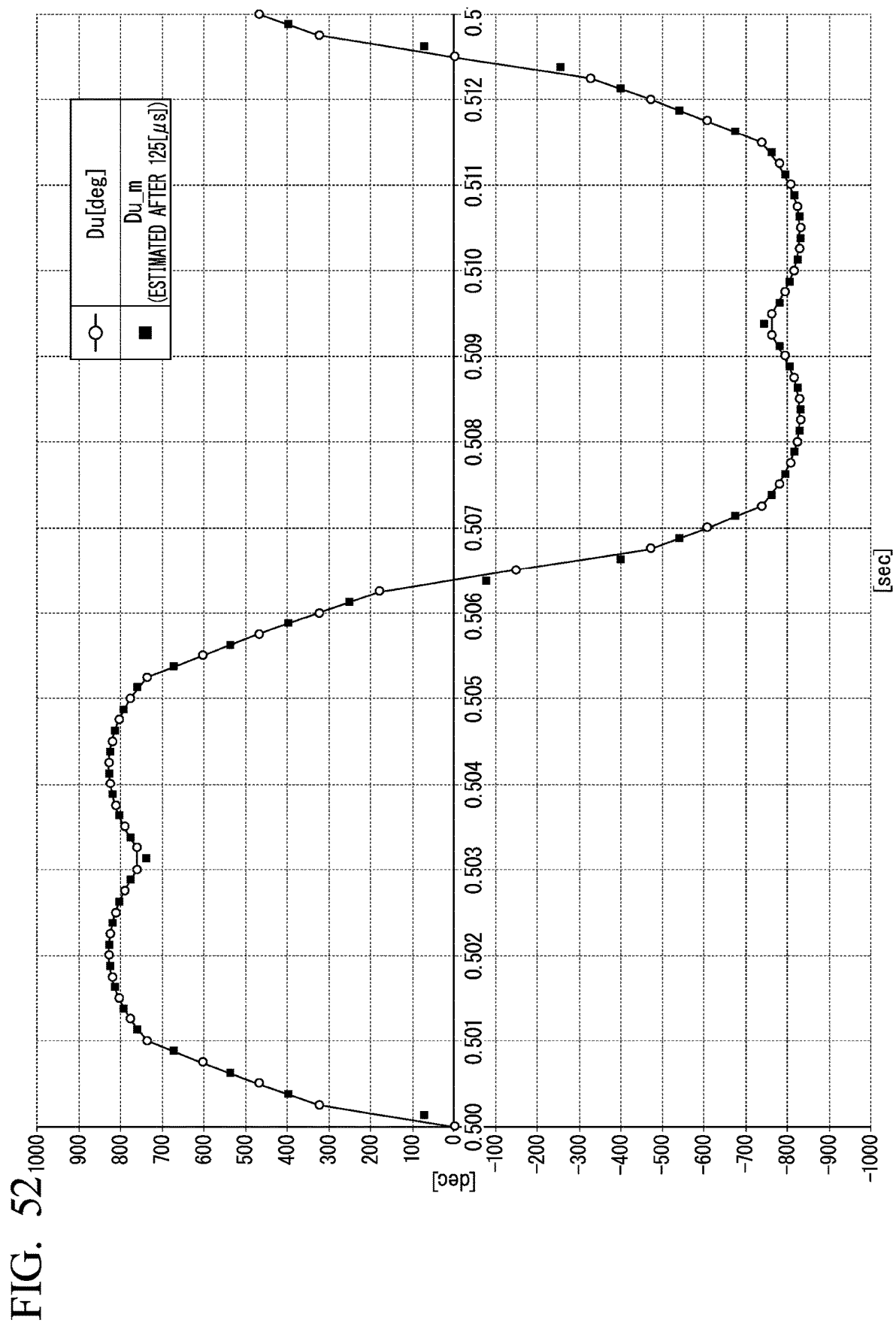
FIG. 52 is a graph showing simulation results of Duty command values calculated using estimated interpolated electric angles.
Figure 53:
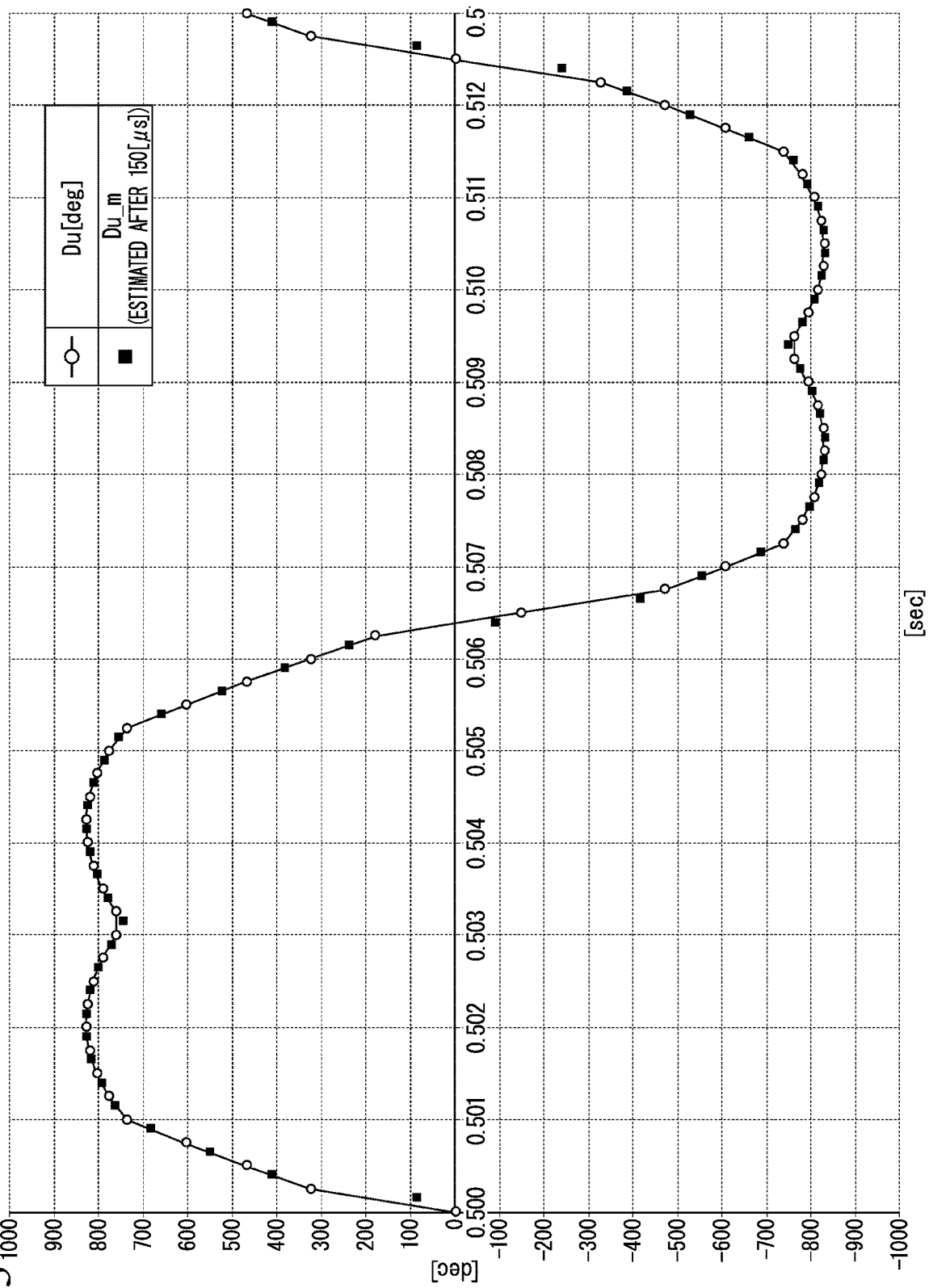
FIG. 53 is a graph showing simulation results of Duty command values calculated using estimated interpolated electric angles.

FIGS. 52 and 53 show simulation waveforms of Duty command values (U phase) Du_m1 to Du_m4 calculated using the interpolated electric angle θs estimated under the same conditions as the simulation whose results are shown in FIGS. 50 and 51. In any of the results, it is possible to confirm that the interpolated Duty command value is output on a line or in the vicinity of linear interpolation of the normal duty command value Du, and interpolation of the Duty command value using the interpolated electric angle is appropriately performed with high accuracy. Although V and W phases are not shown, they show similar results.

According to the motor control device 400C of this embodiment, the interpolated Duty command value with little noise is calculated without the influence of the dead time compensation, and the control signal for PWM control can be varied at a cycle (50 μs) earlier than the cycle for performing PWM calculation. As a result, while the increase in the calculation processing amount of the microcomputer is slight, the noise due to the vibration of the brushless motor or the motor can be suitably suppressed, and the noise due to the motor in the audible range can be reduced.

According to the motor control device 400C of the present embodiment, the linear function interpolation calculation FOH is used for the calculation of the interpolated electric angle, and although the accuracy is slightly lowered compared with the interpolation calculation such as a quadratic function interpolation calculation, an increase in the processing amount of the microcomputer can be suitably suppressed.

The third embodiment of the present invention has been described in detail with reference to the drawings, but the specific configuration is not limited to this embodiment, and design changes or the like within the scope of the present invention are also included. Moreover, the components shown in the above-mentioned embodiment and modification can be combined appropriately and can be constituted.

Modification 7

For example, in the motor control device 400C according to the above-described embodiment, the motor 100 is controlled by the vector control method using space vector driving, but the motor to be controlled by the motor control device is not limited thereto. The motor to be controlled by the motor control device according to the present invention may be, for example, a brushless motor of a sine wave control system. The motor control device according to the present invention does not set the duty command value as the direct interpolation target, but sets the motor angle (electric angle) θe as the interpolation target. The motor angle θe has relatively low noise if the linearity is high, and there is no transitional change other than the angle change to switch from 360° to 0°. Therefore, high accuracy can be ensured in the calculation of the interpolated electric angle by FOH calculation and the calculation of the interpolated Duty command value.

Modification 8

For example, although motor control device 400C concerning the above-mentioned embodiment was carried in electric power steering device 300C, a mode of a motor control device is not limited to this. The motor control device according to the present invention is suitably mounted on a motor drive device that requires high torque while low noise is required. For example, the motor control device according to the present invention is preferably mounted on a walking support device that supports muscle power when the wearer walks, a cleaning device that operates indoors, or the like. Thereby, it is possible to suitably suppress the vibration of the motor and the sound caused by the motor, and to reduce the sound caused by the motor in the audible range.

Modification 9

For example, in the motor control device 400C according to the above embodiment, the control cycle Tc is 250 μs (frequency 4 KHz), but the aspect of the motor control device is not limited to this. The motor control device according to the present invention can preferably reduce the sound caused by the motor in the audible range when the control cycle Tc is 100 μs or more and 250 μs or less. The control cycle is predicted to be shorter than 250 μs as the performance of the CPU or the like mounted on the motor control device improves or the number of poles of the motor to be controlled increases. When the control cycle Tc is 100 μs or more and 250 μs or less, as in the above embodiment, a problem occurs that a sound is generated due to the motor in the audible range. However, according to the motor control device according to the present invention, sounds resulting from vibrations caused by the brushless motor and sounds caused by motors can be suitably suppressed, and the sounds resulting from motors in the audible range can be reduced.

Fourth Embodiment

A fourth embodiment of the present invention will be described with reference to FIGS. 54 to 76.

Figure 54:
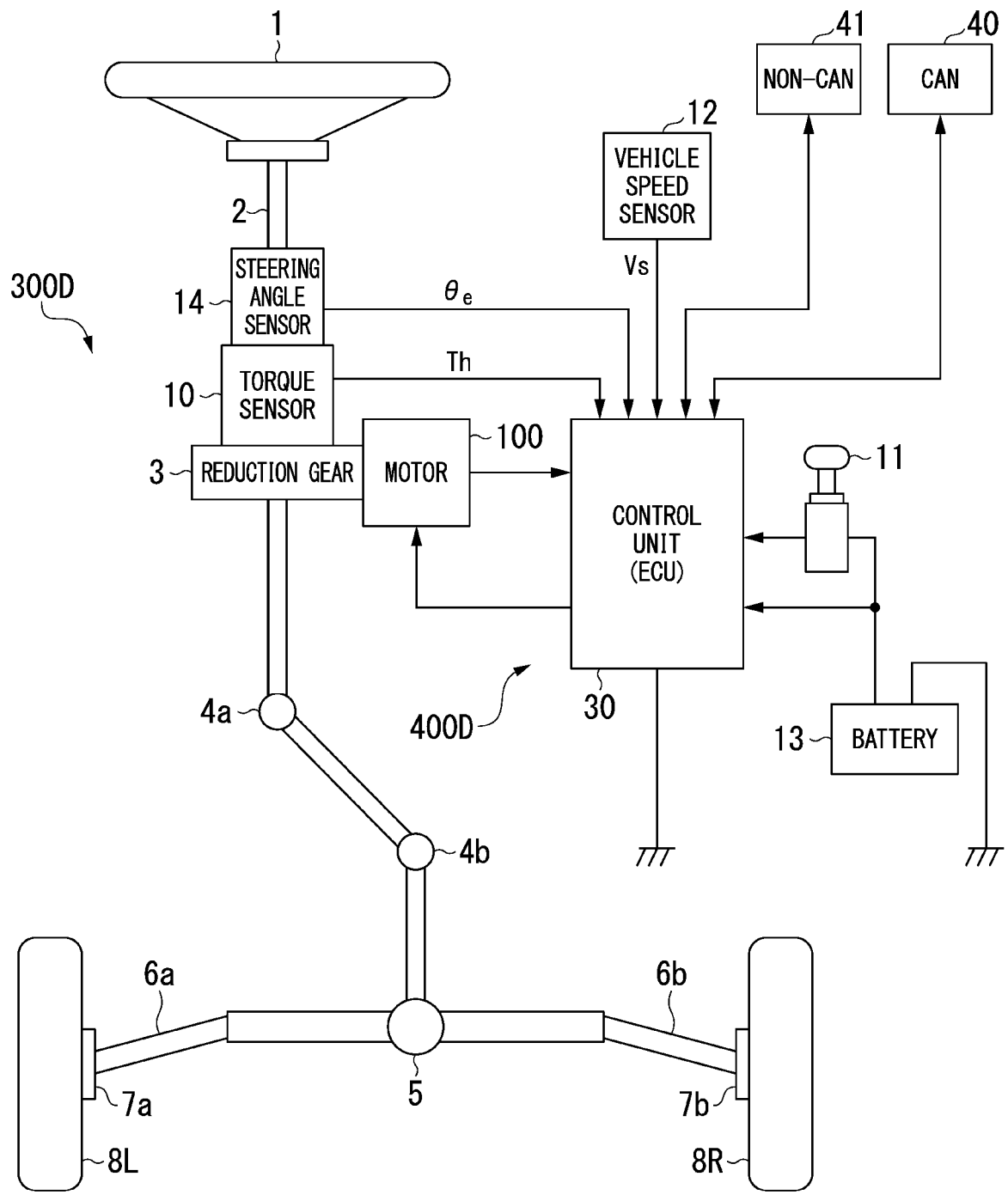
FIG. 54 is a schematic view showing a configuration of an electric power steering device mounted with a motor control device according to a fourth embodiment.

FIG. 54 is a schematic view showing a configuration of an electric power steering device 300D equipped with a motor control device 400D according to the present embodiment. The electric power steering device 300D is a column assist type electric power steering device in which an electric motor and a reduction mechanism are disposed in a column portion (steering shaft).

[Electric Power Steering Device 300D]

The electric power steering device 300D is connected to the steering wheels 8L and 8R through the column axis (steering shaft, handle shaft) 2 of the steering wheel 1, the reduction gear 3, the universal joints 4a and 4b, the pinion rack mechanism 5, the tie rods 6a and 6b, and further the hub units 7a and 7b. In addition, a steering angle sensor 14 for detecting a steering angle θe of the steering wheel 1 and a torque sensor 10 for detecting a steering torque Th of the steering wheel 1 are provided on the column shaft 2, and a motor 100 that assists the steering force of the handle 1 is connected to the column shaft 2 via the reduction gear 3. To the control unit (ECU) 30 that controls the electric power steering device 300D, electric power is supplied from the battery 13 and an ignition key signal is input through the ignition key 11.

The control unit 30 calculates the current command value of the assist (steering assist) command based on the steering torque Th detected by the torque sensor 10 and the vehicle speed Vs detected by the vehicle speed sensor 12, and controls the motor 100 by a voltage control command value Vref which is the calculated current command value subjected to compensation or the like. The steering angle sensor 14 is not essential and may not be disposed, and the steering angle (motor angle) θe can be obtained from a rotation sensor such as a resolver connected to the motor 100.

The control unit 30 mainly includes a program executable computer including a central processing unit (CPU) (including an MPU (Micro Processor Unit), an MCU (Micro Controller Unit), or the like).

The control unit 30 includes circuits such as an inverter 161 that drives the motor 100, a motor current detection circuit 162 that detects the current of the motor 100, and an angle detection unit 110A that detects the motor angle θe of the motor 100. These circuits may be mounted on the motor 100 side.

The control unit 30 is connected to a CAN (Controller Area Network) 40 that transmits and receives various information of the vehicle, and the vehicle speed Vs can also be received from the CAN 40. The control unit 30 can also be connected to a non-CAN 41 that transmits and receives communications other than the CAN 40, analog/digital signals, radio waves, or the like.

The motor 100 is a three-phase brushless motor that is mainly used as an actuator of the electric power steering device 300C in recent years. The motor 100 is controlled by a vector control method using space vector drive. In the vector control method using space vector drive, the q axis for controlling the torque, which is the coordinate axis of the rotor of the motor 100, and the d axis for controlling the strength of the magnetic field are set independently, and since the dq axis is 90°, the current corresponding to each axis (d-axis current command value Iref_d, q-axis current command value Iref_q) is controlled by the vector.

[Motor Control Device 400D]

Figure 55:
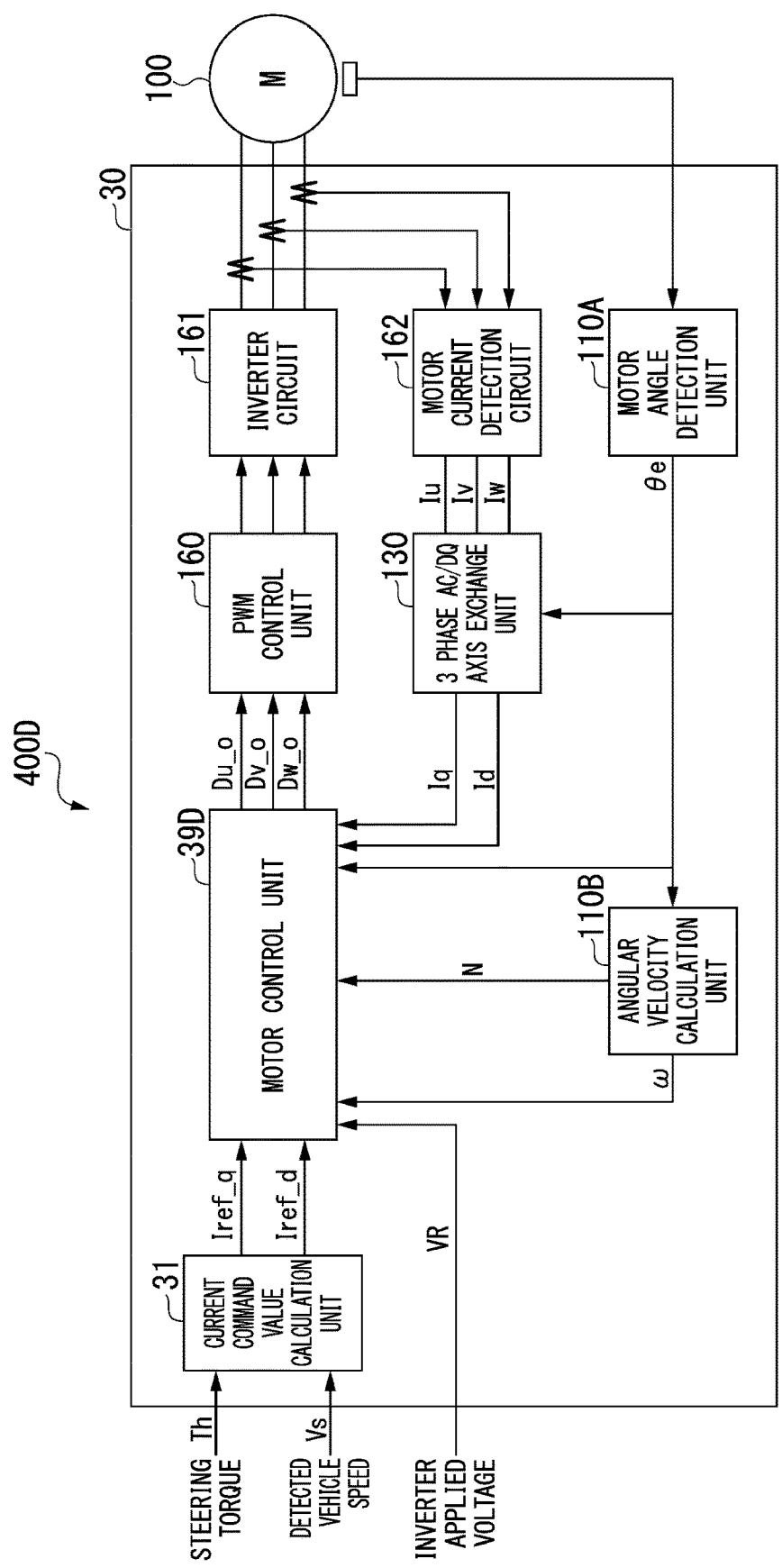
FIG. 55 is a functional configuration diagram of a motor control device configured by a control unit of the electric power steering device.

FIG. 55 is a functional configuration diagram of a motor control device 400D configured by the control unit 30. The function of the motor control device 400D is realized by appropriately combining a program executed by a CPU or the like and an electronic circuit such as an inverter. The functions described as the electronic circuit in the following description may be realized as a program executed by a CPU or the like.

The motor control device 400D performs drive control of the motor 100. The motor control device 400D includes a current command value computation unit 31, a motor control unit 39D, a PWM control unit 160, an inverter 161, a motor current detection circuit 162, a motor angle detection unit 110A, an angular velocity computation unit 110B, and a three-phase alternating current/dq axis conversion unit 130.

The current command value computation unit 31 outputs dq axis current command value Iref_m (m=d, q) of two axes (dq axis coordinate system) calculated using an assist map or the like based on steering torque Th and vehicle speed Vs or the like, to the motor control unit 39D.

The motor control unit 39D calculates a voltage control command value Vref_mb (m=d, q) that has been subjected to dead time compensation from the dq axis current command value Iref_m (m=d, q), the motor angle θe, the motor rotation speed N, or like. Further, the motor control unit 39D calculates three phase Duty command values Du_o, Dv_o and Dw_o by space vector modulation from the voltage control command value Vref_mb (m=d, q) or the like, and outputs them to the PWM control unit 160.

Figure 56:
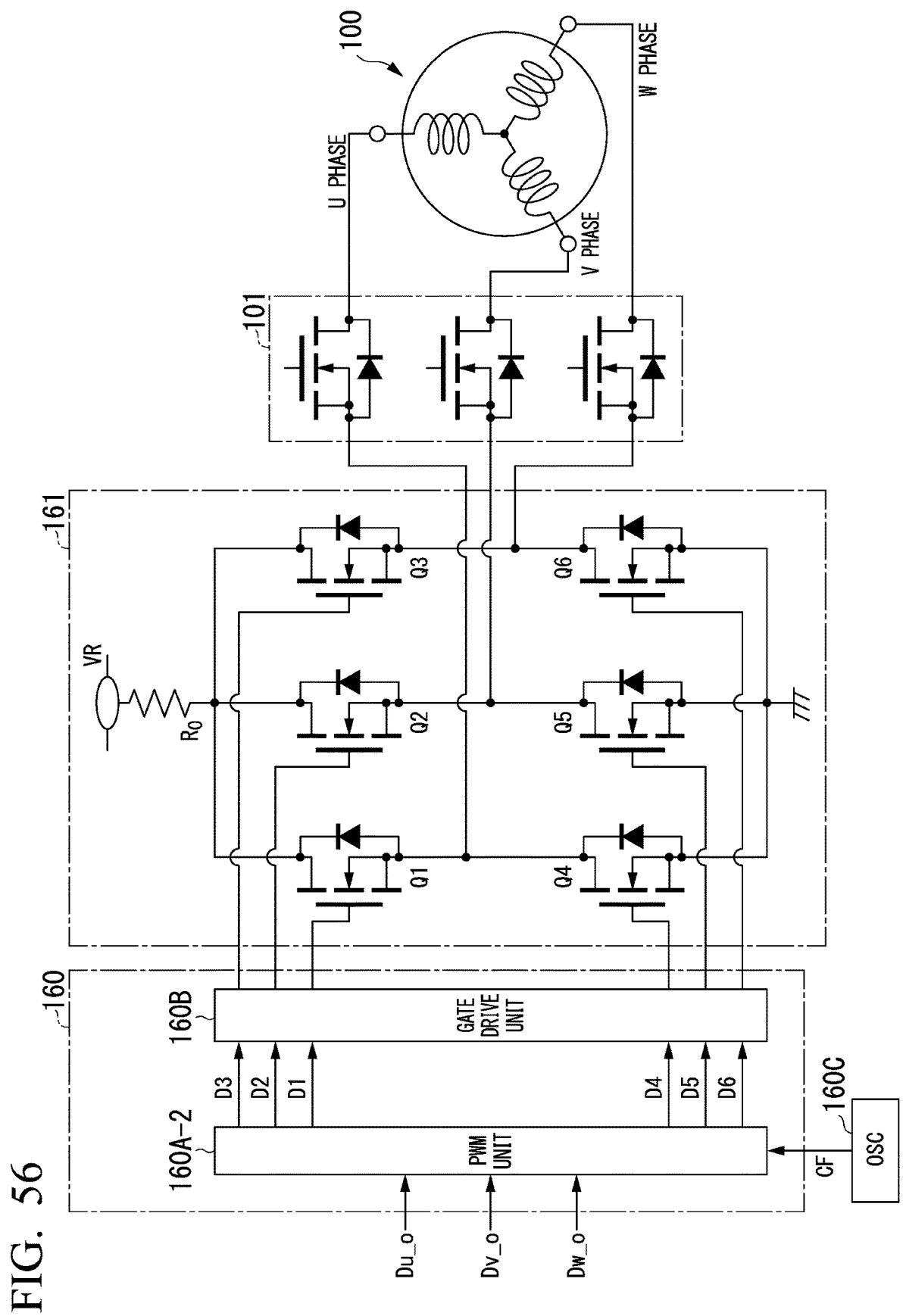
FIG. 56 is a block diagram of a PWM control unit and an inverter of the motor control device.

FIG. 56 is a configuration diagram of the PWM control unit 160 and the inverter 161.

As shown in FIG. 56, the inverter 161 is configured by a three-phase bridge of FETs, and drives the motor 100 by being turned ON/OFF with PWM-Duty values D1 to D6. Between the inverter 161 and the motor 100, a motor switch 101 for interrupting the supply of current when the assist control is stopped or the like is interposed. The upper arm is configured by FETs Q1, Q2 and Q3 as switching elements, and the lower arm is configured by FETs Q4, Q5 and Q6. Also, the FETs Q1 and Q4 are U-phase drive elements, the FETs Q2 and Q5 are V-phase drive elements, and the FETs Q3 and Q6 are W-phase drive elements.

As shown in FIG. 56, the PWM control unit 160 drives and controls the motor 100 via an inverter (inverter applied voltage VR) 161 having a bridge configuration of upper and lower arms as shown in FIG. 56, based on the input three-phase Duty command values Du_o, Dv_o, and Dw_o. As shown in FIG. 56, the PWM control unit 160 includes a PWM unit 160A-2 and a gate drive unit 160B.

As shown in FIG. 56, the PWM unit 160A-2 calculates three-phase PWM-Duty values D1 to D6 according to predetermined equations for the three-phase Duty command values Du_o, Dv_o, Dw_o. A modulation signal (carrier) CF of, for example, a triangular wave is input to the PWM unit 160A-2 from the oscillation unit 160C, and the PWM unit 160A-2 calculates PWM-Duty values D1 to D6 in synchronization with the modulation signal CF.

As shown in FIG. 56, the gate drive unit 160B outputs PWM-Duty values D1 to D6 to drive the gates of the FETs Q1 to Q6 as drive elements.

Since the electric power steering device 300D is an in-vehicle product, the operating temperature range is wide, and from the viewpoint of fail-safe, the inverter 161 for driving the motor 100 needs to have a longer dead time (industrial equipment <EPS) than that for general industrial use represented by home appliances. In general, switching elements (for example, FETs (Field-Effect Transistors)) have a delay time at the time of OFF, and therefore, if the switching elements of the upper and lower arms are simultaneously switched OFF/ON, there may be a situation where the DC link is short-circuited. In order to prevent occurrence of this situation, a time (dead time) in which the switching elements of both the upper and lower arms are turned off is provided.

When the dead time compensation as described above is performed, the current waveform is distorted and the response of current control and steering feeling deteriorate, and for example, when the steering is slowly performed with the steering wheel in the vicinity of the on-center, discontinuous steering feeling due to torque ripple or the like may occur.

The current detector 162 detects three-phase motor currents Iu, Iv, Iw of the motor 100, as shown in FIG. 55. The detected three-phase motor currents Iu, Iv, Iw are input to the three-phase AC/dq axis converter 130 and converted into two-phase feedback dq axis currents Id and Iq. The two-phase feedback dq axis currents Id and Iq are input to the motor control unit 39D.

The motor angle detection unit 110A calculates and acquires the motor angle θe of the motor 100, if necessary. The motor angle θe is input to the angular velocity computation unit 110B, the motor control unit 39D, and the three-phase alternating current/dq axis conversion unit 130.

The angular velocity computation unit 110B obtains the motor rotation speed N and the motor angular velocity ω from the motor angle θe by calculation. The motor rotation speed N and the motor angular velocity ω are input to the motor control unit 39D.

[Motor Control Unit 39D]

Figure 57:
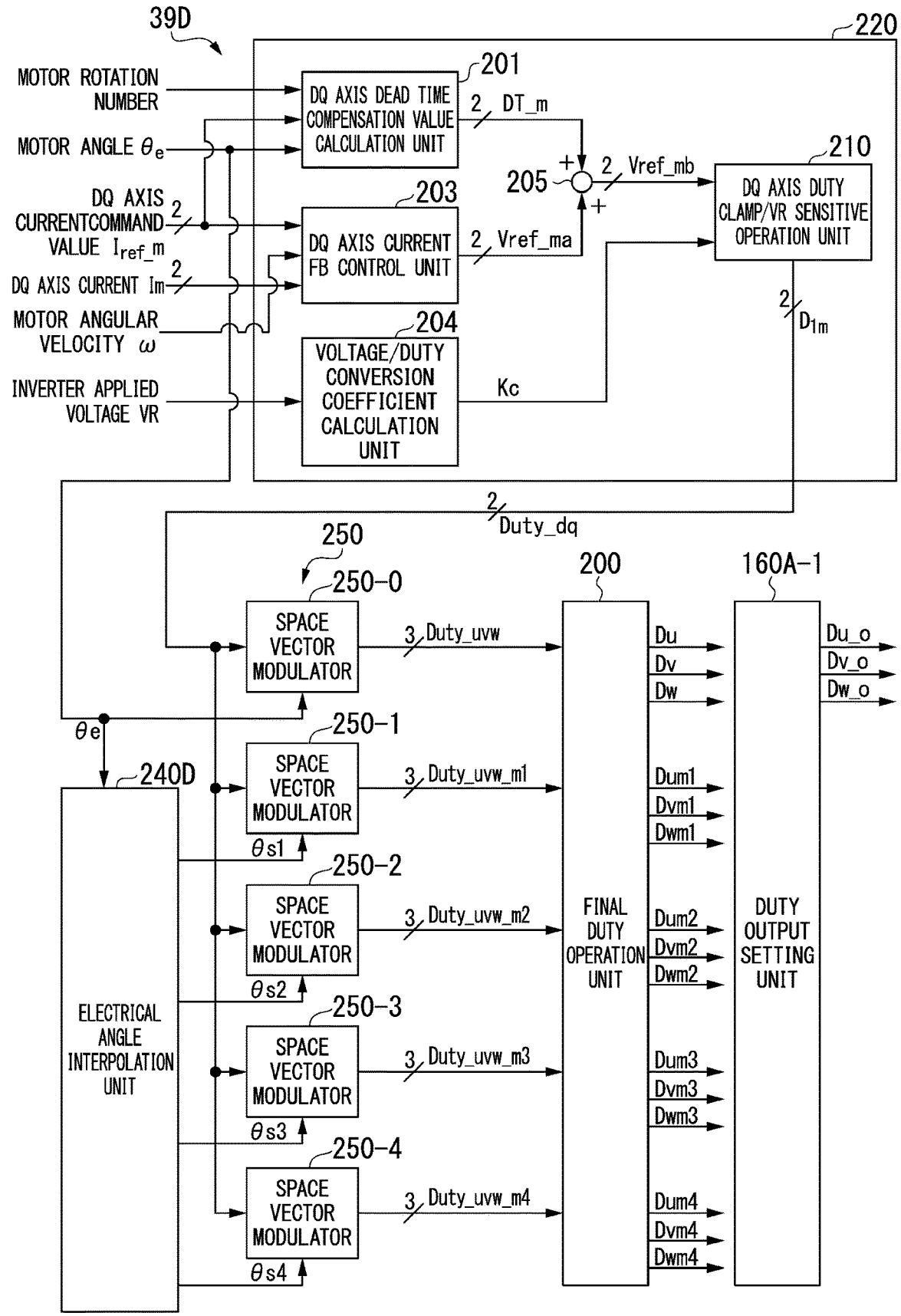
FIG. 57 is a functional configuration diagram of a motor control unit of the motor control device.

FIG. 57 is a functional configuration diagram of the motor control unit 39D.

The motor control unit 39D includes a voltage command value computation unit 220, an electric angle interpolation unit 240D, a space vector modulation unit 250, a final Duty computation unit 200, and a Duty output setting unit 160A-1.

The voltage command value computation unit 220 includes a dq axis dead time compensation value computation unit 201, a dq axis current feedback control unit 203, a voltage/duty conversion coefficient computation unit 204, an adding unit 205, and a dq axis duty clamp/VR sensitivity computation unit 210.

The voltage command value computation unit 220 calculates a voltage command value using the motor electric angle θe and the motor rotation speed θe acquired from the motor 100 for each control cycle Tc, the current command value Iref_m (m=d, q), or the like (voltage command value calculation step).

The dq axis dead time compensation value computation unit 201 outputs a dq axis dead time compensation value DT_m (m=d, q) calculated from the input motor rotation speed N, the motor angle (electric angle) θe, and the dq axis current command value Iref_m (m=d, q), to the adding unit 205.

The dq-axis current feedback control unit 203 outputs a voltage control command value Vref_ma (m=d, q) calculated from the input motor angular velocity ω, the dq-axis current command value Iref_m (m=d, q), and the two-phase feedback dq-axis current Id and Iq, to the adding unit 205.

The voltage/duty conversion coefficient computation unit 204 calculates a voltage/duty conversion coefficient Kc in accordance with the inverter applied voltage VR.

The adding unit 205 outputs a voltage control command value Vref_mb (m=d, q) obtained by adding the dq-axis dead time compensation value DT_m (m=d, q) and the voltage control command value Vref_ma (m=d, q), to the three-phase Duty clamp/VR sensitive computation unit 210.

The dq axis Duty clamp/VR (inverter applied voltage) sensitive computation unit 210 inputs the Duty command value D1m (m=d, q) (Duty_d, Duty_q) for dq axis normal calculated by multiplying the voltage control command value Vref_mb (m=d, q) and the voltage/Duty conversion coefficient Kc, to the space vector modulation unit 250.

[Electric Angle Interpolation Unit 240D]

Figure 58:
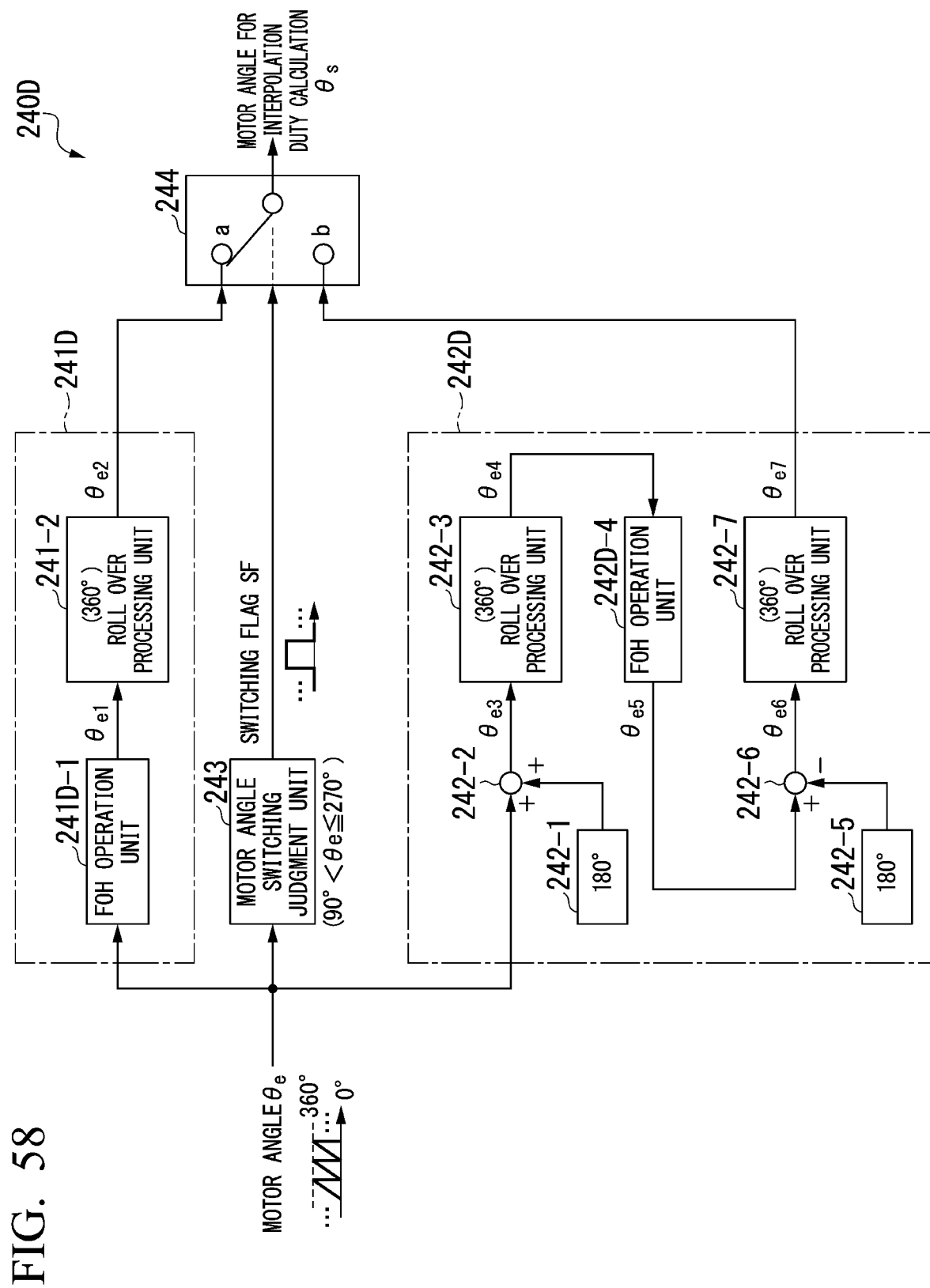
FIG. 58 is a block diagram of an electric angle interpolation unit of the motor control unit.
Figure 59:
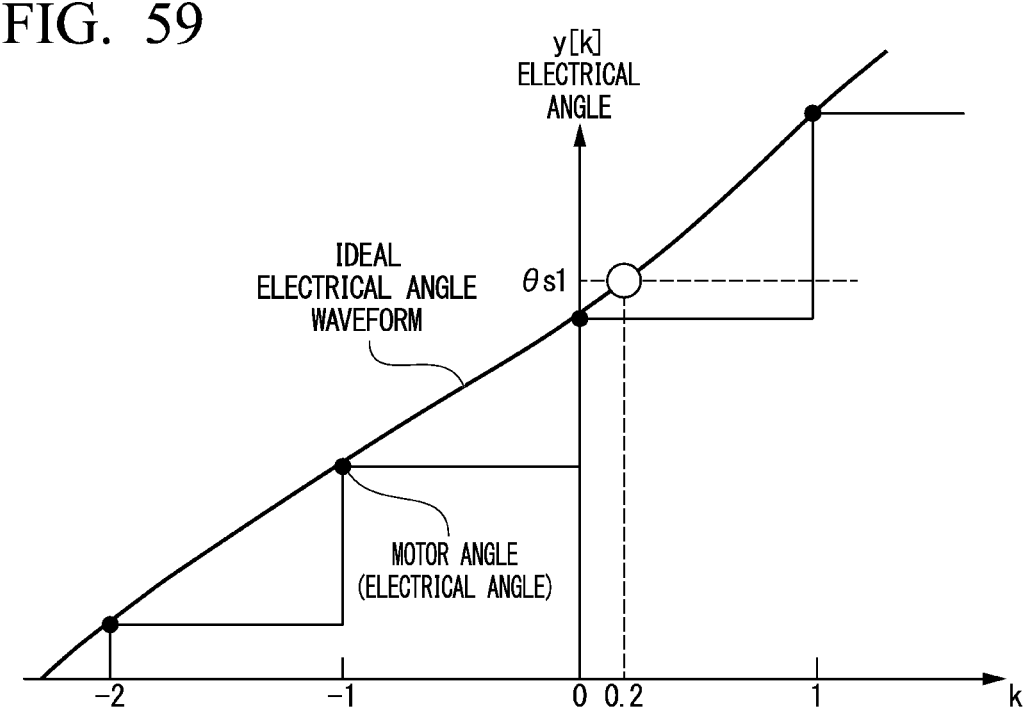
FIG. 59 is a graph showing an interpolated electric angle 1 calculated by the same electric angle interpolation unit by FOH calculation.
Figure 60:
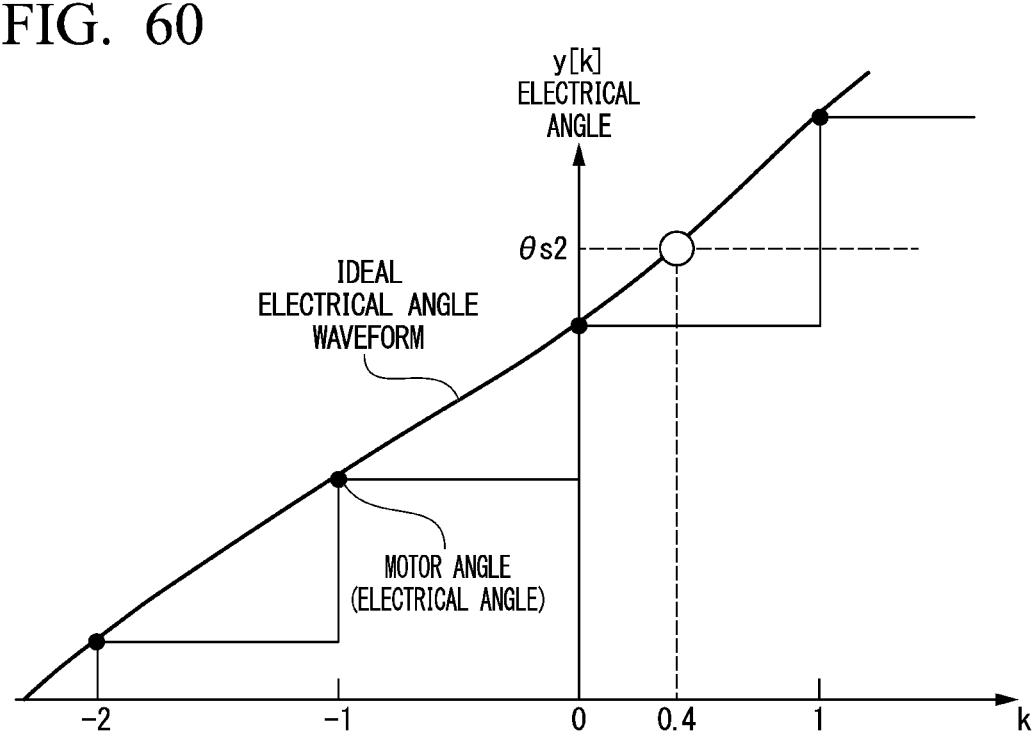
FIG. 60 is a graph showing an interpolated electric angle 2 calculated by the same electric angle interpolation unit by FOH calculation.
Figure 61:
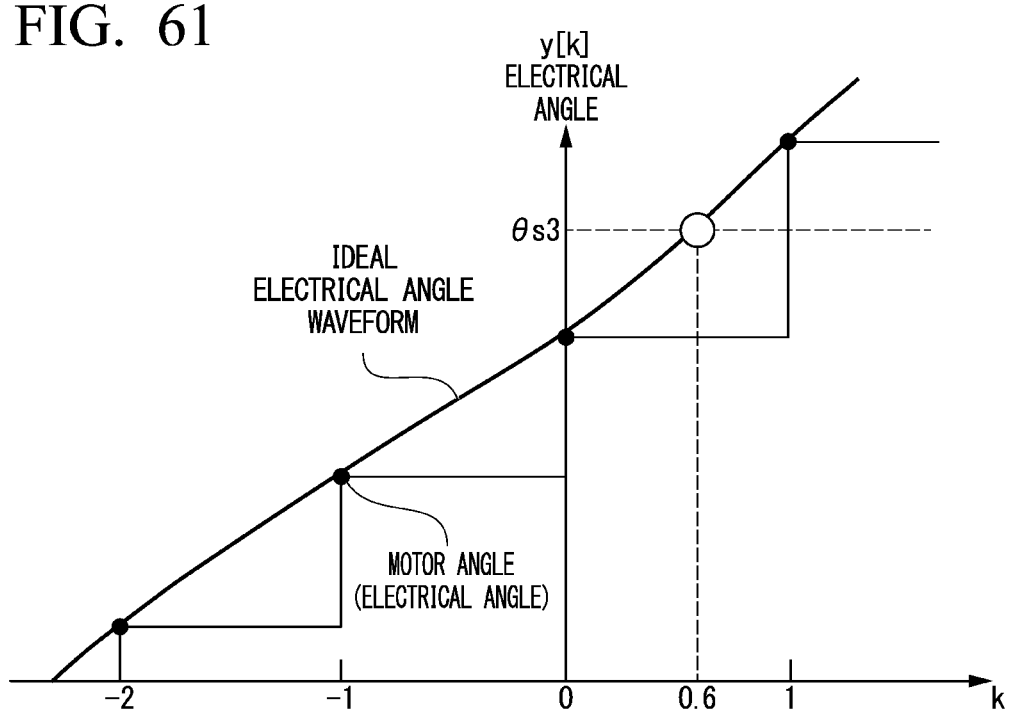
FIG. 61 is a graph showing an interpolated electric angle 3 calculated by the same electric angle interpolation unit by FOH calculation.
Figure 62:
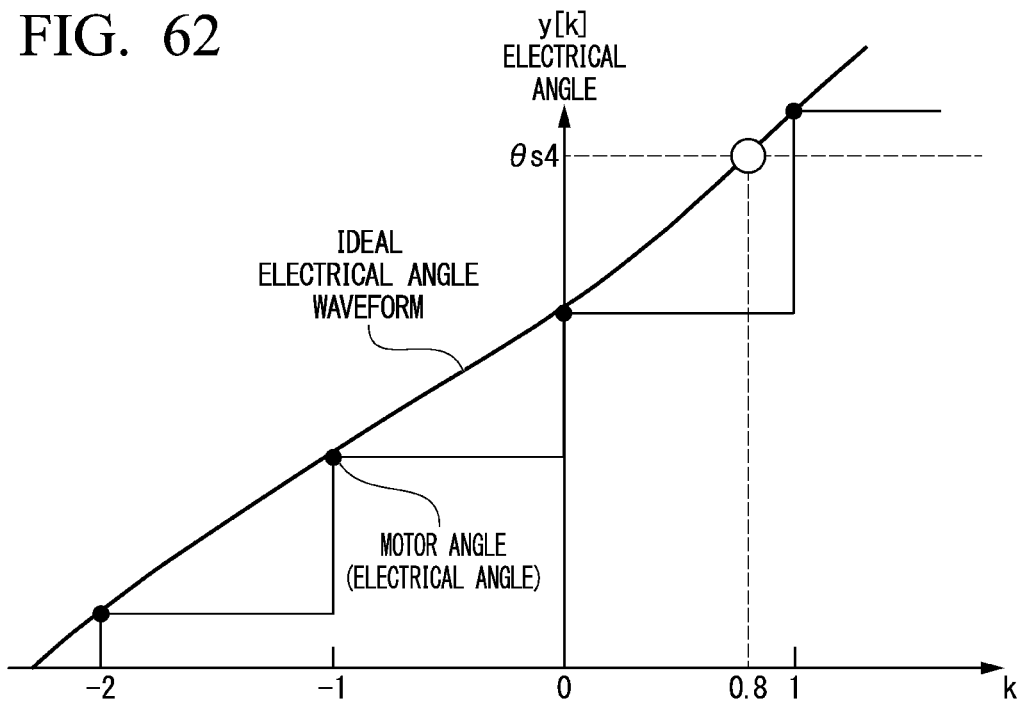
FIG. 62 is a graph showing an interpolated electric angle 4 calculated by the same electric angle interpolation unit by FOH calculation.

FIG. 58 is a block diagram of the electric angle interpolation unit 240D.

The electric angle interpolation unit 240D calculates a motor angle (interpolated electric angle) θs for interpolation Duty calculation from the input motor angle θe, and outputs the calculated motor angle to the space vector modulation unit 250 (electric angle interpolation step).

The electric angle interpolation unit 240D performs linear function interpolation calculation (First Order Hold calculation: hereinafter, linear function interpolation calculation is simply referred to as "FOH calculation") on the motor angle θe detected in the control cycle 250 μs (Tc) to estimate the motor angle (interpolated electric angle) θs at an interval (division interval) of 50 μs in which the control cycle Tc is divided into ⅕, and calculates an interpolated Duty command value based on the estimated motor angle (interpolated electric angle) θs.

In the dq axis current control performed by the electric angle interpolation unit 240D, the Duty command value after space vector modulation is not set as an interpolation target. This is because the Duty command value after space vector modulation includes a dead time compensation value with a transient change, a noise component caused by the distortion component of the third high frequency due to space vector modulation, or the like, and the interpolated Duty command value calculated by directly interpolating the Duty command value may be a value including large noise.

As shown in FIG. 58, the electric angle interpolation unit 240D includes a calculation processing unit 241D (FOH computation unit 241D-1 and rollover processing unit 241-2) that inputs the motor angle θe and directly performs FOH calculation, an offset-added calculation processing unit 242D that inputs the motor angle θe and performs offset processing to perform FOH calculation, a motor angle switching determination unit 243 that determines whether the motor angle θe is in a range greater than 90° and less than or equal to 270° or in any other range to output a switching flag SF, and a switching unit 244 that switches the contacts a and b by the switching flag SF and outputs the motor angle (interpolated electric angle) θs for interpolation Duty calculation.

FIGS. 59 to 62 show four interpolated electric angles (hereinafter referred to as "interpolated electric angles 1 to 4") calculated by FOH calculation at intervals of 50 μs in which the control cycle Tc is divided into ⅕. By calculating the interpolated electric angles 1 to 4 (θs 1 to 4) using the motor electric angle θe detected before, the change of the electric angle can be smoothed.

The function y [k] used for the FOH calculation is expressed by Equation 26. y [k] is a function representing the motor angle (electric angle) at the control cycle number k.

[Equation 26]

$$y[k]=ak+b \quad \text{(EQUATION 26)}$$

If the coefficients a and b are used to express the previous value y [−1] and the current value y [0], Equation 27 holds.

[Equation 27]

$$\begin{cases} y[0] = b \\ y[-1] = -a + b \end{cases} \quad \text{(EQUATION 27)}$$

By arranging the above equations, a and b can be expressed as equation 28 using y [0] and y [−1].

[Equation 28]

$$\begin{cases} a = y[0] - y[-1] \\ b = y[0] \end{cases} \quad \text{(EQUATION 28)}$$

When Equation 28 is substituted into Equation 26, Equation 29 is obtained.

[Equation 29]

$$y[k]=(k+1)y[0]+(-k)y[-1] \quad \text{(EQUATION 29)}$$

Since the interpolated electric angle 1 ($\theta$s1) is an electric angle after 50 μs (Tc*{⅕}) from the control cycle Tc, it can be calculated by substituting k=0.2 in Equation 29.

[Equation 30]

$$y[0.2]=1.2y[0]-0.2y[-1] \quad \text{(EQUATION 30)}$$

Since the interpolated electric angle 2 ($\theta$s2) is an electric angle after 100 μs (Tc*{⅖}) from the control cycle Tc, it can be calculated by substituting k=0.4 in Equation 29.

[Equation 31]

$$y[0.4]=1.4y[0]-0.4y[-1] \quad \text{(EQUATION 31)}$$

Since the interpolated electric angle 3 ($\theta$s3) is an electric angle after 150 μs (Tc*{⅗}) from the control cycle Tc, it can be calculated by substituting k=0.6 into Equation 29.

[Equation 32]

$$y[0.6]=1.6y[0]-0.6y[-1] \quad \text{(EQUATION 32)}$$

Since the interpolated electric angle 4 ($\theta$s4) is an electric angle after 200 μs (Tc*{⅘}) from the control cycle Tc, it can be calculated by substituting k=0.8 into Equation 29.

[Equation 33]

$$y[0.8]=1.8y[0]-0.8y[-1] \quad \text{(EQUATION 33)}$$

Figure 63:
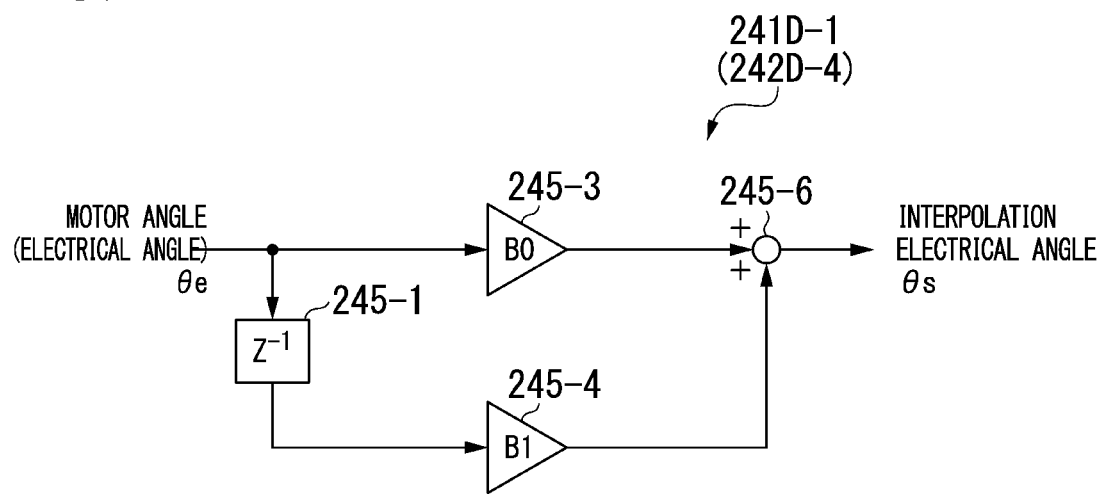
FIG. 63 is a functional block diagram of an FOH computation unit of the electric angle interpolation unit.

FIG. 63 is a functional block diagram of the FOH computation unit 241D-1 (242D-4).

The FOH computation unit 241D-1 includes a holding unit 245-1 and a holding unit 245-2 of the previous value of the motor angle $\theta$e, a coefficient unit B0 (245-3), a coefficient unit B1 (245-4), a coefficient unit B2 (245-5), an adding unit 245-6, and an adding unit 245-7.

The motor angle $\theta$e is input to the coefficient unit B0 (245-3) and the holding unit 245-1, and the holding value of the holding unit 245-1 is input to the coefficient unit B1 (245-4) and the holding unit 245-2. The holding value of holding unit 245-2 is input to coefficient unit B2 (245-5), and output values of the coefficient unit B0 (245-3), the coefficient unit B1 (245-4) and the coefficient unit B2 (245-5) are added by the adding unit 245-7 and the adding unit 245-6 to be output as the interpolated electric angle $\theta$s.

The coefficients B0 and B1 at the time of calculating the interpolated electric angles 1 to 4 ($\theta$s 1 to 4) are expressed as shown in Table 3 by Equations 30 to 33.

TABLE 3

|  | B0 | B1 |
|---|---|---|
| INTERPOLATION ELECTRICAL ANGLE 1 ($\theta$s1) | 1.2 | −0.2 |
| INTERPOLATION ELECTRICAL ANGLE 2 ($\theta$s2) | 1.4 | −0.4 |
| INTERPOLATION ELECTRICAL ANGLE 3 ($\theta$s3) | 1.6 | −0.6 |
| INTERPOLATION ELECTRICAL ANGLE 4 ($\theta$s4) | 1.8 | −0.8 |

As shown in FIG. 58, the calculation processing unit 241D in the electric angle interpolation unit 240D includes an FOH computation unit 241D-1 that receives the motor angle $\theta$e and performs FOH calculation, and a rollover processing unit 241-2 that performs rollover processing (waveform processing) on the motor angle $\theta$e1 output from the FOH computation unit 241D-1. The motor angle $\theta$e2 subjected to rollover processing by the rollover processing unit 241-2 is input to the contact a of the switching unit 244.

As shown in FIG. 58, the offset-added calculation processing unit 242D includes an adding unit 242-2 that receives the motor angle $\theta$e and performs offset processing with coefficient 180° input from the fixing unit 242-1, a rollover processing unit 242-3 that performs rollover processing (waveform processing) on the motor angle $\theta$e3 input from adding unit 242-2, an FOH computation unit 242D-4 that corrects the motor angle $\theta$e4 input from the rollover processing unit 242-3, a subtraction unit 242-6 that receives the motor angle $\theta$e5 from the FOH computation unit 242D-4 and performs offset return processing with by coefficient 180° input from the fixing unit 242-5, and a rollover processing unit 242-7 that performs rollover processing (waveform processing) on the motor angle $\theta$e6 input from the subtraction unit 242-6. The motor angle $\theta$e7 subjected to the rollover processing in the rollover processing unit 242-7 is input to the contact b of the switching unit 244.

The motor angle $\theta$e2 from the rollover processing unit 241-2 of the calculation processing unit 241D is input to the contact a of the switching unit 244, and the motor angle $\theta$e7 from the rollover processing unit 242-7 of the offset-added calculation processing unit 242D is input to the contact b of the switching unit 244. The contacts a and b of the switching unit 244 are switched by the switching flag SF ("H", "L") from the motor angle switching determination unit 243, and a motor angle (interpolated electric angle) $\theta$s for interpolation Duty calculation is output from the switching unit 244.

The motor angle (electric angle) $\theta$e returns to 0° if it exceeds 360° when moving from the current motor angle to the next motor angle. At this time, since a transient angle fluctuation occurs, if the FOH calculation is performed using the current motor angle, there are cases where the accurate interpolation calculation result cannot be obtained. In order to avoid this problem, the electric angle interpolation unit 240D switches the calculation output (motor angle $\theta$s for interpolation Duty calculation) according to the motor angle $\theta$e of the input electric angle.

When the motor angle $\theta$e is in the range of 90°<$\theta$e≤270°, there is no transient angle fluctuation in the motor angle $\theta$e. Therefore, the electric angle interpolation unit 240D performs FOH calculation on the input motor angle $\theta$e.

On the other hand, when the motor angle $\theta$e is in the range of 0°≤$\theta$e≤90° or 270°<$\theta$e≤360°, there is a transient angle fluctuation in the motor angle $\theta$e. Therefore, the electric angle interpolation unit 240D offsets the motor angle $\theta$e by 180°, converts it into a continuous angle signal, performs FOH calculation, and performs 180° offset return processing on the interpolation calculation result after the FOH calculation.

The motor angle switching determination unit 243 generates the switching flag SF ("H" when 90°<$\theta$e≤270°, "L" when 0°≤$\theta$e≤90° or 270°<$\theta$e≤360°) from input motor angle $\theta$e.

The switching unit 244 selects and outputs the motor angle (interpolated electric angle) $\theta$s for the interpolation Duty calculation after the FOH calculation based on the switching flag SF.

That is, when 90°<$\theta$e≤270°, the switching unit 244 is controlled as in Equation 34, and outputs the motor angle $\theta$e2 as the motor angle $\theta$s for interpolation Duty calculation.

[Equation 34]

$$SF=H(90°<\theta_e\leq270°) \quad \text{(EQUATION 34)}$$

Further, when $0° \leq \theta e \leq 90°$ or $270° < \theta e \leq 360°$, the switching unit 244 is controlled as in Equation 35, and outputs the motor angle θe7 as the motor angle θs for interpolation Duty calculation.

[Equation 35]

$$SF = L(0° \leq \theta_e \leq 90° \text{ OR } 270° < \theta_e \leq 360°) \quad \text{(EQUATION 35)}$$

Figure 64:
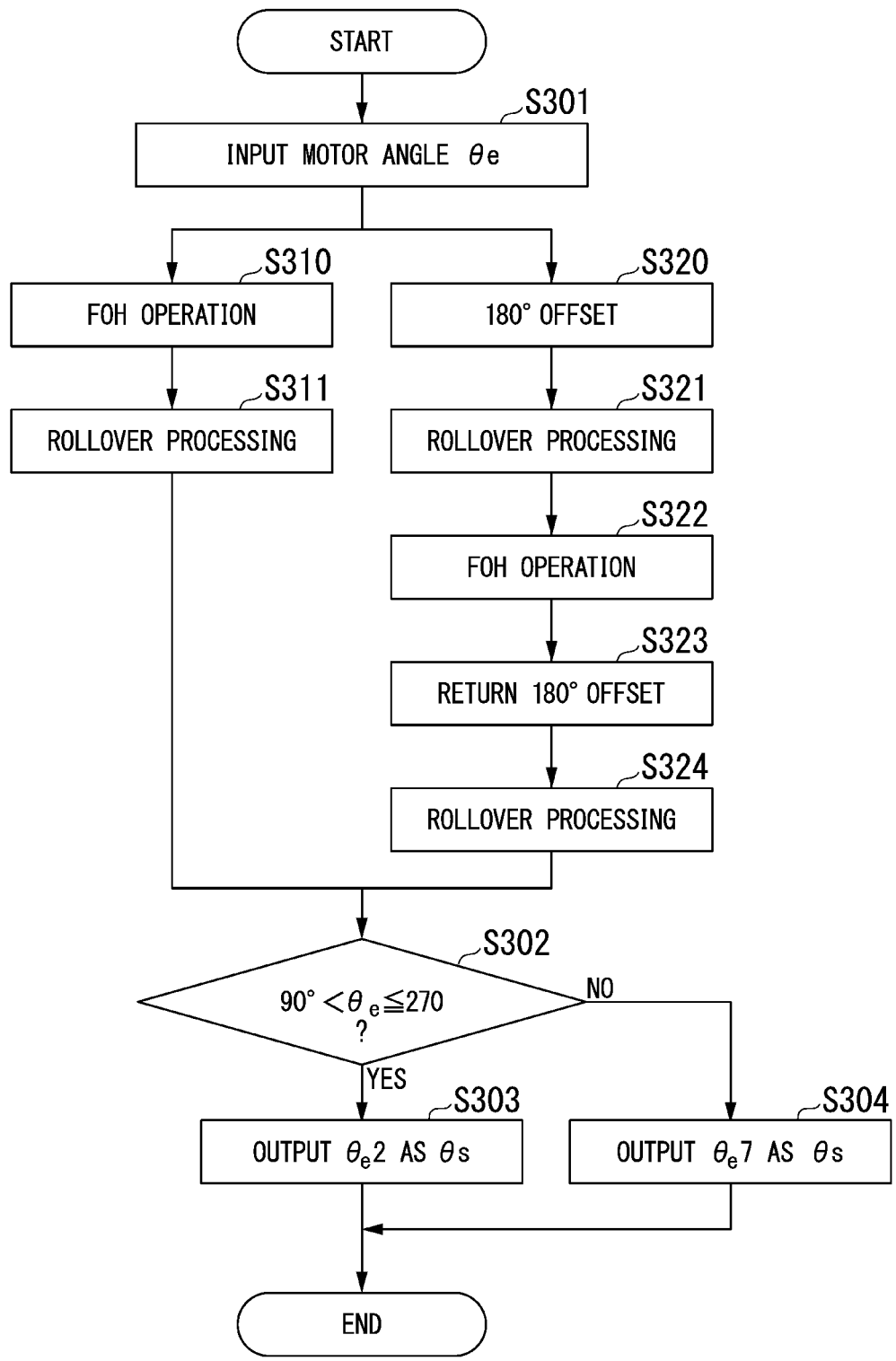
FIG. 64 is a control flowchart of the electric angle interpolation unit.

FIG. 64 shows a control flowchart of the electric angle interpolation unit 240D.

The motor angle (electric angle) θe is input to the electric angle interpolation unit 240D (step S301).

The FOH calculating unit 241D-1 of the calculation processing unit 241D performs FOH calculation (step S310). The motor angle θe is input to the holding unit 245-1 to be used as the previous value in the next FOH calculation. In addition, the previous value input to the holding unit 245-1 is input to the holding unit 245-2 because it is used as the second previous value in the next FOH calculation.

The rollover processing unit 241-2 performs rollover processing on the motor angle θe1 calculated by FOH and outputs a motor angle θe2 (step S311).

The offset-added calculation processing unit 242D performs offset processing on the motor angle (electric angle) θe using the coefficient 180° input from the fixing unit 242-1 by the adding unit 242-2 (step S320).

The rollover processing unit 242-3 performs rollover processing on the offset-processed motor angle θe3, and outputs the motor angle θe4 (step S321).

The FOH computation unit 242D-4 performs the FOH calculation on the input motor angle θe4 (step S322). The motor angle θe is input to the holding unit 245-1 to be used as the previous value in the next FOH calculation. In addition, the previous value input to the holding unit 245-1 is input to the holding unit 245-2 because it is used as the second previous value in the next FOH calculation.

The motor angle θe5 calculated by the FOH is input to the subtraction unit 242-6, and the offset return processing is performed with the coefficient 180° input from the fixing unit 242-5 (step S323).

The motor angle θe6 subjected to the offset return processing is subjected to rollover processing by the rollover processing unit 242-7, and the motor angle θe7 is output (step S324).

After completion of the processing in step S311 and step S324, the motor angle switching determination unit 243 determines that the motor angle θe is greater than 90° and not more than 270° (step S302).

When this condition is satisfied (in the case of YES), the motor angle switching determination unit 243 sets the switching flag SF to "H".

When the above conditions are not met (in the case of NO), the motor angle θe is 0° or more and 90° or less, or more than 270° and 360° or less, and the motor angle switching determination unit 243 sets the switching flag SF to "L".

When the switching flag SF input from the motor angle switching determination unit 243 is "H", the switching unit 244 selects θe2 and outputs it as the motor angle (interpolated electric angle) θs for interpolation Duty calculation (step S303).

When the switching flag SF input from the motor angle switching determination unit 243 is "L", the switching unit 244 selects θe7 and outputs it as the motor angle (interpolated electric angle) θs for interpolation Duty calculation (step S304).

The electric angle interpolation unit 240D performs FOH calculation using the coefficients B0 and B1 (see Table 1) corresponding to the interpolated electric angles 1 to 4 (θs 1 to 4) to calculate each of the interpolated electric angles 1 to 4 (θs 1 to 4).

FIG. 65 shows the waveforms of each part of the electric angle interpolation unit 240D, the horizontal axis is time [sec], and the vertical axis is an internal value processed by an MPU or the like and is 64 [dec]/1 [deg]. Note that 23040 [dec]=360 [deg].

Figure 65A:
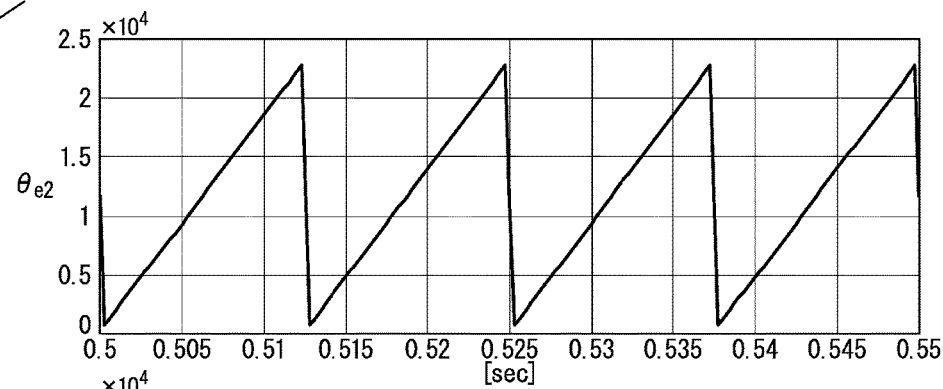
FIG. 65A-FIG. 65D are graphs showing the waveform of the electric angle interpolation unit.
Figure 65B:
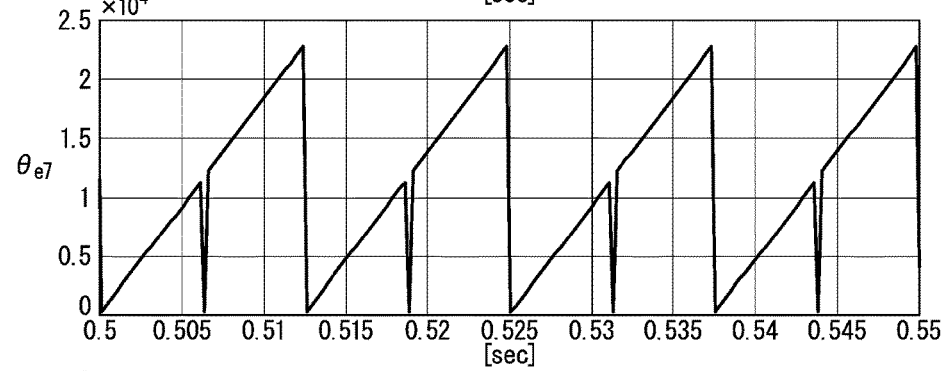
Figure 65C:
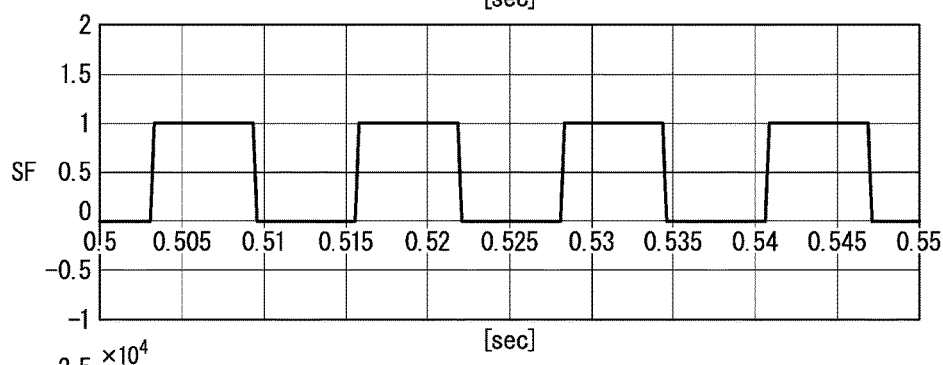

FIG. 65(A) is a waveform example of the motor angle θe2 output from the calculation processing unit 241D, and FIG. 65(B) is a waveform example of the motor angle θe7 output from the offset-added calculation processing unit 242D. FIG. 65(C) shows the switching timing of "H" and "L" of the switching flag SF, and FIG. 65(D) shows a waveform example of the motor angle (interpolated electric angle) θs for interpolation Duty calculation output from the switching unit 244.

Figure 65D:
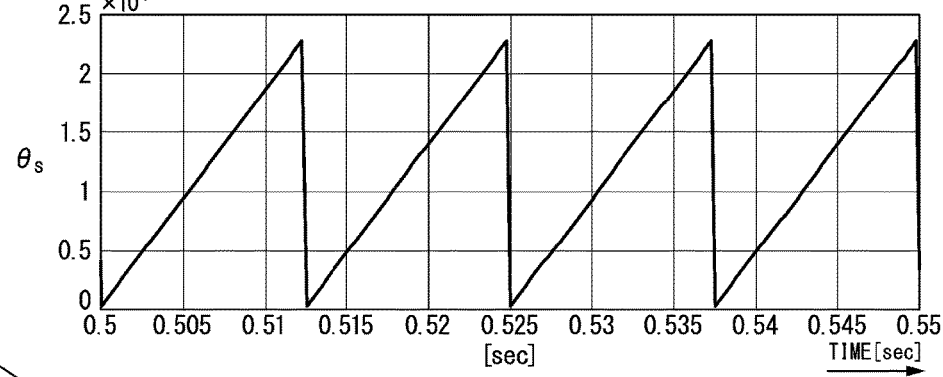

As shown in FIG. 65(D), the motor angle θs output from the electric angle interpolation unit 240D exceeds 360° as compared with the waveform shown in FIG. 65(A). When returning to 0°, there is no transient angle variation. The motor angle θe has relatively low noise if the linearity is high, and there is no transitional change other than the angle change to switch from 360° to 0°, so high accuracy can be ensured in calculation of the interpolated electric angle by FOH calculation.

[Space Vector Modulation Unit 250]

Figure 66:
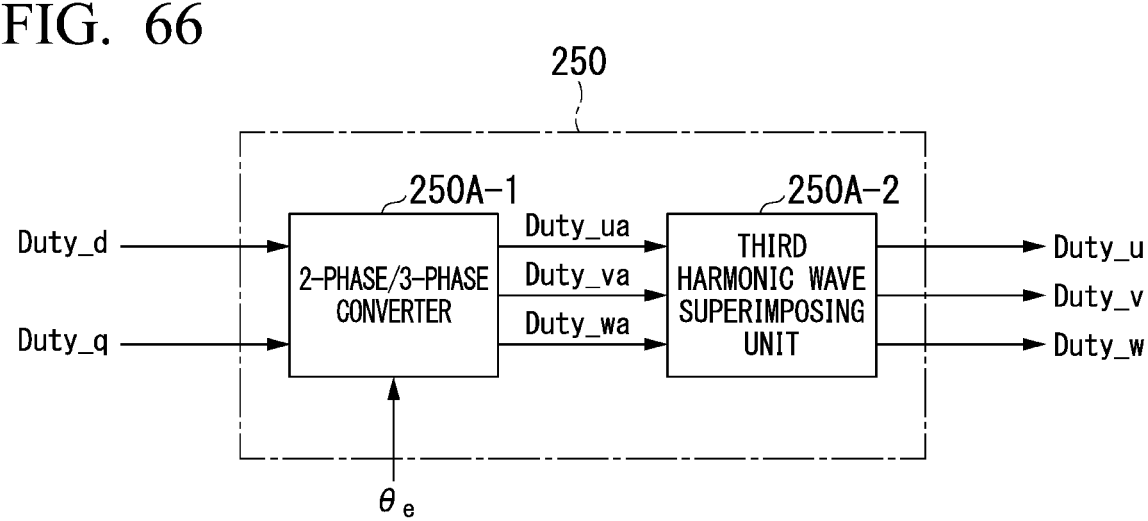
FIG. 66 is a functional block diagram of a space vector modulation unit of the motor control unit.

FIG. 66 is a functional configuration diagram of the space vector modulation unit 250.

The space vector modulation unit (conversion unit) 250 performs space vector conversion calculation after converting from the dimension of voltage to the dimension of Duty (conversion step). The space vector modulation unit 250 only needs to have a function of converting the Duty command value D1m (m=d, q) (Duty_d, Duty_q) for normal calculation in the dq axis space into a three-phase Duty command value (Duty_ua, Duty_va, Duty_wa), superimposing the third harmonic, and outputting the three-phase Duty command values Duty_u, Duty_v, and Duty_w. For example, the space vector modulation method proposed in Japanese Unexamined Patent Application, First Publication No. 2017-70066 or PCT International Publication No. WO 2017/098840 by the present applicant may be used.

The space vector modulation unit 250 includes a space vector modulation unit 250-0 that performs the above space vector conversion calculation using the motor angle (electric angle) θe, and space vector modulation units 250-1, 250-2, 250-3, and 250-4 that perform space vector conversion calculations using the interpolated electric angles 1 to 4 (θs1 to 4), respectively The space vector modulation unit 250-0 performs space vector conversion calculation using the motor angle (electric angle) θe, and outputs three-phase Duty command values Duty_u, Duty_v, and Duty_w.

The space vector modulation unit 250-1 performs space vector conversion calculation using the interpolated electric angle 1 (θs1), and outputs a three-phase interpolated Duty command value Duty_u_m1, Duty_v_m1, Duty_w_m1.

The space vector modulation unit 250-2 performs space vector conversion calculation using the interpolated electric angle 2 (θs2), and outputs a three-phase interpolated Duty command value Duty_u_m2, Duty_v_m2, Duty_w_m2.

The space vector modulation unit 250-3 performs space vector conversion calculation using the interpolated electric angle 3 (θs3), and outputs a three-phase interpolated Duty command value Duty_u_m3, Duty_v_m3, and Duty_w_m3.

The space vector modulation unit 250-4 performs space vector conversion calculation using the interpolated electric angle 4 (θs4), and outputs a three-phase interpolated Duty command value Duty_u_m4, Duty_v_m4, and Duty_w_m4.

[Final Duty Computation Unit 200]

Figure 67:
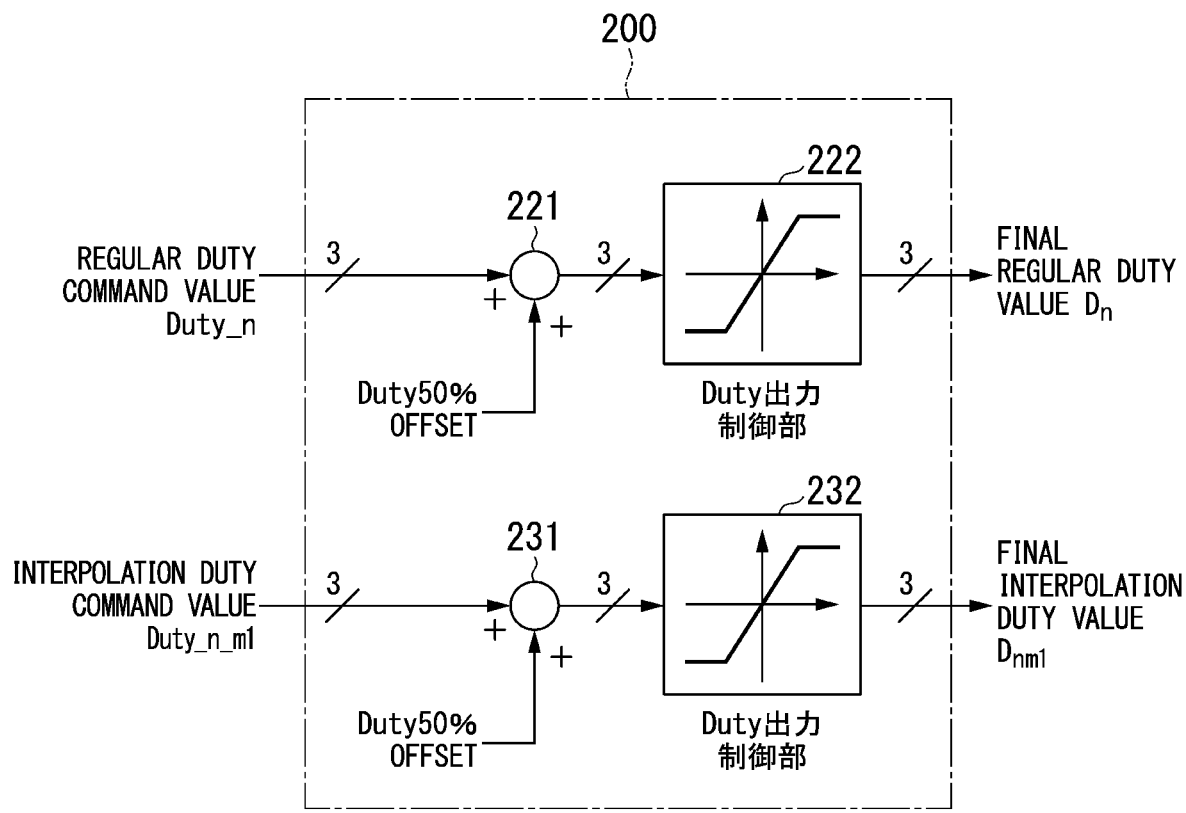
FIG. 67 is a functional block diagram of a final Duty computing unit of the motor control unit.

FIG. 67 is a functional block diagram of the final Duty computing unit 200.

In the final Duty computation unit 200, the normal Duty command value Duty_n (n=u, v, w) from the space vector modulation unit 250 is input to the adding unit 221. The Duty value to which the offset of Duty 50% has been added by the adding unit 221 is input to the limiter 222 which limits the Duty output within the range of 0 to 100% (variable). A final normal Duty command value Dn (n=u, v, w) is output from the limiter 222.

The interpolated Duty command value Duty_n_m1 from the space vector modulation unit 250 is input to the adding unit 231, and the Duty value added with the 50% Duty offset by the adding unit 231 is input to the limiter 232 that limits the Duty output within the range of 0 to 100% (variable). The final interpolated Duty command value Dnm1 (n=u, v, w) is output from the limiter 232.

The interpolated Duty command values Duty_n_m2, Duty_n_m3 and Duty_n_m4 from the space vector modulation unit 250 are processed in the same manner as the interpolated Duty command values Duty_n_m1, and the final interpolated Duty command values Dnm2, Dnm3, Dnm4 (n=u, v, n w) is output output from the limiter 232.

In general, since the EPS supplies the motor applied voltage from the battery (DC+12 V), it cannot supply the applied voltage in the negative (−) direction. In this state, the phase voltage command value in the negative direction cannot be supplied, so the phase current cannot flow in the negative direction. In order to cope with this problem, by offsetting the Duty value by 50% (+6V) for all three phases to make the reference voltage, the phase current becomes 0A when the three-phase Duty value is 50% even when the three phases are not 0V (when the motor applied voltage is +12V). For example, in the case when the U-phase Duty value is 50% (+6 V), the V-phase Duty value is 50% (+6 V), and the W-phase Duty value is 50% (+6 V), the U-phase becomes 0A, the V-phase becomes 0A, and the W-phase becomes 0A. In the case when the U-phase Duty value is 60% (+7.2 V), the V-phase Duty value is 50% (+6 V), and the W-phase Duty value is 40% (+4.8 V), a current flows in the positive (+) direction in the U phase. In the case when the U-phase Duty value is 40% (+4.8 V), the V-phase Duty value is 50% (+6 V), and the W-phase Duty value is 60% (+7.2 V), a current flows in the negative direction in the U phase. By offsetting the three phases to a Duty value of 50% to make the reference voltage, it is possible to flow a current in the negative direction while the applied voltage is positive. Although the 50% Duty value offset is basically fixed, the reference voltage at 50% Duty value fluctuates depending on the applied voltage state to be supplied. For example, when the applied voltage is 11 V, the 50% Duty value is 5.5 V, and when the applied voltage is 13 V, the 50% Duty value is 6.5 V.

[Duty Output Setting Unit 160A-1]

Figure 68:
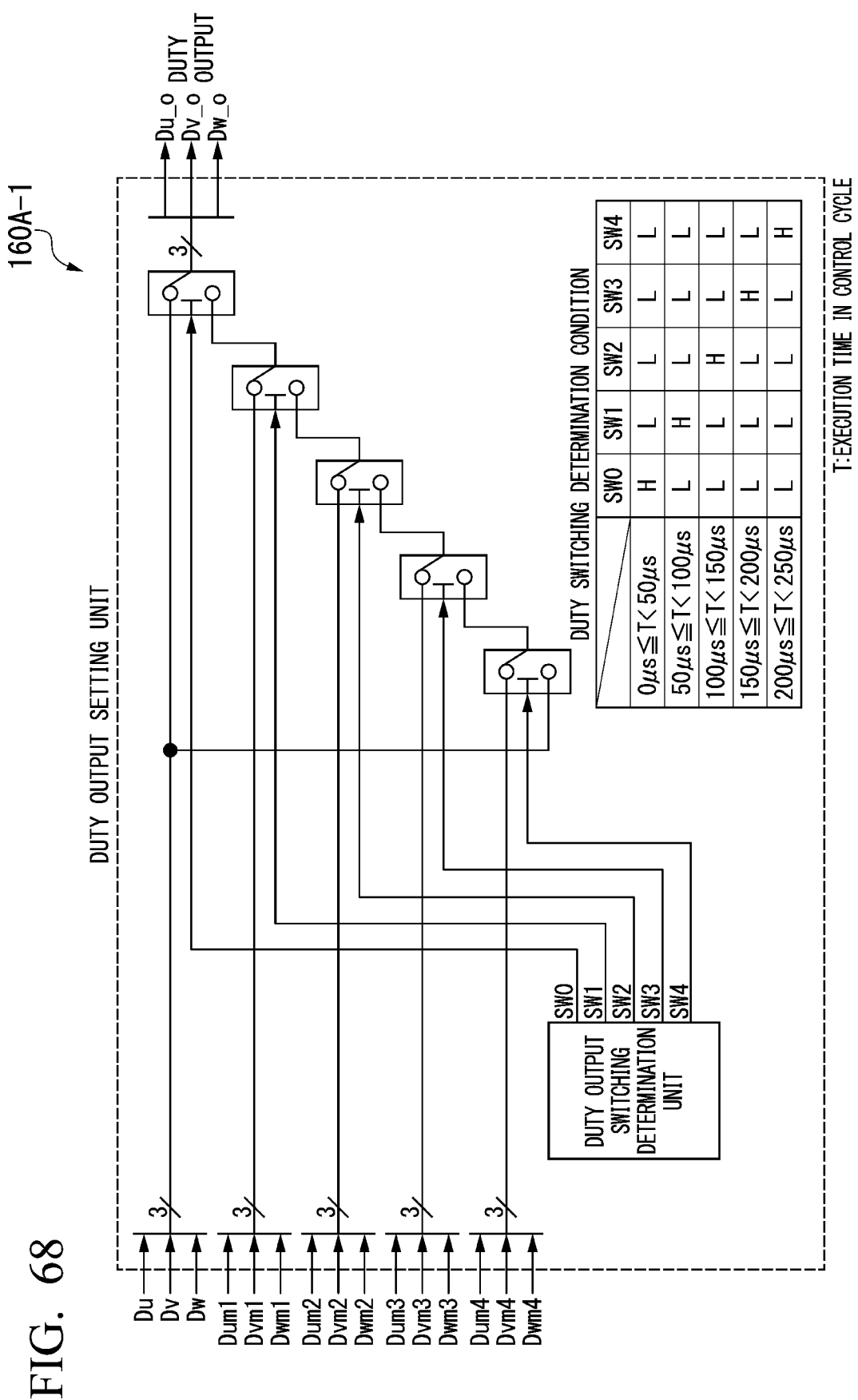
FIG. 68 is a functional configuration diagram of a Duty output setting unit of the motor control unit.
Figure 69:
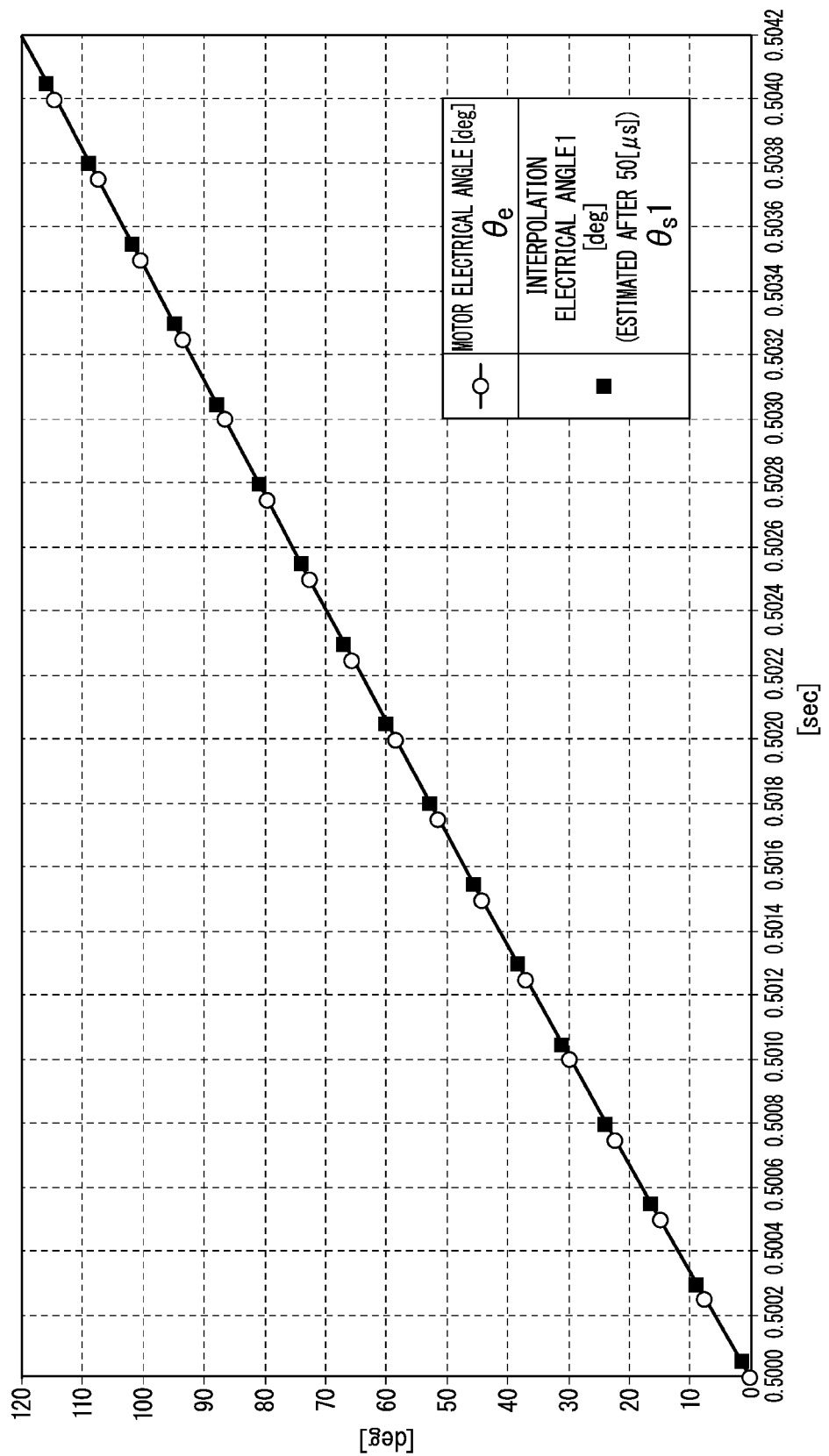
FIG. 69 is a graph showing simulation results of estimation of an interpolated electric angle 1.
Figure 70:
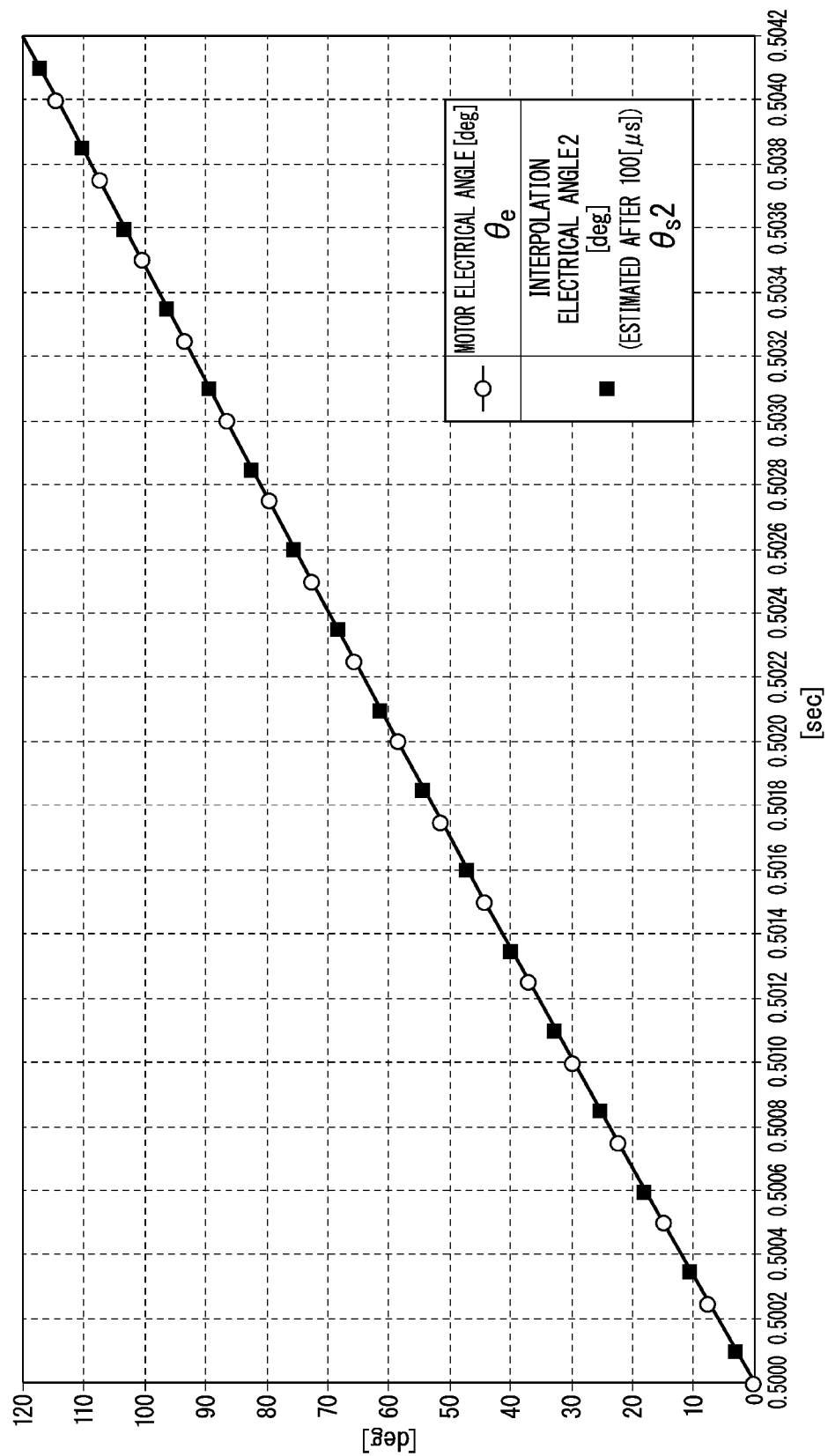
FIG. 70 is a graph showing simulation results of estimation of the interpolated electric angle 2.
Figure 71:
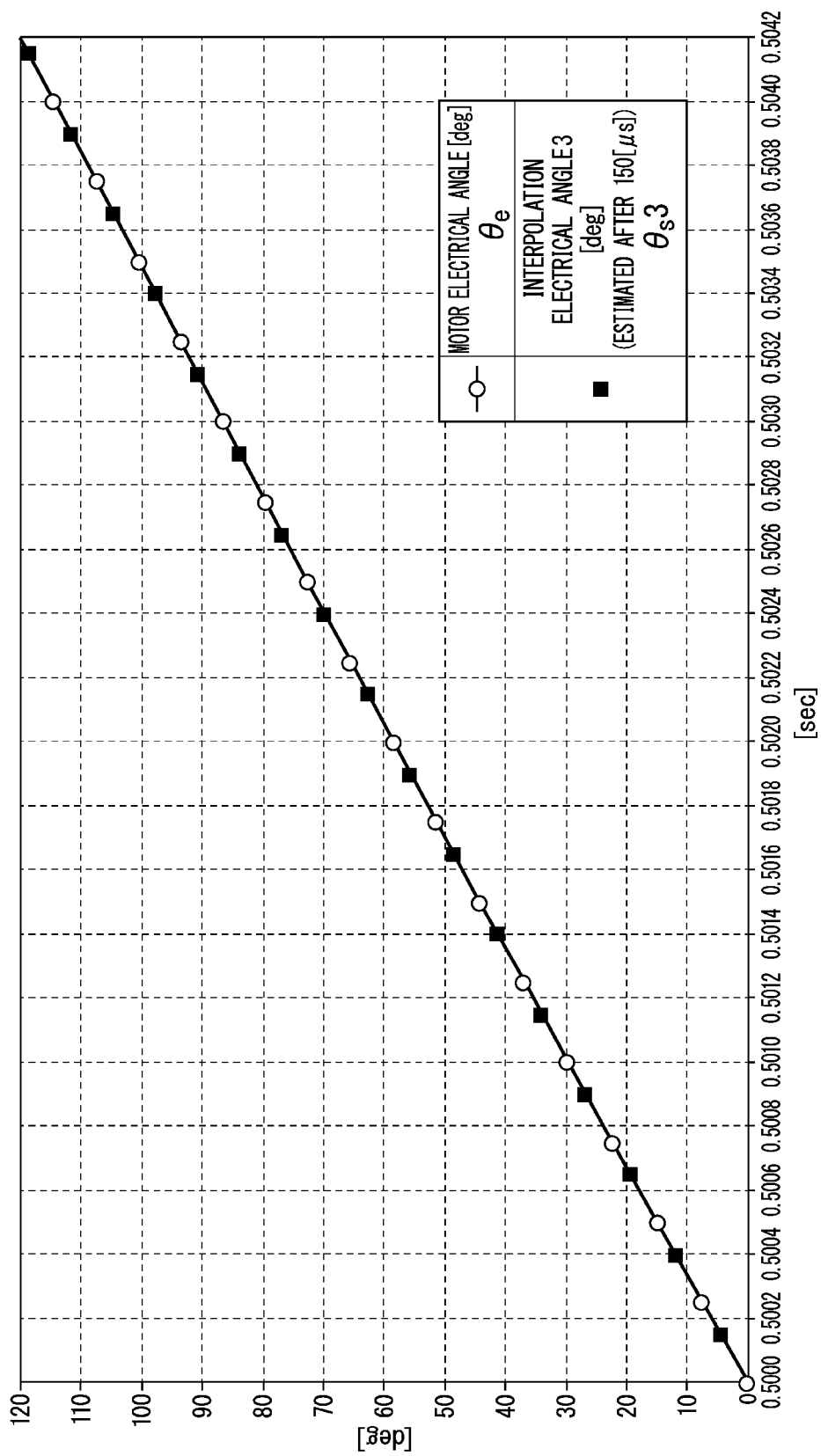
FIG. 71 is a graph showing simulation results of estimation of the interpolated electric angle 3.
Figure 72:
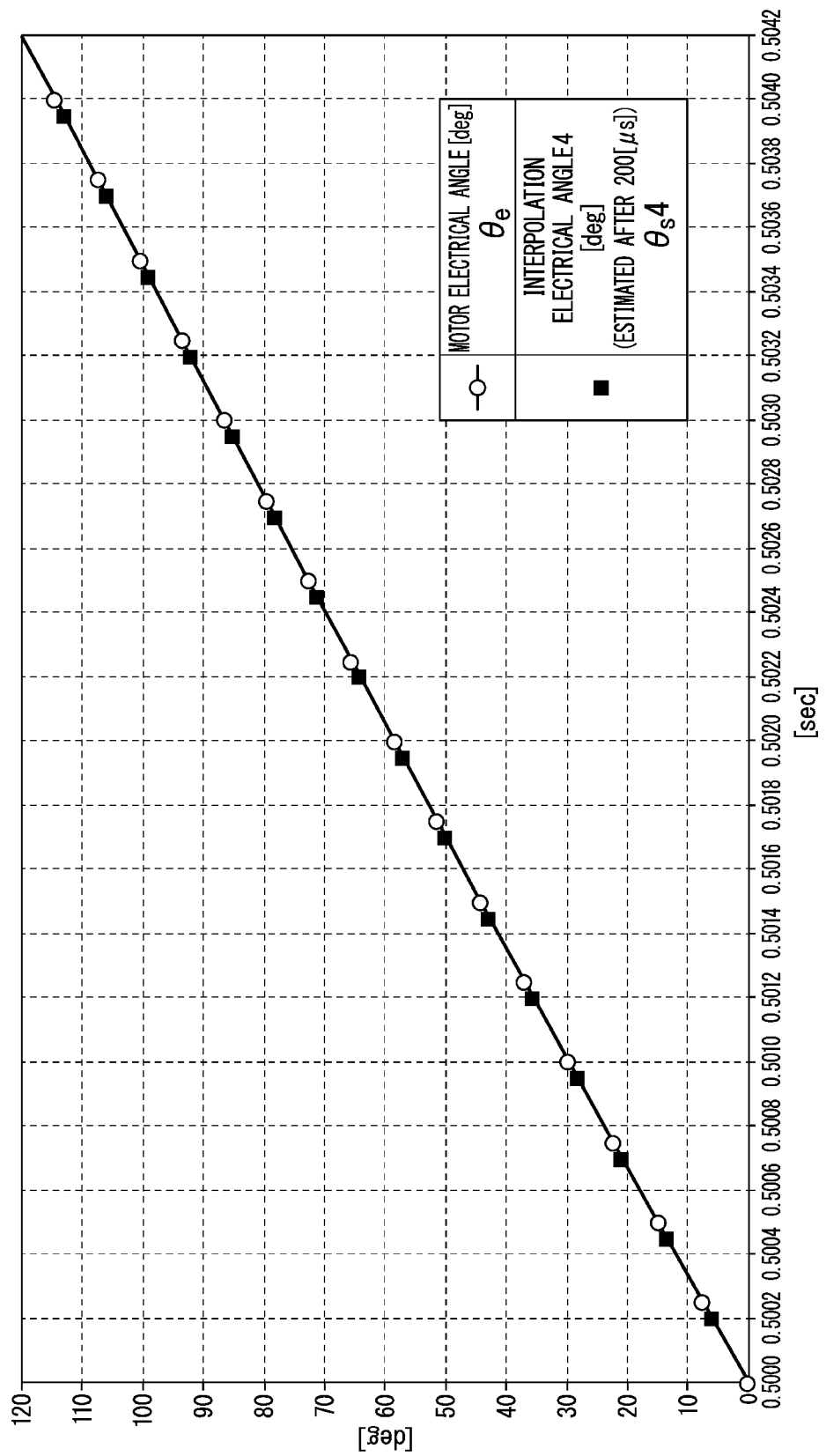
FIG. 72 is a graph showing simulation results of estimation of the interpolated electric angle 4.
Figure 73:
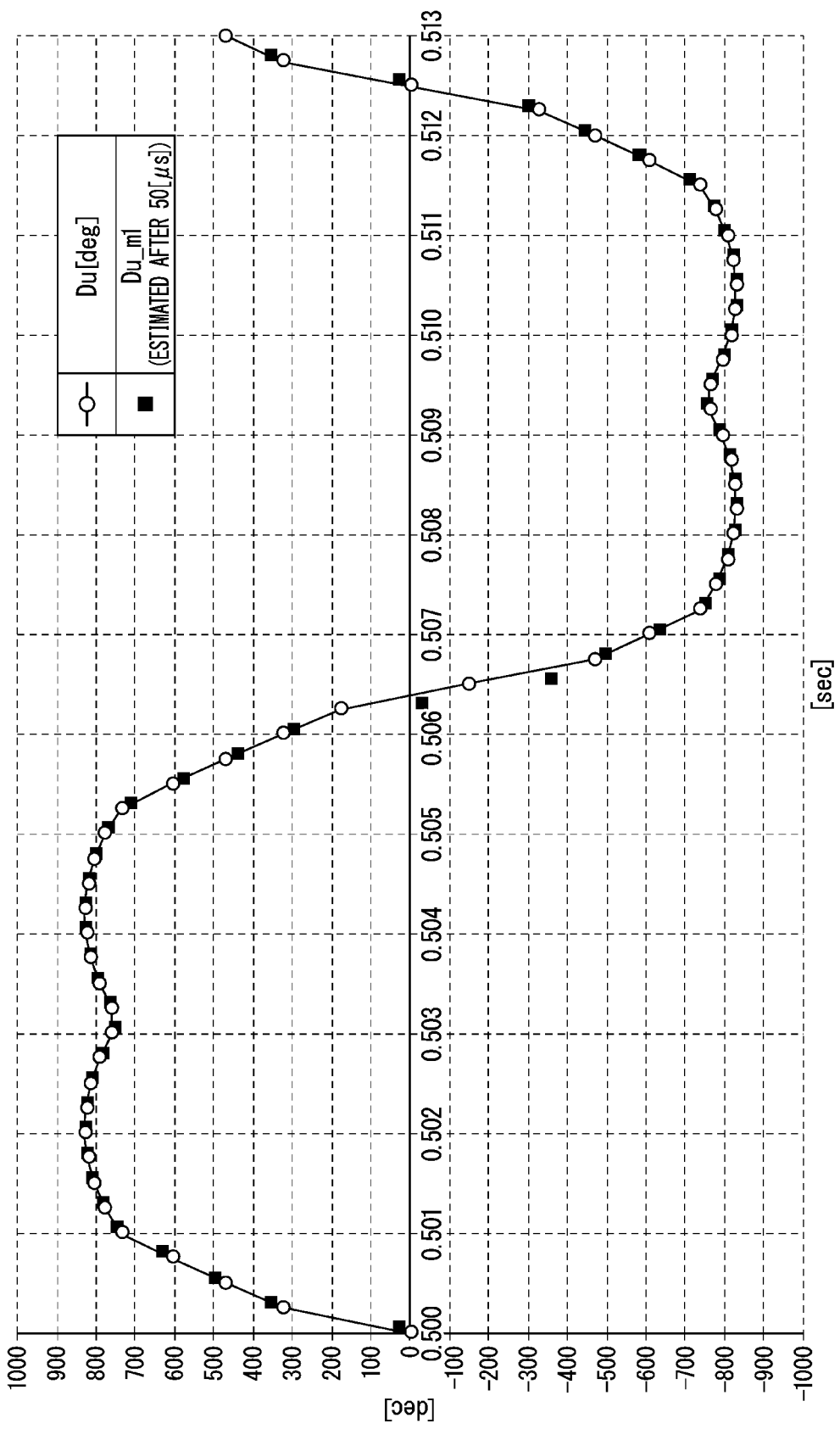
FIG. 73 is a graph showing simulation results of Duty command values calculated using the estimated interpolated electric angle 1.
Figure 74:
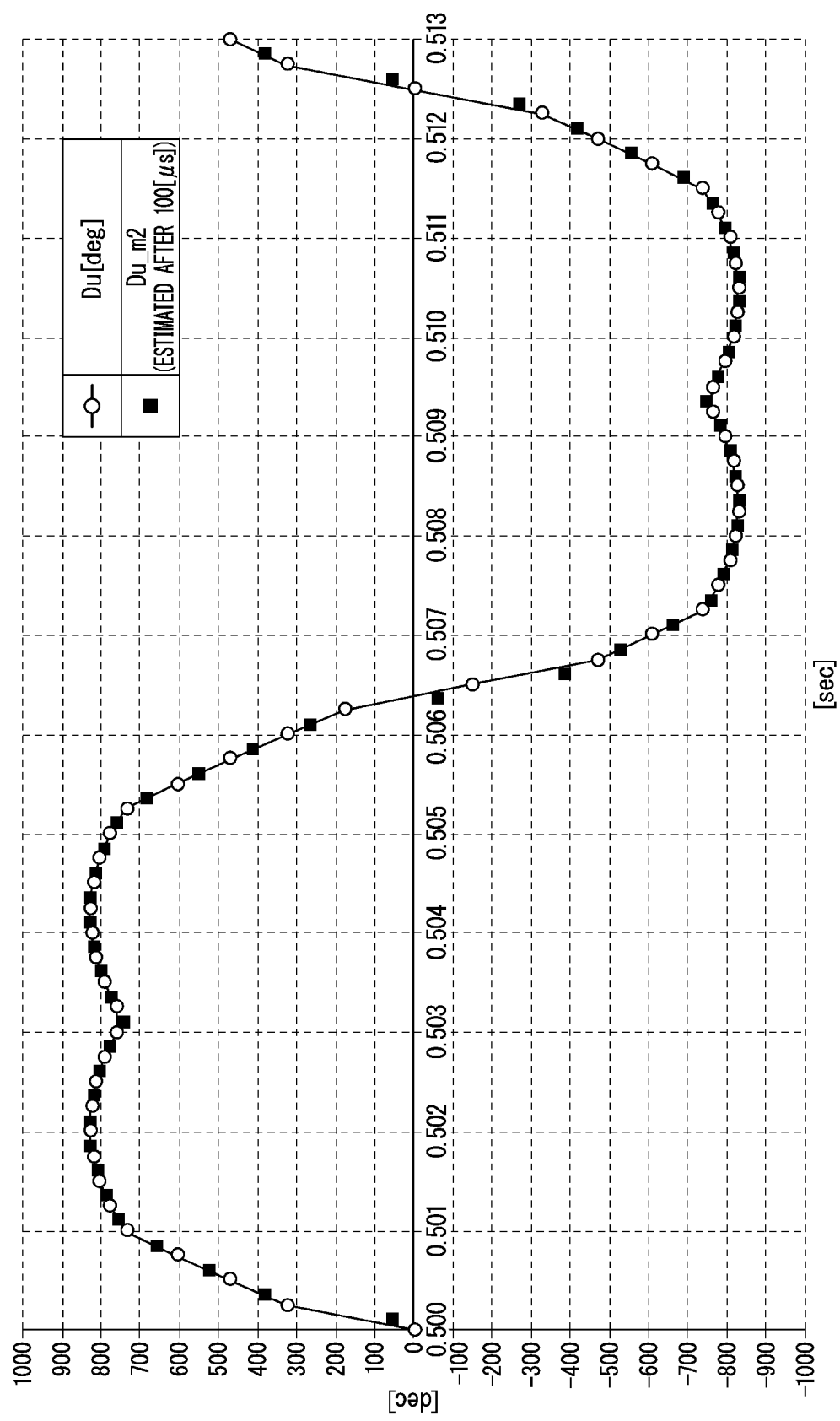
FIG. 74 is a graph showing simulation results of Duty command values calculated using the estimated interpolated electric angle 2.
Figure 75:
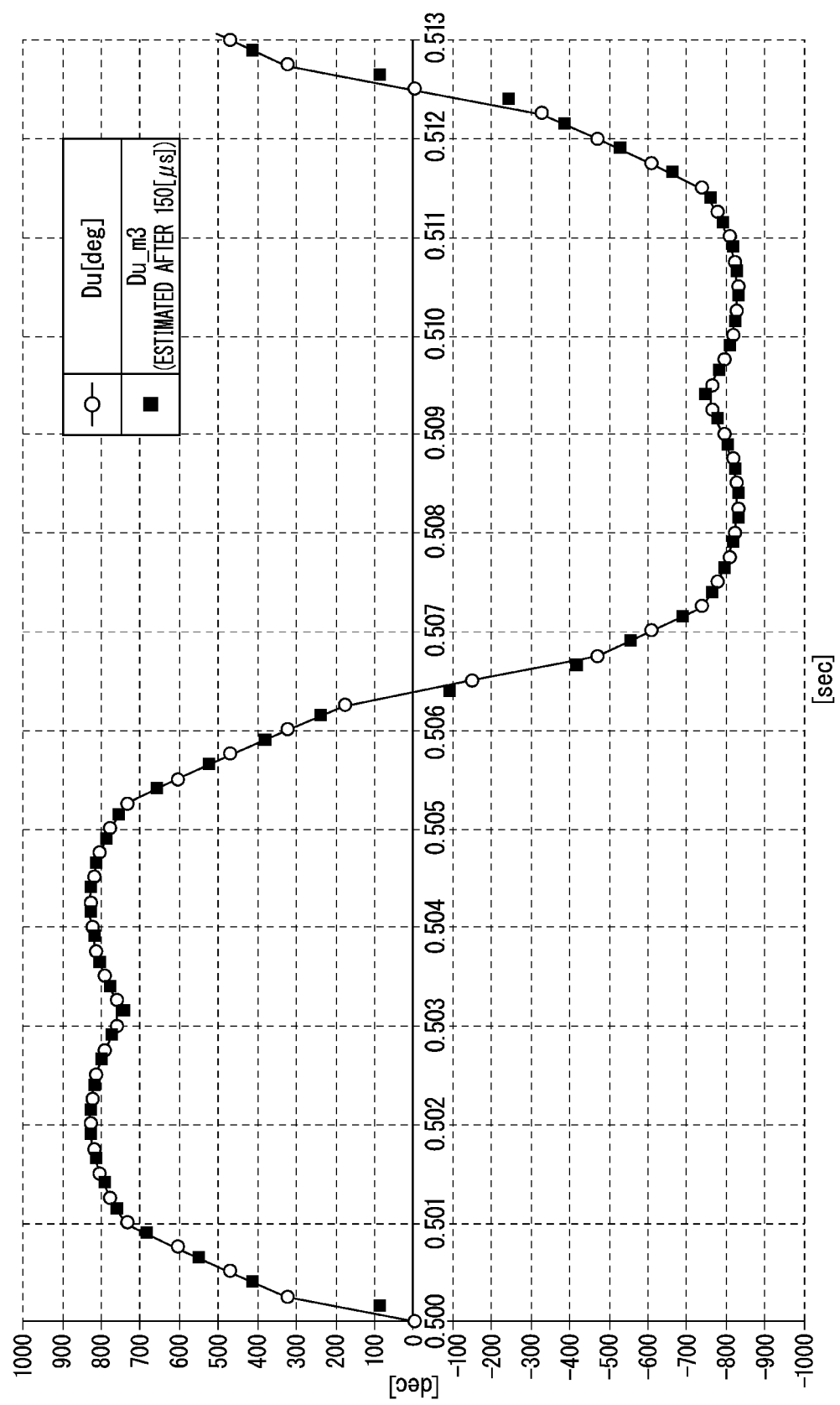
FIG. 75 is a graph showing simulation results of Duty command values calculated using the estimated interpolated electric angle 3.
Figure 76:
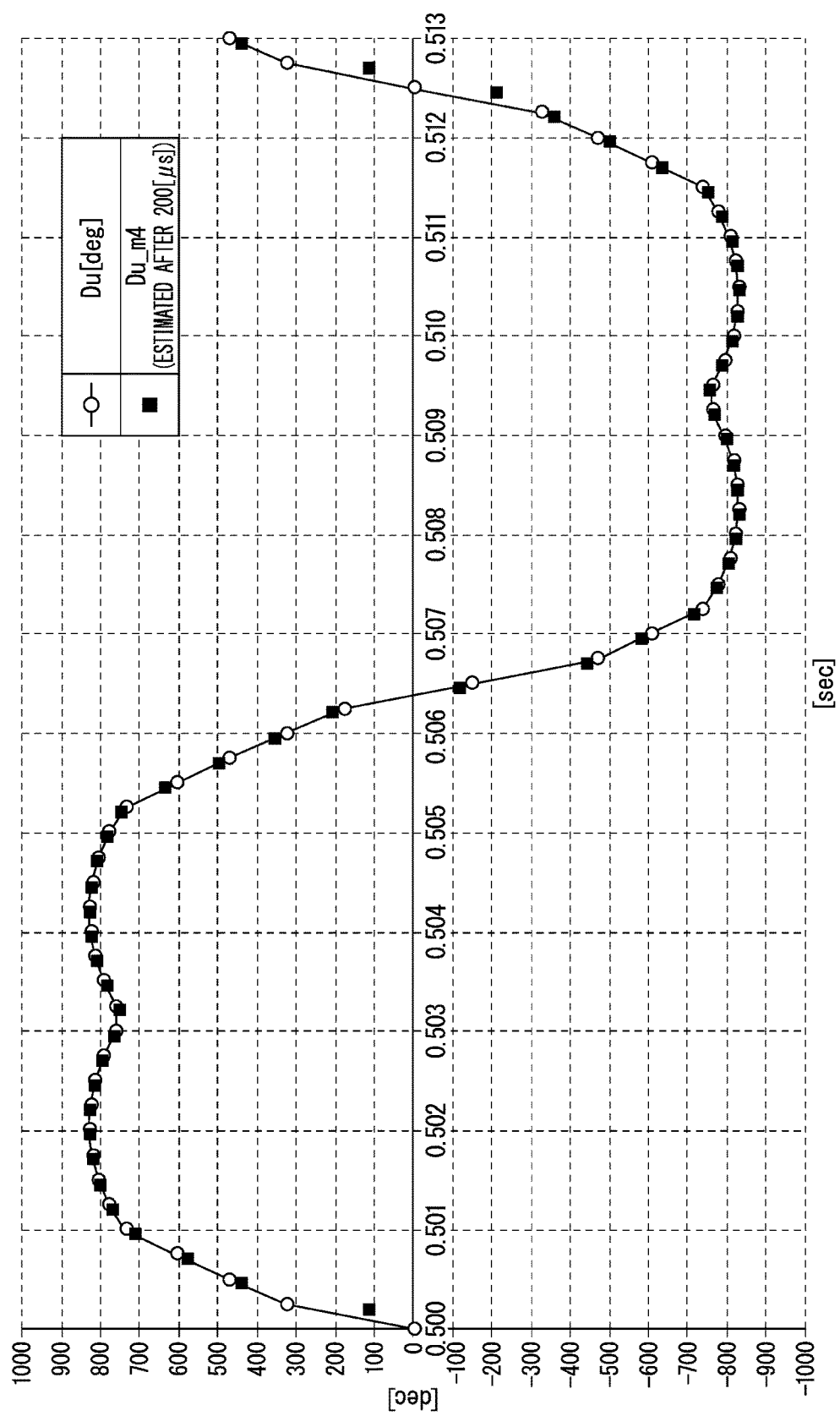
FIG. 76 is a graph showing simulation results of Duty command values calculated using the estimated interpolated electric angle 4.

FIG. 68 is a functional block diagram of the Duty output setting unit 160A-1.

As shown in FIG. 68, the Duty output setting unit (output setting unit) 160A-1 matches the 50 μs interval (division interval) obtained by dividing the control cycle Tc into ⅕, and switches and outputs the final Duty command values Du_o, Dv_o, and Dw_o to be output based on the elapsed time T from the control cycle Tc (output setting step).

FIGS. 69 to 72 show simulation results in which the interpolated electric angles 1 to 4 (θs 1 to 4) [deg] are estimated under the condition that the motor rotation speed is steered to a constant rotation speed (2000 rpm). In any of the results, the interpolated electric angles 1 to 4 overlap the line obtained by linearly interpolating the motor electric angle θe, and it can be confirmed that the estimated angle calculation by the FOH calculation is appropriately performed with high accuracy.

FIGS. 73 to 76 are simulation waveforms of the Duty command values (U phase) Du_m1 to Du_m4 calculated using interpolated electric angles 1 to 4 (θs 1 to 4) estimated under the same conditions as the simulation whose results are shown in FIGS. 69 to 72. In any of the results, it can be confirmed that the interpolated Duty command value is output on a line or in the vicinity of linear interpolation of the normal duty command value Du, and interpolation of the Duty command value using the interpolated electric angle is appropriately performed with high accuracy. Although V and W phases are not shown, they show similar results.

According to the motor control device 400D of this embodiment, the interpolated Duty command value with little noise is calculated without the influence of the dead time compensation, and the control signal for PWM control can be varied at a cycle (50 μs) earlier than the cycle for performing PWM calculation. As a result, while the increase in the calculation processing amount of the microcomputer is slight, the noise due to the vibration of the brushless motor or the motor can be suitably suppressed, and the noise due to the motor in the audible range can be reduced.

According to the motor control device 400D of the present embodiment, the linear function interpolation calculation FOH is used for the calculation of the interpolated electric angle, and although the accuracy is slightly lowered compared with the interpolation calculation such as a quadratic function interpolation calculation, an increase in the processing amount of the microcomputer can be suitably suppressed.

The fourth embodiment of the present invention has been described in detail with reference to the drawings, but the specific configuration is not limited to this embodiment, and design changes or the like within the scope of the present invention are also included. Moreover, the components shown in the above-mentioned embodiment and modification can be combined appropriately and can be constituted.

Modification 10

For example, in the motor control device 400D according to the above-described embodiment, the motor 100 is controlled by the vector control method using space vector driving, but the motor to be controlled by the motor control device is not limited thereto. The motor to be controlled by the motor control device according to the present invention may be, for example, a brushless motor of a sine wave control system. The motor control device according to the present invention does not set the duty command value as the direct interpolation target, but sets the motor angle (electric angle) θe as the interpolation target. The motor angle θe has relatively low noise if the linearity is high, and there is no transitional change other than the angle change to switch from 360° to 0°. Therefore, high accuracy can be ensured in the calculation of the interpolated electric angle by FOH calculation and the calculation of the interpolated Duty command value.

Modification 11

For example, although motor control device 400D concerning the above-mentioned embodiment was carried in electric power steering device 300C, a mode of a motor control device is not limited to this. The motor control device according to the present invention is suitably mounted on a motor drive device that requires high torque while low noise is required. For example, the motor control device according to the present invention is preferably mounted on a walking support device that supports muscle power when the wearer walks, a cleaning device that operates indoors, or the like. Thereby, it is possible to suitably suppress the vibration of the motor and the sound caused by the motor, and to reduce the sound caused by the motor in the audible range.

Modification 12

For example, the motor control device 400D according to the above embodiment estimates the motor angle (interpolated electric angle) θs at equal intervals (division intervals) of 50 μs in which the control cycle Tc is divided into ⅕, but the aspect of the the motor control device is not limited to this. In the motor control device according to the present invention, the control cycle Tc may be divided by an arbitrary number of divisions, or may be divided at unequal intervals.

Modification 13

For example, in the motor control device 400D according to the above embodiment, the control cycle Tc is 250 μs (frequency 4 KHz), but the aspect of the motor control device is not limited to this. The motor control device according to the present invention can preferably reduce the sound caused by the motor in the audible range when the control cycle Tc is 100 μs or more and 250 μs or less. The control cycle is predicted to be shorter than 250 μs as the performance of the CPU or the like mounted on the motor control device improves or the number of poles of the motor to be controlled increases. When the control cycle Tc is 100 μs or more and 250 μs or less, as in the above embodiment, a problem occurs that a sound is generated due to the motor in the audible range. However, according to the motor control device according to the present invention, sounds resulting from vibrations caused by the brushless motor and sounds caused by motors can be suitably suppressed, and the sounds resulting from motors in the audible range can be reduced.

Fifth Embodiment

A fifth embodiment of the present invention will be described with reference to FIGS. 77 to 95.

Figure 77:
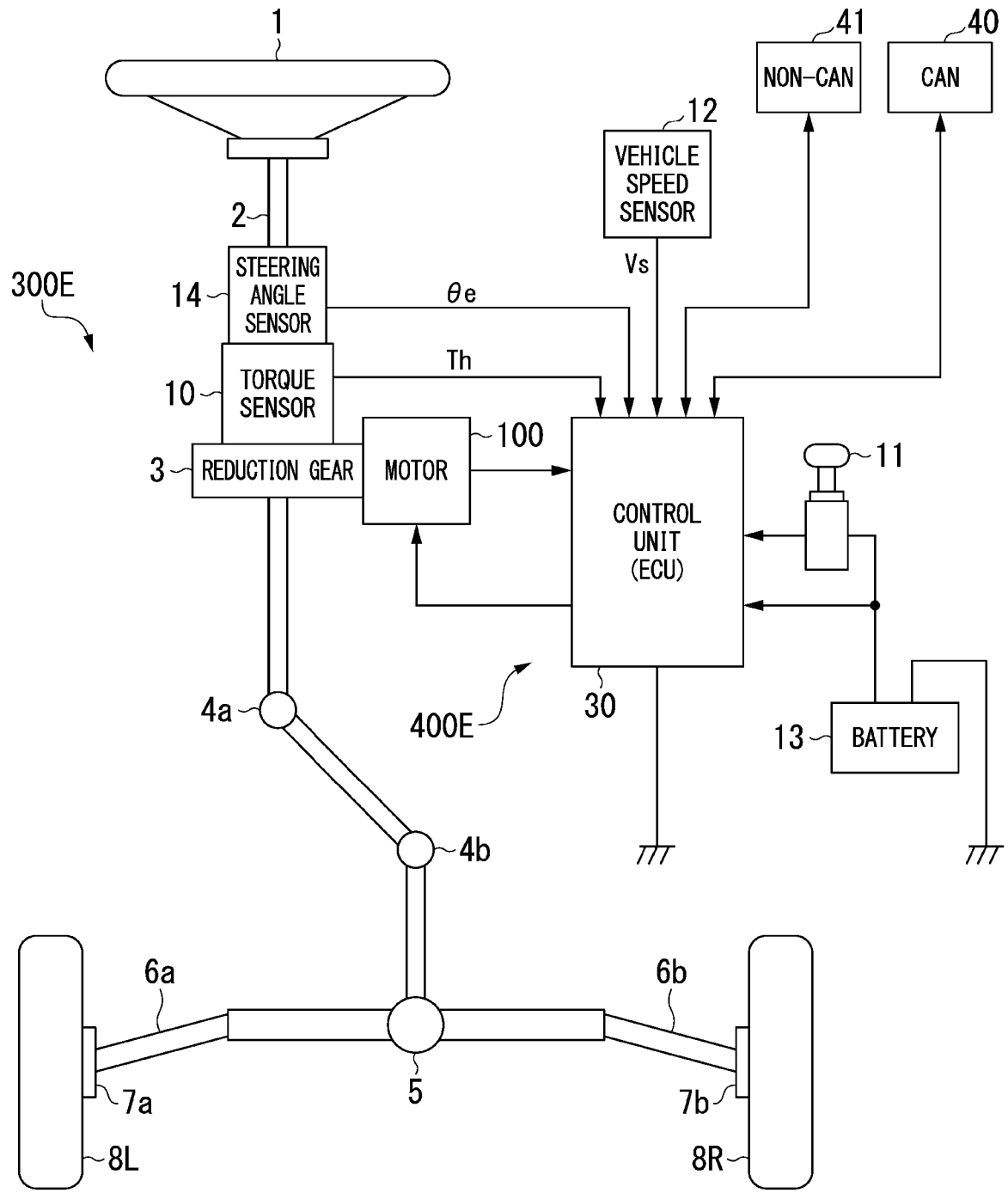
FIG. 77 is a schematic view showing a configuration of an electric power steering device mounted with a motor control device according to a fifth embodiment.

FIG. 77 is a schematic view showing a configuration of an electric power steering device 300E mounted with a motor control device 400E according to the present embodiment. The electric power steering device 300E is a column assist type electric power steering device in which an electric motor and a reduction mechanism are disposed in a column portion (steering shaft).

[Electric Power Steering Device 300E]

The electric power steering device 300E is connected to the steering wheels 8L and 8R through the column axis (steering shaft, handle shaft) 2 of the steering wheel 1, the reduction gear 3, the universal joints 4a and 4b, the pinion rack mechanism 5, the tie rods 6a and 6b, and further the hub units 7a and 7b. In addition, a steering angle sensor 14 for detecting a steering angle θe of the steering wheel 1 and a torque sensor 10 for detecting a steering torque Th of the steering wheel 1 are provided on the column shaft 2, and a motor 100 that assists the steering force of the handle 1 is connected to the column shaft 2 via the reduction gear 3. To the control unit (ECU) 30 that controls the electric power steering device 300E, electric power is supplied from the battery 13 and an ignition key signal is input through the ignition key 11.

The control unit 30 calculates the current command value of the assist (steering assist) command based on the steering torque Th detected by the torque sensor 10 and the vehicle speed Vs detected by the vehicle speed sensor 12, and controls the motor 100 by a voltage control command value Vref which is the calculated current command value subjected to compensation or the like. The steering angle sensor 14 is not essential and may not be disposed, and the steering angle (motor angle) θe can be obtained from a rotation sensor such as a resolver connected to the motor 100.

The control unit 30 mainly includes a program executable computer including a central processing unit (CPU) (including an MPU (Micro Processor Unit), an MCU (Micro Controller Unit), or the like).

The control unit 30 includes circuits such as an inverter 161 that drives the motor 100, a motor current detection circuit 162 that detects the current of the motor 100, and an angle detection unit 110A that detects the motor angle θe of the motor 100. These circuits may be mounted on the motor 100 side.

The control unit 30 is connected to a CAN (Controller Area Network) 40 that transmits and receives various information of the vehicle, and the vehicle speed Vs can also be received from the CAN 40. The control unit 30 can also be connected to a non-CAN 41 that transmits and receives communications other than the CAN 40, analog/digital signals, radio waves, or the like.

The motor 100 is a three-phase brushless motor that is mainly used as an actuator of the electric power steering device 300C in recent years. The motor 100 is controlled by a vector control method using space vector drive. In the vector control method using space vector drive, the q axis for controlling the torque, which is the coordinate axis of the rotor of the motor 100, and the d axis for controlling the strength of the magnetic field are set independently, and since the dq axis is 90°, the current corresponding to each axis (d-axis current command value Iref_d, q-axis current command value Iref_q) is controlled by the vector.

[Motor Control Device 400E]

Figure 78:
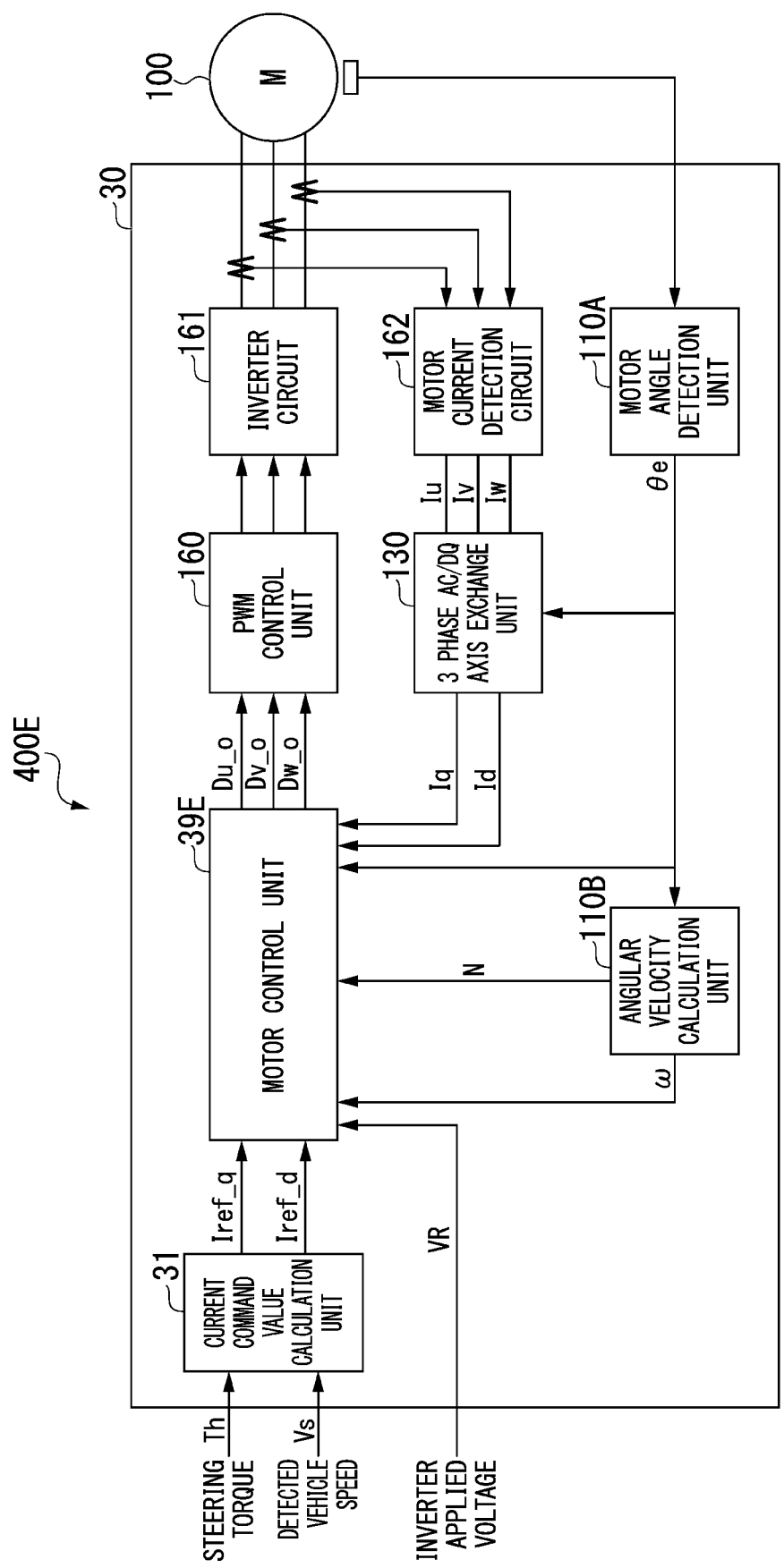
FIG. 78 is a functional configuration diagram of a motor control device configured by a control unit of the electric power steering device.

FIG. 78 is a functional configuration diagram of a motor control device 400E configured by the control unit 30. The function of the motor control device 400E is realized by appropriately combining a program executed by a CPU or the like and an electronic circuit such as an inverter. The functions described as the electronic circuit in the following description may be realized as a program executed by a CPU or the like.

The motor control device 400E performs drive control of the motor 100. The motor control device 400E includes a current command value computation unit 31, a motor control unit 39E, a PWM control unit 160, an inverter 161, a motor current detection circuit 162, a motor angle detection unit 110A, an angular velocity computation unit 110B, and a three-phase alternating current/dq axis conversion unit 130.

The current command value computation unit 31 outputs a dq axis current command value Iref_m (m=d, q) of two axes (dq axis coordinate system) calculated using an assist map or the like based on the steering torque Th, the vehicle speed Vs, or the like, to the motor control unit 39E.

The motor control unit 39E calculates a voltage control command value Vref_mb (m=d, q) subjected to dead time compensation from the input dq-axis current command value Iref_m (m=d, q), the motor angle θe, the motor rotation speed N, or the like. Further, the motor control unit 39E calculates three phase Duty command values Du_o, Dv_o, Dw_o by space vector modulation from the voltage control command value Vref_mb (m=d, q) or the like, and outputs them to the PWM control unit 160.

Figure 79:
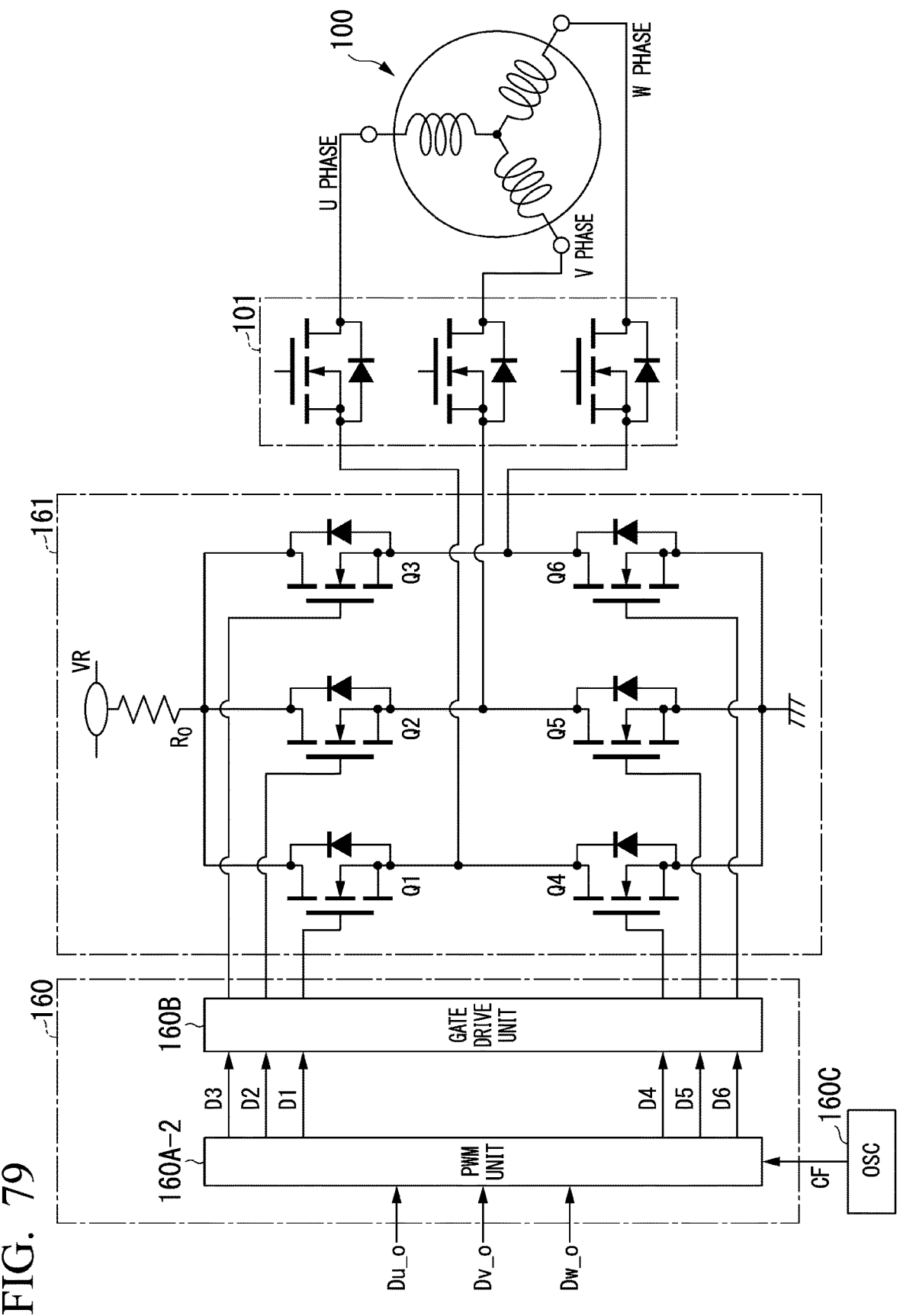
FIG. 79 is a block diagram of a PWM control unit and an inverter of the motor control device.

FIG. 79 is a block diagram of PWM control unit 160 and inverter 161.

As shown in FIG. 79, the inverter 161 is configured by a three-phase bridge of FETs, and drives the motor 100 by being turned ON/OFF with PWM-Duty values D1 to D6. Between the inverter 161 and the motor 100, a motor switch 101 for interrupting the supply of current when the assist control is stopped or the like is interposed. The upper arm is configured by FETs Q1, Q2 and Q3 as switching elements, and the lower arm is configured by FETs Q4, Q5 and Q6. Also, the FETs Q1 and Q4 are U-phase drive elements, the FETs Q2 and Q5 are V-phase drive elements, and the FETs Q3 and Q6 are W-phase drive elements.

As shown in FIG. 79, the PWM control unit 160 drives and controls the motor 100 via an inverter (inverter applied voltage VR) 161 having a bridge configuration of upper and lower arms as shown in FIG. 79, based on the input three-phase Duty command values Du_o, Dv_o, and Dw_o. As shown in FIG. 79, the PWM control unit 160 includes a PWM unit 160A-2 and a gate drive unit 160B.

As shown in FIG. 79, the PWM unit 160A-2 calculates three-phase PWM-Duty values D1 to D6 according to predetermined equations for the three-phase Duty command values Du_o, Dv_o, and Dw_o. A modulation signal (carrier) CF of, for example, a triangular wave is input to the PWM unit 160A-2 from the oscillation unit 160C, and the PWM unit 160A-2 calculates PWM-Duty values D1 to D6 in synchronization with the modulation signal CF.

As shown in FIG. 79, the gate driver 160B outputs PWM-Duty values D1 to D6 to drive the gates of the FETs Q1 to Q6 which are drive elements.

Since the electric power steering device 300E is an in-vehicle product, the operating temperature range is wide, and from the viewpoint of fail-safe, the inverter 161 for driving the motor 100 needs to have a longer dead time (industrial equipment <EPS) than that for general industrial use represented by home appliances. In general, switching elements (for example, FETs (Field-Effect Transistors)) have a delay time at the time of OFF, and therefore, if the switching elements of the upper and lower arms are simultaneously switched OFF/ON, there may be a situation where the DC link is short-circuited. In order to prevent occurrence of this situation, a time (dead time) in which the switching elements of both the upper and lower arms are turned off is provided.

When the dead time compensation as described above is performed, the current waveform is distorted and the response of current control and steering feeling deteriorate, and for example, when the steering is slowly performed with the steering wheel in the vicinity of the on-center, discontinuous steering feeling due to torque ripple or the like may occur.

The current detector 162 detects three-phase motor currents Iu, Iv, Iw of the motor 100, as shown in FIG. 78. The detected three-phase motor currents Iu, Iv, Iw are input to the three-phase AC/dq axis converter 130 and converted into two-phase feedback dq axis currents Id and Iq. The two-phase feedback dq axis currents Id and Iq are input to the motor control unit 39E.

The motor angle detection unit 110A calculates and acquires the motor angle θe of the motor 100, if necessary. The motor angle θe is input to the angular velocity computation unit 110B, the motor control unit 39E, and the three-phase AC/dq axis conversion unit 130.

The angular velocity computation unit 110B obtains the motor rotation speed N and the motor angular velocity ω from the motor angle θe by calculation. The motor rotation speed N and the motor angular velocity ω are input to the motor control unit 39E.

[Motor Control Unit 39E]

Figure 80:
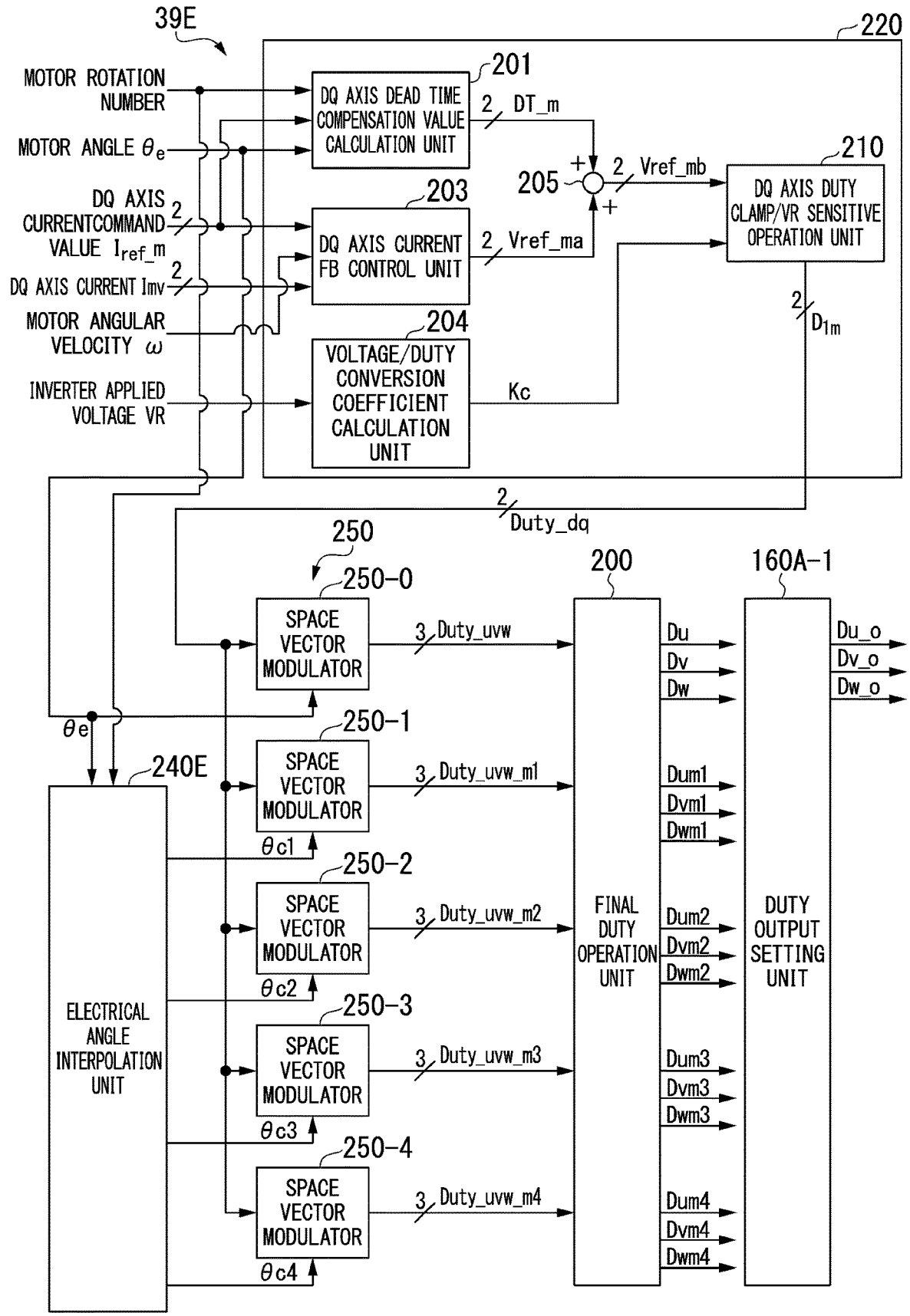
FIG. 80 is a functional configuration diagram of a motor control unit of the motor control device.

FIG. 80 is a functional configuration diagram of the motor control unit 39E.

The motor control unit 39E includes a voltage command value computation unit 220, an electric angle interpolation unit 240E, a space vector modulation unit 250, a final Duty computation unit 200, and a Duty output setting unit 160A-1.

The voltage command value computation unit 220 includes a dq axis dead time compensation value computation unit 201, a dq axis current feedback control unit 203, a voltage/duty conversion coefficient computation unit 204, an adding unit 205, and a dq axis duty clamp/VR sensitivity computation unit 210.

The voltage command value computation unit 220 calculates a voltage command value using the motor electric angle θe and the motor rotation speed θe acquired from the motor 100 for each control cycle Tc, the current command value Iref_m (m=d, q), or the like (voltage command value calculation step).

The dq axis dead time compensation value computation unit 201 outputs the dq axis dead time compensation value DT_m calculated from the input motor rotation speed N, the motor angle (electric angle) θe, and the dq axis current command value Iref_m (m=d, q). (M=d, q), to the adding unit 205.

The dq-axis current feedback control unit 203 outputs a voltage control command value Vref_ma (m=d, q) calculated from the input motor angular velocity ω, the dq-axis current command value Iref_m (m=d, q), and the two-phase feedback dq-axis current Id and Iq, to the adding unit 205.

The voltage/duty conversion coefficient computation unit 204 calculates a voltage/Duty conversion coefficient Kc in accordance with the inverter applied voltage VR.

The adding unit 205 outputs a voltage control command value Vref_mb (m=d, q) obtained by adding the dq-axis dead time compensation value DT_m (m=d, q) and the voltage control command value Vref_ma (m=d, q), to the three-phase Duty clamp/VR sensitive computation unit 210.

The dq axis Duty clamp/VR (inverter applied voltage) sensitive computation unit 210 inputs the Duty command value D1m (m=d, q) (Duty_d, Duty_q) for dq axis normal calculated by multiplying the voltage control command value Vref_mb (m=d, q) and the voltage/Duty conversion coefficient Kc, to the space vector modulation unit 250.

[Electric Angle Interpolation Unit 240E]

Figure 81:
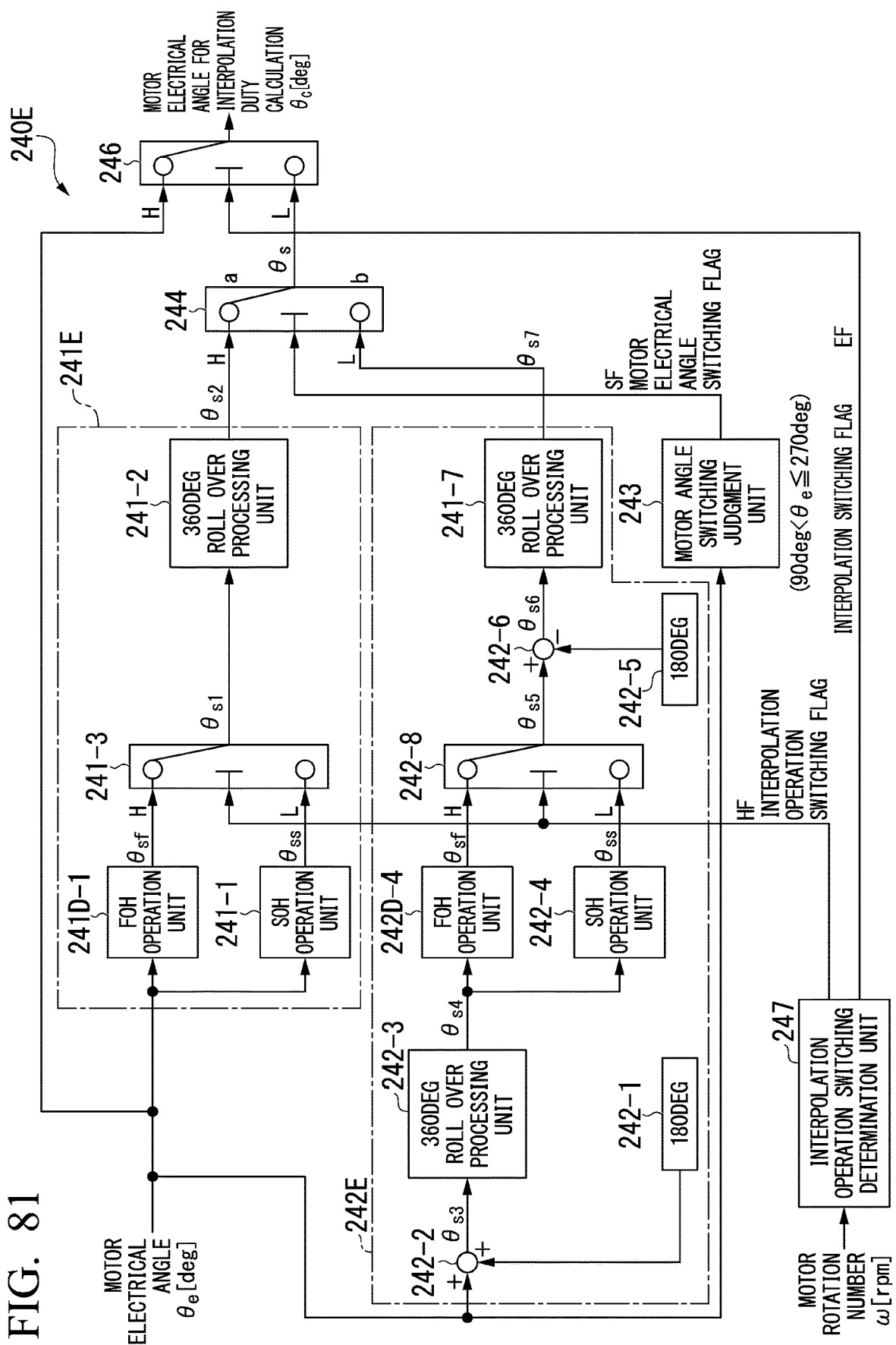
FIG. 81 is a block diagram of an electric angle interpolation unit of the motor control unit.
Figure 82:
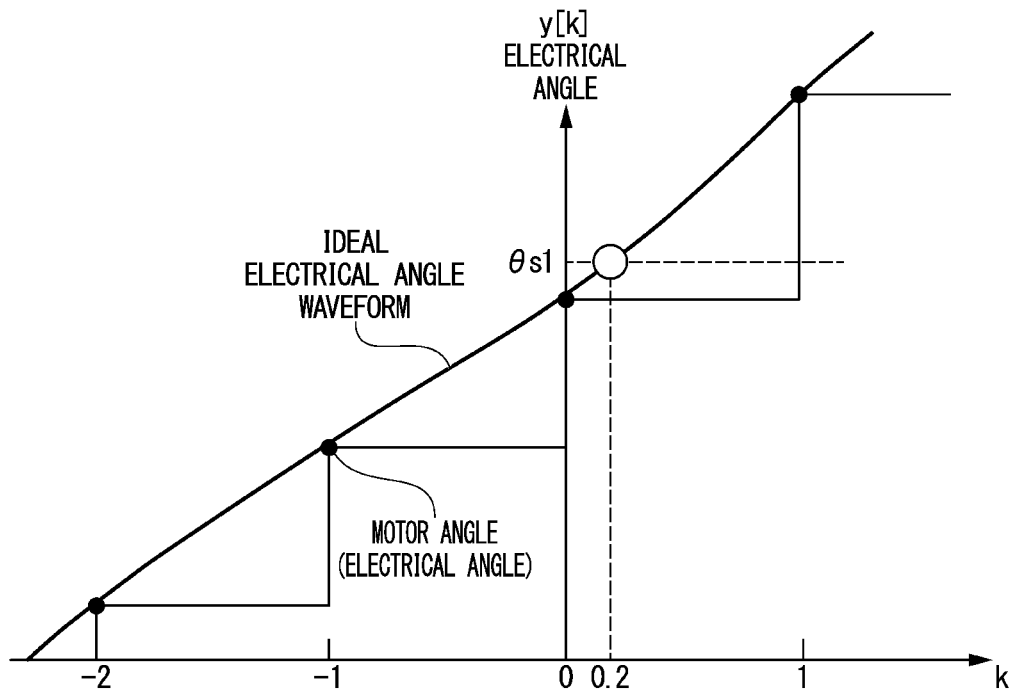
FIG. 82 is a graph showing an interpolated electric angle 1 calculated by the electric angle interpolation unit.
Figure 83:
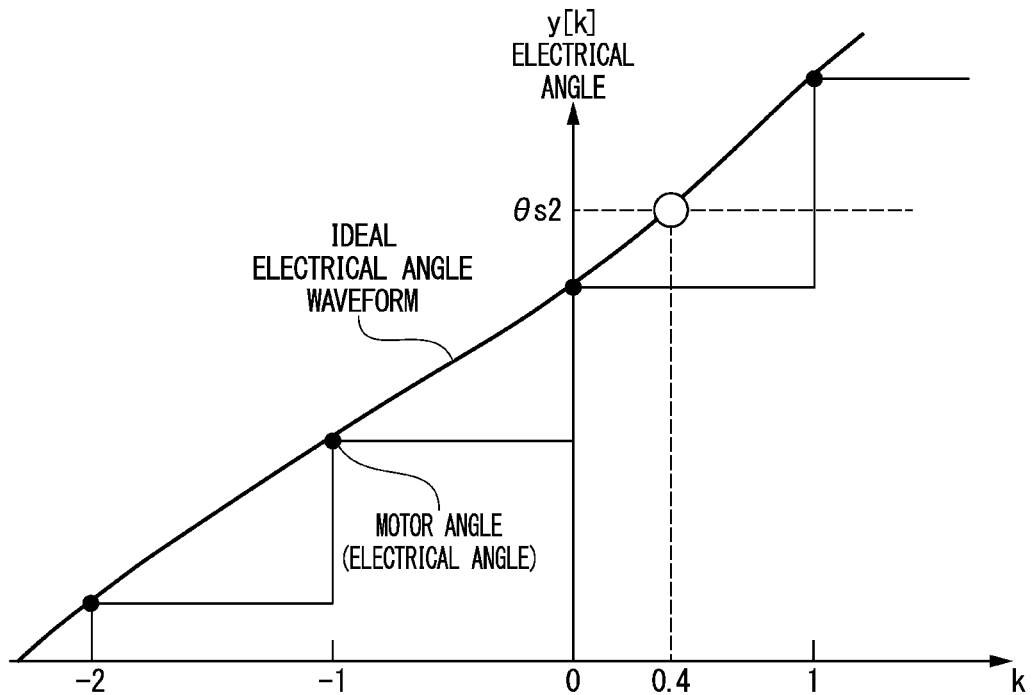
FIG. 83 is a graph showing an interpolated electric angle 2 calculated by the electric angle interpolation unit.
Figure 84:
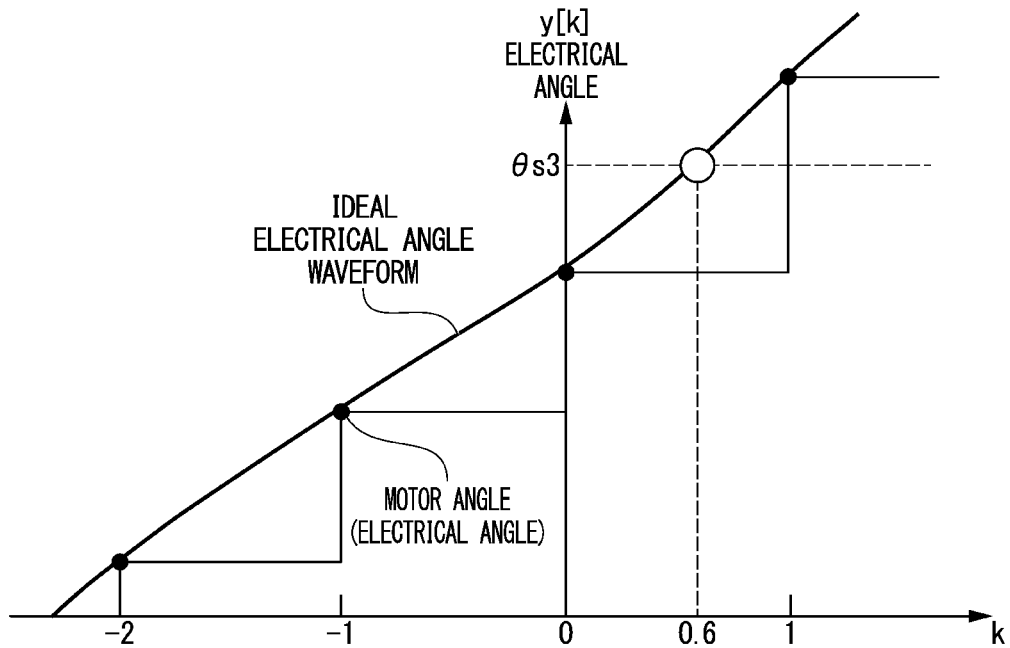
FIG. 84 is a graph showing an interpolated electric angle 3 calculated by the electric angle interpolation unit.
Figure 85:
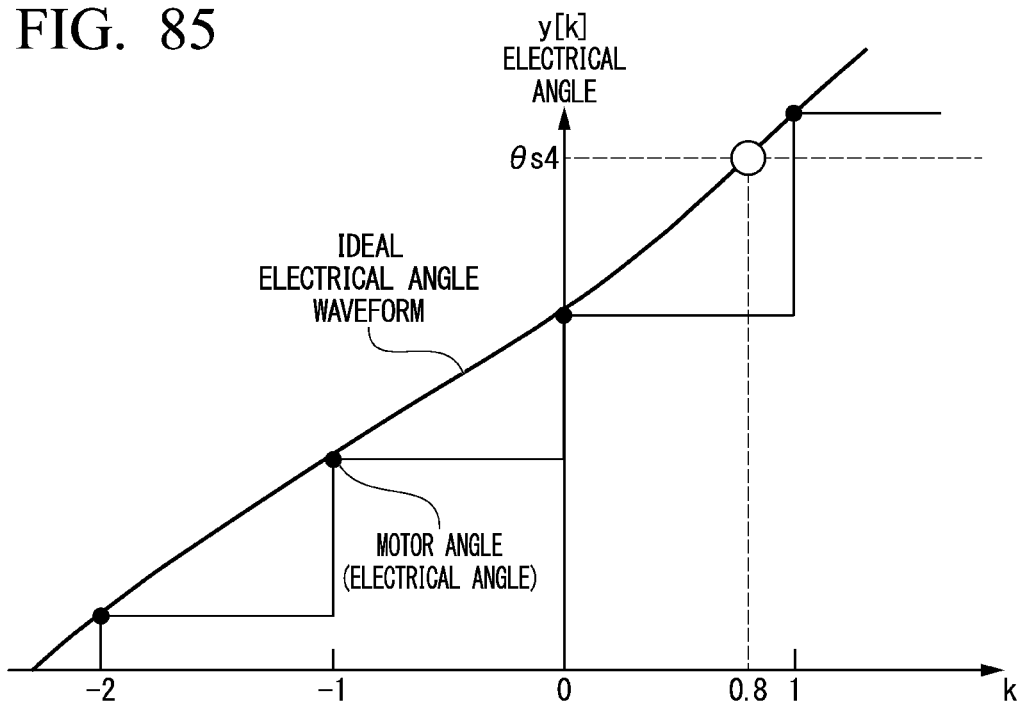
FIG. 85 is a graph showing an interpolated electric angle 4 calculated by the electric angle interpolation unit.

FIG. 81 is a block diagram of the electric angle interpolation unit 240E.

The electric angle interpolation unit 240E calculates a motor angle (interpolated electric angle) θc for interpolation Duty calculation from the input motor angle θe, and outputs the calculated motor angle to the space vector modulation unit 250 (electric angle interpolation step).

The electric angle interpolation unit 240E performs quadratic function interpolation calculation (Second Order Hold calculation: for the following, the quadratic function interpolation calculation may simply referred to as "SOH calculation") with respect to the motor angle θe detected in the control cycle 250 μs (Tc), to estimate the motor angle (interpolated electric angle) θs at an interval (division interval) of 50 μs obtained by dividing the control cycle Tc by ⅕, and calculates the interpolated Duty command value is calculated based on the estimated motor angle (interpolated electric angle) θs.

In the dq-axis current control performed by the electric angle interpolation unit 240E, the Duty command value after space vector modulation is not set as an interpolation target. This is because the Duty command value after space vector modulation includes a dead time compensation value with a transient change and a noise component caused by the distortion component of the third high frequency due to space vector modulation, or the like, and interpolated Duty command value calculated by directly interpolating the Duty command value is a value including large noise.

As shown in FIG. 81, the electric angle interpolation unit 240E includes an arithmetic processing unit 241E that receives the motor angle θe and directly performs SOH calculation or FOH calculation, an offset-added calculation processing unit 242E that receives the motor angle θe and performs offset processing or the like to perform an SOH calculation or an FOH calculation, a motor angle switching determination unit 243 that determines whether the motor angle θe is in a range greater than 90° and less than or equal to 270° or in any other range to output a switching flag (electric angle switching flag) SF, a switching unit 244 that switches the contacts a and b by the switching flag SF and outputs a motor angle (interpolated electric angle) θs for interpolation Duty calculation, an interpolation calculation switching determination unit 247 that outputs an interpolation calculation switching flag HF and an interpolation switching flag EF, and a second switching unit 246 that outputs a final motor angle (interpolated electric angle) θc for interpolation Duty calculation.

FIGS. 82 to 85 show four interpolated electric angles (hereinafter referred to as "interpolated electric angles 1 to 4") estimated at intervals of 50 μs in which the control cycle Tc is divided into ⅕. By calculating the interpolated electric angles 1 to 4 (θs 1 to 4) using the motor electric angle θe detected before, the change of the electric angle can be smoothed.

In the following description, four interpolated electric angles 1 to 4 estimated by SOH calculation at intervals of 50 μs in which the control cycle Tc is divided into ⅕ will be "θss 1 to 4". Further, four interpolated electric angles 1 to 4 estimated by FOH calculation at intervals of 50 μs in which the control cycle Tc is divided into ⅕ are set as "θsf 1 to 4".

The function y [k] used for the SOH calculation is expressed by Equation 36. y [k] is a function representing the motor angle (electric angle) at the control cycle number k.

[Equation 36]

$$y[k] = ak^2 + bk + c \quad \text{(EQUATION 36)}$$

Equation 37 is established by expressing as the second previous value y [−2], the previous value y [−1], and the current value y [0], using the coefficients a, b, c.

[Equation 37]

$$\begin{cases} y[0] = c \\ y[-1] = a - b + c \\ y[-2] = 4a - 2b + c \end{cases} \quad \text{(EQUATION 37)}$$

By arranging the above equations, a, b, c are expressed as in Equation 38 using y [0], y [−1], y [−2].

[Equation 38]

$$\begin{cases} a = (y[-2] - 2y[-1] + y[0])/2 \\ b = (y[-2] - 4y[-1] + 3y[0])/2 \\ c = y[0] \end{cases} \quad \text{(EQUATION 38)}$$

Substituting Equation 38 into Equation 36 yields Equation 39.

[Equation 39]

$$y[k] = ak^2 + bk + c = ((k^2 + 3k + 2)/2)y[0] + ((-2k^2 - 4k)/2)y[-1] + ((k^2 + k)/2)y[-2] \quad \text{(EQUATION 39)}$$

Since the interpolated electric angle 1 (θss1) is an electric angle after 50 μs (Tc*{⅕}) from the control cycle Tc, it can be calculated by substituting k=0.2 into Equation 39.

[Equation 40]

$$y[0.2] = (33y[0] - 11y[-1] + 3y[-2])/25 \quad \text{(EQUATION 40)}$$

Since the interpolated electric angle 2 (θss2) is an electric angle after 100 μs (Tc*{⅖}) from the control cycle Tc, it can be calculated by substituting k=0.4 into Equation 39.

[Equation 41]

$$y[0.4] = (42y[0] - 24y[-1] + 7y[-2])/25 \quad \text{(EQUATION 41)}$$

The interpolated electric angle 3 (θss3) is an electric angle after 150 μs (Tc*{⅗}) from the control cycle Tc, and thus can be calculated by substituting k=0.6 into Equation 39.

[Equation 42]

$$y[0.6] = (52y[0] - 39y[-1] + 12y[-2])/25 \quad \text{(EQUATION 42)}$$

Since the interpolated electric angle 4 (θss4) is an electric angle after 200 μs (Tc*{⅘}) from the control cycle Tc, it can be calculated by substituting k=0.8 into Equation 39.

[Equation 43]

$$y[0.8] = (63y[0] - 56y[-1] + 18y[-2])/25 \quad \text{(EQUATION 43)}$$

Figure 86:
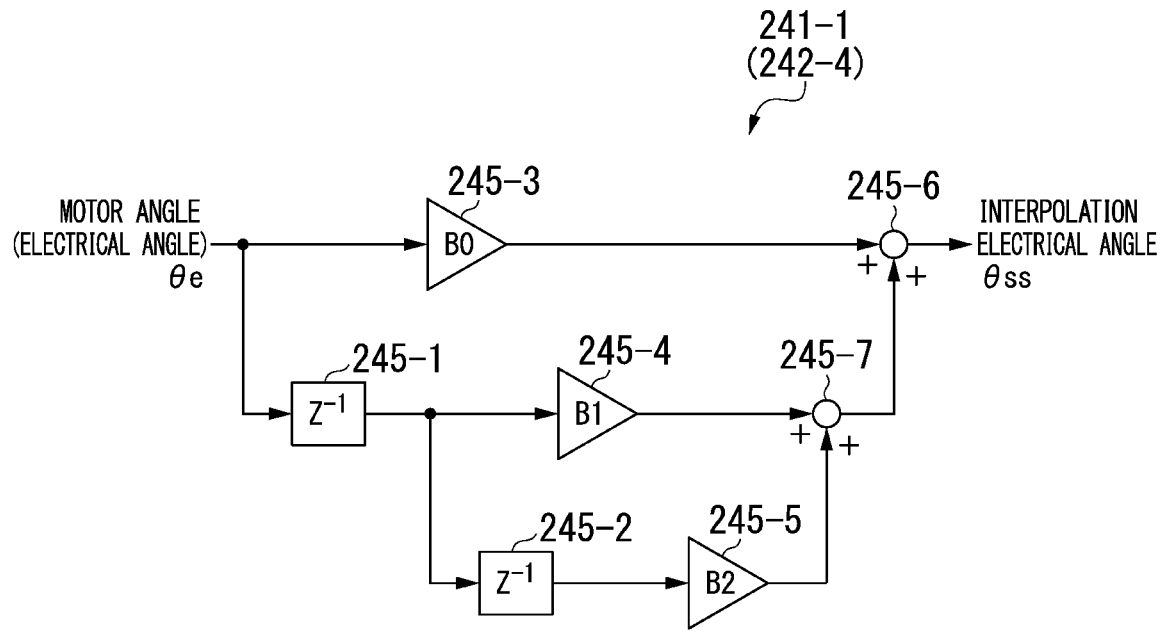
FIG. 86 is a functional block diagram of an SOH computation unit of the electric angle interpolation unit.

FIG. 86 is a functional block diagram of the SOH computation unit 241-1 (242-4).

The SOH computation unit 241-1 includes a holding unit 245-1 and a holding unit 245-2 of the previous value of the motor angle θe, a coefficient unit B0 (245-3), a coefficient unit B1 (245-4), a coefficient unit B2 (245-5), an adding unit 245-6, and an adding unit 245-7.

The motor angle θe is input to the coefficient unit B0 (245-3) and the holding unit 245-1, and the holding value of the holding unit 245-1 is input to the coefficient unit B1 (245-4) and the holding unit 245-2. The holding value of holding unit 245-2 is input to coefficient unit B2 (245-5), and the outputs values of the coefficient unit B0 (245-3), the coefficient unit B1 (245-4) and the coefficient unit B2 (245-5) are added by the adding unit 245-7 and the adding unit 245-6, and are output as the interpolated electric angle θss.

The coefficients B0, B1, and B2 at the time of calculating the interpolated electric angles 1 to 4 (θ ss1 to 4) are expressed as shown in Table 4 by Equations 40 to 43.

TABLE 4

|  | B0 | B1 | B2 |
|---|---|---|---|
| INTERPOLATION ELECTRICAL ANGLE 1 ($\theta_{ss}1$) | $\frac{33}{25}$ | $-\frac{11}{25}$ | $\frac{3}{25}$ |
| INTERPOLATION ELECTRICAL ANGLE 2 ($\theta_{ss}2$) | $\frac{42}{25}$ | $-\frac{24}{25}$ | $\frac{7}{25}$ |
| INTERPOLATION ELECTRICAL ANGLE 3 ($\theta_{ss}3$) | $\frac{52}{25}$ | $-\frac{39}{25}$ | $\frac{12}{25}$ |
| INTERPOLATION ELECTRICAL ANGLE 4 ($\theta_{ss}4$) | $\frac{63}{25}$ | $-\frac{56}{25}$ | $\frac{18}{25}$ |

The function y [k] used for the FOH calculation is expressed by Equation 44. y [k] is a function representing the motor angle (electric angle) at the control cycle number k.

[Equation 44]

$$y[k] = ak + b \quad \text{(EQUATION 44)}$$

Equation 45 is established by expressing the previous value y [−1] and the current value y [0], using the coefficients a and b.

[Equation 45]

$$\begin{cases} y[0] = b \\ y[-1] = -a + b \end{cases} \quad \text{(EQUATION 45)}$$

By arranging the above equations, a and b are expressed as in Equation 46 using y [0] and y [−1].

[Equation 46]

$$\begin{cases} a = y[0] - y[-1] \\ b = y[0] \end{cases} \quad \text{(EQUATION 46)}$$

If Equation 46 is substituted into Equation 44, Equation 47 is obtained.

[Equation 47]

$$y[k] = (k+1)y[0] + (-k)y[-1] \quad \text{(EQUATION 47)}$$

Since the interpolated electric angle 1 (θsf1) is an electric angle after 50 μs (Tc*{1/5}) from the control cycle Tc, it can be calculated by substituting k=0.2 into Equation 47.

[Equation 48]

$$y[0.2] = 1.2y[0] - 0.2y[-1] \quad \text{(EQUATION 48)}$$

Since the interpolated electric angle 2 (θsf 2) is an electric angle after 100 μs (Tc*{2/5}) from the control cycle Tc, it can be calculated by substituting k=0.4 into Equation 47.

[Equation 49]

$$y[0.4] = 1.4y[0] - 0.4y[-1] \quad \text{(EQUATION 49)}$$

Since the interpolated electric angle 3 (θsf 3) is an electric angle after 150 μs (Tc*{3/5}) from the control cycle Tc, it can be calculated by substituting k=0.6 into Equation 47.

[Equation 50]

$$y[0.6] = 1.6y[0] - 0.6y[-1] \quad \text{(EQUATION 50)}$$

Since the interpolated electric angle 4 (θsf 4) is an electric angle after 200 μs (Tc*{4/5}) from the control cycle Tc, it can be calculated by substituting k=0.8 into Equation 47.

[Equation 51]

$$y[0.8] = 1.8y[0] - 0.8y[-1] \quad \text{(EQUATION 51)}$$

Figure 87:
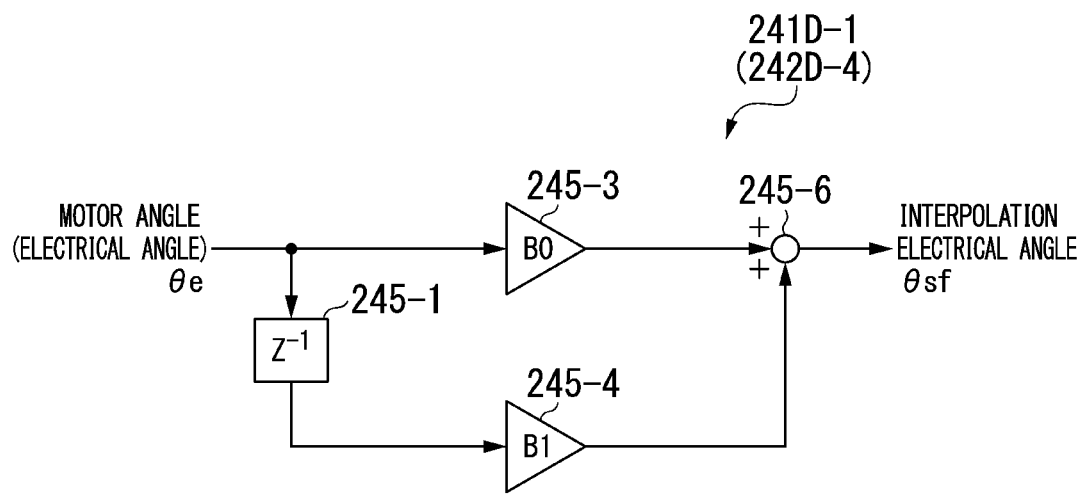
FIG. 87 is a functional block diagram of an FOH computation unit of the electric angle interpolation unit.

FIG. 87 is a functional block diagram of the FOH computation unit 241D-1 (242D-4).

The FOH computation unit 241D-1 includes a holding unit 245-1 and a holding unit 245-2 of the previous value of the motor angle θe, a coefficient unit B0 (245-3), a coefficient unit B1 (245-4), a coefficient unit B2 (245-5), an adding unit 245-6, and an adding unit 245-7.

The motor angle θe is input to the coefficient unit B0 (245-3) and the holding unit 245-1, and the holding value of the holding unit 245-1 is input to the coefficient unit B1 (245-4) and the holding unit 245-2. The holding value of holding unit 245-2 is input to coefficient unit B2 (245-5), and outputs values of the coefficient unit B0 (245-3), the coefficient unit B1 (245-4) and the coefficient unit B2 (245-5) are added by the adding unit 245-7 and the adding unit 245-6, and are output as the interpolated electric angle θsf.

The coefficients B0 and B1 at the time of calculating the interpolated electric angles 1 to 4 (θsf 1 to 4) are expressed as shown in Table 5 by Equations 48 to 51.

TABLE 5

|  | B0 | B1 |
|---|---|---|
| INTERPOLATION ELECTRICAL ANGLE 1 ($\theta_{sf}1$) | 1.2 | −0.2 |
| INTERPOLATION ELECTRICAL ANGLE 2 ($\theta_{sf}2$) | 1.4 | −0.4 |
| INTERPOLATION ELECTRICAL ANGLE 3 ($\theta_{sf}3$) | 1.6 | −0.6 |
| INTERPOLATION ELECTRICAL ANGLE 4 ($\theta_{sf}4$) | 1.8 | −0.8 |

The FOH calculation has a small amount of calculation processing compared to the SOH calculation, and the processing load when the control unit 30 executes is also small.

As shown in FIG. 81, the calculation processing unit 241 in the electric angle interpolation unit 240E includes an SOH computation unit 241-1 that receives the motor angle θe to perform the SOH calculation, an FOH computation unit 241D-1 that receives the motor angle θe to perform the FOH calculation, an interpolation calculation switching unit 241-3 that switches and outputs the output θss of the SOH computation unit 241-1 and the output θsf of the FOH computation unit 241D-1 based on the interpolation calculation switching flag HF, and a rollover processing unit 241-2 that performs rollover processing (waveform processing) on the motor angle θe1 output from the interpolation calculation switching unit 241-3. The motor angle θe2 subjected to rollover processing by the rollover processing unit 241-2 is input to the contact a of the switching unit 244.

When the interpolation calculation switching flag HF is H, the interpolation calculation switching unit 241-3 outputs the output θsf of the FOH computation unit 241D-1 as θs1. When the interpolation calculation switching flag HF is L, the interpolation calculation switching unit 241-3 outputs the output θss of the SOH computation unit 241-1 as θs1.

As shown in FIG. 81, the offset-added calculation processing unit 242 includes an adding unit 242-2 that receives the motor angle θe and performs an offset processing with coefficient 180° input from the fixing unit 242-1, a rollover processing unit 242-3 that performs rollover processing (waveform processing) on the motor angle θe3 input from the adding unit 242-2, an SOH computation unit 242-4 that corrects the motor angle θe4 input from the rollover processing unit 242-3, an FOH computation unit 242D-4 that corrects the motor angle θe4, an interpolation calculation switching unit 242-8 that switches and outputs the output θss of the SOH computation unit 242-4 and the output θsf of the FOH computation unit 242D-4 based on the interpolation calculation switching flag HF, a subtraction unit 242-6 that receives the motor angle θe5 from the interpolation calculation switching unit 242-8 and performs offset return processing with coefficient 180° input from the fixing unit 242-5, and a rollover processing unit 242-7 that performs rollover processing (waveform processing) on the motor angle θe6 input from the subtraction unit 242-6. The motor angle θe7 subjected to the rollover processing in the rollover processing unit 242-7 is input to the contact b of the switching unit 244.

When the interpolation calculation switching flag HF is H, the interpolation calculation switching unit 242-8 outputs the output θsf of the FOH computation unit 242D-4 as θs5. When the interpolation calculation switching flag HF is L, the interpolation calculation switching unit 242-8 outputs the output θss of the SOH computation unit 242-4 as θs5.

The motor angle θe2 from the rollover processing unit 241-2 of the calculation processing unit 241E is input to the contact a of the switching unit 244, and the motor angle θe7 from the rollover processing unit 242-7 of the offset-added calculation processing unit 242E is input to the contact b of the switching unit 244. The contacts a and b of the switching unit 244 are switched by the switching flag (electric angle switching flag) SF ("H", "L") from the motor angle switching determination unit 243, and a motor angle (interpolated electric angle) θs for interpolation Duty calculation is output from the switching unit 244.

The motor angle (electric angle) θe returns to 0° if it exceeds 360° when moving from the current motor angle to the next motor angle. At this time, since a transient angle variation occurs, if SOH calculation is performed using the current motor angle, an accurate interpolation calculation result may not be obtained. In order to avoid this problem, the electric angle interpolation unit 240E switches the calculation output (motor angle θs for interpolation Duty calculation) according to the motor angle θe of the input electric angle.

When the motor angle θe is in the range of 90°<θe≤270°, there is no transient angle fluctuation in the motor angle θe. Therefore, the electric angle interpolation unit 240E performs the SOH calculation on the input motor angle θe.

On the other hand, when the motor angle θe is in the range of 0°≤θe≤90° or 270°<θe≤360°, there is a transient angle fluctuation in the motor angle θe. Therefore, the electric angle interpolation unit 240E offsets the motor angle θe by 180°, converts it into a continuous angle signal, performs SOH calculation, and performs 180° offset return processing on the interpolation calculation result after the SOH calculation.

The motor angle switching determination unit 243 generates the switching flag SF ("H" when 90°<θe≤270°, "L" when 0°≤θe≤90° or 270°<θe≤360°) from the input motor angle θe.

The switching unit 244 selects and outputs the motor angle (interpolated electric angle) θs for the interpolation Duty calculation after the SOH calculation based on the switching flag SF.

That is, when 90°<θe≤270°, the switching unit 244 is controlled as in Equation 52, and outputs the motor angle θe2 as the motor angle θs for interpolation Duty calculation.

[Equation 52]

$$SF=H(90°<\theta_e \leq 270°) \qquad \text{(EQUATION 52)}$$

Further, when 0°≤θe≤90° or 270°<θe≤360°, the switching unit 244 is controlled as in Equation 53, and outputs the motor angle θe7 as the motor angle θs for interpolation Duty calculation.

[Equation 53]

$$SF=L(0°\leq\theta_e\leq 90° \text{ OR } 270°<\theta_e\leq 360°) \qquad \text{(EQUATION 53)}$$

The second switching unit 246 selects and outputs a final motor angle (interpolated electric angle) θc for interpolation Duty calculation based on the interpolation switching flag EF. When the interpolation switching flag EF is H, the second switching unit 246 outputs the motor angle (electric angle) θe as θc. When the interpolation switching flag EF is L, the second switching unit 246 outputs the motor angle θs for interpolation Duty calculation as θc.

Figure 88:
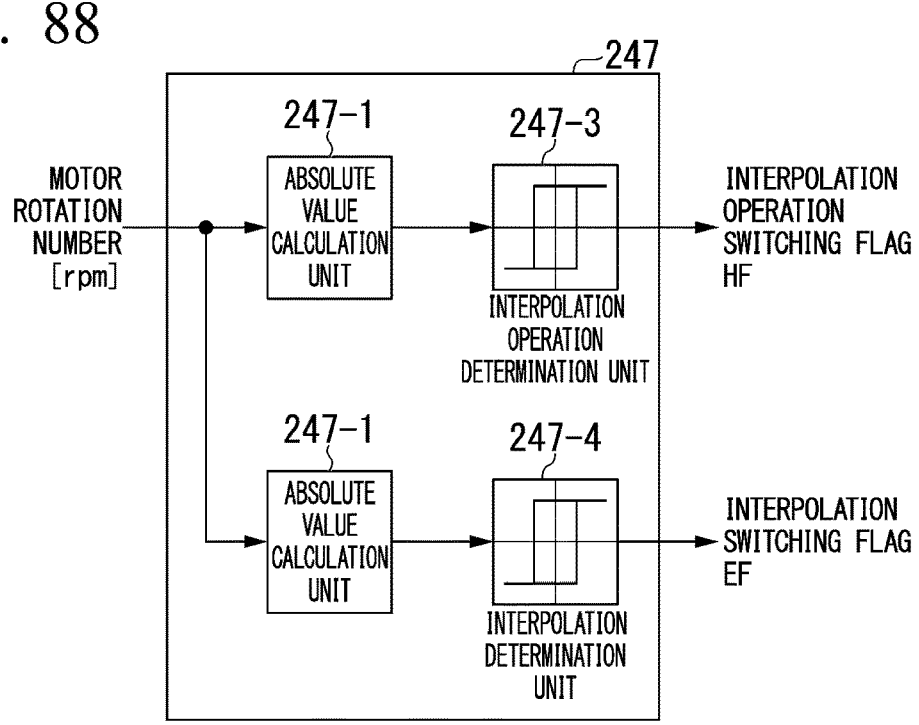
FIG. 88 is a functional configuration diagram of an interpolation calculation switching determination unit of the electric angle interpolation unit.

FIG. 88 is a functional configuration diagram of the interpolation calculation switching determination unit 247.

The interpolation calculation switching determination unit 247 includes an absolute value computation unit 247-1 that calculates an absolute value of the input motor rotation speed N, an interpolation calculation determination unit 247-3, and an interpolation determination unit 247-4.

The interpolation calculation determination unit 247-3 outputs the interpolation calculation switching flag HF based on the motor rotation speed output by the absolute value computation unit 247-1. The interpolation calculation determination unit 247-3 switches the interpolation calculation switch flag HF to "H" when it is determined that the SOH calculation is not appropriate, such as (1) when it is determined that the motor rotation speed N is high (the motor rotation speed N is equal to or higher than the first rotation speed) and the processing required for the SOH calculation exceeds the performance limit of the control unit 30, or (2) when it is determined that a lot of noise is included in the result of the SOH calculation using the motor angle θe used in the previous and previous SOH calculations. Otherwise, the interpolation calculation determination unit 247-3 switches the interpolation calculation switching flag HF to "L".

Since a transient angle variation occurs in the motor electric angle θe when the motor electric angle θe switches from 360 [deg] to 0 [deg], the electric angle interpolation unit 240E selects and outputs the interpolated electric angle θs which does not include the influence of the typical angle variation by the output switching function of the switching unit 244. However, when the motor rotation speed N becomes high (for example, the angle 45 [deg] or more fluctuating every control cycle Tc), the calculation processing necessary for the motor angle switching determination unit 243 or the like exceeds the performance limit of the control unit 30, and the motor angle switching determination unit 243 may not be able to accurately determine the condition of 90°<θe≤270°. Therefore, when the rotation speed becomes high, it becomes difficult for the electric angle interpolation unit 240E to output the interpolated electric angle θs which does not include the influence of the transient angle variation. In this case, the interpolation calculation determination unit 247-3 switches the interpolation calculation switching flag HF to "H" and switches the SOH calculation to the FOH calculation. By switching to the FOH calculation, the calculation processing load of the control unit 30 is reduced, and the determination of the motor angle switching determination unit 243 is normalized.

Further, the SOH calculation uses the motor angle θe at the time of calculation and the motor angle θe used in the previous and second-previous SOH calculations. Therefore, it is necessary that all of the three types of motor angles θe used for the SOH calculation do not include the influence of transient angle variations. As the motor rotation speed N becomes higher, the probability that one of the three types of motor angles θe includes the influence of the transient angle change becomes high, and it becomes difficult for the electric angle interpolation unit 240E to output the interpolated electric angle θs that does not include the influence of the transient angle fluctuation. In this case, the interpolation calculation determination unit 247-3 switches the interpolation calculation switching flag HF to "H" and switches the SOH calculation to the FOH calculation. The FOH calculation uses the motor angle θe at the time of calculation and the motor angle θe used in the previous SOH calculation. Therefore, it is only necessary that the two motor angles θe used for the FOH calculation do not include the influence of transient angle variation. By switching to FOH calculation, the probability that one of the motor angles θe used for the calculation includes the influence of the transient angle change is low, and the probability that the interpolated electric angle θs that does not include the influence of transient angle fluctuation is output becomes high.

Further, at the time of low/medium speed rotation, the ratio of H and L of the electric angle determination flag SF is 1:1, but when the motor rotation speed N is high, the angle fluctuation is large, so the ratio of H to L in the electric angle determination flag SF may be 5:3, 3:5, or the like. In this case, the switching unit 244 operating based on the electric angle determination flag SF may select and output the interpolated electric angle θs including the influence of the transient angle change. In this case, the interpolation calculation determination unit 247-3 switches the interpolation calculation switching flag HF to "H" and switches the SOH calculation to the FOH calculation. By switching to the FOH calculation, as described above, the probability that any one of the motor angles θe used for the calculation includes the influence of the transient angle change is reduced. Therefore, even when the ratio of H and L of the electric angle determination flag SF fluctuates, the probability of outputting the interpolated electric angle θs which does not include the influence of the transient angle fluctuation becomes high.

Further, depending on the type of motor 100, the noise of the angle sensor may increase or the linearity error of the angle may increase in a high speed rotation speed range (for example, 5000 [rpm] or more). In these cases, the SOH calculation is more likely to include noise in the result as compared to the FOH calculation. In this case, the interpolation calculation determination unit 247-3 switches the interpolation calculation switching flag HF to "H" and switches the SOH calculation to the FOH calculation. The FOH calculation uses the motor angle θe at the time of calculation and the motor angle θe used in the previous SOH calculation. Therefore, it is only necessary that the two motor angles θe used for the FOH calculation do not include the influence of transient angle variation. By switching to the FOH calculation, the probability that noise is included in the result of the calculation can be reduced.

Further, when the motor angle θe is not sampled in time due to the problem of the motor control device 400E, the interpolation calculation determination unit 247-3 switches the interpolation calculation switching flag HF to "H" and switches the SOH calculation to the FOH calculation. By switching to the FOH calculation, the calculation processing load of the control unit 30 is reduced, and it is possible to reliably sample the motor angle θe.

The interpolation determination unit 247-4 outputs the interpolation switching flag EF based on the motor rotation speed output by the absolute value computation unit 247-1. In the high speed rotation speed range (for example, 9000 [rpm] or more) where the SOH calculation and the FOH calculation cannot be performed clearly (when the motor rotation speed N becomes equal to or more than the second rotation speed), the interpolation determining unit 247-4 switches the interpolation switching flag EF to H. In the high-speed rotational number range where the SOH calculation and the FOH calculation cannot be clearly performed, the electric angle interpolation unit 240E does not output the interpolation calculation result because there is a high possibility that the calculation is not performed correctly.

In addition, due to the problem of the motor control device 400E, the control unit 30 is subjected to an excessive processing load, and the interpolation determination unit 247-4 switches the interpolation switching flag EF to H even when the processing resources for performing the SOH calculation and the FOH calculation are insufficient.

Figure 89:
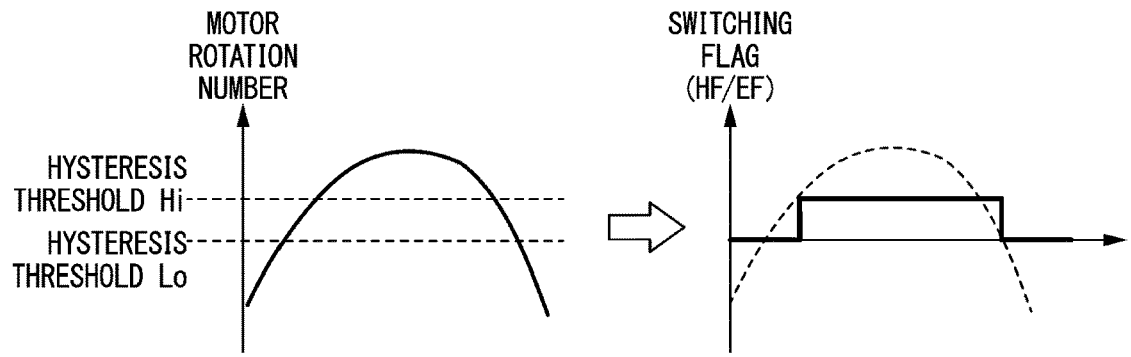
FIG. 89 is a graph of interpolation generation determination unit of the same interpolation calculation switching determination unit and flag generation of the interpolation determination unit.
Figure 90:
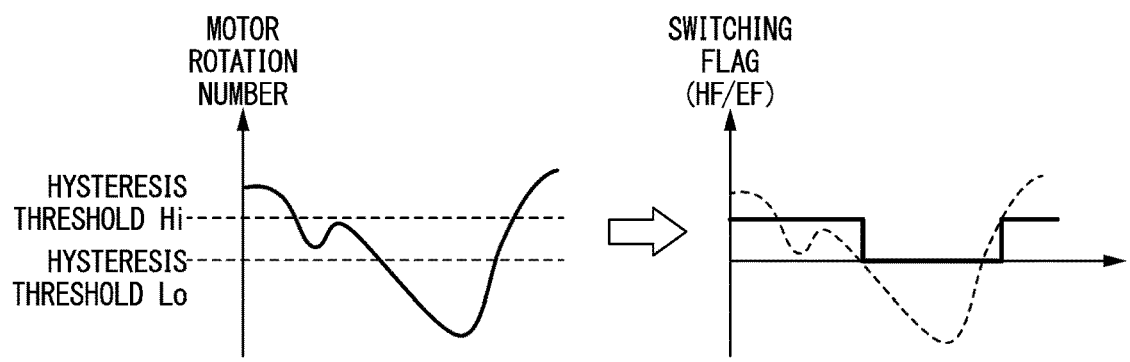
FIG. 90 is a graph of interpolation generation determination unit of the same interpolation calculation switching determination unit and flag generation of the interpolation determination unit.

FIGS. 89 and 90 are graphs of flag (HF and EF) generation of the interpolation calculation determination unit 247-3 and the interpolation determination unit 247-4. The interpolation calculation determination unit 247-3 and the interpolation determination unit 247-4 use the hysteresis threshold Hi and the hysteresis threshold Lo to generate a binary H and L flag (HF and EF). The hysteresis threshold Hi and the hysteresis threshold Lo each have a hysteresis width of about 200 [rpm], for example, and prevent the flags (HF and EF) from rapidly changing at the threshold boundary.

Figure 91:
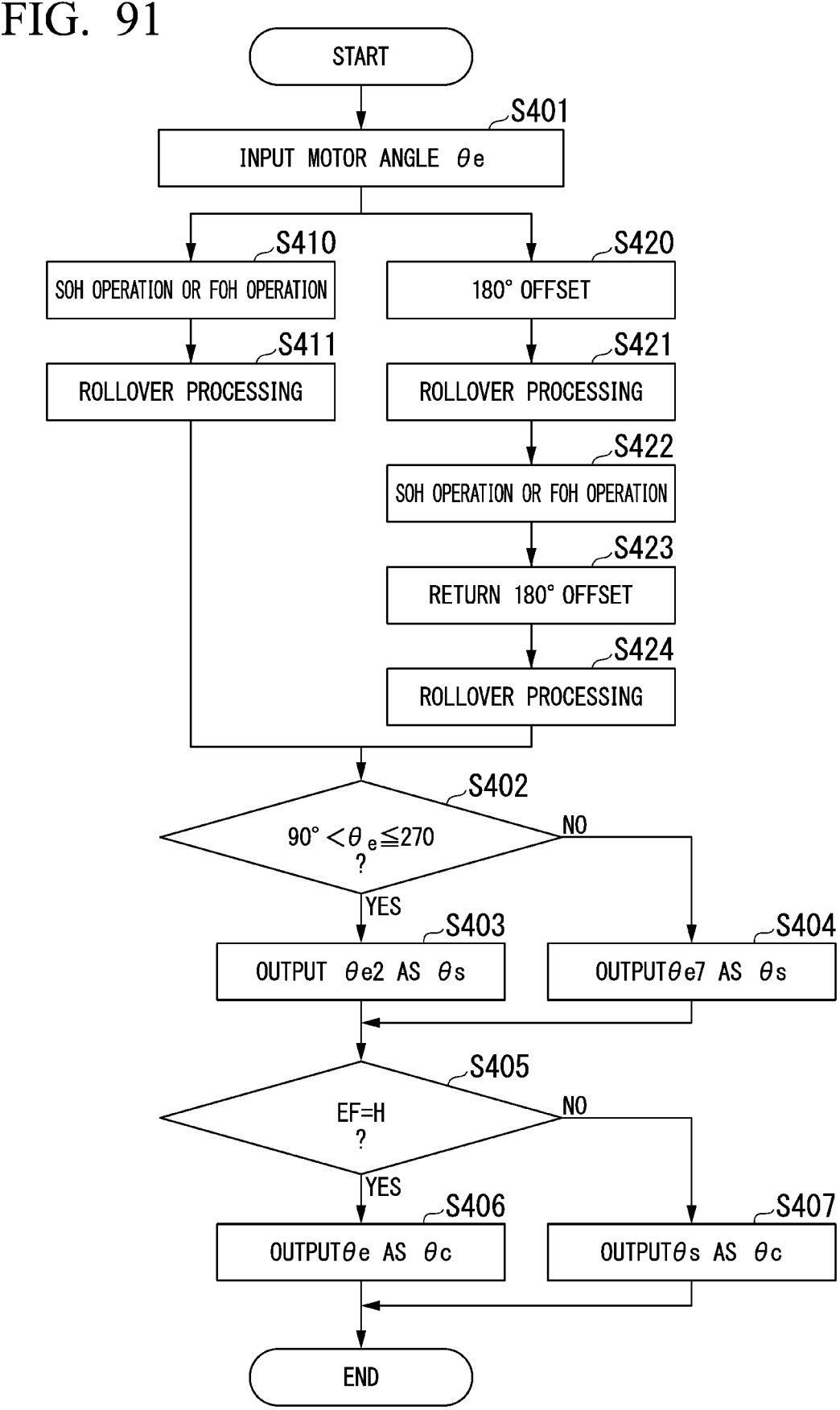
FIG. 91 is a control flowchart of the electric angle interpolation unit.

FIG. 91 shows a control flowchart of the electric angle interpolation unit 240E.

The motor angle (electric angle) θe is input to the electric angle interpolation unit 240E (step S401).

The SOH computation unit 241-1 of the calculation processing unit 241 performs the SOH calculation or the FOH calculation based on the interpolation calculation switching flag HF (step S410). The motor angle θe is input to the holding unit 245-1 to be used as the previous value in the next SOH calculation. Further, the previous value input to the holding unit 245-1 is input to the holding unit 245-2 because it is used as the value before the next SOH calculation.

The rollover processing unit 241-2 performs rollover processing on the motor angle θe1 calculated by the SOH and outputs a motor angle θe2 (step S411).

The offset-added calculation processing unit 242 performs offset processing on the motor angle (electric angle) θe using the coefficient 180° input from the fixing unit 242-1 by the adding unit 242-2 (step S420).

The rollover processing unit 242-3 performs rollover processing on the offset-processed motor angle θe3, and outputs the motor angle θe4 (step S421).

The SOH calculating unit 242-4 performs the SOH calculation or the FOH calculation on the input motor angle θe4 based on the interpolation calculation switching flag HF (step S422). The motor angle θe is input to the holding unit 245-1 to be used as the previous value in the next SOH calculation. Further, the previous value input to the holding unit 245-1 is input to the holding unit 245-2 because it is used as the value before the next SOH calculation.

The motor angle θe5 calculated by the SOH is input to the subtraction unit 242-6, and the offset return processing is performed with the coefficient 180° input from the fixing unit 242-5 (step S423).

The motor angle θe6 subjected to the offset return processing is subjected to rollover processing by the rollover processing unit 242-7, and the motor angle θe7 is output (step S424).

After completion of the processing in step S411 and step S424, the motor angle switching determination unit 243 determines that the motor angle θe is greater than 90° and not more than 270° (step S402).

When this condition is satisfied (in the case of YES), the motor angle switching determination unit 243 sets the switching flag SF to "H".

When the above conditions are not met (in the case of NO), the motor angle θe is 0° or more and 90° or less, or more than 270° and 360° or less, and the motor angle switching determination unit 243 sets the switching flag SF to "L".

When the switching flag SF input from the motor angle switching determination unit 243 is "H", the switching unit 244 selects θe2 and outputs it as the motor angle (interpolated electric angle) θs for interpolation Duty calculation (step S403).

When the switching flag SF input from the motor angle switching determination unit 243 is "L", the switching unit 244 selects θe7 and outputs it as the motor angle (interpolated electric angle) θs for interpolation Duty calculation (step S404).

The second switching unit 246 determines that the interpolation switching flag EF is H (step S405).

When this condition is satisfied (in the case of YES), the second switching unit 246 outputs the motor angle (electric angle) θe as θc (step S406).

When the above condition is not met (in the case of NO), the second switching unit 246 outputs the motor angle θs for interpolation Duty calculation as θc (step S407).

The electric angle interpolation unit 240E performs an interpolation calculation using coefficients B0, B1, and B2 (see Table 1) corresponding to the interpolated electric angles 1 to 4 (θss 1 to θss4) estimated by the SOH calculation and coefficients B0 and B1 (see Table 2) corresponding to the interpolated electric angles 1 to 4 (θsf 1 to θsf4) estimated by the FOH calculation, to calculate interpolated electric angles 1 to 4 (θs1 to θs4). The electric angle interpolation unit 240E selects the motor angle (electric angle) θe or the interpolated electric angles 1 to 4 (θs1 to θs4) based on the interpolation switching flag EF, and outputs it as the interpolated electric angles 1 to 4 (θc 1 to θc4).

Figure 92:
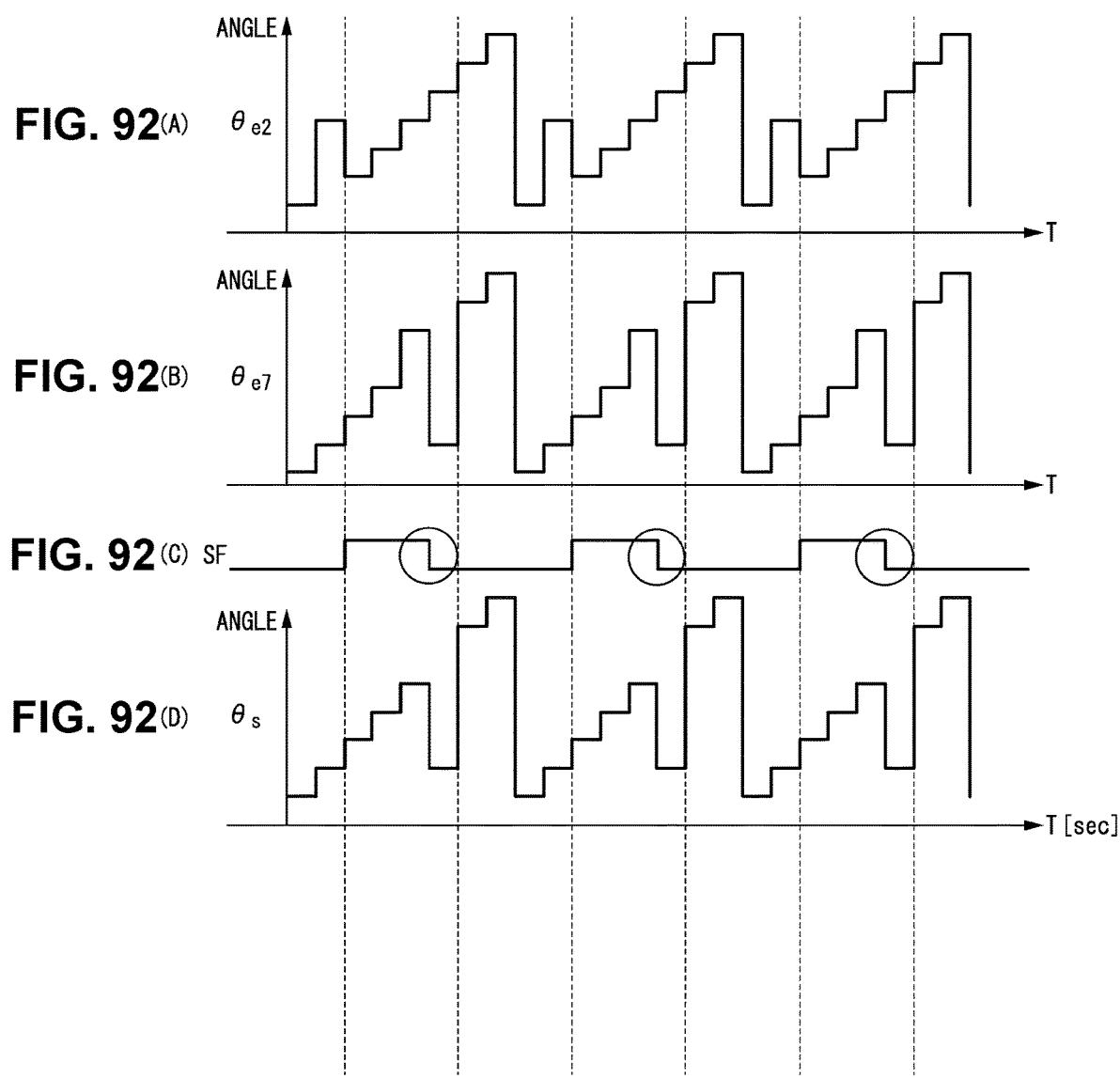
FIG. 92(A)-FIG. 92(D) are graphs showing the waveform of the electric angle interpolation unit.

FIG. 92 shows the waveforms of each part of the electric angle interpolation unit 240E, the horizontal axis is time [sec], and the vertical axis is an internal value processed by the MPU or the like, and is 64 [dec]/1 [deg]. Note that 23040 [dec]=360 [deg].

FIG. 92(A) is a waveform example of the motor angle θe2 output from the calculation processing unit 241E, and FIG. 92(B) is a waveform example of the motor angle θe7 output from the offset-added calculation processing unit 242E. Further, FIG. 92(C) shows the switching timing of "H" and "L" of the switching flag SF, and FIG. 92(D) shows a waveform example of the motor angle (interpolated electric angle) θs for interpolation Duty calculation output from the switching unit 244.

When the motor rotation speed N becomes high (for example, the angle 45 [deg] or more which fluctuates every control cycle Tc), the calculation processing necessary for the motor angle switching determination unit 243 or the like exceeds the performance limit of the control unit 30, and as indicated by a circle in FIG. 92C, the motor angle switching determination unit 243 may not be able to accurately determine the condition of 90°<θe≤270°.

In this case, as shown in FIG. 92(D), the possibility that the interpolated electric angle θs includes the influence of a transient angle change becomes high. In this case, the interpolation calculation determination unit 247-3 switches the interpolation calculation switching flag HF to "H" and switches the SOH calculation to the FOH calculation. By switching to the FOH calculation, the calculation processing load of the control unit 30 is reduced, and the determination of the motor angle switching determination unit 243 is normalized. As a result, the probability of the output of the interpolated electric angle θs not including the influence of the transient angle change is high.

[Space Vector Modulation Unit 250]

Figure 93:
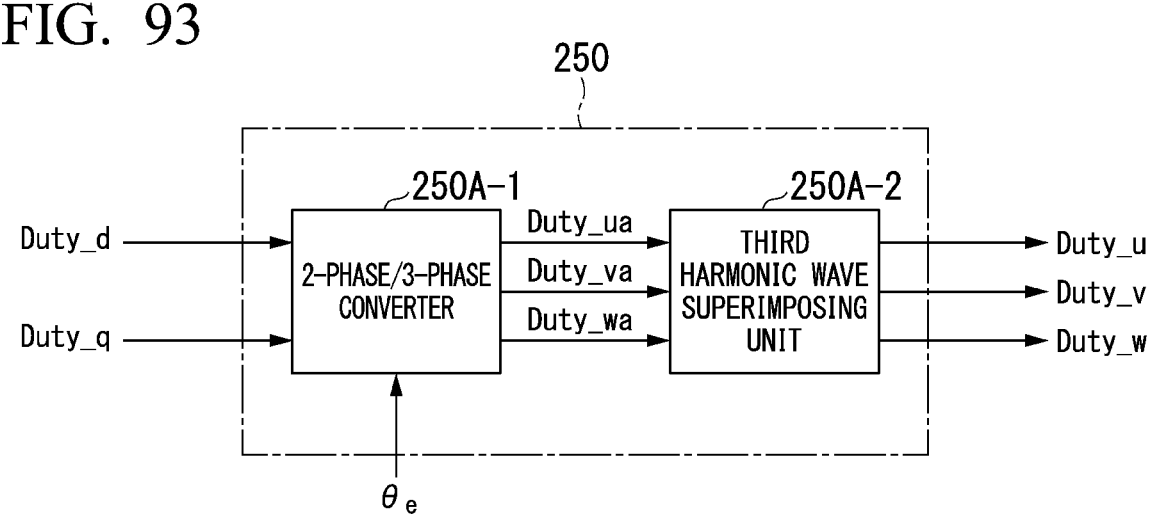
FIG. 93 is a functional configuration diagram of a space vector modulation unit of the motor control unit.

FIG. 93 is a functional block diagram of the space vector modulation unit 250.

The space vector modulation unit (conversion unit) 250 performs space vector conversion calculation after converting from the dimension of voltage to the dimension of Duty (conversion step). The space vector modulation unit 250 only needs to have a function of converting the Duty command value D1m (m=d, q) (Duty_d, Duty_q) for normal calculation in the dq axis space into a three-phase Duty command value (Duty_ua, Duty_va, Duty_wa), superimposing the third harmonic, and outputting the three-phase Duty command values Duty_u, Duty_v, and Duty_w. For example, the space vector modulation method proposed in Japanese Unexamined Patent Application, First Publication No. 2017-70066 or PCT International Publication No. WO 2017/098840 by the present applicant may be used.

The space vector modulation unit 250 includes a space vector modulation unit 250-0 that performs the above space vector conversion calculation using the motor angle (electric angle) θe, and space vector modulation units 250-1, 250-2, 250-3, and 250-4 that perform apace vector conversion calculation using the interpolated electric angles 1 to 4 (θs 1 to θs4).

The space vector modulation unit 250-0 performs space vector conversion calculation using the motor angle (electric angle) θe, and outputs three-phase Duty command values Duty_u, Duty_v, and Duty_w.

The space vector modulation unit 250-1 performs space vector conversion calculation using the interpolated electric angle 1 (θc1), and outputs a three-phase interpolated Duty command value Duty_u_m1, Duty_v_m1, Duty_w_m1.

The space vector modulation unit 250-2 performs space vector conversion calculation using the interpolated electric angle 2 (θc2), and outputs a three-phase interpolated Duty command value Duty_u_m2, Duty_v_m2, Duty_w_m2.

The space vector modulation unit 250-3 performs space vector conversion calculation using the interpolated electric angle 3 (θc3), and outputs a three-phase interpolated Duty command value Duty_u_m3, Duty_v_m3, and Duty_w_m3.

The space vector modulation unit 250-4 performs space vector conversion calculation using the interpolated electric angle 4 (θc4), and outputs a three-phase interpolated Duty command value Duty_u_m4, Duty_v_m4, and Duty_w_m4.

[Final Duty Computation Unit 200]

Figure 94:
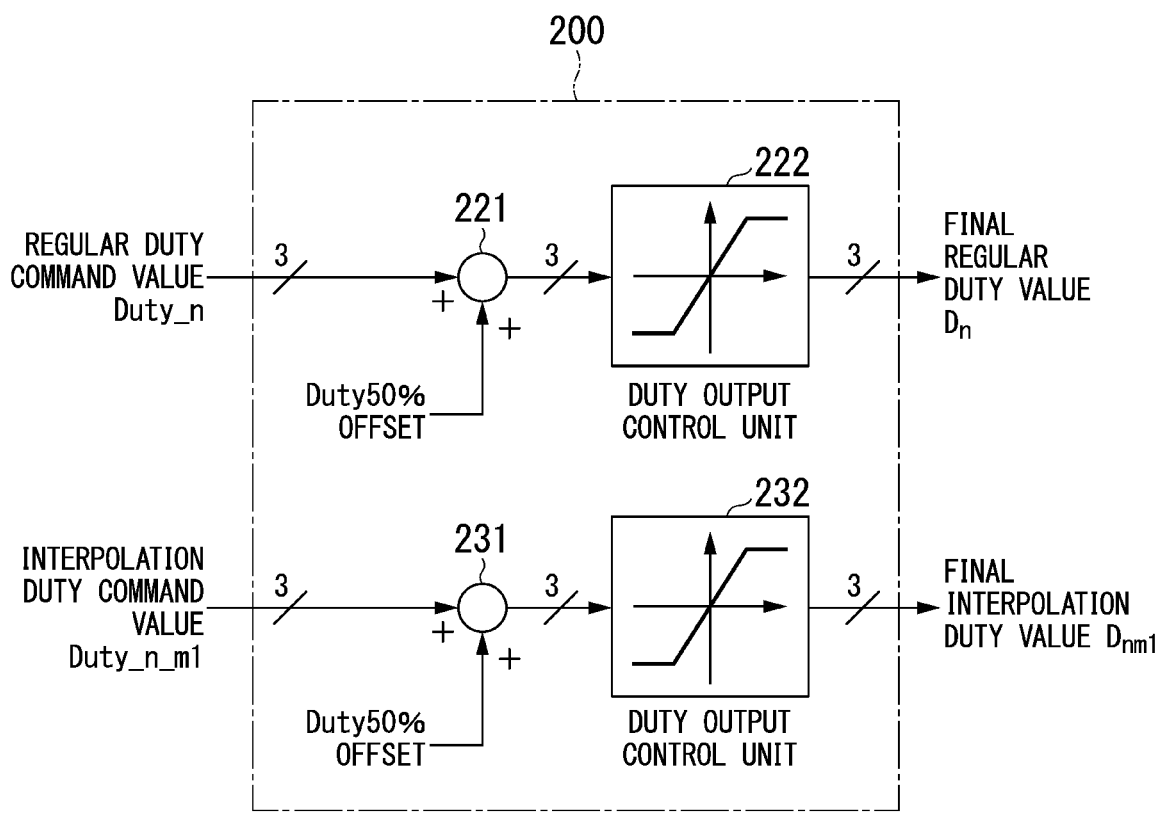
FIG. 94 is a functional block diagram of a final Duty computing unit of the motor control unit.

FIG. 94 is a functional block diagram of the final Duty computing unit 200.

In the final Duty computation unit 200, the normal Duty command value Duty_n (n=u, v, w) from the space vector modulation unit 250 is input to the adding unit 221. The Duty value to which the offset of Duty 50% has been added by the adding unit 221 is input to the limiter 222 which limits the Duty output within the range of 0 to 100% (variable). A final normal Duty command value Dn (n=u, v, w) is output from the limiter 222.

The interpolated Duty command value Duty_n_m1 from the space vector modulation unit 250 is input to the adding unit 231, and the Duty value added with the 50% Duty offset by the adding unit 231 is input to the limiter 232 that limits the Duty output within the range of 0 to 100% (variable). The final interpolated Duty command value Dnm1 (n=u, v, w) is output from the limiter 232.

The interpolated Duty command values Duty_n_m2, Duty_n_m3 and Duty_n_m4 from the space vector modulation unit 250 are processed in the same manner as the interpolated Duty command values Duty_n_m1, and the final interpolated Duty command values Dnm2, Dnm3, Dnm4 (n=u, v, n w) is output output from the limiter 232.

In general, since the EPS supplies the motor applied voltage from the battery (DC+12 V), it cannot supply the applied voltage in the negative (−) direction. In this state, the phase voltage command value in the negative direction cannot be supplied, so the phase current cannot flow in the negative direction. In order to cope with this problem, by offsetting the Duty value by 50% (+6V) for all three phases to make the reference voltage, the phase current becomes 0A when the three-phase Duty value is 50% even when the three phases are not 0V (when the motor applied voltage is +12V). For example, in the case when the U-phase Duty value is 50% (+6 V), the V-phase Duty value is 50% (+6 V), and the W-phase Duty value is 50% (+6 V), the U-phase becomes 0A, the V-phase becomes 0A, and the W-phase becomes 0A. In the case when the U-phase Duty value is 60% (+7.2 V), the V-phase Duty value is 50% (+6 V), and the W-phase Duty value is 40% (+4.8 V), a current flows in the positive (+) direction in the U phase. In the case when the U-phase Duty value is 40% (+4.8 V), the V-phase Duty value is 50% (+6 V), and the W-phase Duty value is 60% (+7.2 V), a current flows in the negative direction in the U phase. By offsetting the three phases to a Duty value of 50% to make the reference voltage, it is possible to flow a current in the negative direction while the applied voltage is positive. Although the 50% Duty value offset is basically fixed, the reference voltage at 50% Duty value fluctuates depending on the applied voltage state to be supplied. For example, when the applied voltage is 11 V, the 50% Duty value is 5.5 V, and when the applied voltage is 13 V, the 50% Duty value is 6.5 V.

[Duty Output Setting Unit 160A-1]

Figure 95:
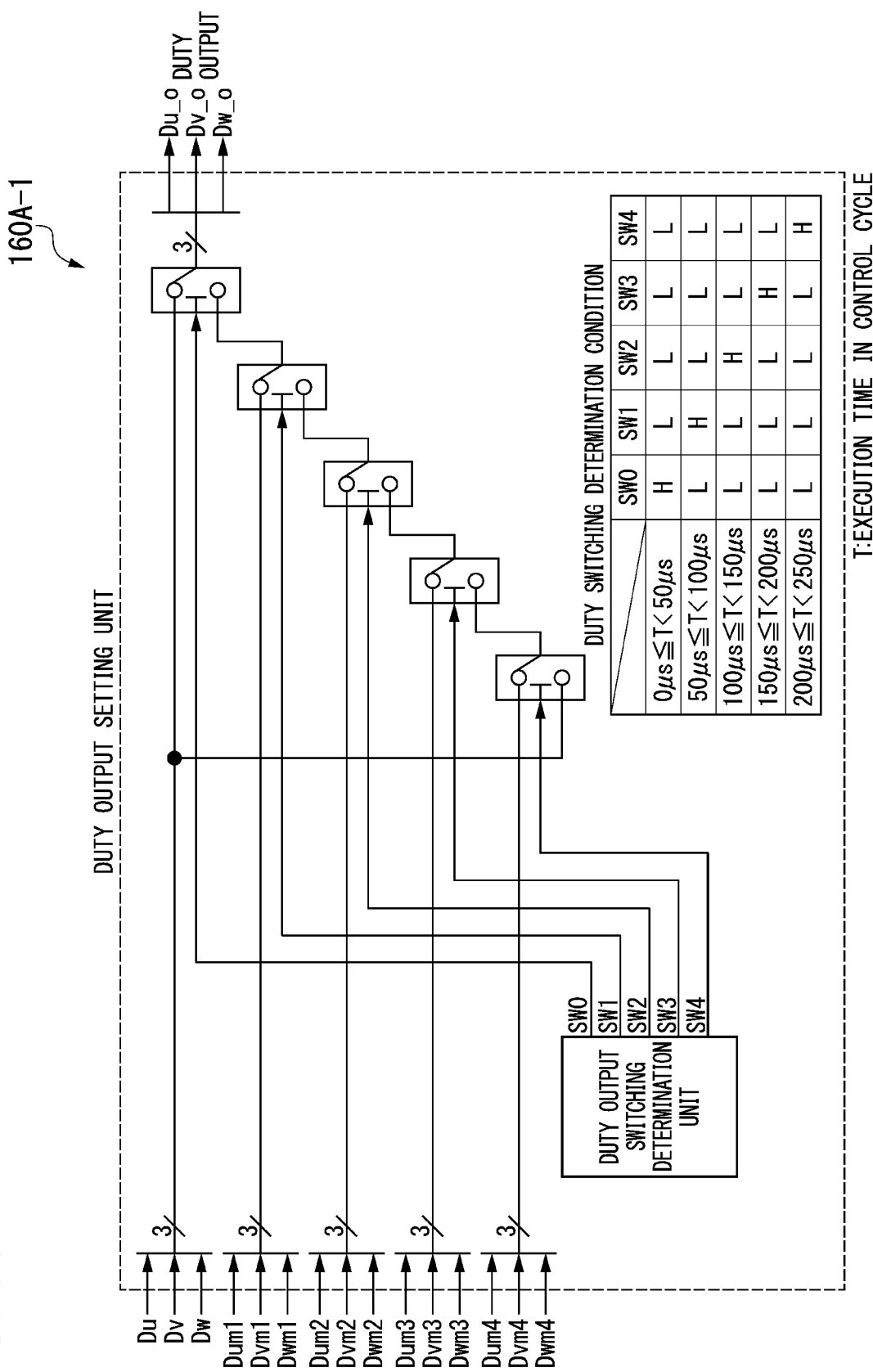
FIG. 95 is a functional configuration diagram of a Duty output setting unit of the motor control unit.

FIG. 95 is a functional block diagram of the Duty output setting unit 160A-1.

As shown in FIG. 95, the Duty output setting unit (output setting unit) 160A-1 matches the 50 μs interval (division interval) obtained by dividing the control cycle Tc into ⅕, and switches and outputs the final Duty command values Du_o, Dv_o, and Dw_o to be output based on the elapsed time T from the control cycle Tc (output setting step).

According to the motor control device 400E of the present embodiment, the interpolated Duty command value with less noise can be calculated without being affected by the dead time compensation, and the control signal for PWM control can be changed at a cycle (50 μs) earlier than the cycle for performing the PWM calculation, thereby, the control signal for PWM control can be varied. As a result, while the increase in the calculation processing amount of the microcomputer is slight, the noise due to the vibration of the brushless motor or the motor can be suitably suppressed, and the noise due to the motor in the audible range can be reduced.

According to the motor control device 400E of the present embodiment, the SOH calculation is switched to the FOH calculation when it is determined that the SOH calculation is not appropriate, such as (1) when the motor rotation speed N is increased and it is determined that the process necessary for the SOH calculation exceeds the performance limit of the control unit 30, or (2) when it is determined that a lot of noise is included in the result of the SOH calculation using the motor angle θe used in the previous and previous SOH calculations. As a result, the probability of the output of the interpolated electric angle θs not including the influence of the transient angle change is high.

According to the motor control device 400E of the present embodiment, the interpolation calculation result is not used when SOH calculation and FOH calculation cannot be performed clearly, such as in high-speed rotation speed range (for example, 9000 [rpm] or higher) where SOH calculation and FOH calculation cannot be performed. As a result, the motor control device 400E can control the motor 100 more safely.

The fifth embodiment of the present invention has been described in detail with reference to the drawings, but the specific configuration is not limited to this embodiment, and design changes or the like within the scope of the present invention are also included. Moreover, the components shown in the above-mentioned embodiment and modification can be combined appropriately and can be constituted.

Modification 14

For example, in the motor control device 400E according to the above-described embodiment, the motor 100 is controlled by the vector control method using space vector driving, but the motor to be controlled by the motor control device is not limited thereto. The motor to be controlled by the motor control device according to the present invention may be, for example, a brushless motor of a sine wave control system. The motor control device according to the present invention does not set the duty command value as the direct interpolation target, but sets the motor angle (electric angle) θe as the interpolation target. The motor angle θe has relatively low noise if the linearity is high, and there is no transitional change other than the angle change to switch from 360° to 0°. Therefore, high accuracy can be ensured in the calculation of the interpolated electric angle by the SOH calculation and the calculation of the interpolation Duty command value.

Modification 15

For example, although the motor control device 400E according to the above-described embodiment is mounted on the electric power steering device 300E, the aspect of the motor control device is not limited to this. The motor control device according to the present invention is suitably mounted on a motor drive device that requires high torque while low noise is required. For example, the motor control device according to the present invention is preferably mounted on a walking support device that supports muscle power when the wearer walks, a cleaning device that operates indoors, or the like. Thereby, it is possible to suitably suppress the vibration of the motor and the sound caused by the motor, and to reduce the sound caused by the motor in the audible range.

Modification 16

For example, although the motor control device 400E according to the above embodiment estimates the motor angle (interpolated electric angle) θs at equal intervals (division intervals) of 50 μs obtained by dividing the control cycle Tc into ⅕, but the aspect of the motor control device is not limited to this. In the motor control device according to the present invention, the control cycle Tc may be divided by an arbitrary number of divisions, or may be divided at unequal intervals.

Modification 17

For example, in the motor control device 400E according to the above embodiment, the control cycle Tc is 250 μs (frequency 4 KHz), but the aspect of the motor control device is not limited to this. The motor control device according to the present invention can preferably reduce the sound caused by the motor in the audible range when the control cycle Tc is 100 μs or more and 250 μs or less. The control cycle is predicted to be shorter than 250 μs as the performance of the CPU or the like mounted on the motor control device improves or the number of poles of the motor to be controlled increases. When the control cycle Tc is 100 μs or more and 250 μs or less, as in the above embodiment, a problem occurs that a sound is generated due to the motor in the audible range. However, according to the motor control device according to the present invention, sounds resulting from vibrations caused by the brushless motor and sounds caused by motors can be suitably suppressed, and the sounds resulting from motors in the audible range can be reduced.

PRIOR ART

Figure 96:
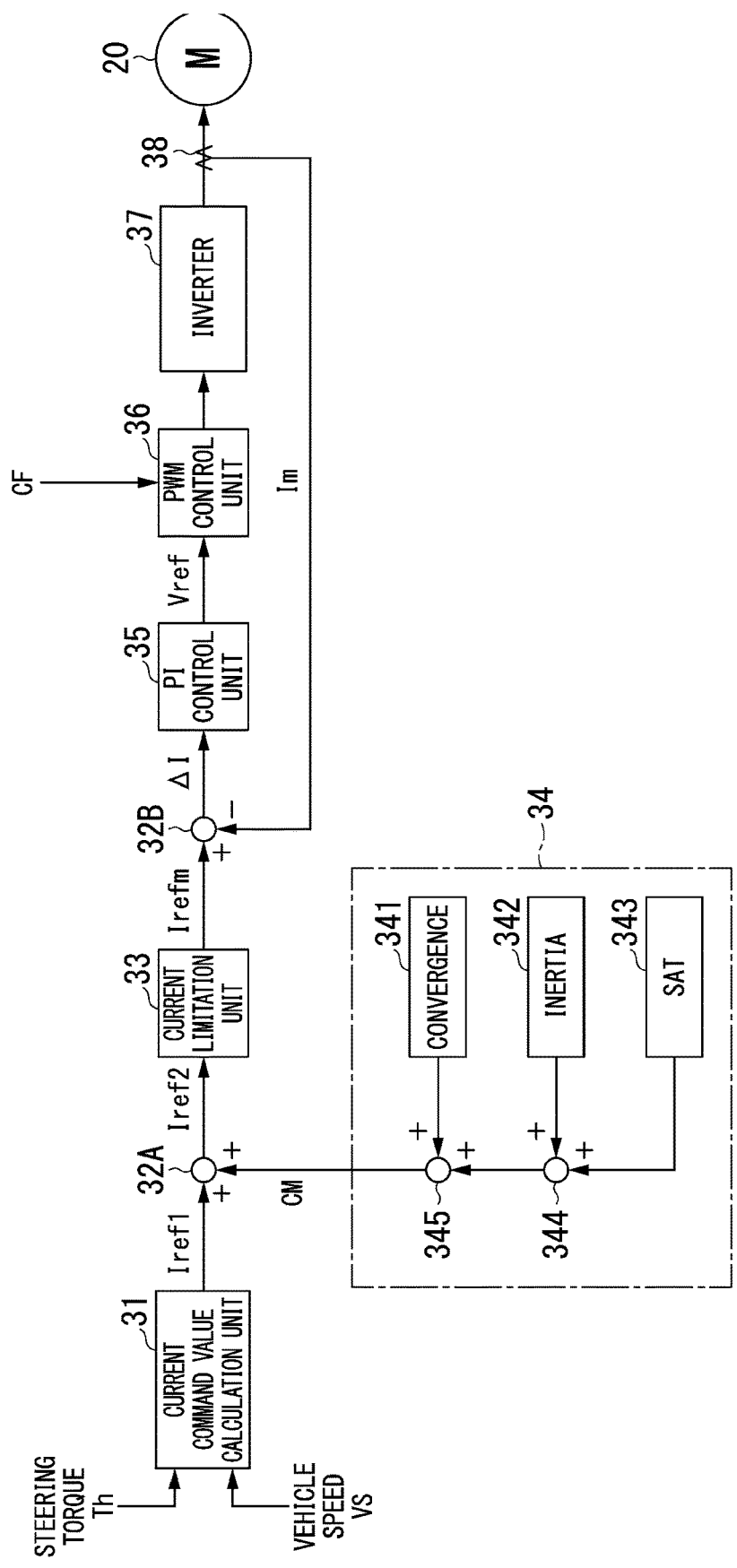
FIG. 96 is a functional configuration diagram of a general motor control device.

The prior art is described below as reference information.
FIG. 96 is a functional configuration diagram of a general motor control device. The steering torque Th from the torque sensor 10 and the vehicle speed Vs from the vehicle speed sensor 12 are input to a steering assist command value computation unit 31. The steering assist command value computing unit 31 computes a steering assist command value Iref1 using an assist map or the like based on the steering torque Th and the vehicle speed Vs. The calculated steering assist command value Iref1 is added by the adding unit 32A to the compensation signal CM from the compensating unit 34 for improving the characteristics. The current steering unit 33 limits the maximum value of the added steering assist command value Iref2. The current command value Irefm whose maximum value is limited is input to the subtracting unit 32B and is subtracted from the motor current detection value Im.

The PI (proportional integration) control unit 35 performs current control such as PI on the deviation ΔI (=Irefm−Im) that is the subtraction result of the subtraction unit 32B. The current control voltage control command value Vref is input to the PWM control unit 36 together with the modulation signal (triangular wave carrier) CF, and the duty command value is calculated. The PWM signal calculated from the duty command value PWM drives the motor 20 via the inverter 37. The motor current value Im of the motor 20 is detected by the motor current detector 38, and is input to the subtraction unit 32B to be fed back.

The compensation unit 34 adds the detected or estimated self aligning torque (SAT) to the inertia compensation value 342 in the adding unit 344, further adds the convergence control value 341 to the addition result in the adding unit 345, and input the addition result to the adding unit 32A as a compensation signal CM, to improve characteristic.

Figure 97:
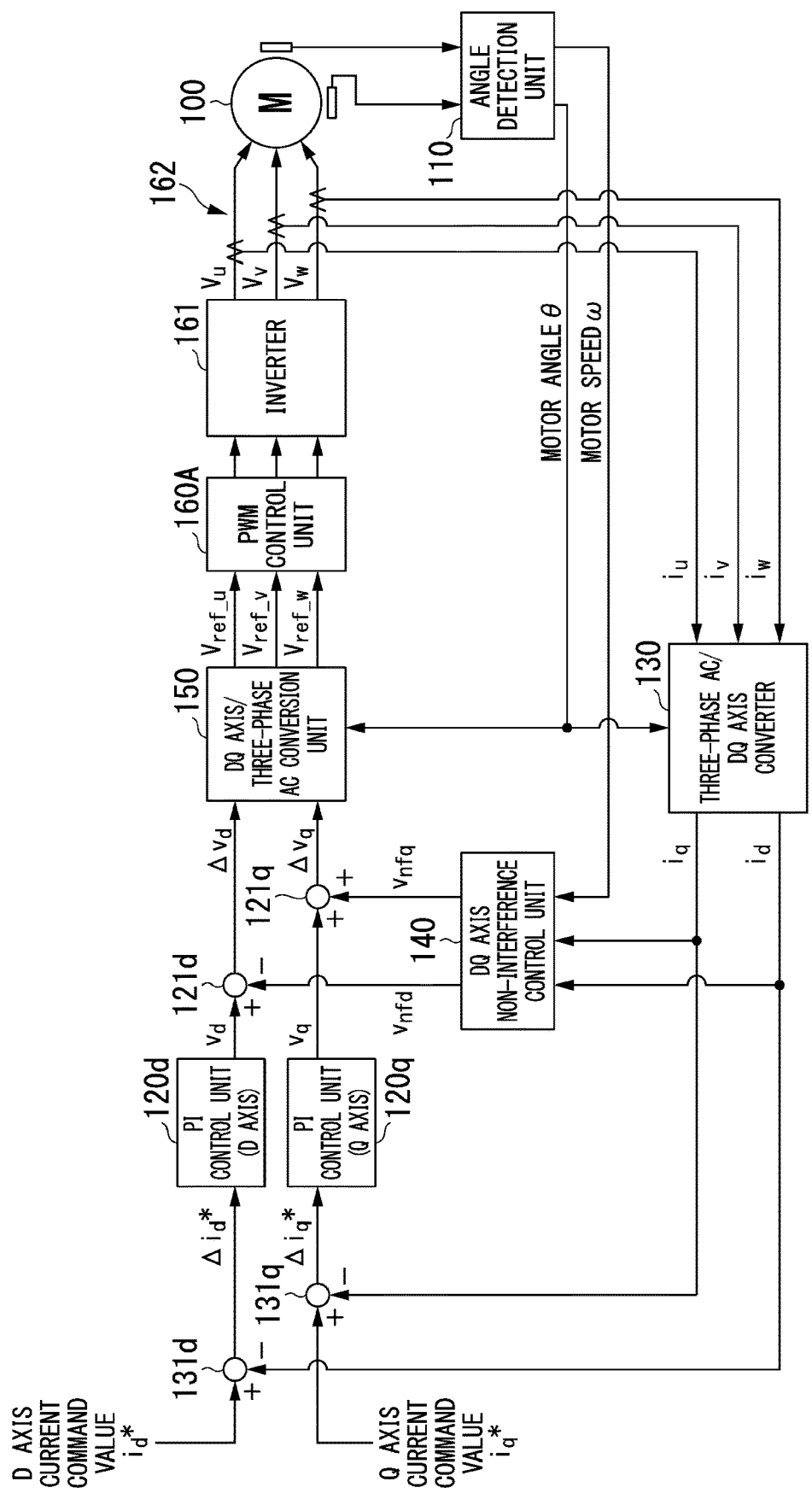
FIG. 97 is a functional configuration diagram in the case of driving and controlling a three-phase brushless motor by a vector control method.

FIG. 97 shows a functional block diagram in the case of driving and controlling the three-phase brushless motor 100 by the vector control method. The two-axis (dq-axis coordinate system) steering assistance command value computed by the steering assistance command value computing unit (not shown) is computed based on the steering torque Th, the vehicle speed Vs, or the like. The d-axis current command value id* and the q-axis current command value iq* are input to the subtraction units 131*d* and 131*q*, respectively. The current deviations Δid* and Δiq* determined by the subtraction units 131*d* and 131*q* are input to PI control units 120*d* and 120*q*, respectively. Voltage command values vd and vq subjected to PI control by the PI control units 120*d* and 120*q* are input to the subtraction unit 141*d* and the adding unit 1421*q*, respectively, and command voltages Δvd and Δvq determined by the subtraction unit 141*d* and the adding unit 141*q* are input to the dq axes/three-phase AC conversion unit 150.

Figure 98:
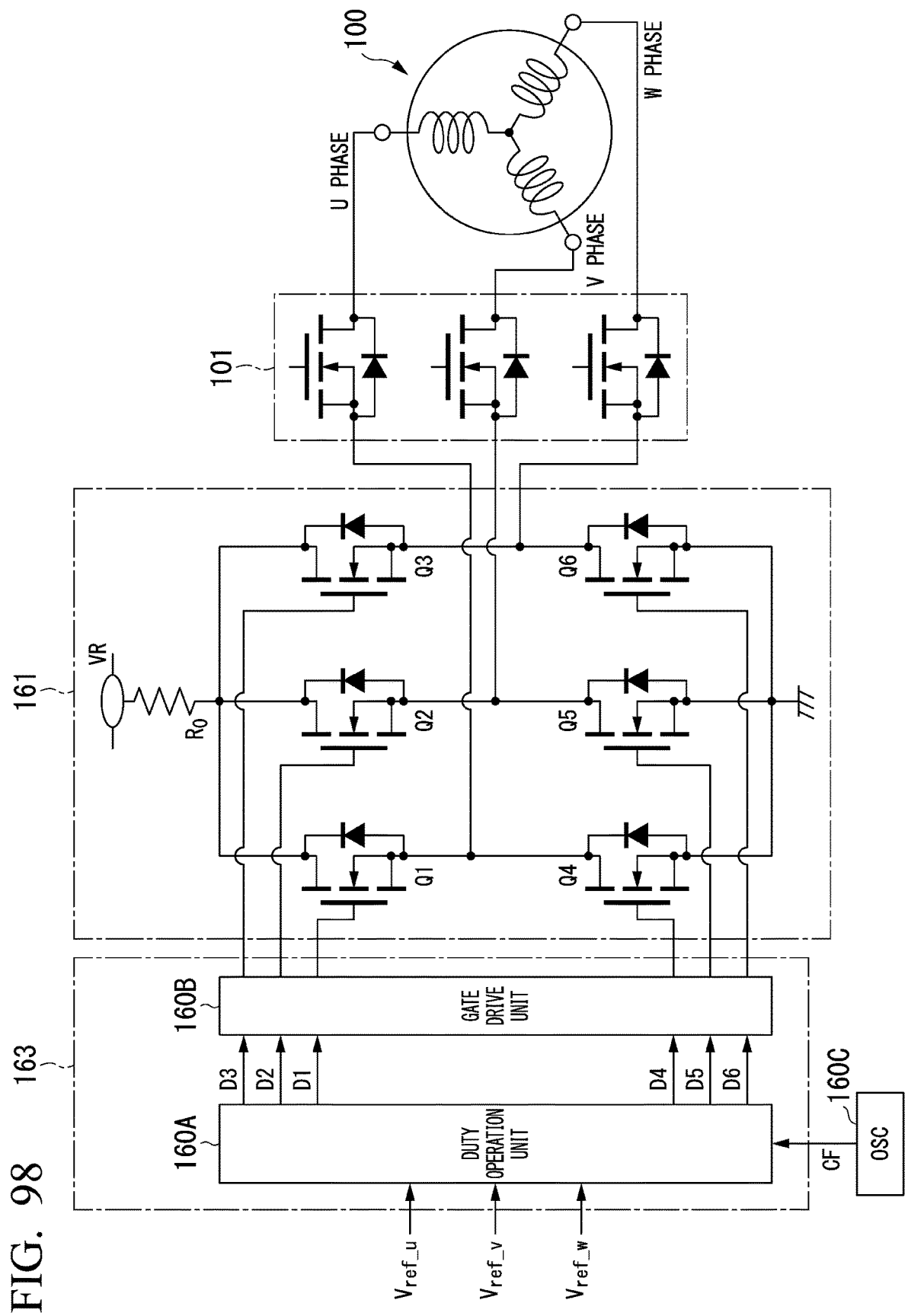
FIG. 98 is a functional configuration diagram of a PWM control unit and an inverter.

FIG. 98 is a functional configuration diagram of the PWM control unit 163 and the inverter 161.

The voltage control command values Vref_u, Vref_v, and Vref_w converted into three phases by the dq-axis/three-phase AC conversion unit 150 are input to the PWM control unit 163 and are calculated by the PWM signal based on the calculated three-phase Duty command values. The motor 100 is driven via inverter (inverter application voltage VR) 161 configured as a bridge configuration of upper and lower arms as shown in FIG. 98. The upper arm is configured by FETs Q1, Q2 and Q3 as switching elements, and the lower arm is configured by FETs Q4, Q5 and Q6. The FETs Q1 and Q4 are driven in the U phase, the FETs Q2 and Q5 are driven in the V phase, and the FETs Q3 and Q6 are driven in the W phase.

The three-phase motor currents iu, iv, iw of the motor 100 are detected by the current detector 162. The detected three-phase motor currents iu, iv, iw are input to the three-phase AC/dq axis converter 130. The two-phase feedback currents id and iq converted by the three-phase alternating current/dq axis conversion unit 130 are subtracted and input to the subtraction units 131 *d* and 131 *q*, respectively, and also input to the dq axis non-interference control unit 140.

Further, a rotation sensor or the like is attached to the motor 100, and the motor angle θ and the motor rotation speed w are output from the angle detection unit 110 that processes the sensor signal. The motor angle θ is input to the dq axis/three-phase alternating current conversion unit 150 and the three-phase alternating current/dq axis conversion unit 130, and the motor rotation speed w is input to the dq axis noninterference control unit 140. The two-phase voltages vnid and vniq from the dq axis non-interference control unit 140 are input to the subtraction unit 121*d* and the adding unit 121*q*, and the voltage command value Δvd obtained by the subtraction unit 121*d* and the voltage command value Δvq obtained by the addition unit 121*q* are input to the dq axis/three-phase AC conversion unit 150.

The PWM control unit 163 and the inverter 161 are configured as shown in FIG. 98, and the PWM control unit 163 is configured by a Duty computation unit 160A that calculates PWM-Duty values D1 to D6 for three phases according to predetermined formulas for voltage control command values Vref_u, Vref_v, and Vref_w, respectively, and a gate drive unit 160B that drives the gates of FETs Q1 to Q6 as drive elements with PWM-Duty values D1 to D6, and that is turned on/off by compensating for dead time. For example, a modulation signal (carrier) CF of a triangular wave is input to the Duty computation unit 160A from the oscillation unit 160C, and the Duty computation unit 160A calculates PWM-Duty values D1 to D6 in synchronization with the modulation signal CF. The inverter 161 is constituted by the three-phase bridge of the FET as described above, and the motor 100 is driven by being turned on/off by the PWM-Duty values D1 to D6, and a motor switch 101 is interposed between the inverter 161 and the motor 100 to interrupt the supply of current when the assist control is stopped.

The electric power steering device of such a vector control system assists the driver's steering, and at the same time, the sound, vibration, ripple or the like of the motor are transmitted to the driver as a sense of force via the steering wheel. Power devices for driving the inverter generally use FETs to energize the motor, but in the case of a three-phase motor, FETs connected in series with upper and lower arms in each phase as shown in FIG. 98 is used. The FETs of the upper and lower arms repeat ON/OFF alternately, but the FET is not an ideal switch, and does not instantaneously turn ON/OFF as instructed by the gate signal, and requires turn-on time and turn-off time. For this reason, when the ON command to the upper arm FET and the OFF command of the lower arm are simultaneously issued, the upper arm FET and the lower arm FET are simultaneously turned ON, which causes a problem of shorting the upper and lower arms. There is a difference between the turn-on time and turn-off time of the FET, and when the FET is commanded at the same time, if the ON command is issued to the upper FET and the turn-on time is short (for example, 100 ns), the FET turns ON immediately, and if the turn-off time is long even if the OFF command is issued to the lower FET (for example, 400 ns), the FET is not immediately turned OFF and there be a situation (for example, ON-ON between 400 ns and 100 ns) in which the upper FET is turned on and the lower FET is turned on instantaneously.

Figure 99:
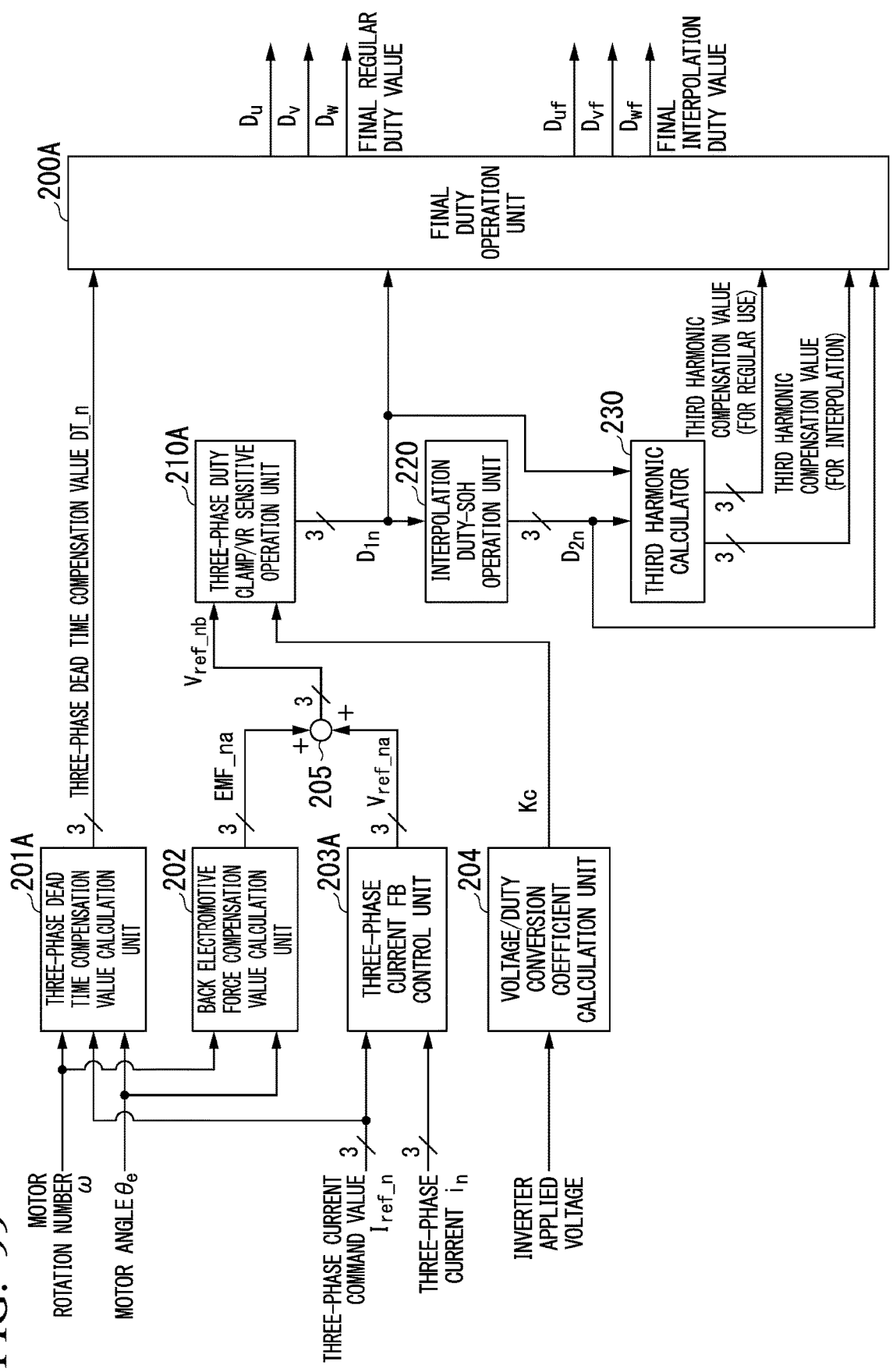
FIG. 99 is a functional configuration diagram of interpolation of a duty command value by the conventional SOH calculation.

Therefore, to prevent the upper arm FET and the lower arm FET from being simultaneously turned on, the ON signal is given to the gate drive unit after a predetermined time called dead time. Since the dead time is non-linear, the current waveform is distorted, the control response performance is degraded, and noise, vibration, and ripple occur. In the case of a column-type electric power steering device, the arrangement of the motor directly connected to the gear box connected by the steering wheel and the steel column shaft is very close to the driver due to its structure, so it is necessary to particularly considered noise, vibration, ripple, or the like caused by the motor compared to the downstream assist type electric power steering device FIG. 99 is a functional block diagram of the interpolation of the Duty command value by the conventional SOH calculation. This is a method of calculating an interpolated Duty value by performing SOH calculation on a three-phase duty command value to which a dead time compensation value is not added. In this conventional method, dead time compensation with a transient change is not subject to SOH calculation, but SOH calculation is directly performed on the Duty command value. When the SOH calculation is performed on the Duty command value of the third harmonic superposition, noise included in the calculation result may be large, and abnormal noise may occur. Also, in dq axis control, there are only three phase Duty command values after space vector modulation Duty command values, and when the interpolated Duty value is calculated by SOH calculation using space vector modulation Duty command values, since a transient response of dead time compensation and a distortion component of the third harmonic due to a space vector are included, an interpolation Duty value with a large noise is generated.

In the motor control device shown in FIG. 99, a three-phase dead time compensation value computation unit 201A is provided that receives the motor rotation speed w, the three-phase current command value Iref_n (n=u, v, w), and the motor angle (electric angle) θe, and calculates the three-phase dead time compensation value DT_n (n=u, v, w). The calculated dead time compensation value DT_n is input to the final Duty computation unit 200A.

In addition, the motor control device shown in FIG. 99 includes a counter electromotive force compensation value computation unit 202 that inputs a motor rotation speed ω and a motor angle θe and calculates a three-phase counter electromotive force compensation value EMF_na (n=u, v, w), a three-phase current feedback (FB) control unit 203A that receives a three-phase current command value Iref_n and a three-phase current in (n=u, v, w) and outputs a three-phase voltage control command value Vref_na (n=u, v, w), and a voltage/Duty conversion coefficient computation unit 204 that calculates a conversion coefficient Kc of voltage/Duty according to the inverter applied voltage VR.

The back electromotive force compensation value EMF_na from the back electromotive force compensation value computation unit 202 and the voltage control command value Vref_na from the three-phase current feedback control unit 203A are added by the adding unit 205. The voltage control command value Vref_nb (n=u, v, w) subjected to back electromotive force compensation by the adding unit 205 is input to the three-phase Duty clamp/inverter applied voltage sensitive computation unit 210A together with the conversion coefficient Kc of voltage/Duty conversion.

The calculated three-phase normal Duty command value D1n (n=u, v, w) multiplied by the conversion coefficient Kc of the voltage/Duty conversion in the three-phase Duty clamp/inverter applied voltage sensitive computation unit 210A is input to the final Duty calculation computation unit 200 A, the interpolated Duty-SOH computation unit 220, and third harmonic computation unit 230. The interpolated Duty command value D2n calculated by the interpolated Duty-SOH computation unit 220 is input to the final Duty computation unit 200A and the third harmonic computation unit 230, and the third harmonic compensation value (for regular use) and the third harmonic compensation value (for interpolation) computed by the third harmonic computation unit 230 are input to the final Duty computation unit 200A.

The final Duty computation unit 200A receives the three-phase dead time compensation value DT_n from the dq-axis dead time compensation value computation unit 201, the three-phase normal Duty command value D1n from the three-phase Duty clamp/inverter applied voltage sensitive computation unit 210, the interpolation Duty command value D2n from the interpolation Duty-SOH computation unit 220, and the third harmonic compensation value (for regular use) and third harmonic compensation value (for interpolation) from the third harmonic computation unit 230, and outputs the calculated final normal Duty values Du, Dv, Dw and final interpolation Duty values Dum, Dvm, Dwm.

Figure 100:
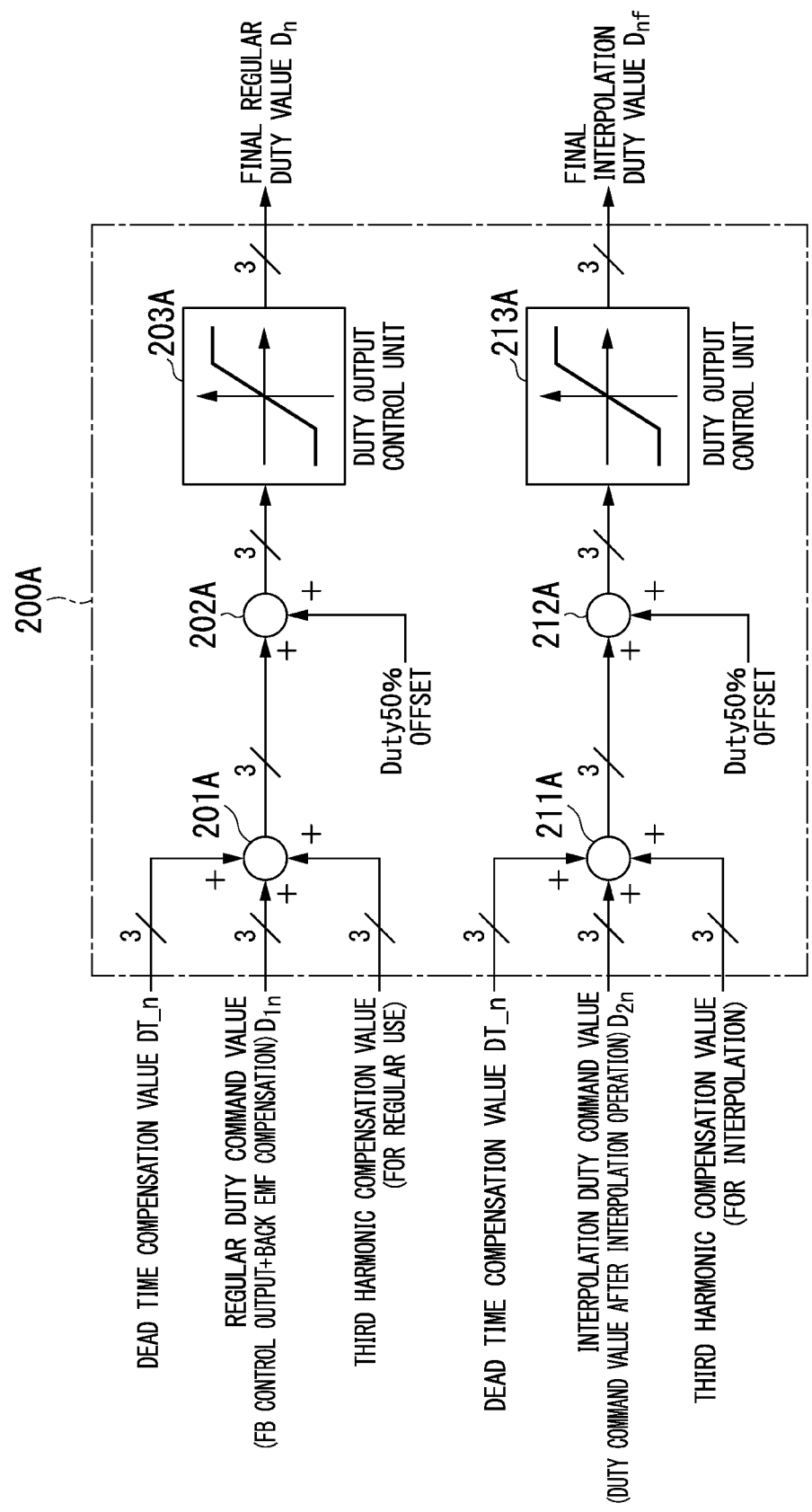
FIG. 100 is a functional configuration diagram of a final Duty computation unit.

FIG. 100 is a functional block diagram of the final Duty computing unit 200A.

In the final Duty computation unit 200A, the dead time compensation value DT_n, the normal Duty command value D1n and the third harmonic compensation value (for normal) are added by the adding unit 201A, and the dead time compensation value DT_n, the interpolated Duty command value D2n and the third harmonic compensation value (for interpolation) are added by the adding unit 211A. The addition results of the adding units 201A and 211A are input to the adding units 202A and 212A, respectively, and the Duty values to which the 50% Duty offset is added by the adding units 202A and 212A are respectively input to limiters 203A and 213A that limit the Duty output in a range of 0 to 100% (variable). The final normal Duty value Dn is output from the limiter 203A, and the final interpolated Duty value Dnf is output from the limiter 213A.

The final normal Duty value Dn and the final interpolated Duty value Dnf output from the final Duty computation unit 200A are input in the PWM control unit 163. The final normal Duty value Dn and the final interpolated Duty value Dnf are held until the end of the calculation of the next control cycle after the end of the calculation.

Next, the space vector modulation will be described. In the above embodiment, in order to reduce the number of calculations, the space vector conversion calculation is performed after the voltage dimension is converted to the duty dimension. As shown in FIG. 10, the space vector modulation unit 250 only needs to have a function of converting the Duty command value D1m (Duty_d, Duty_q) for normal calculation in the dq axis space from the dq axis Duty clamp/inverter applied voltage sensitive computation unit 210 into a three-phase Duty command value (Duty_ua, Duty_va, Duty_wa), superimposing the third harmonic, and outputting the three-phase Duty command values Duty_u, Duty_v, and Duty_w. For example, the space vector modulation method proposed in Japanese Unexamined Patent Application, First Publication No. 2017-70066 or PCT International Publication No. WO 2017/098840 by the present applicant may be used.

That is, the space vector modulation will be described to be easily understood using voltage equations. The vector modulation has a function of controlling the rotation of the motor by performing coordinate conversion as shown below based on the voltage command values Vd and Vq of dq axis space, the motor angle θe and the sector number n (#1 to #6), and supplying to the motor the switching patterns S1 to S6 corresponding to the sector #1 to #6 controlling ON/OFF of FET (upper arm Q1, Q3, Q5, lower arm Q2, Q4, Q6) of the inverter of bridge configuration.

Figure 101:
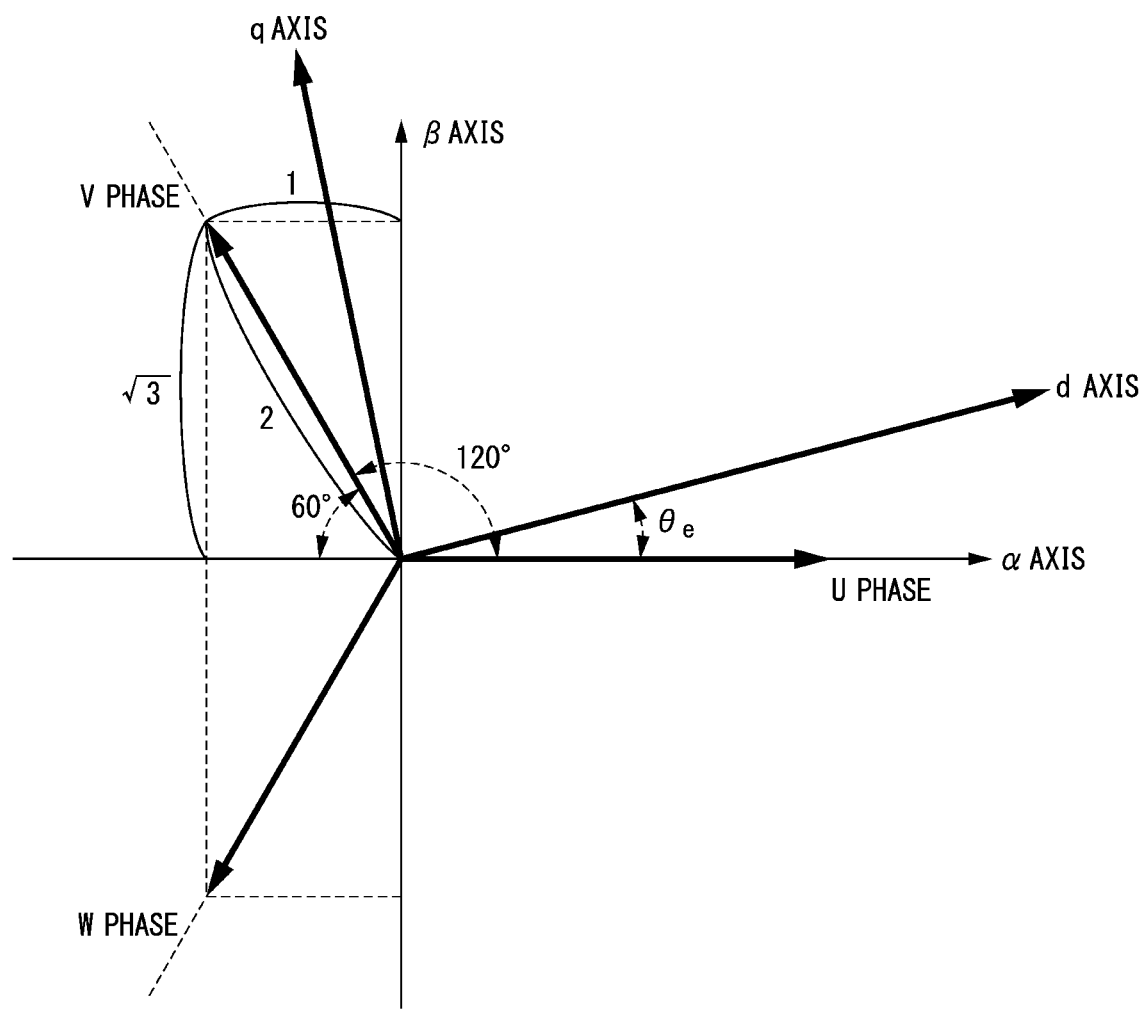
FIG. 101 is a graph showing the relationship between coordinate axes and motor angles used for coordinate conversion.

FIG. 101 is a graph showing the relationship between the coordinate axis used for coordinate conversion and the motor angle θe.

Regarding the coordinate conversion, in the space vector modulation, the voltage command values Vd and Vq are subjected to coordinate conversion into voltage vectors Vα and Vβ in the α-β coordinate system based on Equation 54.

[Equation 54]

$$\begin{bmatrix} V_\alpha \\ V_\beta \end{bmatrix} = \begin{bmatrix} \cos\theta_e & -\sin\theta_e \\ \sin\theta_e & \cos\theta_e \end{bmatrix} \begin{bmatrix} V_d^{} \\ V_q^{} \end{bmatrix}$$ (EQUATION 54)

The relationship between Duty command values Duty_d and Duty_q and voltage command values Vd and Vq is expressed by Equation 55 or Equation 56, where the inverter applied voltage is VR.

[Equation 55]

$V_d^{} = VR \times \text{Duty\_d}/\text{Duty}100\%$ $V_q^{} = VR \times \text{Duty\_q}/\text{Duty}100\%$ (EQUATION 55)

[Equation 56]

Duty_d=$V_d^{**}$/VR×Duty100% (VR SENSITIVE FORMULA)

Duty_q=$V_q^{**}$/VR×Duty100% (VR SENSITIVE FORMULA) (EQUATION 56)

The relationship as shown in Equation 57 exists between the target voltage vector in the dq coordinate system and the target voltage vector in the α-β coordinate system, and the absolute value of the target voltage vector V is stored.

[Equation 57]

$|V| = \sqrt{(V_d^{})^2 + (V_q^{})^2} = \sqrt{V_\alpha^2 + V_\beta^2}$ (EQUATION 57)

Figure 102:
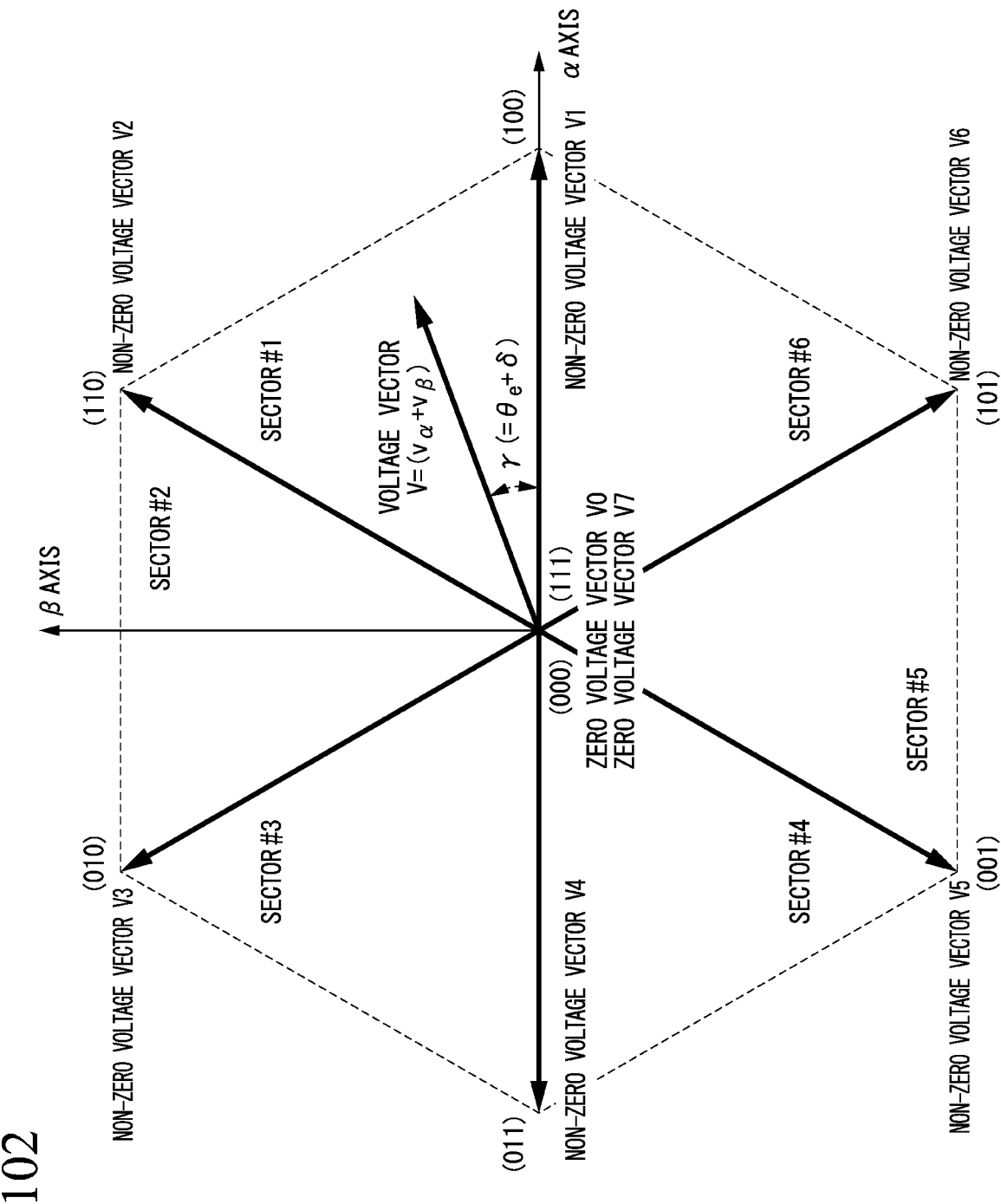
FIG. 102 is a diagram showing a calculation example of the space vector modulation unit.

In the switching pattern in space vector control, according to the switching patterns S1 to S6 of FET (Q1 to Q6), the output voltage of the inverter is defined by eight types of discrete reference voltage vectors V0 to V7 (non-zero voltage vectors V1 to V6 and zero voltage vectors V0 and V7 having different phases by π/3 [rad]) shown in the space vector diagram of FIG. 102. Then, the selection of the reference output voltage vectors V0 to V7 and the generation time thereof are controlled. Also, the space vector can be divided into six sectors #1 to #6 using six areas sandwiched by adjacent reference output voltage vectors, and the target voltage vector V belongs to any one of the sectors #1 to #6 and can be assigned a sector number. It can be determined based on the rotation angle γ in the α-β coordinate system of the target voltage vector V whether the target voltage vector V, which is a composite vector of Vα and Vβ, is located in the sector as shown in FIG. 102 divided into a regular hexagon in the α-β space. Further, the rotation angle γ is determined by γ=θe+δ as a sum of the phase δ obtained from the relationship between the motor angle θe and the voltage command values Vd and Vq in the dq coordinate system.

Figure 103:
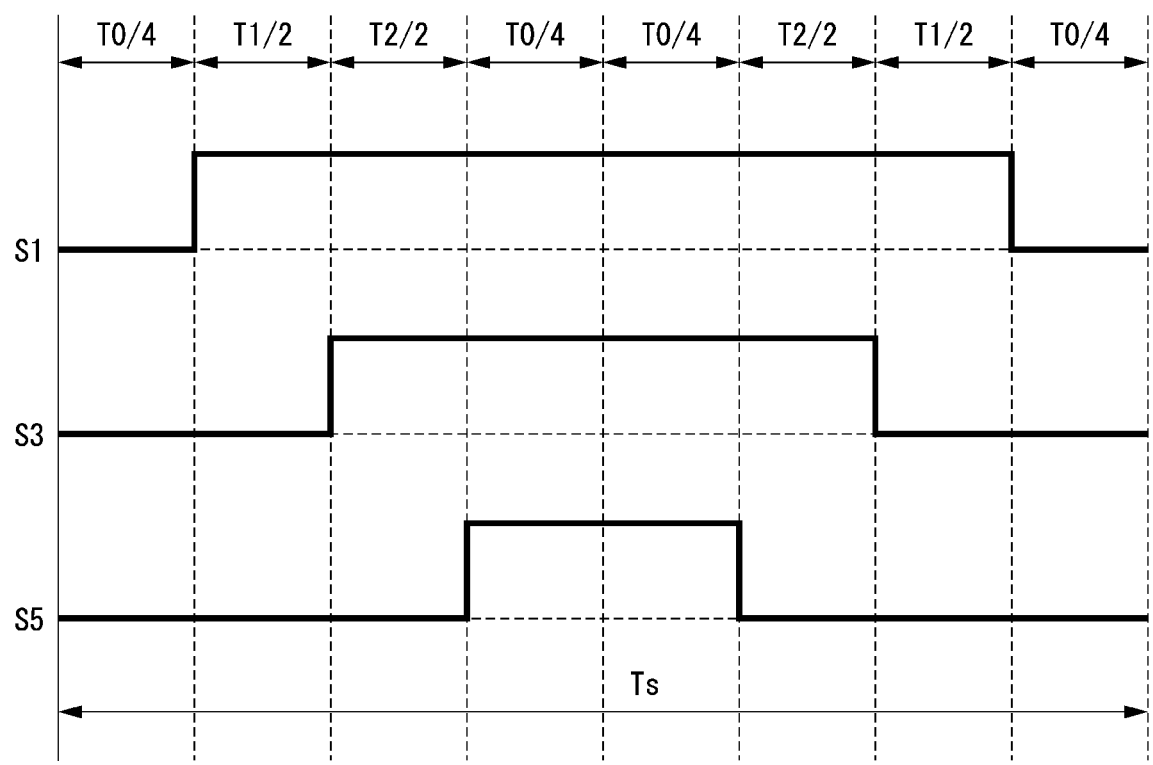
FIG. 103 is a timing chart illustrating a calculation example of the space vector modulation unit.

FIG. 103 shows a basic timing chart for determining the switching pulse width and the timing in the ON/OFF signals S1 to S6 (switching pattern) for the FET in order to output the target voltage vector V from the inverter, in digital control based on the switching patterns S1, S3 and S5 of the inverter in space vector control. In space vector modulation, an calculation or the like is performed within the sampling cycle Ts every defined sampling cycle Ts, and in the next sampling cycle Ts, the result is converted into each switching pulse width and its timing in the switching patterns S1 to S6 and output.

The space vector modulation generates switching patterns S1 to S6 according to the sector number obtained based on the target voltage vector V. FIG. 103 shows an example of switching patterns S1 to S6 of FETs of the inverter in the case of sector number #1 (n=1). Signals S1, S3 and S5 indicate gate signals of the FETs Q1, Q3 and Q5 corresponding to the upper arm. The horizontal axis represents time, and Ts corresponds to a switching cycle, and is a period that is divided into eight periods, and is configured by T0/4, T1/2, T2/2, T0/4, T0/4, T2/2, T1/2 and T0/4. Further, the periods T1 and T2 are times depending on the sector number n and the rotation angle γ, respectively.

INDUSTRIAL APPLICABILITY

The present invention can be applied to a motor control device mounted on an electric power steering device or the like.

DESCRIPTION OF THE REFERENCE SYMBOLS

300 electric power steering device
400 motor control device
2 column axis
3 reduction gear
10 torque sensor
12 vehicle speed sensor
14 rudder angle sensor
30 control unit (ECU)
31 current command value computation unit
39 motor control unit
100 motor
160 PWM control unit
160A-1 Duty output setting unit (output setting unit)
160A-2 PWM unit
160B gate driver
161 inverter
162 current detector
200 final Duty computation unit
201 dq axis dead time compensation value computation unit
203 dq axis current feedback control unit
204 transform coefficient computation unit
210 dq axis duty clamp/VR sensitive computation unit
220 voltage command value computation unit
240 electric angle interpolation unit
243 motor angle switching determination unit
244 switching unit
250 space vector modulation unit (transforming unit)

The invention claimed is:

1. A motor control device that performs PWM control of an inverter that drives a three-phase brushless motor based on a current command value, comprising:
a controller comprising:
a voltage command value computation unit, implemented by one or more from among at least one processor of the controller, that calculates a voltage command value using a motor electric angle and a motor rotation speed acquired from the three-phase brushless motor for each control cycle, and the current command value;
an electric angle interpolation unit, implemented by one or more from among the at least one processor of the controller, that estimates an interpolated electric angle from the motor electric angle at a division interval obtained by dividing the control cycle;
a converter configured to calculate a three-phase Duty command value from the voltage command value and the motor electric angle at the control cycle, and calculates a three-phase intermediate Duty command value from the voltage command value and the interpolated electric angle at the division interval; and
an output setting unit, implemented by one or more from among the at least one processor of the controller, that switches and outputs the three-phase Duty command value and the three-phase intermediate Duty command value in accordance with the division interval.

2. The motor control device according to claim 1, wherein the electric angle interpolation unit estimates the interpolated electric angle using one of a quadratic function interpolation calculation and a linear function interpolation calculation.

3. The motor control device according to claim 2, wherein the electric angle interpolation unit estimates the interpolated electric angle using the quadratic function interpolation calculation when the motor rotation speed is lower than a predetermined first rotation speed, and switches the quadratic function interpolation calculation to the linear function interpolation calculation when the motor rotation speed is equal to or higher than the first rotation speed.

4. The motor control device according to claim 3, wherein the electric angle interpolation unit outputs the motor electric angle as the interpolated electric angle when the motor rotation speed is higher than a predetermined second rotation speed higher than the first rotation speed.

5. The motor control device according to claim 1, wherein the control cycle is not less than 100 μs and not more than 250 μs.

6. The motor control device according to claim 1, wherein the three-phase brushless motor is controlled by a vector drive system, and the converter performs space vector modulation.

7. A motor control method for a three-phase brushless motor in which an inverter is PWM-controlled based on a current command value, comprising:
a voltage command value calculation step of calculating a voltage command value using a motor electric angle and a motor rotation speed acquired from the three-phase brushless motor for each control cycle, and the current command value;
an electric angle interpolation step of estimating an interpolated electric angle from the motor electric angle at a division interval obtained by dividing the control cycle;
a converting step of calculating a first three-phase Duty command value from the voltage command value and the motor electric angle at the control cycle, and calculating a second three-phase Duty command value from the voltage command value and the interpolated electric angle at the division interval; and an output setting step of switching and outputting the first three-phase Duty command value and the second three-phase Duty command value in accordance with the division interval.

8. The motor control method according to claim 7, wherein, in the electric angle interpolation step, a quadratic function interpolation calculation and a linear function interpolation calculation are switched to estimate the interpolated electric angle.

9. The motor control method according to claim 8, wherein,
in the electric angle interpolation step, the interpolated electric angle is estimated using the quadratic function interpolation calculation when the motor rotation speed is lower than a predetermined first rotation speed, and
the quadratic function interpolation calculation is switched to the linear function interpolation calculation when the motor rotation speed is equal to or higher than the first rotation speed.

10. The motor control method according to claim 9, wherein, in the electric angle interpolation step, the motor electric angle is output as the interpolated electric angle when the motor rotation speed is higher than a predetermined second rotation speed higher than the first rotation speed.

11. An electric power steering device of a vector control type, having a function of converting a dq-axis current command value calculated based on at least a steering torque is into a three-phase Duty command value, driving and controlling a three-phase brushless motor by PWM control of an inverter based on the three-phase Duty command value, compensating for a dead time of the inverter, and providing an assist torque to a steering mechanism of a vehicle, the electric power steering device comprising:
a controller comprising:
a first space vector modulation unit, implemented by one or more from among at least one processor of the controller, that converts a dq-axis Duty command value calculated based on the dq-axis current command value, a motor angle, and a motor rotation speed, into three phases according to the motor angle, to superimpose a third harmonic, and outputs a three-phase normal Duty command value for each control cycle;
an electric angle interpolation unit, implemented by one or more from among the at least one processor of the controller, that performs interpolation calculation based on the motor angle and outputs an interpolation motor angle at a division interval obtained by dividing the control cycle for intermediate Duty command value calculation;
a second space vector modulation unit, implemented by one or more from among the at least one processor of the controller, that converts the dq-axis Duty command value into three phases according to the interpolation motor angle, superimposes third harmonics, and outputs a three phase intermediate Duty command value;
a final Duty computation unit, implemented by one or more from among the at least one processor of the controller, that outputs a final normal Duty value and a final intermediate Duty value based on the normal Duty command value and the intermediate Duty command value.

12. The electric power steering device according to claim 11, wherein the electric angle interpolation unit includes:
a motor angle switching determination unit, implemented by one or more from among the at least one processor of the controller, that determines whether the motor angle falls within a predetermined range and outputs a switching flag;
a calculation processing unit, implemented by one or more from among the at least one processor of the controller, that interpolates the motor angle;
an offset-added calculation processing unit, implemented by one or more from among the at least one processor of the controller, which performs interpolation calculation of the motor angle for which offset processing has been performed at a predetermined angle, and performs offset return processing for the predetermined angle for which the interpolation calculation has been performed; and
a switching unit, implemented by one or more from among the at least one processor of the controller, that receives a first interpolation motor angle from the calculation processing unit and a second interpolation motor angle from the offset-added calculation processing unit, and switches by the switching flag to output the interpolation Duty calculation motor angle.

13. The electric power steering device according to claim 12, wherein
the calculation processing unit includes a first rollover processing unit implemented by one or more from among the at least one processor of the controller, and
the offset-added calculation processing unit includes a second rollover processing unit after the offset processing that is implemented by one or more from among the at least one processor of the controller, and includes a third rollover processing unit after the offset return processing that is implemented by one or more from among the at least one processor of the controller.

14. The electric power steering device according to claim 12, wherein the predetermined range is a range of 90° or more and 270° or less.

15. The electric power steering device according to claim 12, wherein the predetermined angle is 180°.

16. The electric power steering device according to claim 11, wherein the interpolation calculation is a quadratic function interpolation calculation or a linear function interpolation calculation.

* * * * *